US010009088B2

(12) United States Patent
Rahman et al.

(10) Patent No.: US 10,009,088 B2
(45) Date of Patent: Jun. 26, 2018

(54) LINEAR COMBINATION PMI CODEBOOK BASED CSI REPORTING IN ADVANCED WIRELESS COMMUNICATION SYSTEMS

(71) Applicant: Samsung Electronics Co., Ltd, Suwon-si (KR)

(72) Inventors: Md. Saifur Rahman, Richardson, TX (US); Eko Onggosanusi, Allen, TX (US); Young-Han Nam, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days. days.

(21) Appl. No.: 15/468,073

(22) Filed: Mar. 23, 2017

(65) Prior Publication Data
US 2017/0279514 A1    Sep. 28, 2017

Related U.S. Application Data

(60) Provisional application No. 62/463,770, filed on Feb. 27, 2017, provisional application No. 62/463,146, (Continued)

(51) Int. Cl.
*H04B 7/06*  (2006.01)
*H04W 72/04*  (2009.01)
(Continued)

(52) U.S. Cl.
CPC ......... *H04B 7/0639* (2013.01); *H04B 7/0617* (2013.01); *H04B 7/0626* (2013.01); (Continued)

(58) Field of Classification Search
CPC .. H04B 7/0639; H04B 7/0617; H04B 7/0626; H04W 72/0413; H04W 72/06; H04L 5/0048
See application file for complete search history.

(56) References Cited

U.S. PATENT DOCUMENTS 9,312,937 B2 *  4/2016  Ko ....................... H04B 7/0456
2008/0101322 A1  5/2008  Prakash et al.
(Continued)

FOREIGN PATENT DOCUMENTS

| JP | 2014042253 A | 3/2014 |
| WO | 2014137772 A1 | 9/2014 |

OTHER PUBLICATIONS

3GPP TS 36.211 V14.1.0 (Dec. 2016) LTE; Evolved Universal Terrestrial Radio Access (E-UTRA); Physical channels and modulation (3GPP TS 36.211 version 14.1.0 Release 14)—Dec. 2016—175 Pages.
3GPP TS 36.212 V14.1.0 (Dec. 2016) LTE; Evolved Universal Terrestrial Radio Access (E-UTRA); Multiplexing and channel coding (3GPP TS 36.212 version 14.1.0 Release 14)—Dec. 2016—176 Pages.
3GPP TS 36.213 V14.1.0 (Dec. 2016) LTE; Evolved Universal Terrestrial Radio Access (E-UTRA); Physical layer procedures (3GPP TS 36.213 version 14.1.0 Release 14)—Dec. 2016—414 Pages.
(Continued)

*Primary Examiner* — Jean B Corrielus

(57) ABSTRACT

A method for a channel state information (CSI) feedback in an advanced communication system. The method comprises receiving, from a base station (BS), CSI feedback configuration information for a pre-coding matrix indicator (PMI) feedback based on a linear combination (LC) codebook, wherein the PMI comprises a first PMI $i_1$ and a second PMI $i_2$. The method further comprises determining, by a user equipment (UE), the first PMI $i_1$ and the second PMI $i_2$ indicating an LC pre-coder that corresponds to a weighted linear combination of a first beam and a second beam, where a power of a weight assigned to the first beam is 1 and a power of a weight assigned to the second beam is between 0 and 1 and transmitting, to the BS, the CSI feedback over an uplink channel including the determined first PMI $i_1$ and second PMI $i_2$.

25 Claims, 18 Drawing Sheets

Related U.S. Application Data filed on Feb. 24, 2017, provisional application No. 62/461,320, filed on Feb. 21, 2017, provisional application No. 62/427,249, filed on Nov. 29, 2016, provisional application No. 62/345,119, filed on Jun. 3, 2016, provisional application No. 62/340,776, filed on May 24, 2016, provisional application No. 62/314,011, filed on Mar. 28, 2016.

(51) Int. Cl.
*H04L 5/00* (2006.01)
*H04W 72/06* (2009.01)

(52) U.S. Cl.
CPC ....... *H04L 5/0048* (2013.01); *H04W 72/0413* (2013.01); *H04W 72/06* (2013.01)

(56) References Cited

U.S. PATENT DOCUMENTS

| | | | |
|---|---|---|---|
| 2012/0201321 A1* | 8/2012 | Koivisto | H04B 7/0632 375/267 |
| 2014/0254508 A1 | 9/2014 | Krishnamurthy et al. | |
| 2014/0376464 A1* | 12/2014 | Nam | H04B 7/0639 370/329 |
| 2017/0048863 A1* | 2/2017 | Tsai | H04B 7/0456 |

OTHER PUBLICATIONS

3GPP TS 36.321 V14.1.0 (Dec. 2016) LTE; Evolved Universal Terrestrial Radio Access (E-UTRA); Medium Access Control (MAC) protocol specification (3GPP TS 36.321 version 14.1.0 Release 14)—Dec. 2016—98 Pages.

3GPP TS 36.331 V14.1.0 (Dec. 2016) LTE; Evolved Universal Terrestrial Radio Access (E-UTRA); Radio Resource Control (RRC) Protocol specification (3GPP TS 36.331 version 14.1.0 Release 14)—Dec. 2016—654 Pages.

3GPP RAN Meeting #71 (RP-160623); New WID Proposal: Enhancements on Full-Dimension (FD) MIMO for LTE Approval; Agenda Item 10.1.1—Mar. 7-10, 2016—8 Pages.

Motorola Mobility; "Enhanced 4 Tx Codebook"; 3GPP TSG-RAN WG1 #72bis; R1-131725; Chicago, USA; Apr. 15-19, 2013; 7 pages.

Nam et al.; "Full Dimension MIMO for LTE-Advanced and 5G"; Information Theory and Applications Workshop (ITA) 2015; San Diego, California, USA; Feb. 1-6, 2015; 6 pages.

Foreign Communication from Related Counterpart Application; PCT Application No. PCT/KR2017/003339; International Search Report dated Jul. 25, 2017; 3 pages.

* cited by examiner

LINEAR COMBINATION PMI CODEBOOK BASED CSI REPORTING IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/314,011, filed on Mar. 28, 2016, entitled "Linear Combination PMI codebook based CSI Reporting in Advanced Wireless Communication Systems;" U.S. Provisional Patent Application Ser. No. 62/340,776, filed on May 24, 2016, entitled "Linear Combination PMI codebook based CSI Reporting in Advanced Wireless Communication Systems;" U.S. Provisional Patent Application Ser. No. 62/345,119, filed on Jun. 3, 2016, entitled "Linear Combination Codebook for Beam-formed CSI-RS and CSI Reporting in Advanced Wireless Communication Systems;" U.S. Provisional Patent Application Ser. No. 62/427,249, filed on Nov. 29, 2016, entitled "Linear Combination PMI codebook based CSI Reporting in Advanced Wireless Communication Systems;" U.S. Provisional Patent Application Ser. No. 62/461,320, filed on Feb. 21, 2017, entitled "Linear Combination PMI codebook based CSI Reporting in Advanced Wireless Communication Systems;" U.S. Provisional Patent Application Ser. No. 62/463,146, filed on Feb. 24, 2017, entitled "Linear Combination PMI codebook based CSI Reporting in Advanced Wireless Communication Systems;" and U.S. Provisional Patent Application Ser. No. 62/463,770, filed on Feb. 27, 2017, entitled "Linear Combination PMI codebook based CSI Reporting in Advanced Wireless Communication Systems." The content of the above-identified patent documents are incorporated herein by reference.

TECHNICAL FIELD

The present application relates generally to channel state information (CSI) reporting operation in advanced wireless communication systems. More specifically, this disclosure relates to linear combination precoding matrix indicator (PMI) codebook based CSI reporting.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-5$^{th}$-Generation (5G) or 5G communication system to be provided for supporting higher data rates beyond 4$^{th}$-Generation (4G) communication system such as Long Term Evolution (LTE). Embodiments of the present disclosure provide an advanced CSI reporting based on a linear combination codebook for MIMO wireless communication systems.

In one embodiment, a user equipment (UE) for a channel state information (CSI) feedback in an advanced communication system is provided. The UE comprises a transceiver configured to receive, from a base station (BS), a CSI feedback configuration information for a pre-coding matrix indicator (PMI) feedback based on a linear combination (LC) codebook, wherein the PMI comprises a first PMI $i_1$ and a second PMI $i_2$ and at least one processor configured to determine the first PMI $i_1$ and the second PMI $i_2$ indicating an LC pre-coder that corresponds to a weighted linear combination of a first beam and a second beam, wherein a power of a weight assigned to the first beam is 1 and a power of a weight assigned to the second beam is between 0 and 1. The UE further comprises the transceiver configured to transmit, to the BS, the CSI feedback over an uplink channel including the determined first PMI $i_1$ and second PMI $i_2$.

In another embodiment, an eNodeB (eNB) for a channel state information (CSI) feedback in an advanced communication system is provided. The eNodeB comprises a transceiver configured to transmit, to a user equipment (UE), a CSI feedback configuration information for a pre-coding matrix indicator (PMI) feedback based on a linear combination (LC) codebook, wherein the PMI comprises a first PMI $i_1$ and a second PMI $i_2$ and receive, from the UE, the CSI feedback over an uplink channel including the first PMI $i_1$ and second PMI $i_2$ indicating an LC pre-coder that corresponds to a weighted linear combination of a first beam and a second beam, wherein a power of a weight assigned to the first beam is 1 and a power of a weight assigned to the second beam is between 0 and 1.

In yet another embodiment, a method for a channel state information (CSI) feedback in an advanced communication system is provided. The method comprises receiving, from a base station (BS), a CSI feedback configuration information for a pre-coding matrix indicator (PMI) feedback based on a linear combination (LC) codebook, wherein the PMI comprises a first PMI $i_1$ and a second PMI $i_2$, determining, by a user equipment (UE), the first PMI $i_1$ and the second PMI $i_2$ indicating an LC pre-coder that corresponds to a weighted linear combination of a first beam and a second beam, where a power of a weight assigned to the first beam is 1 and a power of a weight assigned to the second beam is between 0 and 1, and transmitting, to the BS, the CSI feedback over an uplink channel including the determined first PMI $i_1$ and second PMI $i_2$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

This present disclosure covers several components which can be used in conjunction or in combination with one another, or can operate as standalone schemes.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 23 illustrates the mapping between Codebook-Config parameter to rank 1 beam grouping indicated by ($i_{1,1}$, $i_{1,2}$); and FIG. 24 illustrates mapping Codebook-Config to L or ($L_1$ or/and $L_2$) beams.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation" (REF1); 3GPP TS 36.212 v14.1.0, "E-UTRA, Multiplexing and Channel coding" (REF2); 3GPP TS 36.213 v14.1.0, "E-UTRA, Physical Layer Procedures" (REF3); 3GPP TS 36.321 v14.1.0, "E-UTRA, Medium Access Control (MAC) protocol specification" (REF4); 3GPP TS 36.331 v14.1.0, "E-UTRA, Radio Resource Control (RRC) protocol specification" (REF5); and RP-160623, "New WID Proposal: Enhancements on Full-Dimension (FD) MIMO for LTE," Samsung.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
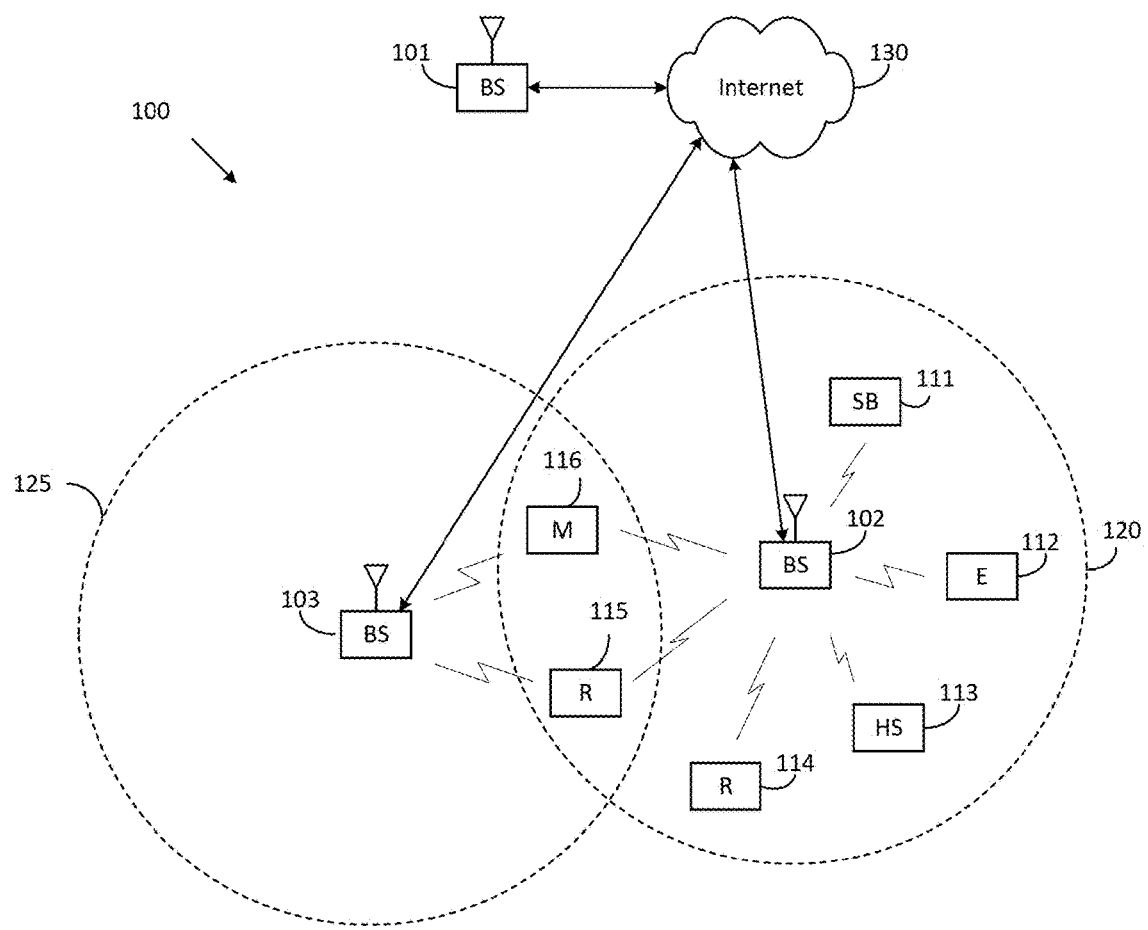
FIG. 1 illustrates an example wireless network according to embodiments of the present disclosure.
Figure 2:
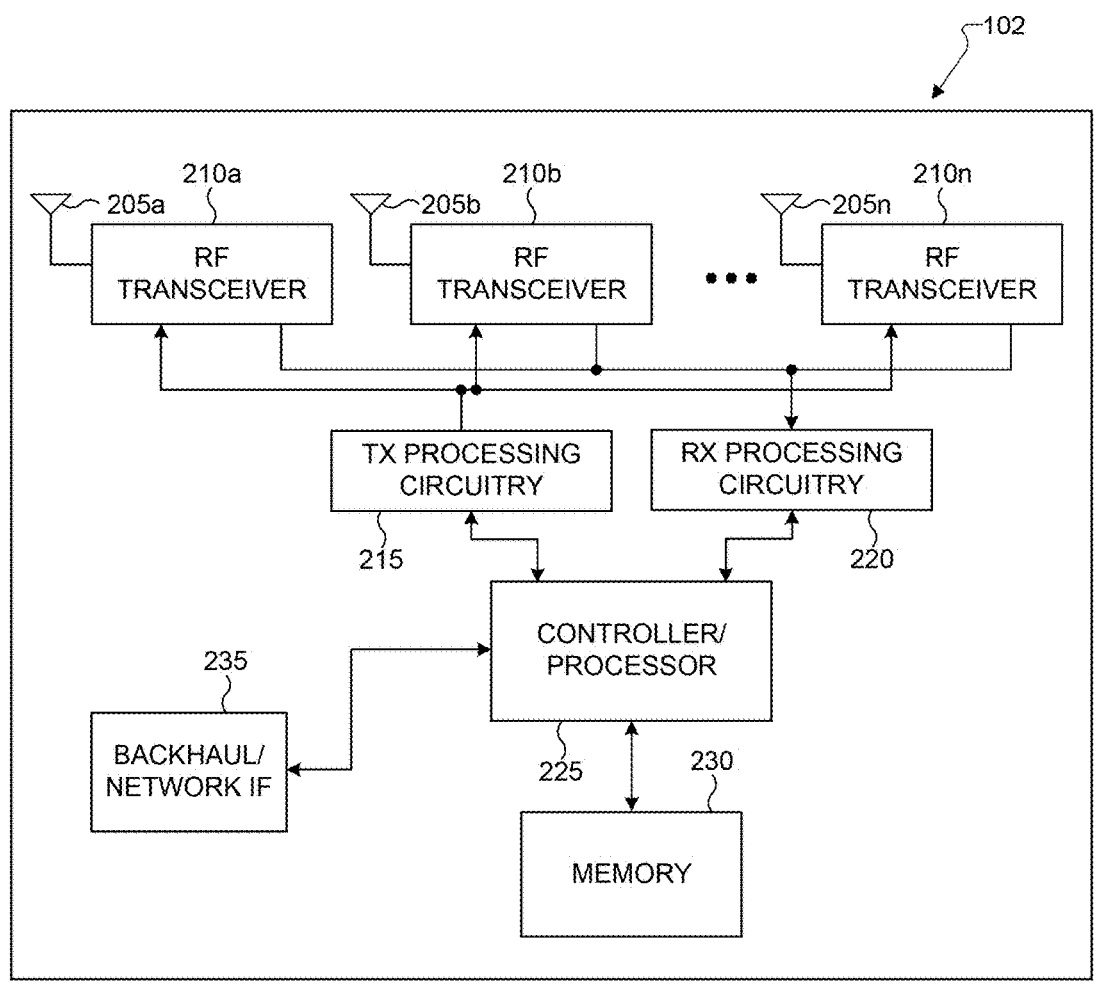
FIG. 2 illustrates an example eNodeB (eNB) according to embodiments of the present disclosure.
Figure 3:
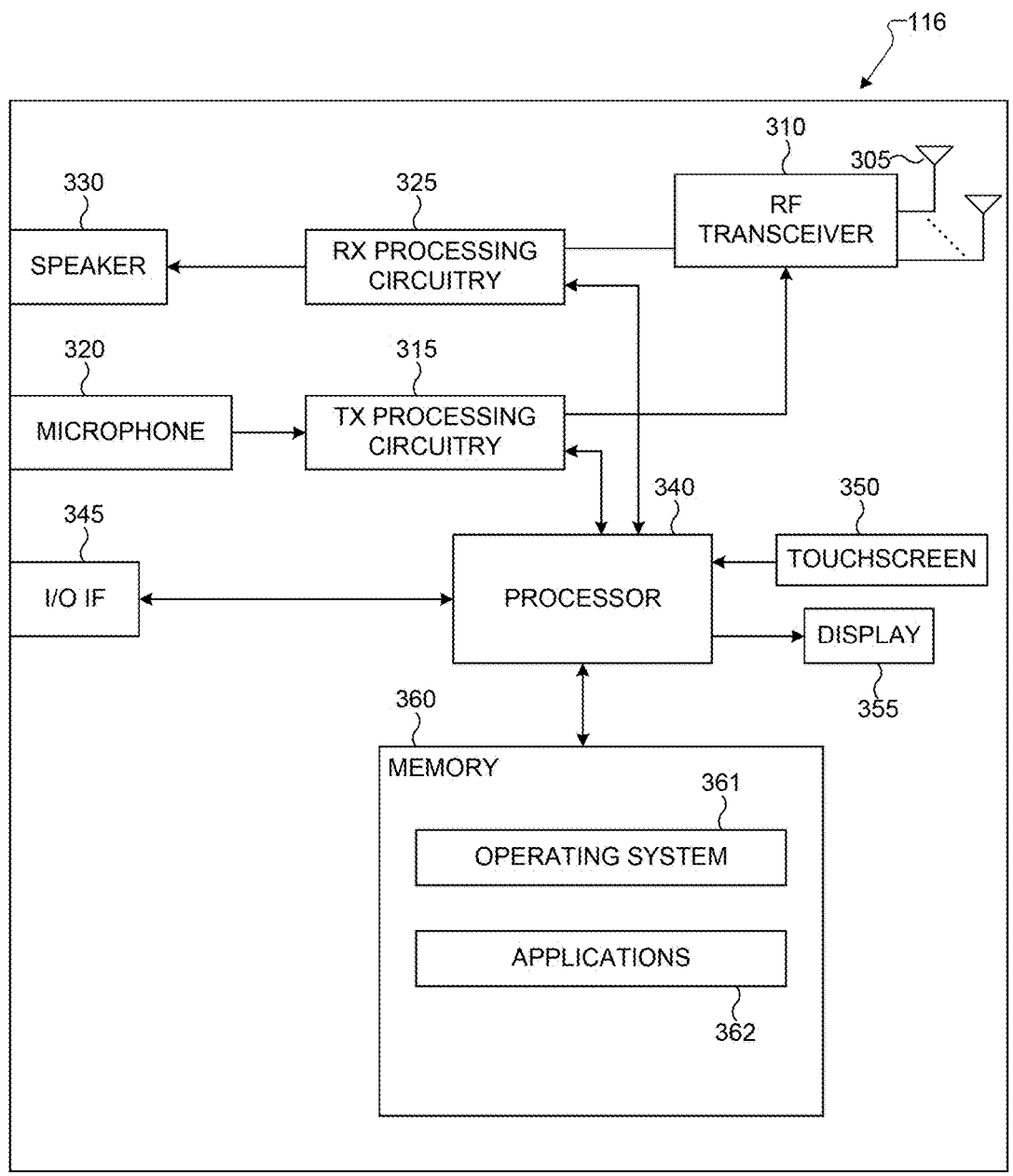
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting, to a user equipment (UE), a CSI feedback configuration information for a pre-coding matrix indicator (PMI) feedback based on a linear combination (LC) codebook, wherein the PMI comprises a first PMI $i_1$ and a second PMI $i_2$ and receiving, from the UE, the CSI feedback over an uplink channel including the first PMI $i_1$ and second PMI $i_2$ indicating an LC pre-coder that corresponds to a weighted linear combination of a first beam and a second beam, wherein a power of a weight assigned to the first beam is 1 and a power of a weight assigned to the second beam is between 0 and 1.

In such embodiments, the CSI feedback configuration information includes a number of dual-polarized CSI-RS ports, wherein a first half of the CSI-RS ports corresponds to a first polarization and a second half of the CSI-RS ports corresponds to a second polarization, and wherein the LC pre-coder is determined as:

$$W^{(l)}_{l,m,l',m',p,n_1,n_2,n_3} = \frac{1}{\sqrt{P(1+p)^2}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix}.$$

wherein P denotes a number of CSI-RS ports, $v_{l,m}$ denotes the first beam, $v_{l+l',m+m'}$ denotes the second beam, p denotes the power of the weight assigned to the second beam, where p takes a value from $\{0, \sqrt{1/4}, \sqrt{1/2}, 1\}$, $\varphi_{n_1}$ denotes a phase of the weight assigned to the second beam for the first half of the CSI-RS ports with the first polarization, and $\varphi_{n_2}$ and $\varphi_{n_3}$ denote a phase of the weights assigned to the first and second beams, respectively, for the second half of the CSI-RS ports with the second polarization, wherein $$\varphi_n = e^{j\pi n/2}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_2-1)}{O_1 N_1}} u_m \end{bmatrix}^T.$$

In such embodiment, a number of CSI reference signal (CSI-RS) ports, P, belongs to a set $\{4, 8, 12, 16, 20, 24, 28, 32\}$.

In such embodiments, the LC codebook parameterized by a single codebook 1-layer and 2-layer CSI feedback is determined as:

| P = 4, 8, 12, 16, 20, 24, 28, 32 | | | |
|---|---|---|---|
| $N_1 > 1, N_2 > 1, 0 \leq i_{1,1} \leq 4N_1 - 1, 0 \leq i_{1,2} \leq 4N_2 - 1$ | | | |
| $0 \leq i_{2,1} \leq 63$ | | | |
| 0 + 16x | 1 + 16x | 2 + 16x | 3 + 16x |
| $W^{(l)}_{i_{1,1},i_{1,2},4d_1,4d_2,p,0,0,x}$ | $W^{(l)}_{i_{1,1},i_{1,2},4d_1,4d_2,p,0,1,x}$ | $W^{(l)}_{i_{1,1},i_{1,2},4d_1,4d_2,p,0,2,x}$ | $W^{(l)}_{i_{1,1},i_{1,2},4d_1,4d_2,p,0,3,x}$ |
| 4 + 16x | 5 + 16x | 6 + 16x | 7 + 16x |
| $W^{(l)}_{i_{1,1},i_{1,2},4d_1,4d_2,p,1,0,x}$ | $W^{(l)}_{i_{1,1},i_{1,2},4d_1,4d_2,p,1,1,x}$ | $W^{(l)}_{i_{1,1},i_{1,2},4d_1,4d_2,p,1,2,x}$ | $W^{(l)}_{i_{1,1},i_{1,2},4d_1,4d_2,p,1,3,x}$ |
| 8 + 16x | 9 + 16x | 10 + 16x | 11 + 16x |
| $W^{(l)}_{i_{1,1},i_{1,2},4d_1,4d_2,p,2,0,x}$ | $W^{(l)}_{i_{1,1},i_{1,2},4d_1,4d_2,p,2,1,x}$ | $W^{(l)}_{i_{1,1},i_{1,2},4d_1,4d_2,p,2,2,x}$ | $W^{(l)}_{i_{1,1},i_{1,2},4d_1,4d_2,p,2,3,x}$ |

| 12 + 16x | 13 + 16x | 14 + 16x | 15 + 16x |
|---|---|---|---|
| $W_{i_{1,1},i_{1,2},4d_1,4d_2,p,3,0,x}^{(l)}$ | $W_{i_{1,1},i_{1,2},4d_1,4d_2,p,3,1,x}^{(l)}$ | $W_{i_{1,1},i_{1,2},4d_1,4d_2,p,3,2,x}^{(l)}$ | $W_{i_{1,1},i_{1,2},4d_1,4d_2,p,3,3,x}^{(l)}$ |
| $N_2 = 1,\ 0 \le i_{1,1} < 4N_1 = 1,\ i_{1,2} = 0$ $0 \le i_{2,1} \le 63$ | | | |
| 0 + 16x | 1 + 16x | 2 + 16x | 3 + 16x |
| $W_{i_{1,1},i_{1,2},4d_1,d_2,p,0,0,x}^{(l)}$ | $W_{i_{1,1},i_{1,2},4d_1,d_2,p,0,1,x}^{(l)}$ | $W_{i_{1,1},i_{1,2},4d_1,d_2,p,0,2,x}^{(l)}$ | $W_{i_{1,1},i_{1,2},4d_1,d_2,p,0,3,x}^{(l)}$ |
| 4 + 16x | 5 + 16x | 6 + 16x | 7 + 16x |
| $W_{i_{1,1},i_{1,2},4d_1,d_2,p,1,0,x}^{(l)}$ | $W_{i_{1,1},i_{1,2},4d_1,d_2,p,1,1,x}^{(l)}$ | $W_{i_{1,1},i_{1,2},4d_1,d_2,p,1,2,x}^{(l)}$ | $W_{i_{1,1},i_{1,2},4d_1,d_2,p,1,3,x}^{(l)}$ |
| 8 + 16x | 9 + 16x | 10 + 16x | 11 + 16x |
| $W_{i_{1,1},i_{1,2},4d_1,d_2,p,2,0,x}^{(l)}$ | $W_{i_{1,1},i_{1,2},4d_1,d_2,p,2,1,x}^{(l)}$ | $W_{i_{1,1},i_{1,2},4d_1,d_2,p,2,2,x}^{(l)}$ | $W_{i_{1,1},i_{1,2},4d_1,d_2,p,2,3,x}^{(l)}$ |
| 12 + 16x | 13 + 16x | 14 + 16x | 15 + 16x |
| $W_{i_{1,1},i_{1,2},4d_1,d_2,p,3,0,x}^{(l)}$ | $W_{i_{1,1},i_{1,2},4d_1,d_2,p,3,1,x}^{(l)}$ | $W_{i_{1,1},i_{1,2},4d_1,d_2,p,3,2,x}^{(l)}$ | $W_{i_{1,1},i_{1,2},4d_1,d_2,p,3,3,x}^{(l)}$ | wherein $x = \lfloor i_{2,l}/16 \rfloor$, l denotes an index for a layer value, $(d_1, d_2)$ denotes a beam index of the second beam, p is a beam power of the second beam, $(N_1, N_2)$ denotes an CSI-RS port layout in two dimensions, P denotes a number of CSI-RS ports, $$W_{l,m,l',m',p,n_1,n_2,n_3}^{(l)} = \frac{1}{\sqrt{P(1+p^2)}} \begin{bmatrix} v_{l,m} + p\varphi_{n_1} v_{l+l',m+m'} \\ \varphi_{n_2} v_{l,m} + p\varphi_{n_3} v_{l+l',m+m'} \end{bmatrix},\ l = 0, 1,$$

1-layer: $W_{l,l',m,m',p,n_1,n_2,n_3}^{(1)} = W_{l,l',m,m',p,n_1,n_2,n_3}^{(l=0)}$, 2-layers: $W_{l,l',m,m',p,n_1,0,n_2,0,n_3,0,n_1,1,n_2,1,n_3,1}^{(2)} = \frac{1}{\sqrt{2}} \left[ W_{l,l',m,m',p,n_1,0,n_2,0,n_3,0}^{(l=0)}\ W_{l,l',m,m',p,n_1,1,n_2,1,n_3,1}^{(l=1)} \right]$ In some embodiments, the RF transceivers 210*a*-210*n* are capable of transmitting, to the UE, dual polarized CSI-RS port layout values comprising $(N_1, N_2)$ using a higher layer signaling that determines a number of CSI-RS ports $P = 2N_1N_2$.

In such embodiments, a combination of the $(N_1, N_2)$ is determined as:

| Number of CSI-RS antenna ports, P | $(N_1, N_2)$ |
|---|---|
| 4 | (2, 1) |
| 8 | (2, 2) |
|  | (4, 1) |
| 12 | (2, 3) |
|  | (3, 2) |
| 16 | (2, 4) |
|  | (4, 2) |
|  | (8, 1) |
| 20 | (2, 5) |
|  | (5, 2) |
|  | (10, 1) |
| 24 | (2, 6) |
|  | (3, 4) |
|  | (4, 3) |
|  | (6, 2) |
|  | (12, 1) |
| 28 | (2, 7) |
|  | (7, 2) |
|  | (14, 1) |
| 32 | (2, 8) |
|  | (4, 4) |
|  | (8, 2) |
|  | (16, 1) |

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the eNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programing, or a combination thereof for processing of CSI reporting on an uplink channel. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of determining CSI feedback configuration information for a pre-coding matrix indicator (PMI) feedback based on a linear combination (LC) codebook, wherein the PMI comprises a first PMI $i_1$ and a second PMI $i_2$.

In such embodiments, the CSI feedback configuration information includes a number of dual-polarized CSI-RS ports, wherein a first half of the CSI-RS ports corresponds to a first polarization and a second half of the CSI-RS ports corresponds to a second polarization, and wherein the LC pre-coder is determined as:

$$W^{(l)}_{l,m,l',m',p,n_1,n_2,n_3} = \frac{1}{\sqrt{P(1+p)^2}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix}.$$

wherein P denotes a number of CSI-RS ports, $v_{l,m}$ denotes the first beam, $v_{l+l',m+m'}$ denotes the second beam, p denotes the power of the weight assigned to the second beam, where p takes a value from $\{0, \sqrt{1/4}, \sqrt{1/2}, 1\}$, $\varphi_{n_1}$ denotes a phase of the weight assigned to the second beam for the first half of the CSI-RS ports with the first polarization, and $\varphi_{n_2}$ and $\varphi_{n_3}$ denote a phase of the weights assigned to the first and second beams, respectively, for the second half of the CSI-RS ports with the second polarization, wherein:

$$\varphi_n = e^{j\pi n/2}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_2-1)}{O_1 N_1}} u_m \end{bmatrix}^T.$$

In such embodiments, a number of CSI reference signal (CSI-RS) ports, P, belongs to a set $\{4, 8, 12, 16, 20, 24, 28, 32\}$.

In such embodiments, the LC codebook parameterized by a single codebook 1-layer and 2-layer CSI feedback is determined as:

| P = 4, 8, 12, 16, 20, 24, 28, 32 | | | |
|---|---|---|---|
| $N_1 > 1, N_2 > 1, 0 \le i_{1,1} \le 4N_1 - 1, 0 \le i_{1,2} \le 4N_2 - 1$ | | | |
| $0 \le i_{2,1} \le 63$ | | | |
| 0 + 16x | 1 + 16x | 2 + 16x | 3 + 16x |
| $W^{(l)}_{i_{1,1},i_{1,2},4d_1,4d_2,p,0,0,x}$ | $W^{(l)}_{i_{1,1},i_{1,2},4d_1,4d_2,p,0,1,x}$ | $W^{(l)}_{i_{1,1},i_{1,2},4d_1,4d_2,p,0,2,x}$ | $W^{(l)}_{i_{1,1},i_{1,2},4d_1,4d_2,p,0,3,x}$ |
| 4 + 16x | 5 + 16x | 6 + 16x | 7 + 16x |
| $W^{(l)}_{i_{1,1},i_{1,2},4d_1,4d_2,p,1,0,x}$ | $W^{(l)}_{i_{1,1},i_{1,2},4d_1,4d_2,p,1,1,x}$ | $W^{(l)}_{i_{1,1},i_{1,2},4d_1,4d_2,p,1,2,x}$ | $W^{(l)}_{i_{1,1},i_{1,2},4d_1,4d_2,p,1,3,x}$ |
| 8 + 16x | 9 + 16x | 10 + 16x | 11 + 16x |
| $W^{(l)}_{i_{1,1},i_{1,2},4d_1,4d_2,p,2,0,x}$ | $W^{(l)}_{i_{1,1},i_{1,2},4d_1,4d_2,p,2,1,x}$ | $W^{(l)}_{i_{1,1},i_{1,2},4d_1,4d_2,p,2,2,x}$ | $W^{(l)}_{i_{1,1},i_{1,2},4d_1,4d_2,p,2,3,x}$ |
| 12 + 16x | 13 + 16x | 14 + 16x | 15 + 16x |
| $W^{(l)}_{i_{1,1},i_{1,2},4d_1,4d_2,p,3,0,x}$ | $W^{(l)}_{i_{1,1},i_{1,2},4d_1,4d_2,p,3,1,x}$ | $W^{(l)}_{i_{1,1},i_{1,2},4d_1,4d_2,p,3,2,x}$ | $W^{(l)}_{i_{1,1},i_{1,2},4d_1,4d_2,p,3,3,x}$ |
| $N_2 = 1, 0 < i_{1,1} < 4N_1 = 1, i_{1,2} = 0$ | | | |
| $0 \le i_{2,1} \le 63$ | | | |
| 0 + 16x | 1 + 16x | 2 + 16x | 3 + 16x |
| $W^{(l)}_{i_{1,1},i_{1,2},4d_1,d_2,p,0,0,x}$ | $W^{(l)}_{i_{1,1},i_{1,2},4d_1,d_2,p,0,1,x}$ | $W^{(l)}_{i_{1,1},i_{1,2},4d_1,d_2,p,0,2,x}$ | $W^{(l)}_{i_{1,1},i_{1,2},4d_1,d_2,p,0,3,x}$ |
| 4 + 16x | 5 + 16x | 6 + 16x | 7 + 16x |
| $W^{(l)}_{i_{1,1},i_{1,2},4d_1,d_2,p,1,0,x}$ | $W^{(l)}_{i_{1,1},i_{1,2},4d_1,d_2,p,1,1,x}$ | $W^{(l)}_{i_{1,1},i_{1,2},4d_1,d_2,p,1,2,x}$ | $W^{(l)}_{i_{1,1},i_{1,2},4d_1,d_2,p,1,3,x}$ |

-continued

| 8 + 16x | 9 + 16x | 10 + 16x | 11 + 16x |
|---|---|---|---|
| $W^{(l)}_{i_{1,1},i_{1,2},4d_1,d_2,p,2,0,x}$ | $W^{(l)}_{i_{1,1},i_{1,2},4d_1,d_2,p,2,1,x}$ | $W^{(l)}_{i_{1,1},i_{1,2},4d_1,d_2,p,2,2,x}$ | $W^{(l)}_{i_{1,1},i_{1,2},4d_1,d_2,p,2,3,x}$ |
| 12 + 16x | 13 + 16x | 14 + 16x | 15 + 16x |
| $W^{(l)}_{i_{1,1},i_{1,2},4d_1,d_2,p,3,0,x}$ | $W^{(l)}_{i_{1,1},i_{1,2},4d_1,d_2,p,3,1,x}$ | $W^{(l)}_{i_{1,1},i_{1,2},4d_1,d_2,p,3,2,x}$ | $W^{(l)}_{i_{1,1},i_{1,2},4d_1,d_2,p,3,3,x}$ | wherein x = $\lfloor i_{2,l}/16 \rfloor$, l denotes an index for a layer value, $(d_1, d_2)$ denotes a beam index of the second beam, p is a beam power of the second beam, $(N_1, N_2)$ denotes an CSI-RS port layout in two dimensions, P denotes a number of CSI-RS ports, $$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2} v_{l,m} + p\varphi_{n_3} v_{l+l',m+m'} \end{bmatrix}, l = 0, 1,$$

1-layer: $W^{(1)}_{l,l',m,m',p,n_1,n_2,n_3} = W^{(l=0)}_{l,l',m,m',p,n_1,n_2,n_3}$, 2-layers: $W^{(2)}_{l,l',m,m',p,n_{1,0},n_{2,0},n_{3,0},n_{1,1},n_{2,1},n_{3,1}} = \frac{1}{\sqrt{2}} \left[ W^{(l=0)}_{l,l',m,m',p,n_{1,0},n_{2,0},n_{3,0}} W^{(l=1)}_{l,l',m,m',p,n_{1,1},n_{2,1},n_{3,1}} \right]$ In such embodiments, a combination of the $(N_1, N_2)$ is determined as:

| Number of CSI-RS antenna ports, P | $(N_1, N_2)$ |
|---|---|
| 4 | (2, 1) |
| 8 | (2, 2) |
|   | (4, 1) |
| 12 | (2, 3) |
|   | (3, 2) |
| 16 | (2, 4) |
|   | (4, 2) |
|   | (8, 1) |
| 20 | (2, 5) |
|   | (5, 2) |
|   | (10, 1) |
| 24 | (2, 6) |
|   | (3, 4) |
|   | (4, 3) |
|   | (6, 2) |
|   | (12, 1) |
| 28 | (2, 7) |
|   | (7, 2) |
|   | (14, 1) |
| 32 | (2, 8) |
|   | (4, 4) |
|   | (8, 2) |
|   | (16, 1) |

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), a CSI feedback configuration information for a pre-coding matrix indicator (PMI) feedback based on a linear combination (LC) codebook, wherein the PMI comprises a first PMI $i_1$ and a second PMI $i_2$ and transmitting, to the BS, the CSI feedback over an uplink channel including the determined first PMI $i_1$ and second PMI $i_2$.

In such embodiments, the CSI feedback configuration information includes a number of dual-polarized CSI-RS ports, wherein a first half of the CSI-RS ports corresponds to a first polarization and a second half of the CSI-RS ports corresponds to a second polarization, and wherein the LC pre-coder is determined as:

$$W^{(l)}_{l,m,l',m',p,n_1,n_2,n_3} = \frac{1}{\sqrt{P(1+p)^2}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix}.$$

wherein P denotes a number of CSI-RS ports, $v_{l,m}$ denotes the first beam, $v_{l+l',m+m'}$ denotes the second beam, p denotes the power of the weight assigned to the second beam, where p takes a value from $\{0, \sqrt[4]{1/4}, \sqrt[4]{1/2}, 1\}$, $\varphi_{n_1}$ denotes a phase of the weight assigned to the second beam for the first half of the CSI-RS ports with the first polarization, and $\varphi_{n_2}$ and $\varphi_{n_2}\varphi_{n_3}$ denote a phase of the weights assigned to the first and second beams, respectively, for the second half of the CSI-RS ports with the second polarization, wherein $$\varphi_n = e^{j\pi n/2}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T.$$

In such embodiments, a number of CSI reference signal (CSI-RS) ports, P, belongs to a set $\{4, 8, 12, 16, 20, 24, 28, 32\}$.

In such embodiments, the LC codebook parameterized by a single codebook for 1-layer and 2-layer CSI feedback is determined as:

In some embodiments, the RF transceiver 310 is capable of receiving, from the BS, dual polarized CSI-RS port layout values comprising $(N_1, N_2)$ using a higher layer signaling, which determines a number of CSI-RS ports $P=2N_1 N_2$;

In such embodiments, a combination of the $(N_1, N_2)$ is determined as:

| Number of CSI-RS antenna ports, P | $(N_1, N_2)$ |
| --- | --- |
| 4 | (2, 1) |
| 8 | (2, 2) |
|  | (4, 1) |
| 12 | (2, 3) |
|  | (3, 2) |
| 16 | (2, 4) |
|  | (4, 2) |
|  | (8, 1) |
| 20 | (2, 5) |
|  | (5, 2) |
|  | (10, 1) |
| 24 | (2, 6) |
|  | (3, 4) |

| P = 4, 8, 12, 16, 20, 24, 28, 32 $N_1 > 1, N_2 > 1, 0 \le i_{1,1} \le 4N_1 - 1, 0 \le i_{1,2} \le 4N_2 - 1$ $0 \le i_{2,1} \le 63$ | | | |
| --- | --- | --- | --- |
| 0 + 16x | 1 + 16x | 2 + 16x | 3 + 16x |
| $W^{(l)}_{i_{1,1},i_{1,2},4d_1,4d_2,p,0,0,x}$ | $W^{(l)}_{i_{1,1},i_{1,2},4d_1,4d_2,p,0,1,x}$ | $W^{(l)}_{i_{1,1},i_{1,2},4d_1,4d_2,p,0,2,x}$ | $W^{(l)}_{i_{1,1},i_{1,2},4d_1,4d_2,p,0,3,x}$ |
| 4 + 16x | 5 + 16x | 6 + 16x | 7 + 16x |
| $W^{(l)}_{i_{1,1},i_{1,2},4d_1,4d_2,p,1,0,x}$ | $W^{(l)}_{i_{1,1},i_{1,2},4d_1,4d_2,p,1,1,x}$ | $W^{(l)}_{i_{1,1},i_{1,2},4d_1,4d_2,p,1,2,x}$ | $W^{(l)}_{i_{1,1},i_{1,2},4d_1,4d_2,p,1,3,x}$ |
| 8 + 16x | 9 + 16x | 10 + 16x | 11 + 16x |
| $W^{(l)}_{i_{1,1},i_{1,2},4d_1,4d_2,p,2,0,x}$ | $W^{(l)}_{i_{1,1},i_{1,2},4d_1,4d_2,p,2,1,x}$ | $W^{(l)}_{i_{1,1},i_{1,2},4d_1,4d_2,p,2,2,x}$ | $W^{(l)}_{i_{1,1},i_{1,2},4d_1,4d_2,p,2,3,x}$ |
| 12 + 16x | 13 + 16x | 14 + 16x | 15 + 16x |
| $W^{(l)}_{i_{1,1},i_{1,2},4d_1,4d_2,p,3,0,x}$ | $W^{(l)}_{i_{1,1},i_{1,2},4d_1,4d_2,p,3,1,x}$ | $W^{(l)}_{i_{1,1},i_{1,2},4d_1,4d_2,p,3,2,x}$ | $W^{(l)}_{i_{1,1},i_{1,2},4d_1,4d_2,p,3,3,x}$ |
| $N_2 = 1, 0 < i_{1,1} < 4N_1 - 1, i_{1,2} = 0$ $0 \le i_{2,1} \le 63$ | | | |
| 0 + 16x | 1 + 16x | 2 + 16x | 3 + 16x |
| $W^{(l)}_{i_{1,1},i_{1,2},4d_1,d_2,p,0,0,x}$ | $W^{(l)}_{i_{1,1},i_{1,2},4d_1,d_2,p,0,1,x}$ | $W^{(l)}_{i_{1,1},i_{1,2},4d_1,d_2,p,0,2,x}$ | $W^{(l)}_{i_{1,1},i_{1,2},4d_1,d_2,p,0,3,x}$ |
| 4 + 16x | 5 + 16x | 6 + 16x | 7 + 16x |
| $W^{(l)}_{i_{1,1},i_{1,2},4d_1,d_2,p,1,0,x}$ | $W^{(l)}_{i_{1,1},i_{1,2},4d_1,d_2,p,1,1,x}$ | $W^{(l)}_{i_{1,1},i_{1,2},4d_1,d_2,p,1,2,x}$ | $W^{(l)}_{i_{1,1},i_{1,2},4d_1,d_2,p,1,3,x}$ |
| 8 + 16x | 9 + 16x | 10 + 16x | 11 + 16x |
| $W^{(l)}_{i_{1,1},i_{1,2},4d_1,d_2,p,2,0,x}$ | $W^{(l)}_{i_{1,1},i_{1,2},4d_1,d_2,p,2,1,x}$ | $W^{(l)}_{i_{1,1},i_{1,2},4d_1,d_2,p,2,2,x}$ | $W^{(l)}_{i_{1,1},i_{1,2},4d_1,d_2,p,2,3,x}$ |
| 12 + 16x | 13 + 16x | 14 + 16x | 15 + 16x |
| $W^{(l)}_{i_{1,1},i_{1,2},4d_1,d_2,p,3,0,x}$ | $W^{(l)}_{i_{1,1},i_{1,2},4d_1,d_2,p,3,1,x}$ | $W^{(l)}_{i_{1,1},i_{1,2},4d_1,d_2,p,3,2,x}$ | $W^{(l)}_{i_{1,1},i_{1,2},4d_1,d_2,p,3,3,x}$ | wherein $x = \lfloor i_{2,1}/16 \rfloor$, l denotes an index for a layer value, $(d_1, d_2)$ denotes a beam index of the second beam, p is a beam power of the second beam, $(N_1, N_2)$ denotes an CSI-RS port layout in two dimensions, P denotes a number of CSI-RS ports, $$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2} v_{l,m} + p\varphi_{n_3} v_{l+l',m+m'} \end{bmatrix}, l = 0, 1,$$

1-layer: $W^{(1)}_{l,l',m,m',p,n_1,n_2,n_3} = W^{(l=0)}_{l,l',m,m',p,n_1,n_2,n_3}$, 2-layers: $W^{(2)}_{l,l',m,m',p,n_{1,0},n_{2,0},n_{3,0},n_{1,1},n_{2,1},n_{3,1}} = \frac{1}{\sqrt{2}} \begin{bmatrix} W^{(l=0)}_{l,l',m,m',p,n_{1,0},n_{2,0},n_{3,0}} & W^{(l=1)}_{l,l',m,m',p,n_{1,1},n_{2,1},n_{3,1}} \end{bmatrix}$

| Number of CSI-RS antenna ports, P | $(N_1, N_2)$ |
|---|---|
| | (4, 3) |
| | (6, 2) |
| | (12, 1) |
| 28 | (2, 7) |
| | (7, 2) |
| | (14, 1) |
| 32 | (2, 8) |
| | (4, 4) |
| | (8, 2) |
| | (16, 1) |

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on an uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is capable of determining, by a user equipment (UE), the first PMI $i_1$ and the second PMI $i_2$ indicating an LC pre-coder that corresponds to a weighted linear combination of a first beam and a second beam, where a power of a weight assigned to the first beam is 1 and a power of a weight assigned to the second beam is between 0 and 1.

In such embodiments, the CSI feedback configuration information includes a number of dual-polarized CSI-RS ports, wherein a first half of the CSI-RS ports corresponds to a first polarization and a second half of the CSI-RS ports corresponds to a second polarization, and wherein the LC pre-coder is determined as:

$$W^{(l)}_{l,m,l',m',p,n_1,n_2,n_3} = \frac{1}{\sqrt{P(1+p)^2}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix}$$

wherein P denotes a number of CSI-RS ports, $v_{l,m}$ denotes the first beam, $v_{l+l',m+m'}$ denotes the second beam, p denotes the power of the weight assigned to the second beam, where p takes a value from $\{0, \sqrt{1/4}, \sqrt{1/2}, 1\}$, $\varphi_{n_1}$ denotes a phase of the weight assigned to the second beam for the first half of the CSI-RS ports with the first polarization, and $\varphi_{n_2}$ and $\varphi_{n_2}\varphi_{n_3}$ denote a phase of the weights assigned to the first and second beams, respectively, for the second half of the CSI-RS ports with the second polarization, wherein $$\varphi_n = e^{j\pi n/2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_2-1)}{O_1 N_1}} u_m \end{bmatrix}^T.$$

In such embodiments, a number of CSI reference signal (CSI-RS) ports, P, belongs to a set $\{4, 8, 12, 16, 20, 24, 28, 32\}$.

In such embodiments, the LC codebook parameterized by a single codebook for 1-layer and 2-layer CSI feedback is determined as:

| P = 4, 8, 12, 16, 20, 24, 28, 32 | | | |
|---|---|---|---|
| $N_1 > 1, N_2 > 1, 0 \leq i_{1,1} \leq 4N_1 - 1, 0 \leq i_{1,2} \leq 4N_2 - 1$ | | | |
| $0 \leq i_{2,1} \leq 63$ | | | |
| 0 + 16x | 1 + 16x | 2 + 16x | 3 + 16x |
| $W^{(l)}_{i_{1,1},i_{1,2},4d_1,4d_2,p,0,0,x}$ | $W^{(l)}_{i_{1,1},i_{1,2},4d_1,4d_2,p,0,1,x}$ | $W^{(l)}_{i_{1,1},i_{1,2},4d_1,4d_2,p,0,2,x}$ | $W^{(l)}_{i_{1,1},i_{1,2},4d_1,4d_2,p,0,3,x}$ |
| 4 + 16x | 5 + 16x | 6 + 16x | 7 + 16x |
| $W^{(l)}_{i_{1,1},i_{1,2},4d_1,4d_2,p,1,0,x}$ | $W^{(l)}_{i_{1,1},i_{1,2},4d_1,4d_2,p,1,1,x}$ | $W^{(l)}_{i_{1,1},i_{1,2},4d_1,4d_2,p,1,2,x}$ | $W^{(l)}_{i_{1,1},i_{1,2},4d_1,4d_2,p,1,3,x}$ |
| 8 + 16x | 9 + 16x | 10 + 16x | 11 + 16x |
| $W^{(l)}_{i_{1,1},i_{1,2},4d_1,4d_2,p,2,0,x}$ | $W^{(l)}_{i_{1,1},i_{1,2},4d_1,4d_2,p,2,1,x}$ | $W^{(l)}_{i_{1,1},i_{1,2},4d_1,4d_2,p,2,2,x}$ | $W^{(l)}_{i_{1,1},i_{1,2},4d_1,4d_2,p,2,3,x}$ |

-continued

| 12 + 16x | 13 + 16x | 14 + 16x | 15 + 16x |
|---|---|---|---|
| $W_{i_{1,1},i_{1,2},4d_1,4d_2,p,3,0,x}^{(l)}$ | $W_{i_{1,1},i_{1,2},4d_1,4d_2,p,3,1,x}^{(l)}$ | $W_{i_{1,1},i_{1,2},4d_1,4d_2,p,3,2,x}^{(l)}$ | $W_{i_{1,1},i_{1,2},4d_1,4d_2,p,3,3,x}^{(l)}$ |

$N_2 = 1, 0 \leq i_{1,1} < 4N_1 = 1, i_{1,2} = 0$
$0 \leq i_{2,1} \leq 63$

| 0 + 16x | 1 + 16x | 2 + 16x | 3 + 16x |
|---|---|---|---|
| $W_{i_{1,1},i_{1,2},4d_1,d_2,p,0,0,x}^{(l)}$ | $W_{i_{1,1},i_{1,2},4d_1,d_2,p,0,1,x}^{(l)}$ | $W_{i_{1,1},i_{1,2},4d_1,d_2,p,0,2,x}^{(l)}$ | $W_{i_{1,1},i_{1,2},4d_1,d_2,p,0,3,x}^{(l)}$ |
| 4 + 16x | 5 + 16x | 6 + 16x | 7 + 16x |
| $W_{i_{1,1},i_{1,2},4d_1,d_2,p,1,0,x}^{(l)}$ | $W_{i_{1,1},i_{1,2},4d_1,d_2,p,1,1,x}^{(l)}$ | $W_{i_{1,1},i_{1,2},4d_1,d_2,p,1,2,x}^{(l)}$ | $W_{i_{1,1},i_{1,2},4d_1,d_2,p,1,3,x}^{(l)}$ |
| 8 + 16x | 9 + 16x | 10 + 16x | 11 + 16x |
| $W_{i_{1,1},i_{1,2},4d_1,d_2,p,2,0,x}^{(l)}$ | $W_{i_{1,1},i_{1,2},4d_1,d_2,p,2,1,x}^{(l)}$ | $W_{i_{1,1},i_{1,2},4d_1,d_2,p,2,2,x}^{(l)}$ | $W_{i_{1,1},i_{1,2},4d_1,d_2,p,2,3,x}^{(l)}$ |
| 12 + 16x | 13 + 16x | 14 + 16x | 15 + 16x |
| $W_{i_{1,1},i_{1,2},4d_1,d_2,p,3,0,x}^{(l)}$ | $W_{i_{1,1},i_{1,2},4d_1,d_2,p,3,1,x}^{(l)}$ | $W_{i_{1,1},i_{1,2},4d_1,d_2,p,3,2,x}^{(l)}$ | $W_{i_{1,1},i_{1,2},4d_1,d_2,p,3,3,x}^{(l)}$ | wherein $x = \lfloor i_{2,1}/16 \rfloor$, l denotes an index for a layer value, $(d_1, d_2)$ denotes a beam index of the second beam, p is a beam power of the second beam, $(N_1, N_2)$ denotes an CSI-RS port layout in two dimensions, P denotes a number of CSI-RS ports, $$W_{l,m,l',m',p,n_1,n_2,n_3}^{(l)} = \frac{1}{\sqrt{P(1+p^2)}} \begin{bmatrix} v_{l,m} + p\varphi_{n_1} v_{l+l',m+m'} \\ \varphi_{n_2} v_{l,m} + p\varphi_{n_3} v_{l+l',m+m'} \end{bmatrix}, l = 0, 1,$$

1-layer: $W_{l,l',m,m',p,n_1,n_2,n_3}^{(1)} = W_{l,l',m,m',p,n_1,n_2,n_3}^{(l=0)}$, 2-layers: $W_{l,l',m,m',p,n_{1,0},n_{2,0},n_{3,0},n_{1,1},n_{2,1},n_{3,1}}^{(2)} = \frac{1}{\sqrt{2}} \left[ W_{l,l',m,m',p,n_{1,0},n_{2,0},n_{3,0}}^{(l=0)} \; W_{l,l',m,m',p,n_{1,1},n_{2,1},n_{3,1}}^{(l=1)} \right]$ In some embodiments, the processor 340 is capable of determining an oversampling factor $(O_1, O_2)$ based on a layer value for the CSI feedback, wherein: for a 1-layer and 2-layer CSI feedback, $O_1=4$ and $O_2=1$ if $N_1=1$, and $O_1=4$ otherwise: and for more than the 2-layer CSI feedback, $(O_1, O_2)=(16,1)$ if $(N_1, N_2)=(2,1)$, $(O_1, O_2)=(8,1)$ if $(N_1, N_2)=(4,1)$, and $(O_1, O_2)$ are configured using a higher layer signaling for other values of $(N_1, N_2)$, and determining $O_1N_1$ and $O_2N_2$ in a denominator of the first beam $v_{l,m}$ and the second beam $v_{l+l',m+m'}$ using the $(N_1, N_2)$ and $(O_1, O_2)$.

In such embodiments, a combination of the $(N_1, N_2)$ is determined as:

| Number of CSI-RS antenna ports, P | $(N_1, N_2)$ |
|---|---|
| 4 | (2, 1) |
| 8 | (2, 2) |
|  | (4, 1) |
| 12 | (2, 3) |
|  | (3, 2) |
| 16 | (2, 4) |
|  | (4, 2) |
|  | (8, 1) |
| 20 | (2, 5) |
|  | (5, 2) |
|  | (10, 1) |
| 24 | (2, 6) |
|  | (3, 4) |
|  | (4, 3) |
|  | (6, 2) |
|  | (12, 1) |
| 28 | (2, 7) |
|  | (7, 2) |
|  | (14, 1) |

-continued

| Number of CSI-RS antenna ports, P | $(N_1, N_2)$ |
|---|---|
| 32 | (2, 8) |
|  | (4, 4) |
|  | (8, 2) |
|  | (16, 1) |

In some embodiments, the processor 340 is capable of deriving the first PMI $i_1$ and the second PMI $i_2$ based on the LC codebook when a rank indicator (RI) is less than or equal to two, or deriving the first PMI $i_1$ and the second PMI $i_2$ based on a non-LC codebook when the RI is greater than two, wherein the non-LC codebook is determined in long-term-evolution (LTE) specification, wherein, for the LC codebook, the first PMI $i_1$ comprises indices $i_{1,1}, i_{1,2}, i_{1,b}$, and $i_{1,p}$ indicating $i_{1,1}, i_{1,2}, (d_1, d_2)$, and p, respectively, in first five subscripts of a pre-coder equation, and the second PMI $i_2=i_{2,0}$ for a 1-layer CSI feedback and $i_2=64 \cdot i_{2,1}+i_{2,0}$, where $i_{2,0}=i_{2,l} \bmod 64$ and $i_{2,1}=\lfloor i_{2,l}/64 \rfloor$, for a 2-layer CSI feedback, where $i_{2,l}$ for l=0, 1 indicates last three subscripts of the pre-coder equation as $\lfloor i_{2,l}/4 \rfloor \bmod 4$, $i_{2,l} \bmod 4$, and $x=\lfloor i_{2,l}/16 \rfloor$, respectively.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
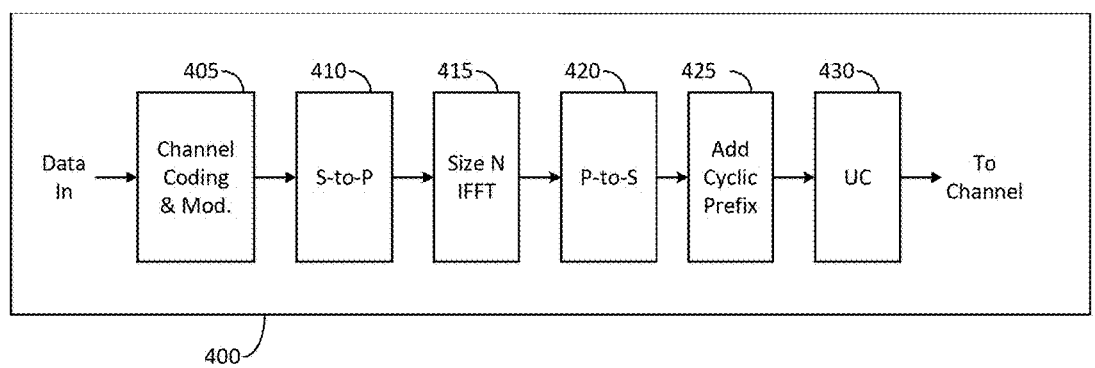
FIG. 4A illustrates a high-level diagram of an orthogonal frequency division multiple access transmit path according to embodiments of the present disclosure.
Figure 4B:
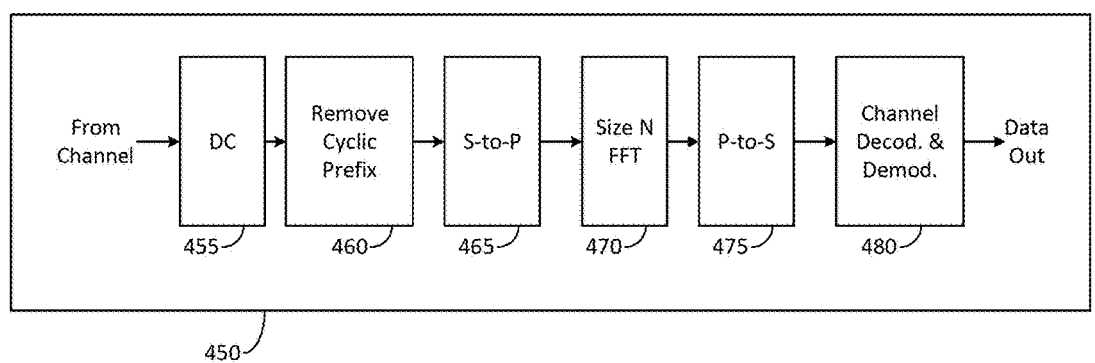
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
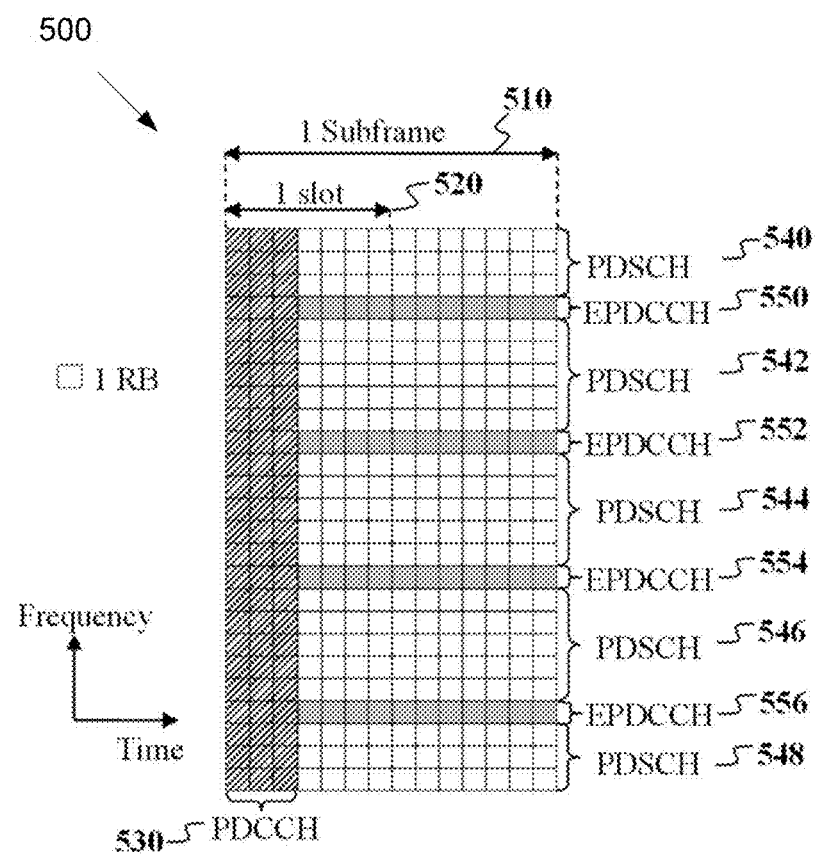
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCI}$ RBs for a total of $Z=O_F+\lfloor(n_{s0}+y\cdot N_{EPDCCH})/D\rfloor$ REs for a PDSCH transmission BW. An EPDCCH transmission is achieved in either one RB or multiple of RBs.

Figure 6:
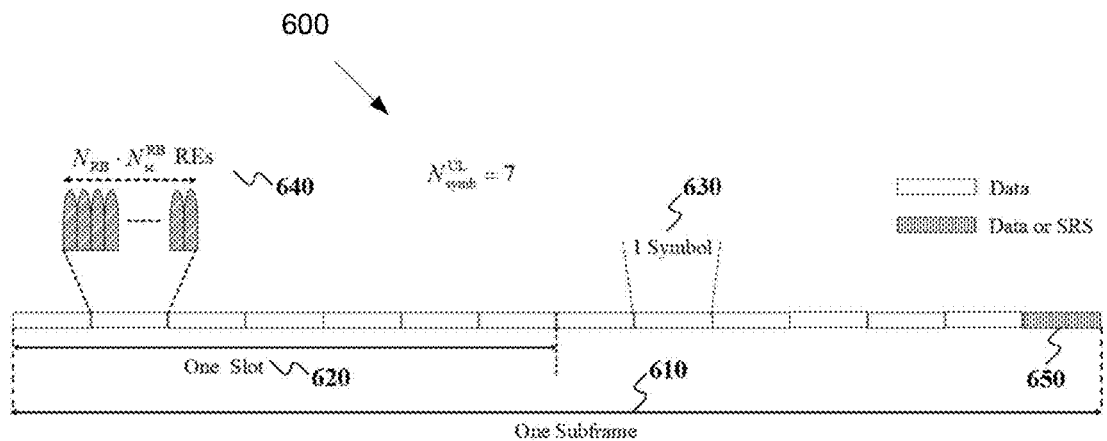
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB}\cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 7:
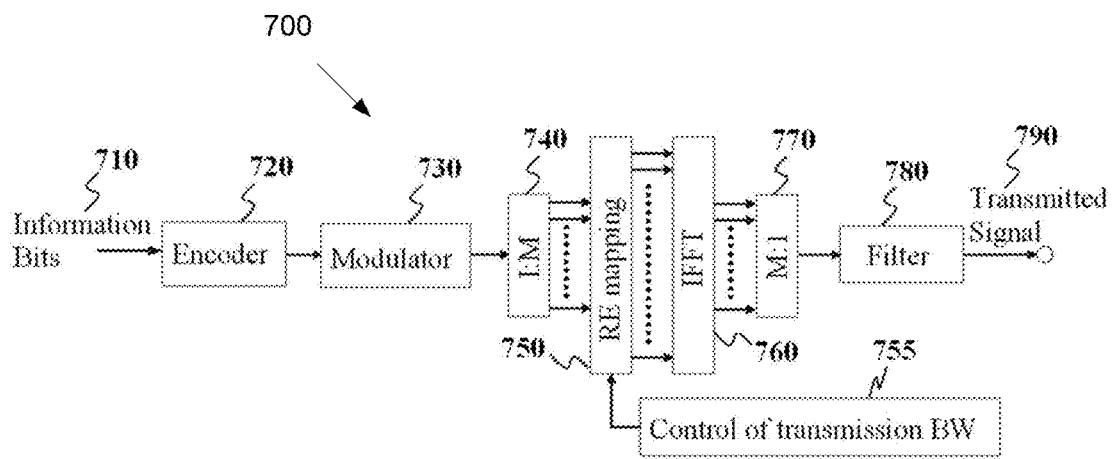
FIG. 7 illustrates an example transmitter block diagram for a physical downlink shared channel (PDSCH) subframe according to embodiments of the present disclosure.

FIG. 7 illustrates an example transmitter block diagram for a physical downlink shared channel (PDSCH) subframe 700 according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast Fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
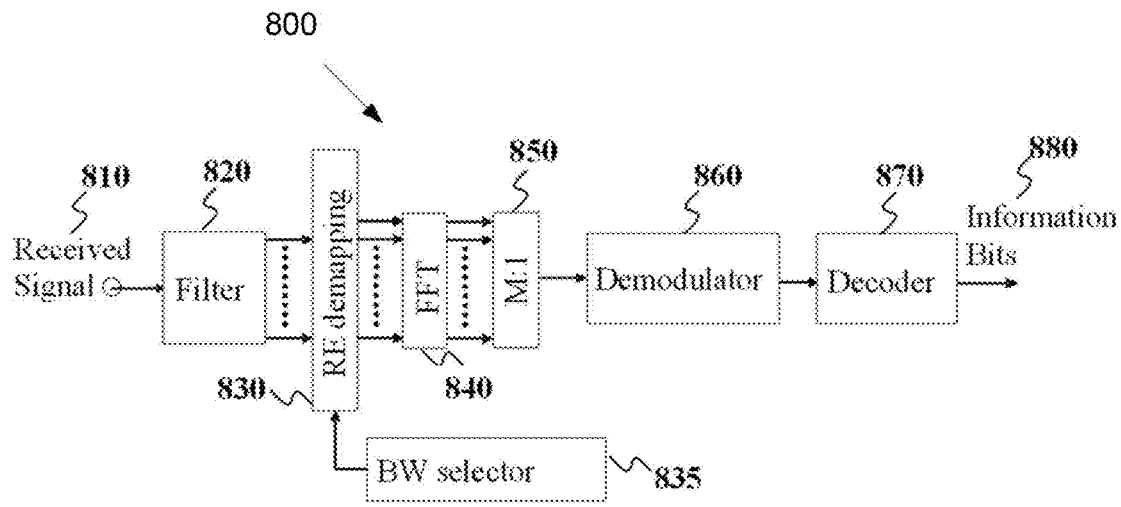
FIG. 8 illustrates an example receiver block diagram for a PDSCH subframe according to embodiments of the present disclosure.

FIG. 8 illustrates an example receiver block diagram for a packet data shared channel (PDSCH) subframe 800 according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping 830 assigns a reception bandwidth (BW) that is selected by a BW selector 835. The BW selector 835 is configured to control a transmission BW. A fast Fourier transform (FFT) circuit 840 applies a FFT. The output of the FFT circuity 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a de-scrambling, channel estimation, and a de-interleaving are not shown for brevity.

Figure 9:
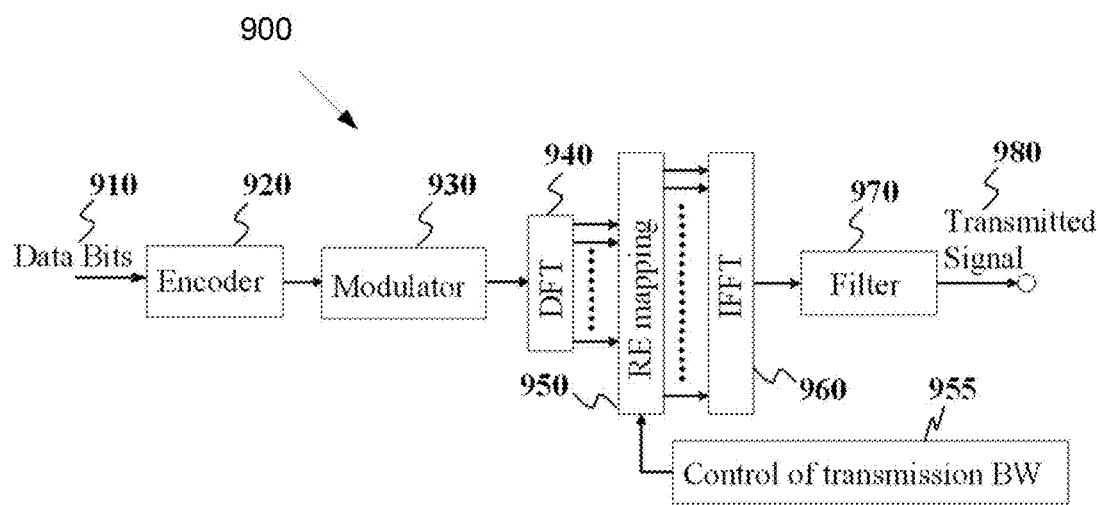
FIG. 9 illustrates an example transmitter block diagram for a physical uplink shared channel (PUSCH) subframe according to embodiments of the present disclosure.

FIG. 9 illustrates a transmitter block diagram for a physical uplink shared channel (PUSCH) subframe 900 according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuity 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
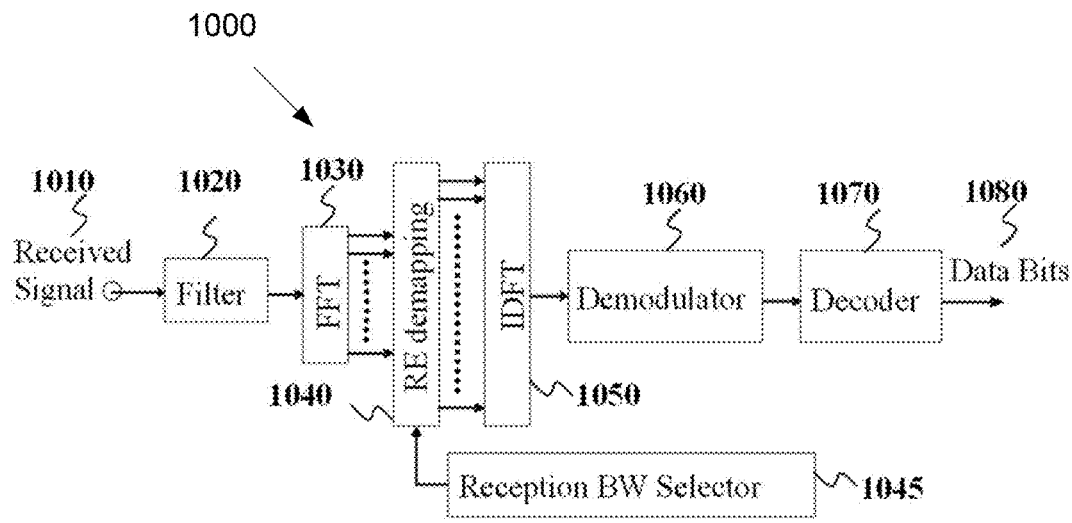
FIG. 10 illustrates an example receiver block diagram for a physical uplink shared channel (PUSCH) in a subframe according to embodiments of the present disclosure.

FIG. 10 illustrates an example receiver block diagram for a PUSCH subframe 1000 according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs 1040 corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
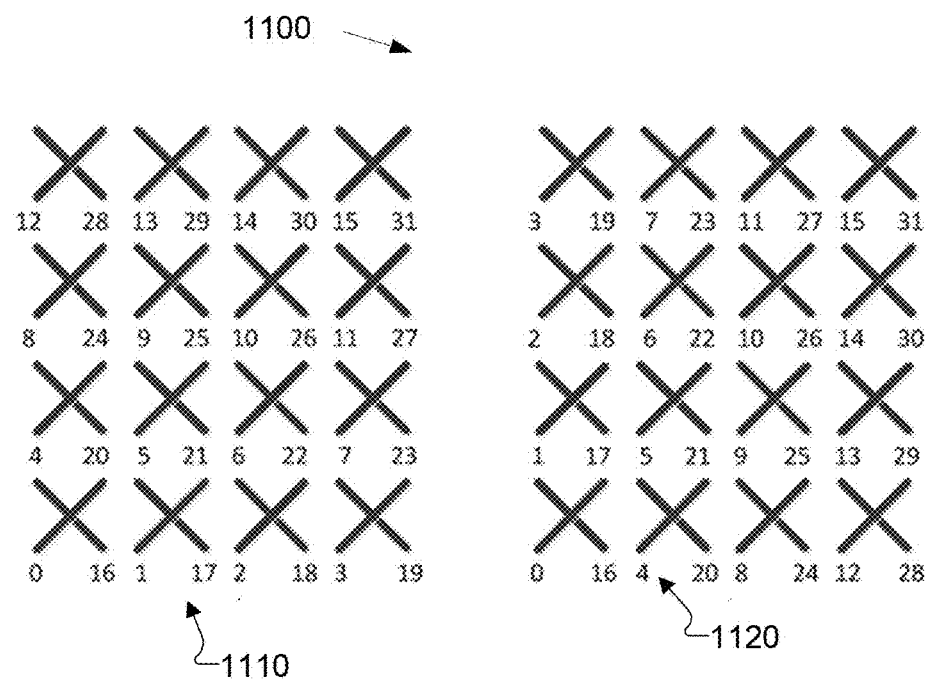
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel.12 of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In 3GPP LTE specification, MIMO precoding (for beamforming or spatial multiplexing) can be facilitated via precoding matrix index (PMI) reporting as a component of channel state information (CSI) reporting. The PMI report is derived from one of the following sets of standardized codebooks: two antenna ports (single-stage); four antenna ports (single-stage or dual-stage); eight antenna ports (dual-stage); configurable dual-stage eMIMO-Type of 'CLASS A' codebook for eight, twelve, or sixteen antenna ports (also known as 'nonPrecoded);' and single-stage eMIMO-Type of 'CLASS B' codebook for two, four, or eight antenna ports (also known as 'beamformed').

If an eNodeB follows a PMI recommendation from a UE, the eNB is expected to precode the eNB's transmitted signal according to a recommended precoding vector or matrix for a given subframe and RB. Regardless whether the eNB follows this recommendation, the UE is configured to report a PMI according to a configured precoding codebook. Here a PMI, which may consist of a single index or a pair of indices, is associated with a precoding matrix W in an associated codebook.

When dual-stage class A codebook is configured, a resulting precoding matrix can be described in equation (1). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components. The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. The precoder $W_2(i_2)$, therefore, performs a linear transformation of the long-term component such as a linear combination of a set of basic functions or vectors associated with the column vectors of $W_{1,1}(i_{1,1}) \otimes W_{1,2}(i_{1,2})$.

$$W(i_{1,1}, i_{1,2}, i_2) = \underbrace{(W_{1,1}(i_{1,1}) \otimes W_{1,2}(i_{1,2}))}_{W_1(i_{1,1}, i_{1,2})} W_2(i_2) \qquad \text{Equation (1)}$$

The above discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include a three-component PMI $\{i_{1,1}, i_{1,2}, i_2\}$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage.

In addition, when UE-specific beamforming is applied to CSI-RS resource (termed the UE-specific or UE-specifically beamformed CSI-RS), CSI-RS overhead reduction is possible. UE complexity reduction is also evident since the configured number of ports tends to be much smaller than NP CSI-RS counterpart of the UE. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beam-formed (BF) CSI-RS. As mentioned, in Rel.13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, the aforementioned precoding codebooks are utilized for CSI reporting. Two schemes of CSI reporting modes are supported (e.g., PUSCH-based aperiodic CSI (A-CSI) and PUCCH-based periodic CSI (P-CSI)). In each scheme, different modes are defined based on frequency selectivity of CQI and/or PMI, that is, whether wideband or subband reporting is performed. The supported CSI reporting modes are given in TABLE 1.

TABLE 1

CQI and PMI Feedback Types for PUSCH CSI reporting Modes

|  |  | PMI Feedback Type | | |
| --- | --- | --- | --- | --- |
|  |  | No PMI | Single PMI | Multiple PMI |
| PUSCH CQI Feedback Type | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 | Mode 3-2 |

TABLE 2

CQI and PMI Feedback Types for PUCCH CSI reporting Modes

|  |  | PMI Feedback Type | |
| --- | --- | --- | --- |
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

According to the WI, the hybrid CSI reporting based on non-precoded and beam-formed CSI-RS associated with two eMIMO-Types may be supported in LTE specification.

In the present disclosure, for brevity, FDD is considered as the duplex method for both DL and UL signaling but the embodiments of the present disclosure are also directly applicable to TDD.

Throughout the present disclosure, 2D dual-polarized array is used solely for illustrative purposes, unless stated otherwise. Extensions to 2D single-polarized array are straightforward for those skilled in the art.

Terms such as 'non-precoded' (or 'NP') CSI-RS and 'beamformed' (or 'BF') CSI-RS are used throughout this present disclosure. The essence of this present disclosure does not change when different terms or names are used to refer to these two CSI-RS types. The same holds for CSI-RS resource. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are exemplary and can be substituted with other labels such as '1' and '2', 'A' or 'B'. Alternatively, instead of using categories such as CSI-RS type or CSI-RS resource type, a category of CSI reporting class can also be used. For instance, NP CSI-RS is associated with eMIMO-Type of 'CLASS A' while UE-specific BF CSI-RS is associated with eMIMO-Type of 'CLASS B' with one CSI-RS resource.

Figure 12:
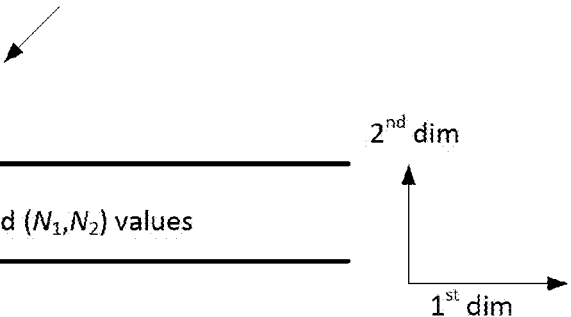
FIG. 12 illustrates an example dual-polarized antenna port layouts for {2, 4, 8, 12, 16} ports according to embodiments of the present disclosure.

FIG. 12 illustrates an example dual-polarized antenna port layouts for {2, 4, 8, 12, 16} ports 1200 according to embodiments of the present disclosure. An embodiment of the dual-polarized antenna port layouts for {2, 4, 8, 12, 16} ports 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, 2D antenna arrays are constructed from $N_1 \times N_2$ dual-polarized antenna elements arranged in a $(N_1, N_2)$ rectangular format for 2,4,8,12,16 antenna ports. In FIG. 12, each antenna element is logically mapped onto a single antenna port. In general, one antenna port may correspond to multiple antenna elements (physical antennas) combined via a virtualization. This $N_1 \times N_2$ dual polarized array can then be viewed as $2N_1N_2$-element array of elements.

The first dimension consists of $N_1$ columns and facilitates azimuth beamforming. The second dimension similarly consists of $N_2$ rows and allows elevation beamforming. MIMO precoding in LTE specification was largely designed to offer precoding (beamforming) gain for one-dimensional (1D) antenna array using 2, 4, 8 antenna ports, which correspond to $(N_1, N_2)$ belonging to $\{(1, 1), (2, 1), (4, 1)\}$. While fixed beamforming (i.e. antenna virtualization) can be implemented across the elevation dimension, it is unable to reap the potential gain offered by the spatial and frequency selective nature of the channel. Therefore, MIMO precoding in LTE specification is designed to offer precoding gain for two-dimensional (2D) antenna array using 8, 12, 16 antenna ports, which correspond to $(N_1, N_2)$ belonging to $\{(2, 2), (2, 3), (3, 2), (8, 1), (4, 2), (2, 4)\}$.

Although $(N_1, N_2)=(6, 1)$ case has not been supported in LTE specification, it may be supported in future releases. The embodiments of the present disclosure are general and are applicable to any ($N_1$, $N_2$) values including ($N_1$, $N_2$)=(6, 1). The first and second dimensions as shown in FIG. 12 are for illustration only. The present disclosure is applicable to the case, in which the first and second dimensions are swapped, i.e., first and second dimensions respectively correspond to elevation and azimuth or any other pair of directions.

Figure 13:
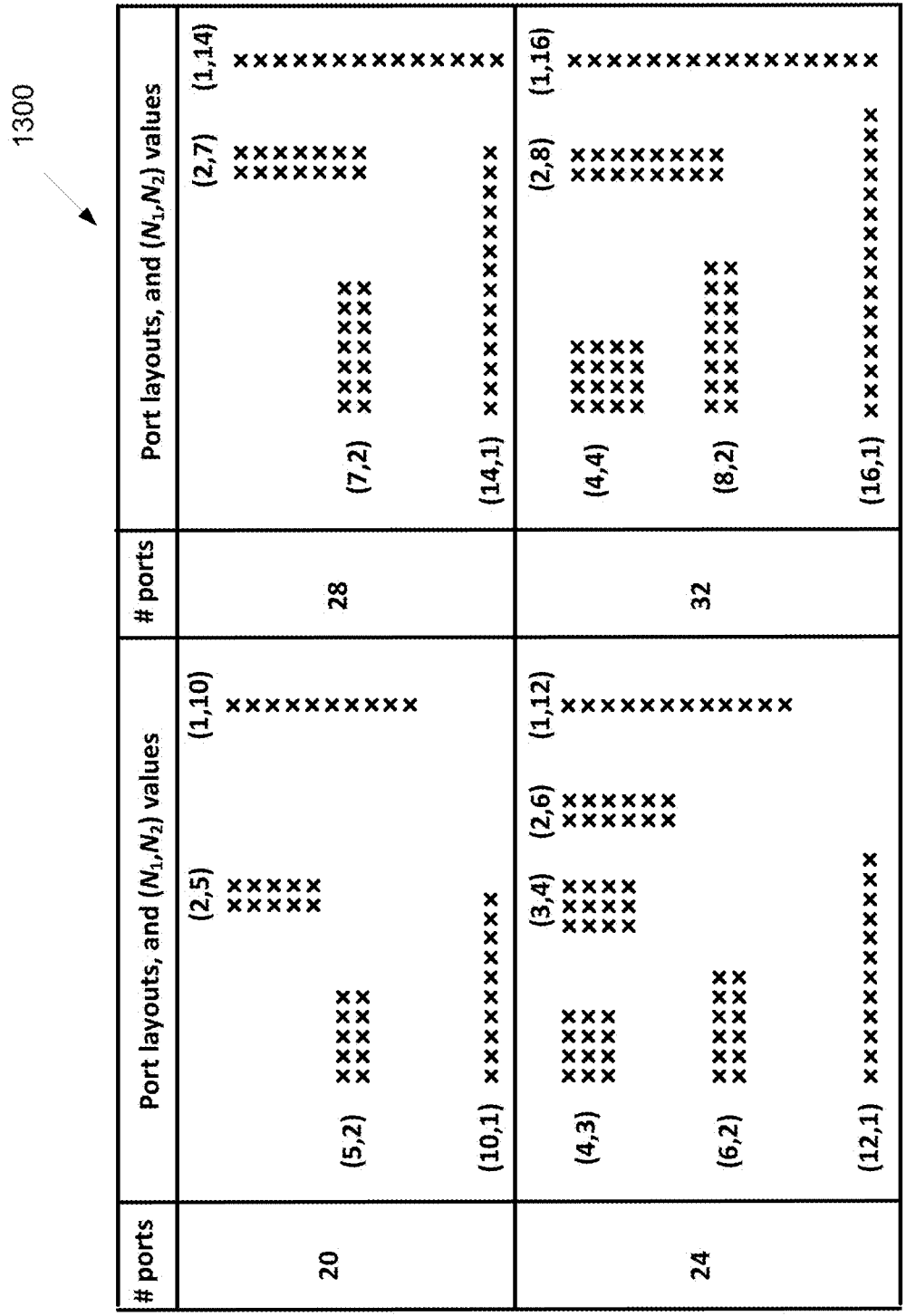
FIG. 13 illustrates an example dual-polarized antenna port layouts for {20, 24, 28, 32} ports according to embodiments of the present disclosure.

FIG. 13 illustrates an example dual-polarized antenna port layouts for {20, 24, 28, 32} ports 1300 according to embodiments of the present disclosure. An embodiment of the dual-polarized antenna port layouts for {20, 24, 28, 32} ports 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

For a UE configured with higher layer parameter CSI-Reporting-Type, and CSI-Reporting Type is set to 'CLASS B', and one CSI-RS resource configured, and higher layer parameter PMI-Config is set to '1.' In one example, for 2 antenna ports {15,16}, a PMI value corresponds to the codebook index n given in TABLE 3 with v equal to the associated RI value. In another example, for 4 antenna ports {15,16,17,18}, a PMI corresponds to the codebook index n given in TABLE 4 with v equal to the associated RI value. In yet another example, for 8 antenna ports {15,16,17,18, 19,20,21,22}, a PMI value corresponds to the codebook index n given in TABLE 5 with v equal to the associated RI value. Where $e_k^{(N)}$ is a length-N column-vector where the l-th element is 1 for k=l (k,l∈{0, 1, ..., N−1}), and 0 otherwise.

TABLE 3

Codebook for ι-layer CSI reporting using antenna ports {15, 16}

| Codebook index, n | Number of layers ι | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |

TABLE 4

Codebook for ι-layer CSI reporting using antenna ports {15, 16, 17, 18}

| Codebook index, n | Number of layers ι | | | |
|---|---|---|---|---|
| | 1 | 2 | 3 | 4 |
| 0 | $\frac{1}{\sqrt{2}}\begin{bmatrix}e_0^{(2)}\\e_0^{(2)}\end{bmatrix}$ | $\frac{1}{2}\begin{bmatrix}e_0^{(2)} & e_0^{(2)}\\e_0^{(2)} & -e_0^{(2)}\end{bmatrix}$ | $\frac{1}{\sqrt{6}}\begin{bmatrix}e_0^{(2)} & e_0^{(2)} & e_1^{(2)}\\e_0^{(2)} & -e_0^{(2)} & -e_1^{(2)}\end{bmatrix}$ | $\frac{1}{2\sqrt{2}}\begin{bmatrix}e_0^{(2)} & e_1^{(2)} & e_0^{(2)} & e_1^{(2)}\\e_0^{(2)} & e_1^{(2)} & -e_0^{(2)} & -e_1^{(2)}\end{bmatrix}$ |
| 1 | $\frac{1}{\sqrt{2}}\begin{bmatrix}e_0^{(2)}\\-e_0^{(2)}\end{bmatrix}$ | $\frac{1}{2}\begin{bmatrix}e_0^{(2)} & e_0^{(2)}\\je_0^{(2)} & -je_0^{(2)}\end{bmatrix}$ | $\frac{1}{\sqrt{6}}\begin{bmatrix}e_1^{(2)} & e_0^{(2)} & e_1^{(2)}\\e_1^{(2)} & -e_0^{(2)} & -e_1^{(2)}\end{bmatrix}$ | $\frac{1}{2\sqrt{2}}\begin{bmatrix}e_0^{(2)} & e_1^{(2)} & e_0^{(2)} & e_1^{(2)}\\je_0^{(2)} & je_1^{(2)} & -je_0^{(2)} & -je_1^{(2)}\end{bmatrix}$ |
| 2 | $\frac{1}{\sqrt{2}}\begin{bmatrix}e_0^{(2)}\\j\cdot e_0^{(2)}\end{bmatrix}$ | $\frac{1}{2}\begin{bmatrix}e_1^{(2)} & e_1^{(2)}\\e_1^{(2)} & -e_1^{(2)}\end{bmatrix}$ | $\frac{1}{\sqrt{6}}\begin{bmatrix}e_0^{(2)} & e_1^{(2)} & e_1^{(2)}\\e_0^{(2)} & e_1^{(2)} & -e_1^{(2)}\end{bmatrix}$ | — |
| 3 | $\frac{1}{\sqrt{2}}\begin{bmatrix}e_0^{(2)}\\-j\cdot e_0^{(2)}\end{bmatrix}$ | $\frac{1}{2}\begin{bmatrix}e_1^{(2)} & e_1^{(2)}\\je_1^{(2)} & -je_1^{(2)}\end{bmatrix}$ | $\frac{1}{\sqrt{6}}\begin{bmatrix}e_1^{(2)} & e_0^{(2)} & e_0^{(2)}\\e_1^{(2)} & e_0^{(2)} & -e_0^{(2)}\end{bmatrix}$ | — |
| 4 | $\frac{1}{\sqrt{2}}\begin{bmatrix}e_1^{(2)}\\e_1^{(2)}\end{bmatrix}$ | $\frac{1}{2}\begin{bmatrix}e_0^{(2)} & e_1^{(2)}\\e_0^{(2)} & -e_1^{(2)}\end{bmatrix}$ | — | — |
| 5 | $\frac{1}{\sqrt{2}}\begin{bmatrix}e_1^{(2)}\\-e_1^{(2)}\end{bmatrix}$ | $\frac{1}{2}\begin{bmatrix}e_0^{(2)} & e_1^{(2)}\\je_0^{(2)} & -je_1^{(2)}\end{bmatrix}$ | — | — |
| 6 | $\frac{1}{\sqrt{2}}\begin{bmatrix}e_1^{(2)}\\j\cdot e_1^{(2)}\end{bmatrix}$ | $\frac{1}{2}\begin{bmatrix}e_0^{(2)} & e_0^{(2)}\\e_1^{(2)} & -e_0^{(2)}\end{bmatrix}$ | — | — |
| 7 | $\frac{1}{\sqrt{2}}\begin{bmatrix}e_1^{(2)}\\-j\cdot e_1^{(2)}\end{bmatrix}$ | $\frac{1}{2}\begin{bmatrix}e_1^{(2)} & e_0^{(2)}\\je_1^{(2)} & -je_0^{(2)}\end{bmatrix}$ | — | — |

TABLE 5

Codebook for ι-layer CSI reporting using antenna ports {15, 16, 17, 18, 19, 20, 21, 22}

| Codebook index, n | 1 | 2 | 3 | 4 |
|---|---|---|---|---|
| 0 | $\frac{1}{\sqrt{2}}\begin{bmatrix} e_0^{(4)} \\ e_0^{(4)} \end{bmatrix}$ | $\frac{1}{2}\begin{bmatrix} e_0^{(4)} & e_0^{(4)} \\ e_0^{(4)} & -e_0^{(4)} \end{bmatrix}$ | $\frac{1}{\sqrt{6}}\begin{bmatrix} e_0^{(4)} & e_0^{(4)} & e_1^{(4)} \\ e_0^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ e_0^{(4)} & e_1^{(4)} & -e_0^{(4)} & -e_1^{(4)} \end{bmatrix}$ |
| 1 | $\frac{1}{\sqrt{2}}\begin{bmatrix} e_0^{(4)} \\ -e_0^{(4)} \end{bmatrix}$ | $\frac{1}{2}\begin{bmatrix} e_0^{(4)} & e_0^{(4)} \\ je_0^{(4)} & -je_0^{(4)} \end{bmatrix}$ | $\frac{1}{\sqrt{6}}\begin{bmatrix} e_1^{(4)} & e_0^{(4)} & e_1^{(4)} \\ e_1^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ je_0^{(4)} & je_1^{(4)} & -je_0^{(4)} & -je_1^{(4)} \end{bmatrix}$ |
| 2 | $\frac{1}{\sqrt{2}}\begin{bmatrix} e_0^{(4)} \\ j\cdot e_0^{(4)} \end{bmatrix}$ | $\frac{1}{2}\begin{bmatrix} e_1^{(4)} & e_1^{(4)} \\ e_1^{(4)} & -e_1^{(4)} \end{bmatrix}$ | $\frac{1}{\sqrt{6}}\begin{bmatrix} e_0^{(4)} & e_1^{(4)} & e_1^{(4)} \\ e_0^{(4)} & e_1^{(4)} & -e_1^{(4)} \end{bmatrix}$ | $\frac{1}{2\sqrt{2}}\begin{bmatrix} e_1^{(4)} & e_2^{(4)} & e_1^{(4)} & e_2^{(4)} \\ e_1^{(4)} & e_2^{(4)} & -e_1^{(4)} & -e_2^{(4)} \end{bmatrix}$ |
| 3 | $\frac{1}{\sqrt{2}}\begin{bmatrix} e_0^{(4)} \\ -j\cdot e_0^{(4)} \end{bmatrix}$ | $\frac{1}{2}\begin{bmatrix} e_1^{(4)} & e_1^{(4)} \\ je_1^{(4)} & -je_1^{(4)} \end{bmatrix}$ | $\frac{1}{\sqrt{6}}\begin{bmatrix} e_1^{(4)} & e_0^{(4)} & e_0^{(4)} \\ e_1^{(4)} & e_0^{(4)} & -e_0^{(4)} \end{bmatrix}$ | $\frac{1}{2\sqrt{2}}\begin{bmatrix} e_1^{(4)} & e_2^{(4)} & e_1^{(4)} & e_2^{(4)} \\ je_1^{(4)} & je_2^{(4)} & -je_1^{(4)} & -je_2^{(4)} \end{bmatrix}$ |
| 4 | $\frac{1}{\sqrt{2}}\begin{bmatrix} e_1^{(4)} \\ e_1^{(4)} \end{bmatrix}$ | $\frac{1}{2}\begin{bmatrix} e_2^{(4)} & e_2^{(4)} \\ e_2^{(4)} & -e_2^{(4)} \end{bmatrix}$ | $\frac{1}{\sqrt{6}}\begin{bmatrix} e_1^{(4)} & e_1^{(4)} & e_2^{(4)} \\ e_1^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ e_2^{(4)} & e_3^{(4)} & -e_2^{(4)} & -e_3^{(4)} \end{bmatrix}$ |
| 5 | $\frac{1}{\sqrt{2}}\begin{bmatrix} e_1^{(4)} \\ -e_1^{(4)} \end{bmatrix}$ | $\frac{1}{2}\begin{bmatrix} e_2^{(4)} & e_2^{(4)} \\ je_2^{(4)} & -je_2^{(4)} \end{bmatrix}$ | $\frac{1}{\sqrt{6}}\begin{bmatrix} e_2^{(4)} & e_1^{(4)} & e_2^{(4)} \\ e_2^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ je_2^{(4)} & je_3^{(4)} & -je_2^{(4)} & -je_3^{(4)} \end{bmatrix}$ |
| 6 | $\frac{1}{\sqrt{2}}\begin{bmatrix} e_1^{(4)} \\ j\cdot e_1^{(4)} \end{bmatrix}$ | $\frac{1}{2}\begin{bmatrix} e_3^{(4)} & e_3^{(4)} \\ e_3^{(4)} & -e_3^{(4)} \end{bmatrix}$ | $\frac{1}{\sqrt{6}}\begin{bmatrix} e_1^{(4)} & e_2^{(4)} & e_2^{(4)} \\ e_1^{(4)} & e_2^{(4)} & -e_2^{(4)} \end{bmatrix}$ | $\frac{1}{2\sqrt{2}}\begin{bmatrix} e_3^{(4)} & e_0^{(4)} & e_3^{(4)} & e_0^{(4)} \\ e_3^{(4)} & e_0^{(4)} & -e_3^{(4)} & -e_0^{(4)} \end{bmatrix}$ |
| 7 | $\frac{1}{\sqrt{2}}\begin{bmatrix} e_1^{(4)} \\ -j\cdot e_1^{(4)} \end{bmatrix}$ | $\frac{1}{2}\begin{bmatrix} e_3^{(4)} & e_3^{(4)} \\ je_3^{(4)} & -je_3^{(4)} \end{bmatrix}$ | $\frac{1}{\sqrt{6}}\begin{bmatrix} e_2^{(4)} & e_1^{(4)} & e_1^{(4)} \\ e_2^{(4)} & e_1^{(4)} & -e_1^{(4)} \end{bmatrix}$ | $\frac{1}{2\sqrt{2}}\begin{bmatrix} e_3^{(4)} & e_0^{(4)} & e_3^{(4)} & e_0^{(4)} \\ je_3^{(4)} & je_0^{(4)} & -je_3^{(4)} & -je_0^{(4)} \end{bmatrix}$ |
| 8 | $\frac{1}{\sqrt{2}}\begin{bmatrix} e_2^{(4)} \\ e_2^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ | $\frac{1}{\sqrt{6}}\begin{bmatrix} e_2^{(4)} & e_2^{(4)} & e_3^{(4)} \\ e_2^{(4)} & -e_2^{(4)} & -e_3^{(4)} \end{bmatrix}$ | — |
| 9 | $\frac{1}{\sqrt{2}}\begin{bmatrix} e_2^{(4)} \\ -e_2^{(4)} \end{bmatrix}$ | $\frac{1}{2}\begin{bmatrix} e_0^{(4)} & e_1^{(4)} \\ je_0^{(4)} & -je_1^{(4)} \end{bmatrix}$ | $\frac{1}{\sqrt{6}}\begin{bmatrix} e_3^{(4)} & e_2^{(4)} & e_3^{(4)} \\ e_3^{(4)} & -e_2^{(4)} & -e_3^{(4)} \end{bmatrix}$ | — |
| 10 | $\frac{1}{\sqrt{2}}\begin{bmatrix} e_2^{(4)} \\ j\cdot e_0^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ | $\frac{1}{\sqrt{6}}\begin{bmatrix} e_2^{(4)} & e_3^{(4)} & e_3^{(4)} \\ e_2^{(4)} & e_3^{(4)} & -e_3^{(4)} \end{bmatrix}$ | — |
| 11 | $\frac{1}{\sqrt{2}}\begin{bmatrix} e_2^{(4)} \\ -j\cdot e_2^{(4)} \end{bmatrix}$ | $\frac{1}{2}\begin{bmatrix} e_1^{(4)} & e_2^{(4)} \\ je_1^{(4)} & -je_2^{(4)} \end{bmatrix}$ | $\frac{1}{\sqrt{6}}\begin{bmatrix} e_3^{(4)} & e_2^{(4)} & e_2^{(4)} \\ e_3^{(4)} & e_2^{(4)} & -e_2^{(4)} \end{bmatrix}$ | — |
| 12 | $\frac{1}{\sqrt{2}}\begin{bmatrix} e_3^{(4)} \\ e_3^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ | $\frac{1}{\sqrt{6}}\begin{bmatrix} e_3^{(4)} & e_3^{(4)} & e_0^{(4)} \\ e_3^{(4)} & -e_3^{(4)} & -e_0^{(4)} \end{bmatrix}$ | — |
| 13 | $\frac{1}{\sqrt{2}}\begin{bmatrix} e_3^{(4)} \\ -e_3^{(4)} \end{bmatrix}$ | $\frac{1}{2}\begin{bmatrix} e_0^{(4)} & e_3^{(4)} \\ je_0^{(4)} & -je_3^{(4)} \end{bmatrix}$ | $\frac{1}{\sqrt{6}}\begin{bmatrix} e_0^{(4)} & e_3^{(4)} & e_0^{(4)} \\ e_0^{(4)} & -e_3^{(4)} & -e_0^{(4)} \end{bmatrix}$ | — |
| 14 | $\frac{1}{\sqrt{2}}\begin{bmatrix} e_3^{(4)} \\ j\cdot e_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ | $\frac{1}{\sqrt{6}}\begin{bmatrix} e_3^{(4)} & e_0^{(4)} & e_0^{(4)} \\ e_3^{(4)} & e_0^{(4)} & -e_0^{(4)} \end{bmatrix}$ | — |
| 15 | $\frac{1}{\sqrt{2}}\begin{bmatrix} e_3^{(4)} \\ -j\cdot e_3^{(4)} \end{bmatrix}$ | $\frac{1}{2}\begin{bmatrix} e_1^{(4)} & e_3^{(4)} \\ je_1^{(4)} & -je_3^{(4)} \end{bmatrix}$ | $\frac{1}{\sqrt{6}}\begin{bmatrix} e_0^{(4)} & e_3^{(4)} & e_3^{(4)} \\ e_0^{(4)} & e_3^{(4)} & -e_3^{(4)} \end{bmatrix}$ | — |

TABLE 5-continued

Codebook for ι-layer CSI reporting using antenna ports {15, 16, 17, 18, 19, 20, 21, 22}

| Codebook index, n | Number of layers ι | |
|---|---|---|
| | 5 | 6 |
| 0 | $\frac{1}{\sqrt{10}}\begin{bmatrix} e_0^{(4)} & e_0^{(4)} & e_1^{(4)} & e_1^{(4)} & e_2^{(4)} \\ e_0^{(4)} & -e_0^{(4)} & e_1^{(4)} & -e_1^{(4)} & e_2^{(4)} \end{bmatrix}$ | $\frac{1}{2\sqrt{3}}\begin{bmatrix} e_0^{(4)} & e_0^{(4)} & e_1^{(4)} & e_1^{(4)} & e_2^{(4)} & e_2^{(4)} \\ e_0^{(4)} & -e_0^{(4)} & e_1^{(4)} & -e_1^{(4)} & e_2^{(4)} & -e_2^{(4)} \end{bmatrix}$ |
| 1-15 | — | — |

| Codebook index, n | Number of layers ι | |
|---|---|---|
| | 7 | 8 |
| 0 | $\frac{1}{\sqrt{14}}\begin{bmatrix} e_0^{(4)} & e_0^{(4)} & e_1^{(4)} & e_1^{(4)} & e_2^{(4)} & e_2^{(4)} & e_3^{(4)} \\ e_0^{(4)} & -e_0^{(4)} & e_1^{(4)} & -e_1^{(4)} & e_2^{(4)} & -e_2^{(4)} & e_3^{(4)} \end{bmatrix}$ | $\frac{1}{4}\begin{bmatrix} e_0^{(4)} & e_0^{(4)} & e_1^{(4)} & e_1^{(4)} & e_2^{(4)} & e_2^{(4)} & e_3^{(4)} & e_3^{(4)} \\ e_0^{(4)} & -e_0^{(4)} & e_1^{(4)} & -e_1^{(4)} & e_2^{(4)} & -e_2^{(4)} & e_3^{(4)} & -e_3^{(4)} \end{bmatrix}$ |
| 1-15 | — | — |

According to [6], eFD-MIMO may support {20, 24, 28, 32} antenna ports in Rel. 14. Assuming rectangular (1D or 2D) port layouts, there are several possible ($N_1$, $N_2$) values for {20, 24, 28, 32} ports (as shown in TABLE 13). An illustration of 1D and 2D antenna port layouts for these ($N_1$, $N_2$) values are shown in FIG. 13.

TABLE 6

Supported configuration of ($O_1$, $O_2$) and ($N_1$, $N_2$)

| Number of CSI-RS antenna ports, P | ($N_1$, $N_2$) | ($O_1$, $O_2$) |
|---|---|---|
| 20 | (1, 10) | (—, 4), (—, 8) |
|  | (2, 5) | (8, 4), (8, 8) |
|  | (5, 2) | (8, 4), (4, 4) |
|  | (10, 1) | (4, —), (8, —) |
| 24 | (1, 12) | (—, 4), (—, 8) |
|  | (2, 6) | (8, 4), (8, 8) |
|  | (3, 4) | (8, 4), (8, 8) |
|  | (4, 3) | (8, 4), (4, 4) |
|  | (6, 2) | (8, 4), (4, 4) |
|  | (12, 1) | (4, —), (8, —) |
| 28 | (1, 14) | (—, 4), (—, 8) |
|  | (2, 7) | (8, 4), (8, 8) |
|  | (7, 2) | (8, 4), (4, 4) |
|  | (14, 1) | (4, —), (8, —) |
| 32 | (1, 16) | (—, 4), (—, 8) |
|  | (2, 8) | (8, 4), (8, 8) |
|  | (4, 4) | (8, 4), (8, 8) |
|  | (8, 2) | (8, 4), (4, 4) |
|  | (16, 1) | (4, —), (8, —) |

Figure 14:
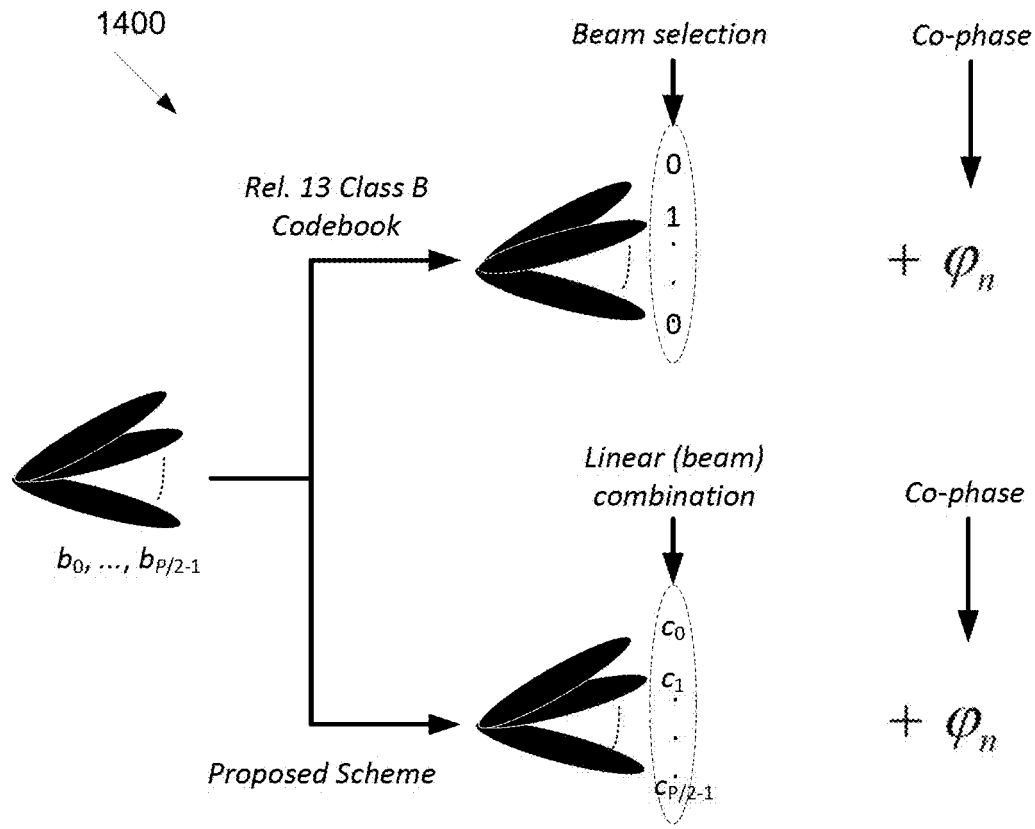
FIG. 14 illustrates an example Class B linear combination pre-coder according to embodiments of the present disclosure.

FIG. 14 illustrates an example Class B linear combination pre-coder 1400 according to embodiments of the present disclosure. An embodiment of the Class B linear combination pre-coder 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

The Rel. 13 'Class B' eMIMO-Type codebook is defined for P=2, 4, and 8 (dual-polarized) beam-formed ports, which are beam-formed using P/2 beams, $b_0$, $b_1$, $b_2$, and $b_{P/2}$. As shown in FIG. 14, the Rel. 13 'Class B' codebook performs beam selection (e.g., selects one beam from P/2 beams) and co-phasing (e.g., selects a co-phase from QPSK codebook {1,j,−1,−j}.

The rank-1 Class B pre-coder can be expressed as:

$$W_{k,n}^{(1)} = \frac{1}{\sqrt{2}}\begin{bmatrix} e_k^{(P/2)} \\ \varphi_n e_k^{(P/2)} \end{bmatrix},$$

where n=0, 1, 2, 3 and k=0, 1, ... , $$\frac{P}{2} - 1.$$

The rank-2 Class B pre-coder can be expressed as:

$$W_{k,k',n}^{(2)} = \frac{1}{2}\begin{bmatrix} e_k^{(P/2)} & e_{k'}^{(P/2)} \\ \varphi_n e_k^{(P/2)} & -\varphi_n e_{k'}^{(P/2)} \end{bmatrix},$$

where k, k'=0, 1, ... , $$\frac{P}{2} - 1$$

and n=0, 1.

In some embodiments, as shown in FIG. 14, a UE is configured with a 'Class B-LC' eMIMO-Type codebook via RRC signaling. The configured codebook performs linear (beam) combination using coefficient vector $c_k^{(P/2)} = \{c_{k,0}^{(P/2)}, c_{k,2}^{(P/2)}, \ldots, c_{k,P/2-1}^{(P/2)}\}$ whose components belong to coefficient codebook $C_{coeff}$, wherein the first coefficient $c_{k,0}^{(P/2)}=1$ without loss of generality, and co-phase selection using QPSK codebook {1, j, −1, −j}.

In one example, the coefficient codebook $C_{coeff}=\{1,j,-1,-j\}$. In another example, $$C_{coeff} = C_{coeff,WB} C_{coeff,SB}$$

where $$C_{coeff,WB} = \left\{ e^{j\frac{\pi}{4}}, e^{j\frac{3\pi}{4}}, e^{j\frac{5\pi}{4}}, e^{j\frac{7\pi}{4}} \right\}$$

and $$C_{coeff,SB} = \left\{ e^{j\frac{\pi}{4}}, e^{-j\frac{\pi}{4}} \right\}.$$

The rank-1 Class B LC pre-coder can then be expressed as:

$$W_{k,n}^{(1)} = \frac{1}{\sqrt{P}} \begin{bmatrix} c_k^{(P/2)} \\ \varphi_n c_k^{(P/2)} \end{bmatrix},$$

where n=0, 1, 2, 3 and $c_{k,r}^{(P/2)} \in C_{coeff}$ for k=0, 1, . . . , $\frac{P}{2} - 1$.

The rank-2 Class B LC pre-coder can be expressed as:

$$W_{k,k',n}^{(2)} = \frac{1}{\sqrt{2P}} \begin{bmatrix} c_k^{(P/2)} & c_{k'}^{(P/2)} \\ \varphi_n c_k^{(P/2)} & -\varphi_n c_{k'}^{(P/2)} \end{bmatrix}$$

where n=0, 1.

In one example, k=k'. In another example, k≠k'.

In some embodiments, a UE is configured with a LC codebook or a non-LC codebook using a 1-bit indication via RRC signaling. A few alternatives for this configuration may be considered. In one example, the LC codebook (Class A or Class B) is configured using an RRC parameter CombinationCBEnabled or LinearCombinationCBEnabled or LCCBEnabled. In such example, when this parameter is ON, the new LC codebook is enabled regardless whether eMIMO-Type is 'Class A'/'nonPrecoded' or 'Class B'/'beamformed'. When the UE is configured with eMIMO-Type 'Class A'/'nonPrecoded', then the UE uses the Class A LC codebook proposed in 2016.03.017 for CSI calculation. When the UE is configured with eMIMO-Type 'Class B'/'beamformed', then the UE uses the Class B LC codebook proposed in this present disclosure for CSI calculation. In such example, when this parameter is OFF, then the UE uses Rel. 13 or Rel. 14 Class A or Class B codebooks depending on the configured eMIMO-Type.

In another example, the Class A LC codebook is configured using an RRC parameter ClassACombinationCBEnabled or ClassALinearCombinationCBEnabled or ClassALCCBEnabled. In such example, when this parameter is ON and the UE is configured with eMIMO-Type 'Class A'/'nonPrecoded', then the UE uses the Class A LC codebook for CSI calculation. In such example, when this parameter is OFF and the UE is configured with eMIMO-Type 'Class A'/'nonPrecoded', then the UE uses the Rel. 13 or Rel. 14 Class A codebook for CSI calculation.

In yet another example, the Class B LC codebook is configured using an RRC parameter ClassBCombinationCB Enabled or ClassBLinearCombinationCB Enabled or ClassBLCCBEnabled. In such example, when this parameter is ON and the UE is configured with eMIMO-Type 'Class B'/'beamformed', then the UE uses the Class B LC codebook proposed in this present disclosure for CSI calculation. In such example, when this parameter is OFF and the UE is configured with eMIMO-Type 'Class B'/'beamformed', then the UE uses the Rel. 13 or Rel. 14 Class B codebook for CSI calculation.

An example of LC codebook configuration for hybrid CSI-RS and CSI reporting is shown in TABLE 7. In this hybrid scheme, there are two CSI-RS associated with two eMIMO-Types in one CSI process. For instance, the 1st CSI-RS is NP and is associated with Class A eMIMO-Type and the 2nd CSI-RS is BF and is associated with Class B, K=1 eMIMO-Type. Depending on the RRC parameter value, the Class A and Class B LC codebooks can be enabled/disabled as shown in TABLE 7.

The LC codebook for other hybrid CSI schemes such as 1st eMIMO-Type Class B, K≥1 and 2nd eMIMO-Type Class B, K=1 can be configured similarly.

TABLE 7

LC codebook configuration alternatives for hybrid CSI-RS

| | | Codebook | |
| --- | --- | --- | --- |
| | | 1st eMIMO-Type associated with 1st (NP) CSI-RS: | 2nd eMIMO-Type associated with 2nd (BF) CSI-RS: |
| RRC parameter | Value | Class A | Class B, K = 1 |
| CombinationCBEnabled | ON | Class A LC | Class B LC |
| | OFF | Rel. 13 or Rel. 14 Class A | Rel. 13 or Rel. 14 Class B |
| ClassACombinationCBEnabled | ON | Class A LC | Rel. 13 or Rel. 14 Class B |
| | OFF | Rel. 13 or Rel. 14 Class A | Rel. 13 or Rel. 14 Class B |
| ClassBCombinationCBEnabled | ON | Rel. 13 or Rel. 14 Class A | Class B LC |
| | OFF | Rel. 13 or Rel. 14 Class A | Rel. 13 or Rel. 14 Class B |

In some embodiments, a UE is configured with a 'Class B-LC' eMIMO-Type codebook via RRC signaling. If the UE is further configured with K=1 BF CSI-RS resource for P ports, then the UE derives a PMI value using the proposed P port 'Class B-LC' eMIMO-Type codebook. Alternatively, if the UE is configured with K>1 BF CSI-RS resource for P ports, then the UE derives a PMI value using the proposed P port 'Class B-LC' eMIMO-Type codebook. In addition, the UE may or may not report a corresponding CRI.

Figure 15:
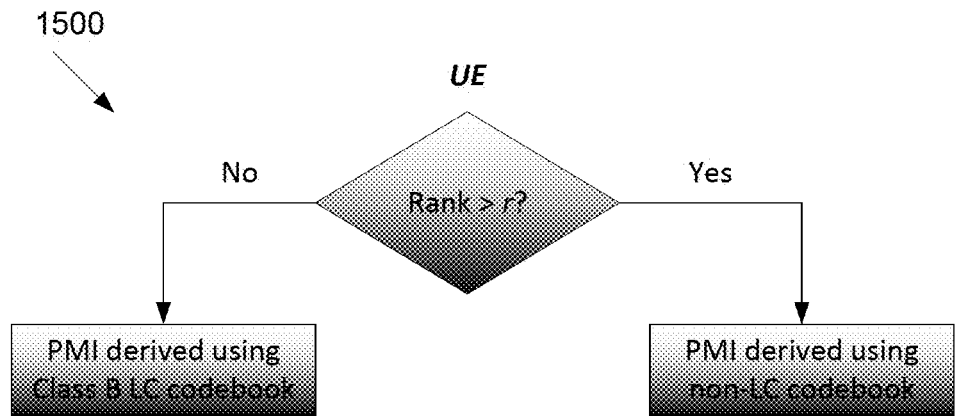
FIG. 15 illustrates an example linear combination (LC) or non-LC precoding matrix indicator (PMI) derivation based on rank according to embodiments of the present disclosure.

In some embodiments, for rank>r, the Class B LC codebook is the same as Rel. 13 or similar (such as Rel. 14) Class B codebook. An illustration of PMI derivation at the UE based on rank is shown in FIG. 15. If rank≤r, the UE derives PMI using the proposed Class B LC codebook. Otherwise, the UE derives the PMI using the non-LC codebook such as Rel. 13 or Rel. 14 codebooks. An example value of r is 2.

FIG. 15 illustrates an example linear combination (LC) or non-LC precoding matrix indicator (PMI) derivation based on rank 1500 according to embodiments of the present disclosure. An embodiment of the LC or non-LC PMI derivation based on rank 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In some embodiments, for P=4 and 8, the rank 1-4 Class B LC pre-coders are expressed as follows:

$$W_{k,n}^{(1)} = \frac{1}{\sqrt{P}} \begin{bmatrix} c_k^{(P/2)} \\ \varphi_n c_k^{(P/2)} \end{bmatrix},$$

$$W_{k,k',n}^{(2)} = \frac{1}{\sqrt{2P}} \begin{bmatrix} c_k^{(P/2)} & c_{k'}^{(P/2)} \\ \varphi_n c_k^{(P/2)} & -\varphi_n c_{k'}^{(P/2)} \end{bmatrix},$$

$$W_{k,k'}^{(3)} = \frac{1}{\sqrt{3P}} \begin{bmatrix} c_k^{(P/2)} & c_{k'}^{(P/2)} & c_{k'}^{(P/2)} \\ c_k^{(P/2)} & -c_k^{(P/2)} & c_{k'}^{(P/2)} \end{bmatrix},$$

$$\tilde{W}_{k,k'}^{(3)} = \frac{1}{\sqrt{3P}} \begin{bmatrix} c_k^{(P/2)} & c_{k'}^{(P/2)} & c_{k'}^{(P/2)} \\ c_k^{(P/2)} & c_{k'}^{(P/2)} & -c_{k'}^{(P/2)} \end{bmatrix}$$

$$W_{k,k',n}^{(4)} = \frac{1}{\sqrt{4P}} \begin{bmatrix} c_k^{(P/2)} & c_{k'}^{(P/2)} & c_k^{(P/2)} & c_{k'}^{(P/2)} \\ \varphi_n c_k^{(P/2)} & \varphi_n c_{k'}^{(P/2)} & -\varphi_n c_k^{(P/2)} & -\varphi_n c_{k'}^{(P/2)} \end{bmatrix},$$

and for P=8, the rank 5-8 Class B LC pre-coders are expressed as follows:

$$W_{k,k',k''}^{(5)} = \frac{1}{\sqrt{5P}} \begin{bmatrix} c_k^{(P/2)} & c_k^{(P/2)} & c_{k'}^{(P/2)} & c_{k'}^{(P/2)} & c_{k''}^{(P/2)} \\ c_k^{(P/2)} & -c_k^{(P/2)} & c_{k'}^{(P/2)} & -c_{k'}^{(P/2)} & c_{k''}^{(P/2)} \end{bmatrix}$$

$$W_{k,k',k''}^{(6)} = \frac{1}{\sqrt{6P}} \begin{bmatrix} c_k^{(P/2)} & c_k^{(P/2)} & c_{k'}^{(P/2)} & c_{k'}^{(P/2)} & c_{k''}^{(P/2)} & c_{k''}^{(P/2)} \\ c_k^{(P/2)} & -c_k^{(P/2)} & c_{k'}^{(P/2)} & -c_{k'}^{(P/2)} & c_{k''}^{(P/2)} & -c_{k''}^{(P/2)} \end{bmatrix}$$

$$W_{k,k',k'',k'''}^{(7)} = \frac{1}{\sqrt{7P}} \begin{bmatrix} c_k^{(P/2)} & c_k^{(P/2)} & c_{k'}^{(P/2)} & c_{k'}^{(P/2)} & c_{k''}^{(P/2)} & c_{k''}^{(P/2)} & c_{k'''}^{(P/2)} \\ c_k^{(P/2)} & -c_k^{(P/2)} & c_{k'}^{(P/2)} & -c_{k'}^{(P/2)} & c_{k''}^{(P/2)} & -c_{k''}^{(P/2)} & c_{k'''}^{(P/2)} \end{bmatrix}$$

$$W_{k,k',k'',k'''}^{(8)} = \frac{1}{\sqrt{8P}} \begin{bmatrix} c_k^{(P/2)} & c_k^{(P/2)} & c_{k'}^{(P/2)} & c_{k'}^{(P/2)} & c_{k''}^{(P/2)} & c_{k''}^{(P/2)} & c_{k'''}^{(P/2)} & c_{k'''}^{(P/2)} \\ c_k^{(P/2)} & -c_k^{(P/2)} & c_{k'}^{(P/2)} & -c_{k'}^{(P/2)} & c_{k''}^{(P/2)} & -c_{k''}^{(P/2)} & c_{k'''}^{(P/2)} & -c_{k'''}^{(P/2)} \end{bmatrix},$$

where $\varphi_n$ is a co-phase value for the two polarizations belonging to $\{1, j, -1, -j\}$, and there are two alternatives for the LC coefficients.

In one example of Alt 0, $c_k^{(P/2)} = [c_{k,0}^{(P/2)} c_{k,1}^{(P/2)} \ldots c_{k,P/2-1}^{(P/2)}]^T$, where $c_{k,r}^{(P/2)} = \varphi_{\lfloor kM^{P/2-1-r} \rfloor \mod M}$, r=0, 1, ..., P/2−1, which corresponds to M-PSK LC coefficients. The example set of values of M is $\{2, 4, 8\}$.

In another example of Alt 1, $c_k^{(P/2)}$ belongs to a DFT codebook of length P/2 and oversampling factor O:

$$c_k^{(P/2)} = \begin{bmatrix} c_{k,0}^{(P/2)} & c_{k,1}^{(P/2)} & \ldots & c_{k,P/2-1}^{(P/2)} \end{bmatrix}^T \in$$

$$\left\{ \begin{bmatrix} 1 & e^{j\frac{2\pi k}{OP/2}} & \ldots & e^{j\frac{2\pi k(P/2-1)}{OP/2}} \end{bmatrix}^T : k = 0, 1, \ldots, OP/2 - 1 \right\}.$$

In such example, the two alternatives (e.g., Alt 0 and Alt 1) are identical for P=4 and OP/2=K.

In some embodiments, a UE is configured with Class B LC codebook table for P=4 ports as shown in TABLE 8, which corresponds to OP/2=K=2 (i.e., Alt 0: BPSK codebook or Alt 1: O=1).

TABLE 8

Codebook for ι-layer CSI reporting using antenna ports {15, 16, 17, 18}

| Codebook index, n | Number of layers ι | | | |
|---|---|---|---|---|
| | 1 | 2 | 3 | 4 |
| 0 | $\frac{1}{2}\begin{bmatrix} c_0^{(2)} \\ c_0^{(2)} \end{bmatrix}$ | $\frac{1}{2\sqrt{2}}\begin{bmatrix} c_0^{(2)} & c_0^{(2)} \\ c_0^{(2)} & -c_0^{(2)} \end{bmatrix}$ | $\frac{1}{2\sqrt{3}}\begin{bmatrix} c_0^{(2)} & c_0^{(2)} & c_1^{(2)} \\ c_0^{(2)} & -c_0^{(2)} & -c_1^{(2)} \end{bmatrix}$ | $\frac{1}{4}\begin{bmatrix} c_0^{(2)} & c_1^{(2)} & c_0^{(2)} & c_1^{(2)} \\ c_0^{(2)} & c_1^{(2)} & -c_0^{(2)} & -c_1^{(2)} \end{bmatrix}$ |
| 1 | $\frac{1}{2}\begin{bmatrix} c_0^{(2)} \\ -c_0^{(2)} \end{bmatrix}$ | $\frac{1}{2\sqrt{2}}\begin{bmatrix} c_0^{(2)} & c_0^{(2)} \\ jc_0^{(2)} & -jc_0^{(2)} \end{bmatrix}$ | $\frac{1}{2\sqrt{3}}\begin{bmatrix} c_1^{(2)} & c_0^{(2)} & c_1^{(2)} \\ c_1^{(2)} & -c_0^{(2)} & -c_1^{(2)} \end{bmatrix}$ | $\frac{1}{4}\begin{bmatrix} c_0^{(2)} & c_1^{(2)} & c_0^{(2)} & c_1^{(2)} \\ jc_0^{(2)} & jc_1^{(2)} & -jc_0^{(2)} & -jc_1^{(2)} \end{bmatrix}$ |
| 2 | $\frac{1}{2}\begin{bmatrix} c_0^{(2)} \\ jc_0^{(2)} \end{bmatrix}$ | $\frac{1}{2\sqrt{2}}\begin{bmatrix} c_1^{(2)} & c_1^{(2)} \\ c_1^{(2)} & -c_1^{(2)} \end{bmatrix}$ | $\frac{1}{2\sqrt{3}}\begin{bmatrix} c_0^{(2)} & c_1^{(2)} & c_1^{(2)} \\ c_0^{(2)} & c_1^{(2)} & -c_1^{(2)} \end{bmatrix}$ | — |
| 3 | $\frac{1}{2}\begin{bmatrix} c_0^{(2)} \\ -jc_0^{(2)} \end{bmatrix}$ | $\frac{1}{2\sqrt{2)}}\begin{bmatrix} c_1^{(2)} & c_1^{(2)} \\ jc_1^{(2)} & -jc_1^{(2)} \end{bmatrix}$ | $\frac{1}{2\sqrt{3}}\begin{bmatrix} c_1^{(2)} & c_0^{(2)} & c_0^{(2)} \\ c_1^{(2)} & c_0^{(2)} & -c_0^{(2)} \end{bmatrix}$ | — |
| 4 | $\frac{1}{2}\begin{bmatrix} c_1^{(2)} \\ c_1^{(2)} \end{bmatrix}$ | $\frac{1}{2\sqrt{2}}\begin{bmatrix} c_2^{(2)} & c_2^{(2)} \\ c_2^{(2)} & -c_2^{(2)} \end{bmatrix}$ | — | — |
| 5 | $\frac{1}{2}\begin{bmatrix} c_1^{(2)} \\ -c_1^{(2)} \end{bmatrix}$ | $\frac{1}{2\sqrt{2}}\begin{bmatrix} c_2^{(2)} & c_2^{(2)} \\ jc_2^{(2)} & -jc_2^{(2)} \end{bmatrix}$ | — | — |
| 6 | $\frac{1}{2}\begin{bmatrix} c_1^{(2)} \\ jc_1^{(2)} \end{bmatrix}$ | $\frac{1}{2\sqrt{2}}\begin{bmatrix} c_3^{(2)} & c_3^{(2)} \\ c_3^{(2)} & -c_3^{(2)} \end{bmatrix}$ | — | — |

TABLE 8-continued

Codebook for $\iota$-layer CSI reporting using antenna ports {15, 16, 17, 18}

| Codebook index, n | Number of layers $\iota$ | | | |
|---|---|---|---|---|
| | 1 | 2 | 3 | 4 |
| 7 | $\frac{1}{2}\begin{bmatrix} c_1^{(2)} \\ -jc_1^{(2)} \end{bmatrix}$ | $\frac{1}{2\sqrt{2}}\begin{bmatrix} c_3^{(2)} & c_3^{(2)} \\ jc_3^{(2)} & -jc_3^{(2)} \end{bmatrix}$ | — | — |

$$c_0^{(2)} = [1\ \ 1]^T,\ c_1^{(2)} = [1\ \ -1]^T$$

In some embodiments, a UE is configured with Class B LC codebook table for P=4 ports as shown in TABLE 9, which corresponds to OP/2=K=4 (i.e., Alt 0: QPSK codebook or Alt 1: O=2). In this table, for rank 2 (l=2) all pairs of coefficients for the two layers are considered, which includes: (1) four cases in which same coefficients are used for the two layers (k=k'); and (2) six cases in which different coefficients are used for the two layers (k≠k').

In some embodiments, a UE is configured with Class B LC codebook table for P=4 ports as shown in TABLE 10, which corresponds to OP/2=K=4 (i.e., Alt 0: QPSK codebook or Alt 1: O=2). In this table, for rank 2 (l=2) Rel. 10 8-Tx coefficient pairs are considered for the two layers, which includes: (1) four cases in which same coefficients are used for the two layers (k=k'); and (2) four cases in which different coefficients are used for the two layers (k≠k').

TABLE 9

Codebook for $\iota$-layer CSI reporting using antenna ports {15, 16, 17, 18}

| Codebook index, n | Number of layers $\iota$ | | | |
|---|---|---|---|---|
| | 1 | 2 | 3 | 4 |
| 0 | $\frac{1}{2}\begin{bmatrix} c_0^{(2)} \\ c_0^{(2)} \end{bmatrix}$ | $\frac{1}{2\sqrt{2}}\begin{bmatrix} c_0^{(2)} & c_0^{(2)} \\ c_0^{(2)} & -c_0^{(2)} \end{bmatrix}$ | $\frac{1}{2\sqrt{3}}\begin{bmatrix} c_0^{(2)} & c_0^{(2)} & c_1^{(2)} \\ c_0^{(2)} & -c_0^{(2)} & -c_1^{(2)} \end{bmatrix}$ | $\frac{1}{4}\begin{bmatrix} c_0^{(2)} & c_1^{(2)} & c_0^{(2)} & c_1^{(2)} \\ c_0^{(2)} & c_1^{(2)} & -c_0^{(2)} & -c_1^{(2)} \end{bmatrix}$ |
| 1 | $\frac{1}{2}\begin{bmatrix} c_0^{(2)} \\ -c_0^{(2)} \end{bmatrix}$ | $\frac{1}{2\sqrt{2}}\begin{bmatrix} c_0^{(2)} & c_0^{(2)} \\ jc_0^{(2)} & -jc_0^{(2)} \end{bmatrix}$ | $\frac{1}{2\sqrt{3}}\begin{bmatrix} c_1^{(2)} & c_0^{(2)} & c_1^{(2)} \\ c_1^{(2)} & -c_0^{(2)} & -c_1^{(2)} \end{bmatrix}$ | $\frac{1}{4}\begin{bmatrix} c_0^{(2)} & c_1^{(2)} & c_0^{(2)} & c_1^{(2)} \\ jc_0^{(2)} & jc_1^{(2)} & -jc_0^{(2)} & -jc_1^{(2)} \end{bmatrix}$ |
| 2 | $\frac{1}{2}\begin{bmatrix} c_0^{(2)} \\ jc_0^{(2)} \end{bmatrix}$ | $\frac{1}{2\sqrt{2}}\begin{bmatrix} c_1^{(2)} & c_1^{(2)} \\ c_1^{(2)} & -c_1^{(2)} \end{bmatrix}$ | $\frac{1}{2\sqrt{3}}\begin{bmatrix} c_0^{(2)} & c_1^{(2)} & c_1^{(2)} \\ c_0^{(2)} & c_1^{(2)} & -c_1^{(2)} \end{bmatrix}$ | $\frac{1}{4}\begin{bmatrix} c_2^{(2)} & c_3^{(2)} & c_2^{(2)} & c_3^{(2)} \\ c_2^{(2)} & c_3^{(2)} & -c_2^{(2)} & -c_3^{(2)} \end{bmatrix}$ |
| 3 | $\frac{1}{2}\begin{bmatrix} c_0^{(2)} \\ -jc_0^{(2)} \end{bmatrix}$ | $\frac{1}{2\sqrt{2}}\begin{bmatrix} c_1^{(2)} & c_1^{(2)} \\ jc_1^{(2)} & -jc_1^{(2)} \end{bmatrix}$ | $\frac{1}{2\sqrt{3}}\begin{bmatrix} c_1^{(2)} & c_0^{(2)} & c_0^{(2)} \\ c_1^{(2)} & c_0^{(2)} & -c_0^{(2)} \end{bmatrix}$ | $\frac{1}{4}\begin{bmatrix} c_2^{(2)} & c_3^{(2)} & c_2^{(2)} & c_3^{(2)} \\ jc_2^{(2)} & jc_3^{(2)} & -jc_2^{(2)} & -jc_3^{(2)} \end{bmatrix}$ |
| 4 | $\frac{1}{2}\begin{bmatrix} c_1^{(2)} \\ c_1^{(2)} \end{bmatrix}$ | $\frac{1}{2\sqrt{2}}\begin{bmatrix} c_0^{(2)} & c_1^{(2)} \\ c_0^{(2)} & -c_1^{(2)} \end{bmatrix}$ | $\frac{1}{2\sqrt{3}}\begin{bmatrix} c_2^{(2)} & c_2^{(2)} & c_3^{(2)} \\ c_2^{(2)} & -c_2^{(2)} & -c_3^{(2)} \end{bmatrix}$ | — |
| 5 | $\frac{1}{2}\begin{bmatrix} c_1^{(2)} \\ -c_1^{(2)} \end{bmatrix}$ | $\frac{1}{2\sqrt{2}}\begin{bmatrix} c_0^{(2)} & c_1^{(2)} \\ jc_0^{(2)} & -jc_1^{(2)} \end{bmatrix}$ | $\frac{1}{2\sqrt{3}}\begin{bmatrix} c_3^{(2)} & c_2^{(2)} & c_3^{(2)} \\ c_3^{(2)} & -c_2^{(2)} & -c_3^{(2)} \end{bmatrix}$ | — |
| 6 | $\frac{1}{2}\begin{bmatrix} c_1^{(2)} \\ jc_1^{(2)} \end{bmatrix}$ | $\frac{1}{2\sqrt{2}}\begin{bmatrix} c_1^{(2)} & c_0^{(2)} \\ c_1^{(2)} & -c_0^{(2)} \end{bmatrix}$ | $\frac{1}{2\sqrt{3}}\begin{bmatrix} c_2^{(2)} & c_3^{(2)} & c_3^{(2)} \\ c_2^{(2)} & c_3^{(2)} & -c_3^{(2)} \end{bmatrix}$ | — |
| 7 | $\frac{1}{2}\begin{bmatrix} c_1^{(2)} \\ -jc_1^{(2)} \end{bmatrix}$ | $\frac{1}{2\sqrt{2}}\begin{bmatrix} c_1^{(2)} & c_0^{(2)} \\ jc_1^{(2)} & -jc_0^{(2)} \end{bmatrix}$ | $\frac{1}{2\sqrt{3}}\begin{bmatrix} c_3^{(2)} & c_2^{(2)} & c_2^{(2)} \\ c_3^{(2)} & c_2^{(2)} & -c_2^{(2)} \end{bmatrix}$ | — |
| 8-15 | | | — | — |
| 16-47 | — | | — | — |

Indices n = 4 to 15 for $\iota$ = 1 are obtained by replacing the coefficient $c_0^{(2)}$ in n = 0-3 with $c_2^{(2)}$ and $c_3^{(2)}$
Indices n = 8 to 47 for $\iota$ = 2 are obtained by replacing the coefficient pair $(c_0^{(2)}, c_1^{(2)})$ in n = 0-7 with remaining 5 coefficient pairs $(c_0^{(2)}, c_2^{(2)})$, $(c_0^{(2)}, c_3^{(2)})$, $(c_1^{(2)}, c_2^{(2)})$, $(c_1^{(2)}, c_3^{(2)})$, and $(c_2^{(2)}, c_2^{(2)})$
$$c_0^{(2)} = [1\ \ 1]^T,\ c_1^{(2)} = [1\ \ -1]^T,\ c_2^{(2)} = [1\ \ j]^T,\ c_3^{(2)} = [1\ \ -j]^T$$

TABLE 10

Codebook for υ-layer CSI reporting using antenna ports {15, 16, 17, 18}

| Codebook index, n | Number of layers υ | | | |
|---|---|---|---|---|
| | 1 | 2 | 3 | 4 |
| 0 | $\frac{1}{2}\begin{bmatrix} c_0^{(2)} \\ c_0^{(2)} \end{bmatrix}$ | $\frac{1}{2\sqrt{2}}\begin{bmatrix} c_0^{(2)} & c_0^{(2)} \\ c_0^{(2)} & -c_0^{(2)} \end{bmatrix}$ | $\frac{1}{2\sqrt{3}}\begin{bmatrix} c_0^{(2)} & c_0^{(2)} & c_1^{(2)} \\ c_0^{(2)} & -c_0^{(2)} & -c_1^{(2)} \end{bmatrix}$ | $\frac{1}{4}\begin{bmatrix} c_0^{(2)} & c_1^{(2)} & c_0^{(2)} & c_1^{(2)} \\ c_0^{(2)} & c_1^{(2)} & -c_0^{(2)} & -c_1^{(2)} \end{bmatrix}$ |
| 1 | $\frac{1}{2}\begin{bmatrix} c_0^{(2)} \\ -c_0^{(2)} \end{bmatrix}$ | $\frac{1}{2\sqrt{2}}\begin{bmatrix} c_0^{(2)} & c_0^{(2)} \\ jc_0^{(2)} & -jc_0^{(2)} \end{bmatrix}$ | $\frac{1}{2\sqrt{3}}\begin{bmatrix} c_1^{(2)} & c_0^{(2)} & c_1^{(2)} \\ c_1^{(2)} & -c_0^{(2)} & -c_1^{(2)} \end{bmatrix}$ | $\frac{1}{4}\begin{bmatrix} c_0^{(2)} & c_1^{(2)} & c_0^{(2)} & c_1^{(2)} \\ jc_0^{(2)} & jc_1^{(2)} & -jc_0^{(2)} & -jc_1^{(2)} \end{bmatrix}$ |
| 2 | $\frac{1}{2}\begin{bmatrix} c_0^{(2)} \\ jc_0^{(2)} \end{bmatrix}$ | $\frac{1}{2\sqrt{2}}\begin{bmatrix} c_0^{(2)} & c_1^{(2)} \\ c_1^{(2)} & -c_1^{(2)} \end{bmatrix}$ | $\frac{1}{2\sqrt{3}}\begin{bmatrix} c_0^{(2)} & c_1^{(2)} & c_1^{(2)} \\ c_0^{(2)} & c_1^{(2)} & -c_1^{(2)} \end{bmatrix}$ | $\frac{1}{4}\begin{bmatrix} c_2^{(2)} & c_3^{(2)} & c_2^{(2)} & c_3^{(2)} \\ c_2^{(2)} & c_3^{(2)} & -c_2^{(2)} & -c_3^{(2)} \end{bmatrix}$ |
| 3 | $\frac{1}{2}\begin{bmatrix} c_0^{(2)} \\ -jc_0^{(2)} \end{bmatrix}$ | $\frac{1}{2\sqrt{2}}\begin{bmatrix} c_1^{(2)} & c_1^{(2)} \\ jc_1^{(2)} & -jc_1^{(2)} \end{bmatrix}$ | $\frac{1}{2\sqrt{3}}\begin{bmatrix} c_1^{(2)} & c_0^{(2)} & c_0^{(2)} \\ c_1^{(2)} & c_0^{(2)} & -c_0^{(2)} \end{bmatrix}$ | $\frac{1}{4}\begin{bmatrix} c_2^{(2)} & c_3^{(2)} & c_2^{(2)} & c_3^{(2)} \\ jc_2^{(2)} & jc_3^{(2)} & -jc_2^{(2)} & -jc_3^{(2)} \end{bmatrix}$ |
| 4 | $\frac{1}{2}\begin{bmatrix} c_1^{(2)} \\ c_1^{(2)} \end{bmatrix}$ | $\frac{1}{2\sqrt{2}}\begin{bmatrix} c_2^{(2)} & c_2^{(2)} \\ c_2^{(2)} & -c_2^{(2)} \end{bmatrix}$ | $\frac{1}{2\sqrt{3}}\begin{bmatrix} c_2^{(2)} & c_2^{(2)} & c_3^{(2)} \\ c_2^{(2)} & -c_2^{(2)} & -c_3^{(2)} \end{bmatrix}$ | — |
| 5 | $\frac{1}{2}\begin{bmatrix} c_1^{(2)} \\ -c_1^{(2)} \end{bmatrix}$ | $\frac{1}{2\sqrt{2}}\begin{bmatrix} c_2^{(2)} & c_2^{(2)} \\ jc_2^{(2)} & -jc_2^{(2)} \end{bmatrix}$ | $\frac{1}{2\sqrt{3}}\begin{bmatrix} c_3^{(2)} & c_2^{(2)} & c_3^{(2)} \\ c_3^{(2)} & -c_2^{(2)} & -c_3^{(2)} \end{bmatrix}$ | — |
| 6 | $\frac{1}{2}\begin{bmatrix} c_1^{(2)} \\ jc_1^{(2)} \end{bmatrix}$ | $\frac{1}{2\sqrt{2}}\begin{bmatrix} c_3^{(2)} & c_3^{(2)} \\ c_3^{(2)} & -c_3^{(2)} \end{bmatrix}$ | $\frac{1}{2\sqrt{3}}\begin{bmatrix} c_2^{(2)} & c_3^{(2)} & c_3^{(2)} \\ c_2^{(2)} & c_3^{(2)} & -c_3^{(2)} \end{bmatrix}$ | — |
| 7 | $\frac{1}{2}\begin{bmatrix} c_1^{(2)} \\ -jc_1^{(2)} \end{bmatrix}$ | $\frac{1}{2\sqrt{2}}\begin{bmatrix} c_3^{(2)} & c_3^{(2)} \\ jc_3^{(2)} & -jc_3^{(2)} \end{bmatrix}$ | $\frac{1}{2\sqrt{3}}\begin{bmatrix} c_3^{(2)} & c_2^{(2)} & c_2^{(2)} \\ c_3^{(2)} & c_2^{(2)} & -c_2^{(2)} \end{bmatrix}$ | — |
| 8 | $\frac{1}{2}\begin{bmatrix} c_2^{(2)} \\ c_2^{(2)} \end{bmatrix}$ | $\frac{1}{2\sqrt{2}}\begin{bmatrix} c_0^{(2)} & c_1^{(2)} \\ c_0^{(2)} & -c_1^{(2)} \end{bmatrix}$ | — | — |
| 9 | $\frac{1}{2}\begin{bmatrix} c_2^{(2)} \\ -c_2^{(2)} \end{bmatrix}$ | $\frac{1}{2\sqrt{2}}\begin{bmatrix} c_0^{(2)} & c_1^{(2)} \\ jc_0^{(2)} & -jc_1^{(2)} \end{bmatrix}$ | — | — |
| 10 | $\frac{1}{2}\begin{bmatrix} c_2^{(2)} \\ jc_2^{(2)} \end{bmatrix}$ | $\frac{1}{2\sqrt{2}}\begin{bmatrix} c_1^{(2)} & c_2^{(2)} \\ c_1^{(2)} & -c_2^{(2)} \end{bmatrix}$ | — | — |
| 11 | $\frac{1}{2}\begin{bmatrix} c_2^{(2)} \\ -jc_2^{(2)} \end{bmatrix}$ | $\frac{1}{2\sqrt{2}}\begin{bmatrix} c_1^{(2)} & c_2^{(2)} \\ jc_1^{(2)} & -jc_2^{(2)} \end{bmatrix}$ | — | — |
| 12 | $\frac{1}{2}\begin{bmatrix} c_3^{(2)} \\ c_3^{(2)} \end{bmatrix}$ | $\frac{1}{2\sqrt{2}}\begin{bmatrix} c_1^{(2)} & c_3^{(2)} \\ c_1^{(2)} & -c_3^{(2)} \end{bmatrix}$ | — | — |
| 13 | $\frac{1}{2}\begin{bmatrix} c_3^{(2)} \\ -c_3^{(2)} \end{bmatrix}$ | $\frac{1}{2\sqrt{2}}\begin{bmatrix} c_1^{(2)} & c_3^{(2)} \\ jc_1^{(2)} & -jc_3^{(2)} \end{bmatrix}$ | — | — |
| 14 | $\frac{1}{2}\begin{bmatrix} c_3^{(2)} \\ jc_3^{(2)} \end{bmatrix}$ | $\frac{1}{2\sqrt{2}}\begin{bmatrix} c_0^{(2)} & c_3^{(2)} \\ c_0^{(2)} & -c_3^{(2)} \end{bmatrix}$ | — | — |
| 15 | $\frac{1}{2}\begin{bmatrix} c_3^{(2)} \\ -jc_3^{(2)} \end{bmatrix}$ | $\frac{1}{2\sqrt{2}}\begin{bmatrix} c_0^{(2)} & c_3^{(2)} \\ jc_0^{(2)} & -jc_3^{(2)} \end{bmatrix}$ | — | — |

$c_0^{(2)} = [1 \ \ 1]^T, \ c_1^{(2)} = [1 \ \ -1]^T, \ c_2^{(2)} = [1 \ \ j]^T, \ c_3^{(2)} = [1 \ \ -j]^T$

In some embodiments, a UE is configured with a P=4 port Class B codebook which performs both beam (port) selection and beam (port) combination. In particular, the UE is configured to either: (1) select L=1 out of P/2=2 beams (ports) or (2) linearly combine L=P/2=2 beams (ports).

The codebook table for beam selection (L=1) is as in TABLE 4, and that for beam combination is according to some embodiments of this present disclosure, for example TABLE 8, TABLE 9, and TABLE 10.

In one embodiment, the beam selection (L=1) and beam combination (L=2) are SB, hence L value can change across SBs. In this embodiment, the UE is configured to report L=1 or L=2 according to one of the following alternatives as shown in TABLE 11: In one example of explicit embodiment, the UE reports the L value explicitly as another CSI component in addition to the PMI. In this case, 1-bit indication is needed to report the L value per SB. The number of bits to report the corresponding PMI depends on the reported L value. An example of reported bit sequences is also shown assuming PMI TABLE 4 for L=1 and PMI TABLE 10 for L=2. Note that in this case, the number of bits for the reported PMI can change across SBs.

In another example of implicit embodiment, the UE reports the L value implicitly in the PMI. There are two further alternatives in this case, depending on whether L value is indicated as the most significant bit (MSB) or the least significant bit (LSB) of the reported bit sequence for the PMI. Note that in this case, the number of bits for the reported PMI does not change across SBs.

In some embodiments, the beam selection (L=1) and beam combination (L=2) are WB, hence L value does not change across SBs. Similar to the SB reporting (see TABLE 11), the WB reporting of L value can be explicit as another WB CSI component in addition to traditional WB CSI components such as RI. Alternatively, it can be implicit in the reported RI, where the reported L value is indicated by the MSB bit or the LSB bit of the reported bit sequence for the RI.

TABLE 11

Beam selection or beam combination reporting types (TABLE 4 for L = 1 and TABLE 10 for L = 2)

| Reporting | Type | Reported information | L | Number of bits (Rank 1) | Reported bit sequence |
|---|---|---|---|---|---|
| SB | Explicit | (L, PMI) | 1 | 1 + 3 = 4 | 0 ($b_0$, $b_1$, $b_2$) |
|  |  |  | 2 | 1 + 4 = 5 | 1 ($b_0$, $b_1$, $b_2$, $b_3$) |
|  | Implicit | PMI | MSB indicates L | 5 (TABLE 9) | $b_0$, $b_1$, $b_2$, $b_3$, $b_4$ where $b_0 = 0$ indicates L = 1, and $b_0 = 1$ indicates L = 2 |
|  |  |  | LSB indicates L | 5 | $b_0$, $b_1$, $b_2$, $b_3$, $b_4$ where $b_4 = 0$ indicates L = 1, and $b_4 = 1$ indicates L = 2 |
| WB | Explicit | (L, RI) | 1 | 1 + 2 = 3 | 0 ($b_0$, $b_1$) |
|  |  |  | 2 | 1 + 2 = 3 (TABLE 9) | 1 ($b_0$, $b_1$) |
|  | Implicit | RI | MSB indicates L | 3 | $b_0$, $b_1$, $b_2$ where $b_0 = 0$ indicates L = 1, and $b_0 = 1$ indicates L = 2 |
|  |  |  | LSB indicates L | 3 | $b_0$, $b_1$, $b_2$ where $b_2 = 0$ indicates L = 1, and $b_2 = 1$ indicates L = 2 |

In some embodiments, a UE is configured with Class B LC codebook table for P=8 ports as shown in TABLE 12, which corresponds to Alt 1 with O=1. In this case, four (DFT) coefficient vectors are as follows:

$c_0^{(4)} = [1\ 1\ 1\ 1]^T$, $c_1^{(4)} = [1\ j\ -1\ -j]^T$, $c_2^{(4)} = [1\ -1\ 1\ -1]^T$, $c_3^{(4)} = [1\ -j\ -1\ j]^T$.

TABLE 12

Codebook for ι-layer CSI reporting using antenna ports {15, 16, 17, 18, 19, 20, 21, 22}

| Codebook index, n | Number of layers ι | | | |
|---|---|---|---|---|
|  | 1 | 2 | 3 | 4 |
| 0 | $\frac{1}{2\sqrt{2}}\begin{bmatrix} c_0^{(4)} \\ c_0^{(4)} \end{bmatrix}$ | $\frac{1}{4}\begin{bmatrix} c_0^{(4)} & c_0^{(4)} \\ c_0^{(4)} & -c_0^{(4)} \end{bmatrix}$ | $\frac{1}{2\sqrt{6}}\begin{bmatrix} c_0^{(4)} & c_0^{(4)} & c_1^{(4)} \\ c_0^{(4)} & -c_0^{(4)} & -c_1^{(4)} \end{bmatrix}$ | $\frac{1}{4\sqrt{2}}\begin{bmatrix} c_0^{(4)} & c_1^{(4)} & c_0^{(4)} & c_1^{(4)} \\ c_0^{(4)} & c_1^{(4)} & -c_0^{(4)} & -c_1^{(4)} \end{bmatrix}$ |
| 1 | $\frac{1}{2\sqrt{2}}\begin{bmatrix} c_0^{(4)} \\ -c_0^{(4)} \end{bmatrix}$ | $\frac{1}{4}\begin{bmatrix} c_0^{(4)} & c_0^{(4)} \\ jc_0^{(4)} & -jc_0^{(4)} \end{bmatrix}$ | $\frac{1}{2\sqrt{6}}\begin{bmatrix} c_1^{(4)} & c_0^{(4)} & c_1^{(4)} \\ c_1^{(4)} & -c_0^{(4)} & -c_1^{(4)} \end{bmatrix}$ | $\frac{1}{4\sqrt{2}}\begin{bmatrix} c_0^{(4)} & c_1^{(4)} & c_0^{(4)} & c_1^{(4)} \\ jc_0^{(4)} & jc_1^{(4)} & -jc_0^{(4)} & -jc_1^{(4)} \end{bmatrix}$ |
| 2 | $\frac{1}{2\sqrt{2}}\begin{bmatrix} c_0^{(4)} \\ jc_0^{(4)} \end{bmatrix}$ | $\frac{1}{4}\begin{bmatrix} c_1^{(4)} & c_1^{(4)} \\ c_1^{(4)} & -c_1^{(4)} \end{bmatrix}$ | $\frac{1}{2\sqrt{6}}\begin{bmatrix} c_0^{(4)} & c_1^{(4)} & c_1^{(4)} \\ c_0^{(4)} & -c_1^{(4)} & -c_1^{(4)} \end{bmatrix}$ | $\frac{1}{4\sqrt{2}}\begin{bmatrix} c_1^{(4)} & c_2^{(4)} & c_1^{(4)} & c_2^{(4)} \\ c_1^{(4)} & c_2^{(4)} & -c_1^{(4)} & -c_2^{(4)} \end{bmatrix}$ |

TABLE 12-continued

Codebook for ι-layer CSI reporting using antenna ports {15, 16, 17, 18, 19, 20, 21, 22}

| n | 1 | 2 | 3 | 4 |
|---|---|---|---|---|
| 3 | $\frac{1}{2\sqrt{2}}\begin{bmatrix} c_0^{(4)} \\ -jc_0^{(4)} \end{bmatrix}$ | $\frac{1}{4}\begin{bmatrix} c_1^{(4)} & c_1^{(4)} \\ jc_1^{(4)} & -jc_1^{(4)} \end{bmatrix}$ | $\frac{1}{2\sqrt{6}}\begin{bmatrix} c_1^{(4)} & c_0^{(4)} & c_0^{(4)} \\ c_1^{(4)} & c_0^{(4)} & -c_0^{(4)} \end{bmatrix}$ | $\frac{1}{4\sqrt{2}}\begin{bmatrix} c_1^{(4)} & c_2^{(4)} & c_1^{(4)} & c_2^{(4)} \\ jc_1^{(4)} & jc_2^{(4)} & -jc_1^{(4)} & -jc_2^{(4)} \end{bmatrix}$ |
| 4 | $\frac{1}{2\sqrt{2}}\begin{bmatrix} c_1^{(4)} \\ c_1^{(4)} \end{bmatrix}$ | $\frac{1}{4}\begin{bmatrix} c_2^{(4)} & c_2^{(4)} \\ c_2^{(4)} & -c_2^{(4)} \end{bmatrix}$ | $\frac{1}{2\sqrt{6}}\begin{bmatrix} c_1^{(4)} & c_1^{(4)} & c_2^{(4)} \\ c_1^{(4)} & -c_1^{(4)} & -c_2^{(4)} \end{bmatrix}$ | $\frac{1}{4\sqrt{2}}\begin{bmatrix} c_2^{(4)} & c_3^{(4)} & c_2^{(4)} & c_3^{(4)} \\ c_2^{(4)} & c_3^{(4)} & -c_2^{(4)} & -c_3^{(4)} \end{bmatrix}$ |
| 5 | $\frac{1}{2\sqrt{2}}\begin{bmatrix} c_1^{(4)} \\ -c_1^{(4)} \end{bmatrix}$ | $\frac{1}{4}\begin{bmatrix} c_2^{(4)} & c_2^{(4)} \\ jc_2^{(4)} & -jc_2^{(4)} \end{bmatrix}$ | $\frac{1}{2\sqrt{6}}\begin{bmatrix} c_2^{(4)} & c_1^{(4)} & c_2^{(4)} \\ c_2^{(4)} & -c_1^{(4)} & -c_2^{(4)} \end{bmatrix}$ | $\frac{1}{4\sqrt{2}}\begin{bmatrix} c_2^{(4)} & c_3^{(4)} & c_2^{(4)} & c_3^{(4)} \\ jc_2^{(4)} & jc_3^{(4)} & -jc_2^{(4)} & -jc_3^{(4)} \end{bmatrix}$ |
| 6 | $\frac{1}{2\sqrt{2}}\begin{bmatrix} c_1^{(4)} \\ jc_1^{(4)} \end{bmatrix}$ | $\frac{1}{4}\begin{bmatrix} c_3^{(4)} & c_3^{(4)} \\ c_3^{(4)} & -c_3^{(4)} \end{bmatrix}$ | $\frac{1}{2\sqrt{6}}\begin{bmatrix} c_1^{(4)} & c_2^{(4)} & c_2^{(4)} \\ c_1^{(4)} & c_2^{(4)} & -c_2^{(4)} \end{bmatrix}$ | $\frac{1}{4\sqrt{2}}\begin{bmatrix} c_3^{(4)} & c_0^{(4)} & c_3^{(4)} & c_0^{(4)} \\ c_3^{(4)} & c_0^{(4)} & -c_0^{(4)} & -c_0^{(4)} \end{bmatrix}$ |
| 7 | $\frac{1}{2\sqrt{2}}\begin{bmatrix} c_1^{(4)} \\ -jc_1^{(4)} \end{bmatrix}$ | $\frac{1}{4}\begin{bmatrix} c_3^{(4)} & c_3^{(4)} \\ jc_3^{(4)} & -jc_3^{(4)} \end{bmatrix}$ | $\frac{1}{2\sqrt{6}}\begin{bmatrix} c_2^{(4)} & c_1^{(4)} & c_1^{(4)} \\ c_2^{(4)} & c_1^{(4)} & -c_1^{(4)} \end{bmatrix}$ | $\frac{1}{4\sqrt{2}}\begin{bmatrix} c_3^{(4)} & c_0^{(4)} & c_3^{(4)} & c_0^{(4)} \\ jc_3^{(4)} & jc_0^{(4)} & -jc_0^{(4)} & -jc_0^{(4)} \end{bmatrix}$ |
| 8 | $\frac{1}{2\sqrt{2}}\begin{bmatrix} c_2^{(4)} \\ c_2^{(4)} \end{bmatrix}$ | $\frac{1}{4}\begin{bmatrix} c_0^{(4)} & c_1^{(4)} \\ c_0^{(4)} & -c_1^{(4)} \end{bmatrix}$ | $\frac{1}{2\sqrt{6}}\begin{bmatrix} c_2^{(4)} & c_2^{(4)} & c_3^{(4)} \\ c_2^{(4)} & -c_2^{(4)} & -c_3^{(4)} \end{bmatrix}$ | — |
| 9 | $\frac{1}{2\sqrt{2}}\begin{bmatrix} c_2^{(4)} \\ -c_2^{(4)} \end{bmatrix}$ | $\frac{1}{4}\begin{bmatrix} c_0^{(4)} & c_1^{(4)} \\ jc_0^{(4)} & -jc_1^{(4)} \end{bmatrix}$ | $\frac{1}{2\sqrt{6}}\begin{bmatrix} c_3^{(4)} & c_2^{(4)} & c_3^{(4)} \\ c_3^{(4)} & -c_2^{(4)} & -c_3^{(4)} \end{bmatrix}$ | — |
| 10 | $\frac{1}{2\sqrt{2}}\begin{bmatrix} c_2^{(4)} \\ jc_2^{(4)} \end{bmatrix}$ | $\frac{1}{4}\begin{bmatrix} c_1^{(4)} & c_2^{(4)} \\ c_1^{(4)} & -c_2^{(4)} \end{bmatrix}$ | $\frac{1}{2\sqrt{6}}\begin{bmatrix} c_2^{(4)} & c_3^{(4)} & c_3^{(4)} \\ c_2^{(4)} & c_3^{(4)} & -c_3^{(4)} \end{bmatrix}$ | — |
| 11 | $\frac{1}{2\sqrt{2}}\begin{bmatrix} c_2^{(4)} \\ -jc_2^{(4)} \end{bmatrix}$ | $\frac{1}{4}\begin{bmatrix} c_1^{(4)} & c_2^{(4)} \\ jc_1^{(4)} & -jc_2^{(4)} \end{bmatrix}$ | $\frac{1}{2\sqrt{6}}\begin{bmatrix} c_3^{(4)} & c_2^{(4)} & c_2^{(4)} \\ c_3^{(4)} & c_2^{(4)} & -c_2^{(4)} \end{bmatrix}$ | — |
| 12 | $\frac{1}{2\sqrt{2}}\begin{bmatrix} c_3^{(4)} \\ c_3^{(4)} \end{bmatrix}$ | $\frac{1}{4}\begin{bmatrix} c_1^{(4)} & c_3^{(4)} \\ c_1^{(4)} & -c_3^{(4)} \end{bmatrix}$ | $\frac{1}{2\sqrt{6}}\begin{bmatrix} c_3^{(4)} & c_3^{(4)} & c_0^{(4)} \\ c_3^{(4)} & -c_3^{(4)} & -c_0^{(4)} \end{bmatrix}$ | — |
| 13 | $\frac{1}{2\sqrt{2}}\begin{bmatrix} c_3^{(4)} \\ -c_3^{(4)} \end{bmatrix}$ | $\frac{1}{4}\begin{bmatrix} c_1^{(4)} & c_3^{(4)} \\ jc_1^{(4)} & -jc_3^{(4)} \end{bmatrix}$ | $\frac{1}{2\sqrt{6}}\begin{bmatrix} c_0^{(4)} & c_3^{(4)} & c_0^{(4)} \\ c_0^{(4)} & -c_3^{(4)} & -c_0^{(4)} \end{bmatrix}$ | — |
| 14 | $\frac{1}{2\sqrt{2}}\begin{bmatrix} c_3^{(4)} \\ jc_3^{(4)} \end{bmatrix}$ | $\frac{1}{4}\begin{bmatrix} c_0^{(4)} & c_3^{(4)} \\ c_0^{(4)} & -c_3^{(4)} \end{bmatrix}$ | $\frac{1}{2\sqrt{6}}\begin{bmatrix} c_3^{(4)} & c_0^{(4)} & c_0^{(4)} \\ c_3^{(4)} & c_0^{(4)} & -c_0^{(4)} \end{bmatrix}$ | — |
| 15 | $\frac{1}{2\sqrt{2}}\begin{bmatrix} c_3^{(4)} \\ -jc_3^{(4)} \end{bmatrix}$ | $\frac{1}{4}\begin{bmatrix} c_0^{(4)} & c_3^{(4)} \\ jc_0^{(4)} & -jc_3^{(4)} \end{bmatrix}$ | $\frac{1}{2\sqrt{6}}\begin{bmatrix} c_0^{(4)} & c_3^{(4)} & c_3^{(4)} \\ c_0^{(4)} & c_3^{(4)} & -c_3^{(4)} \end{bmatrix}$ | — |

| Codebook index, n | Number of layers ι | |
|---|---|---|
| | 5 | 6 |
| 0 | $\frac{1}{2\sqrt{10}}\begin{bmatrix} c_0^{(4)} & c_0^{(4)} & c_1^{(4)} & c_1^{(4)} & c_2^{(4)} \\ c_0^{(4)} & -c_0^{(4)} & c_1^{(4)} & -c_1^{(4)} & c_2^{(4)} \end{bmatrix}$ | $\frac{1}{4\sqrt{3}}\begin{bmatrix} c_0^{(4)} & c_0^{(4)} & c_1^{(4)} & c_1^{(4)} & c_2^{(4)} & c_2^{(4)} \\ c_0^{(4)} & -c_0^{(4)} & c_1^{(4)} & -c_1^{(4)} & c_2^{(4)} & -c_2^{(4)} \end{bmatrix}$ |
| 1-15 | — | — |

| Codebook index, n | Number of layers ι | |
|---|---|---|
| | 7 | 8 |
| 0 | $\frac{1}{4\sqrt{14}}\begin{bmatrix} c_0^{(4)} & c_0^{(4)} & c_1^{(4)} & c_1^{(4)} & c_2^{(4)} & c_2^{(4)} & c_3^{(4)} \\ c_0^{(4)} & -c_0^{(4)} & c_1^{(4)} & -c_1^{(4)} & c_2^{(4)} & -c_2^{(4)} & c_3^{(4)} \end{bmatrix}$ | $\frac{1}{8}\begin{bmatrix} c_0^{(4)} & c_0^{(4)} & c_1^{(4)} & c_1^{(4)} & c_2^{(4)} & c_2^{(4)} & c_3^{(4)} & c_3^{(4)} \\ c_0^{(4)} & -c_0^{(4)} & c_1^{(4)} & -c_1^{(4)} & c_2^{(4)} & -c_2^{(4)} & c_3^{(4)} & -c_3^{(4)} \end{bmatrix}$ |
| 1-15 | — | — |

The codebook tables for O>2 can be constructed similarly. For example, for O=2, eight (DFT) coefficient vectors are as follows:

$$c_0^{(4)} = [1\ \ 1\ \ 1\ \ 1]^T, c_1^{(4)} = [1\ \ j\ \ -1\ \ -j]^T,$$

$$c_2^{(4)} = [1\ \ -1\ \ 1\ \ -1]^T, c_3^{(4)} = [1\ \ -j\ \ -1\ \ j]^T$$

$$c_4^{(4)} = \left[1,\ \frac{1}{\sqrt{2}}+j\frac{1}{\sqrt{2}},\ j,\ -\frac{1}{\sqrt{2}}+j\frac{1}{\sqrt{2}}\right]^T,$$

$$c_5^{(4)} = \left[1,\ -\frac{1}{\sqrt{2}}+j\frac{1}{\sqrt{2}},\ -j,\ \frac{1}{\sqrt{2}}+j\frac{1}{\sqrt{2}}\right]^T,$$

$$c_6^{(4)} = \left[1,\ -\frac{1}{\sqrt{2}}-j\frac{1}{\sqrt{2}},\ j,\ \frac{1}{\sqrt{2}}-j\frac{1}{\sqrt{2}}\right]^T,$$

$$c_7^{(4)} = \left[1,\ \frac{1}{\sqrt{2}}-j\frac{1}{\sqrt{2}},\ -j,\ -\frac{1}{\sqrt{2}}-j\frac{1}{\sqrt{2}}\right]^T.$$

The rank 1-8 codebook tables are shown in TABLE 13.

In some embodiments, a UE is configured with Class B LC codebook tables for P=8 ports as shown in TABLE 14.

TABLE 14

Codebook for $\iota$-layer CSI reporting using antenna ports {15, 16, 17, 18, 19, 20, 21, 22}

| Codebook index, n | Number of layers $\iota$ = 1 | Number of layers $\iota$ = 2 |
|---|---|---|
| 0 | $\frac{1}{2\sqrt{2}}\begin{bmatrix}c_0^{(4)}\\c_0^{(4)}\end{bmatrix}$ | $\frac{1}{4}\begin{bmatrix}c_0^{(4)} & c_0^{(4)}\\c_0^{(4)} & -c_0^{(4)}\end{bmatrix}$ |
| 1 | $\frac{1}{2\sqrt{2}}\begin{bmatrix}c_0^{(4)}\\jc_0^{(4)}\end{bmatrix}$ | $\frac{1}{4}\begin{bmatrix}c_0^{(4)} & c_0^{(4)}\\c_0^{(4)} & -jc_0^{(4)}\end{bmatrix}$ |
| 2 | $\frac{1}{2\sqrt{2}}\begin{bmatrix}c_0^{(4)}\\-c_0^{(4)}\end{bmatrix}$ | $\frac{1}{4}\begin{bmatrix}c_1^{(4)} & c_1^{(4)}\\c_1^{(4)} & -c_1^{(4)}\end{bmatrix}$ |

TABLE 13

Codebook for $\iota$-layer CSI reporting using antenna ports {15, 16, 17, 18, 19, 20, 21, 22}

| Codebook index, n | 1 | 2 | 3 | 4 |
|---|---|---|---|---|
| 0-7 | Same as in TABLE 12 | Same as in TABLE 12 | Same as in TABLE 12 | Same as in TABLE 12 |
| 8-15 | Same as in TABLE 12 | Same as in TABLE 12 | Same as in TABLE 12 | Obtained by replacing $c_0^{(4)}, c_1^{(4)}, c_2^{(4)}, c_3^{(4)}$ in n = 0-7 for $\upsilon$ = 4 in TABLE 12 with $c_4^{(4)}, c_5^{(4)}, c_6^{(4)}, c_7^{(4)}$, respectively. |
| 16-31 | Obtained by replacing $c_0^{(4)}, c_1^{(4)}, c_2^{(4)}, c_3^{(4)}$ in n = 0-15 for $\upsilon$ = 1 in TABLE 12 with $c_4^{(4)}, c_5^{(4)}, c_6^{(4)}, c_7^{(4)}$, respectively. | Obtained by replacing $c_0^{(4)}, c_1^{(4)}, c_2^{(4)}, c_3^{(4)}$ in n = 0-15 for $\upsilon$ = 2 in TABLE 12 with $c_4^{(4)}, c_5^{(4)}, c_6^{(4)}, c_7^{(4)}$, respectively. | Obtained by replacing $c_0^{(4)}, c_1^{(4)}, c_2^{(4)}, c_3^{(4)}$ in n = 0-15 for $\upsilon$ = 3 in TABLE 12 with $c_4^{(4)}, c_5^{(4)}, c_6^{(4)}, c_7^{(4)}$, respectively. | — |

| Codebook index, n | 5 | 6 |
|---|---|---|
| 0 | $\frac{1}{2\sqrt{10}}\begin{bmatrix}c_0^{(4)} & c_0^{(4)} & c_1^{(4)} & c_1^{(4)} & c_2^{(4)}\\c_0^{(4)} & -c_0^{(4)} & c_1^{(4)} & -c_1^{(4)} & c_2^{(4)}\end{bmatrix}$ | $\frac{1}{4\sqrt{3}}\begin{bmatrix}c_0^{(4)} & c_0^{(4)} & c_1^{(4)} & c_1^{(4)} & c_2^{(4)} & c_2^{(4)}\\c_0^{(4)} & -c_0^{(4)} & c_1^{(4)} & -c_1^{(4)} & c_2^{(4)} & -c_2^{(4)}\end{bmatrix}$ |
| 1 | $\frac{1}{2\sqrt{10}}\begin{bmatrix}c_4^{(4)} & c_4^{(4)} & c_5^{(4)} & c_5^{(4)} & c_6^{(4)}\\c_4^{(4)} & -c_4^{(4)} & c_5^{(4)} & -c_5^{(4)} & c_6^{(4)}\end{bmatrix}$ | $\frac{1}{4\sqrt{3}}\begin{bmatrix}c_4^{(4)} & c_4^{(4)} & c_5^{(4)} & c_5^{(4)} & c_6^{(4)} & c_6^{(4)}\\c_4^{(4)} & -c_4^{(4)} & c_5^{(4)} & -c_5^{(4)} & c_6^{(4)} & -c_6^{(4)}\end{bmatrix}$ |
| 2-15 | — | — |

| Codebook index, n | 7 | 8 |
|---|---|---|
| 0 | $\frac{1}{4\sqrt{14}}\begin{bmatrix}c_0^{(4)} & c_0^{(4)} & c_1^{(4)} & c_1^{(4)} & c_2^{(4)} & c_2^{(4)} & c_3^{(4)}\\c_0^{(4)} & -c_0^{(4)} & c_1^{(4)} & -c_1^{(4)} & c_2^{(4)} & -c_2^{(4)} & c_3^{(4)}\end{bmatrix}$ | $\frac{1}{8}\begin{bmatrix}c_0^{(4)} & c_0^{(4)} & c_1^{(4)} & c_1^{(4)} & c_2^{(4)} & c_2^{(4)} & c_3^{(4)} & c_3^{(4)}\\c_0^{(4)} & -c_0^{(4)} & c_1^{(4)} & -c_1^{(4)} & c_2^{(4)} & -c_2^{(4)} & c_3^{(4)} & -c_3^{(4)}\end{bmatrix}$ |
| 1 | $\frac{1}{4\sqrt{14}}\begin{bmatrix}c_4^{(4)} & c_4^{(4)} & c_5^{(4)} & c_5^{(4)} & c_6^{(4)} & c_6^{(4)} & c_7^{(4)}\\c_4^{(4)} & -c_4^{(4)} & c_5^{(4)} & -c_5^{(4)} & c_6^{(4)} & -c_6^{(4)} & c_7^{(4)}\end{bmatrix}$ | $\frac{1}{8}\begin{bmatrix}c_4^{(4)} & c_4^{(4)} & c_5^{(4)} & c_5^{(4)} & c_6^{(4)} & c_6^{(4)} & c_7^{(4)} & c_7^{(4)}\\c_4^{(4)} & -c_4^{(4)} & c_5^{(4)} & -c_5^{(4)} & c_6^{(4)} & -c_6^{(4)} & c_7^{(4)} & -c_7^{(4)}\end{bmatrix}$ |
| 2-15 | — | — |

TABLE 14-continued

Codebook for ι-layer CSI reporting using antenna ports {15, 16, 17, 18, 19, 20, 21, 22}

| Codebook index, n | Number of layers ι | |
|---|---|---|
| | 1 | 2 |
| 3 | $\frac{1}{2\sqrt{2}}\begin{bmatrix} c_0^{(4)} \\ -jc_0^{(4)} \end{bmatrix}$ | $\frac{1}{4}\begin{bmatrix} c_1^{(4)} & c_1^{(4)} \\ jc_1^{(4)} & -jc_1^{(4)} \end{bmatrix}$ |
| 4-255 | Indices n = 4 to 255 for ι = 1 are obtained by replacing the subscript of $c_0^{(4)}$ with 1, 2, and 3. Indices n = 4 to 127 for ι = 2 are obtained by replacing the subscript of $c_0^{(4)}$ with 2, and 3 | |

In some embodiments, a UE is configured with single Class B LC codebook tables for P=4, and 8 as shown in TABLE 15.

TABLE 15

Codebook for ι-layer CSI reporting using antenna ports {15, 16, ..., P}

| Codebook index, n | Number of layers ι | |
|---|---|---|
| | 1 | 2 |
| 0 | $\frac{1}{\sqrt{P}}\begin{bmatrix} c_0^{(P/2)} \\ c_0^{(P/2)} \end{bmatrix}$ | $\frac{1}{\sqrt{2P}}\begin{bmatrix} c_0^{(P/2)} & c_0^{(P/2)} \\ c_0^{(P/2)} & -c_0^{(P/2)} \end{bmatrix}$ |
| 1 | $\frac{1}{\sqrt{P}}\begin{bmatrix} c_0^{(P/2)} \\ jc_0^{(P/2)} \end{bmatrix}$ | $\frac{1}{\sqrt{2P}}\begin{bmatrix} c_0^{(P/2)} & c_0^{(P/2)} \\ jc_0^{(P/2)} & -jc_0^{(P/2)} \end{bmatrix}$ |
| 2 | $\frac{1}{\sqrt{P}}\begin{bmatrix} c_0^{(P/2)} \\ -c_0^{(P/2)} \end{bmatrix}$ | $\frac{1}{\sqrt{2P}}\begin{bmatrix} c_1^{(P/2)} & c_1^{(P/2)} \\ c_1^{(P/2)} & -c_1^{(P/2)} \end{bmatrix}$ |
| 3 | $\frac{1}{\sqrt{P}}\begin{bmatrix} c_0^{(P/2)} \\ -jc_0^{(P/2)} \end{bmatrix}$ | $\frac{1}{\sqrt{2P}}\begin{bmatrix} c_1^{(P/2)} & c_1^{(P/2)} \\ jc_1^{(P/2)} & -jc_1^{(P/2)} \end{bmatrix}$ |
| 4-$4^{P/2}$ − 1 | Indices n = 4 to $4^{P/2}$ − 1 for ι = 1 are obtained by replacing the subscript of $c_0^{(2)}$ with 1, 2, and 3. Indices n = 4 to 2 × $4^{P/2-1}$ − 1 for ι = 2 are obtained by replacing the subscript of $c_0^{(2)}$ with 2, and 3 | |

In some embodiments, the Class B LC coefficients comprises of multiple components which are reported using multiple coefficient codebooks for each component. For example, the number of components can be two. In this case, the coefficient index k indicates a pair of indices ($k_1$, $k_2$) explicitly where $k_1$ indicates the 1st coefficient component and $k_2$ indicates the 2nd coefficient component.

The r-th coefficient is then given by $c_{k,r}^{(P/2)} = c_{k_1,r}^{(P/2)} c_{k_2,r}^{(P/2)}$. A few alternatives of the coefficient codebook are shown in TABLE 16. In one embodiment of Alt 0, each coefficient has a (2-bit) WB phase component and a (1-bit) SB phase component. The reported coefficients are constant-modulus (CM), hence has the same magnitude. In another embodiment, the magnitude of each coefficient is reported using a magnitude codebook. So, the reported coefficients are non-CM because the reported coefficients can have different magnitudes. In such embodiment, there could be a few alternatives. In one example of Alt 1, magnitude reporting is WB and phase reporting is SB. In another example of Alt 2, both magnitude and phase reporting are SB. In yet another example of Alt 3, magnitude reporting is WB and phase reporting is SB except that magnitudes of coefficients are also reported and this reporting is WB.

TABLE 16

Coefficient codebook alternatives

| Alt | 1st coefficient component ($c_{k_1,r}^{(P/2)}$) | | 2nd coefficient component ($c_{k_2,r}^{(P/2)}$) | |
|---|---|---|---|---|
| | type | example | type | example |
| 0 | WB phase | $C_{k_1,r}^{(P/2)} = \alpha_{k_1}$ | SB phase | $c_{k_2,r}^{(P/2)} = \psi_{\lfloor k_2/2^{P/2-1-r}\rfloor \bmod 2}$ |
| 1 | WB magnitude | $C_{k_1,r}^{(P/2)} = m_{k_1}$ | SB phase | $C_{k_2,r}^{(P/2)} = \varphi_{\lfloor k_2/4^{P/2-1-r}\rfloor \bmod 4}$ |
| 2 | SB magnitude | $C_{k_1,r}^{(P/2)} = m_{k_1}$ | SB phase | $c_{k_2,r}^{(P/2)} = \varphi_{\lfloor k_2/4^{P/2-1-r}\rfloor \bmod 4}$ |
| 3 | WB magnitude, WB phase | $c_{k_1,r}^{(P/2)} = m_{k_1} \alpha_{k_1}$ | SB phase | $c_{k_2,r}^{(P/2)} = \psi_{\lfloor k_2/2^{P/2-1-r}\rfloor \bmod 2}$ | where: $\varphi_n = e^{j\pi n/2}$, n=0, 1, 2, 3 is 2-bit SB phase {1,−1,j,−j}, $\psi_k = e^{j\pi(k/2 - 1/4)}$, k=0, 1 is 1-bit SB phase $$\{e^{j\frac{\pi}{4}}, e^{-j\frac{\pi}{4}}\},$$

$\alpha_k = e^{j\pi(k/2 + 1/4)}$, k=0, 1, 2, 3 is 2-bit WB phase $$\{e^{j\frac{\pi}{4}}, e^{j\frac{3\pi}{4}}, e^{j\frac{5\pi}{4}}, e^{j\frac{7\pi}{4}}\},$$

and $m_k$ is for coefficient magnitude.

An example of magnitude codebook is uniform codebook in [0, V], where V=1, for example. In such example, magnitude of a coefficient can be 0, which means that the corresponding beam is not selected for linear combination. Note also that this beam selection can be SB or WB.

The WB reporting of the 1st coefficient component $c_{k_1,r}^{(P/2)}$ can be joint with at least one of other WB CSI components such as 1st PMI, RI, and WB L value. Alternatively, it can be as another WB PMI, for example $i_0$.

The SB reporting of both 1st and 2nd coefficient components, $c_{k_1,r}^{(P/2)}$ and $c_{k_2,r}^{(P/2)}$, can be joint with at least one of other SB CSI components such as the (or second) PMI (or $i_2$) (for the co-phase), and SB L value. Alternatively, it can be as another SB PMI, for example $i_3$. Similarly, the SB reporting of the 2nd coefficient component $c_{k_2,r}^{(P/2)}$ only can be joint with at least one of other SB CSI components such as the (or second) PMI (or $i_2$) (for the co-phase), and SB L value. Alternatively, it can be as another SB PMI, for example $i_3$.

The rank 1 and rank P codebook tables for alternatives in TABLE 16 can be constructed similar to some of the embodiments of the present disclosure.

In some embodiments, the Class B LC coefficients are reported using a single coefficient codebook, where coefficients can have one such as phase or multiple components such as magnitude and phase. In the case of two components (e.g. magnitude and phase), the coefficient index k indicates a pair of indices ($k_1$, $k_2$) implicitly or jointly where $k_1$ indicates the 1st coefficient component and $k_2$ indicates the 2nd coefficient component.

The first and the second coefficient components are similar to TABLE 16, but the reporting of the two components are either WB or SB.

In some embodiments, the rank 1-P Class B LC pre-coders are such that the coefficients for the two polarizations may or may not be the same. In this case, the rank 1 and rank 2 pre-coder expressions are given by $$W^{(1)}_{k,n} = \frac{1}{\sqrt{P}} \begin{bmatrix} c_k^{(P/2,0)} \\ \varphi_n c_k^{(P/2,1)} \end{bmatrix}, \quad W^{(2)}_{k,k',n} = \frac{1}{\sqrt{2P}} \begin{bmatrix} c_k^{(P/2,0)} & c_{k'}^{(P/2,0)} \\ \varphi_n c_k^{(P/2,1)} & -\varphi_n c_{k'}^{(P/2,1)} \end{bmatrix},$$

respectively, where $c_k^{(P/2,0)} = [c_{k,0}^{(P/2,0)} c_{k,1}^{(P/2,0)} \ldots c_{k,P/2-1}^{(P/2,0)}]^T$ and $c_k^{(P/2,1)} = [c_{k,0}^{(P/2,1)} c_{k,1}^{(P/2,1)} \ldots c_{k,P/2-1}^{(P/2,1)}]^T$ are length-P/2 coefficient vectors for the two polarizations, which are according to some embodiments of this present disclosure.

In one embodiment, $c_k^{(P/2,0)} = c_k^{(P/2,1)}$. In another embodiment, $c_k^{(P/2,0)} \neq c_k^{(P/2,1)}$.

In some embodiments, the rank 1-P Class B LC pre-coders are such that the coefficient vector is of length-P (all P ports). In this case, the co-phasing for two polarizations is not needed. In this case, the rank 1 and rank 2 LC pre-coders are given by $$W^{(1)}_k = c_k^{(P)}, \quad W^{(2)}_{k,k'} = \begin{bmatrix} c_k^{(P,0)} & c_{k'}^{(P,0)} \\ c_k^{(P,1)} & -c_{k'}^{(P,1)} \end{bmatrix},$$

respectively,
where $c_k^{(P)} = [c_{k,0}^{(P)} c_{k,1}^{(P)} \ldots c_{k,P/2-1}^{(P)} c_{k,P/2}^{(P)} c_{k,P/2+1}^{(P)} \ldots c_{k,P-1}^{(P)}]^T$ is length-P coefficient vector; and $c_k^{(P,0)} = [c_{k,0}^{(P)} c_{k,1}^{(P)} \ldots c_{k,P/2-1}^{(P)}]^T$ and $c_k^{(P,1)} = [c_{k,P/2}^{(P)} c_{k,P/2+1}^{(P)} \ldots c_{k,P-1}^{(P)}]^T$.

Two examples of coefficient vector are as follows: (1) each component of coefficient vectors belongs to an M-PSK codebook. In one example, M=4, i.e. QPSK codebook and (2) coefficient vectors belong to a length-P DFT codebook of oversampling factor O. The example set of values of O is {2, 4, 8}.

Figure 16:
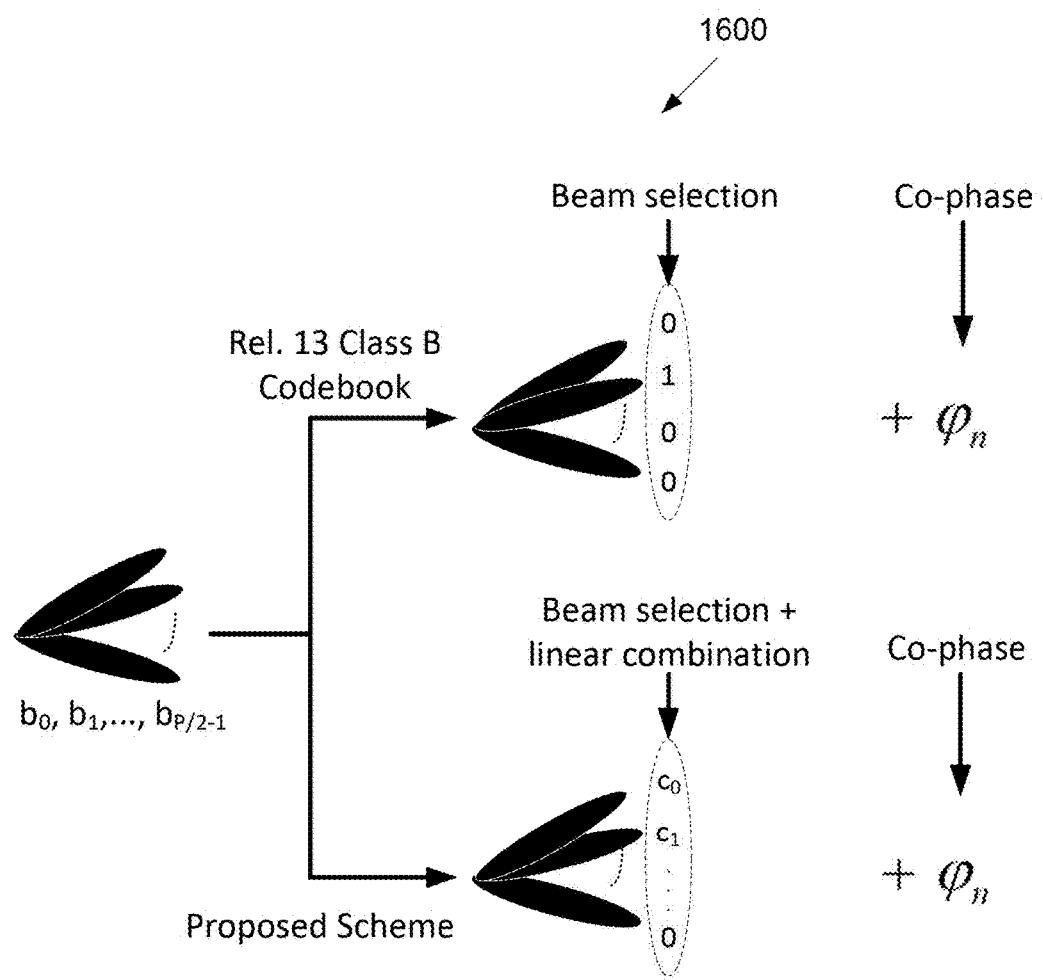
FIG. 16 illustrates an example Class B beam selection followed linear combination pre-coder according to embodiments of the present disclosure.

FIG. 16 illustrates an example Class B beam selection followed linear combination pre-coder 1600 according to embodiments of the present disclosure. An embodiment of the Class B beam selection followed linear combination pre-coder 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with the extended Class B LC codebook in which $1 \leq l \leq P/2$ beam selection is performed first, followed by linear combination of l selected beams, where l=1 implies one beam selection, in which case the codebook reduces to Rel. 13 Class B codebook; and l=L implies all L beam selection, in which case the codebook reduces to the Class B LC codebook proposed earlier in the present disclosure.

An illustration of beam selection followed by linear combination is shown in FIG. 16. As shown, out of L=P/2 beams, $b_0$, $b_1$, . . . , and $b_{P/2-1}$, l=2 beams, $b_0$ and $b_1$, are selected and linearly combined using non-zero coefficients $c_0$ and $c_1$, respectively.

In one embodiment, beam selection is WB; hence l (out of L) selected beams do not change across SBs. In this case, the reporting of selected beams can be joint with the first PMI $i_1$ or the first component of the first PMI $i_{1,1}$ or the second component of the first PMI $i_{1,2}$. Alternatively, the selected beams are reported separately as another WB PMI, for example $i_0$.

In another embodiment, beam selection is SB; hence l (out of L) selected beams change across SBs. In this case, the reporting of selected beams can be joint with the second PMI $i_2$. Alternatively, the selected beams are reported separately as another SB PMI, for example $i_3$.

The rank 1-P Class B LC pre-coder expressions and codebook tables can be constructed similar to some embodiments of this present disclosure by introducing l out L beam selection.

In one example, the beam selection can be performed jointly with coefficients by allowing the coefficients to the take value 0. In this method, the beam selection indication or reporting is joint with the coefficient reporting. In another example, the beam selection can be performed separately from coefficients. In such example, the beam selection indication or reporting is separate from the coefficient reporting.

In some embodiments, a UE is configured with Class B LC codebook in which the rank-1 pre-coder is given by $$W^{(1)}_{k,n} = \frac{1}{\sqrt{P}} \begin{bmatrix} c_k^{(4)} \\ \varphi_n c_k^{(4)} \end{bmatrix},$$

where $\varphi_n$ is a co-phase value for the two polarization belonging to {1, j, -1, -j}, and $c_k^{(4)}$ belongs to the rank-1 Householder codebook. The higher rank Class B LC codebook can be obtained similarly by using higher rank Householder codebook.

In some embodiments, a UE is configured with Class B LC codebook in which the coefficients are based on the non-CM Grassmanian codebook in which the length of the codewords is either P/2 (if QPSK co-phase is quantized separately for two polarizations) or P (if QPSK co-phase is not quantized separately for two polarizations).

In some embodiments, a UE is configured with a Class B LC codebook for P ports which is a double codebook ($W_1 W_2$) with two PMIs: (1) 1st PMI: indicating L WB beams in $W_1$ codebook, in this instance $i_1$ for P=4, and P=8 with 1D port layout and ($i_{1,1}, i_{1,2}$) for P=8 with 2D port layout; and (2) 2nd PMI $i_2$ indicating either beam selection or combination and co-phasing using $W_2$ codebook.

Figure 17:
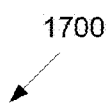
FIG. 17 illustrates an example coefficient codebook for beam-formed port layouts according to embodiments of the present disclosure.

FIG. 17 illustrates an example coefficient codebook for beam-formed port layouts 1700 according to embodiments of the present disclosure. An embodiment of coefficient codebook for beam-formed port layouts 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one example, the Class B LC codebook ($W_2$ codebook) performs beam selection from L $W_1$ beams, for example, using one of the legacy (up to Rel. 13) codebooks. For example, as shown in FIG. 17, for P=4 ports, the Class B LC codebook is Rel. 12 4-Tx codebook, and for P=8 ports, the Class B LC codebook is either Rel. 10 8-Tx codebook or Rel. 13 8-Tx codebook depending on the 1D or 2D beam-formed port layouts, respectively.

In another example, the Class B LC codebook ($W_2$ codebook) performs beam combination of all or a subset of L $W_1$ beams. This beam combination of L beams can be according to the $W_2$ codebook.

Similar to TABLE 11, if the UE is configured with either beam selection (L=1) or beam combination (L>1), then for SB reporting, the L value can be reported either: (1) explicitly as another SB CSI component using 1-bit indication or (2) implicitly with the 2nd PMI $i_2$, where 1-bit corresponding to the L value is either the MSB or the LSB of the bit sequence for the reported 2nd PMI, and then for WB reporting, the L value can be reported either: (1) explicitly as another WB CSI component using 1-bit indication or (2) implicitly with either: (a) the 1st PMI $i_1$ or the 1st component of the 1st PMI $i_{1,1}$, or the 2nd component of the 1st PMI $i_{1,2}$, where 1-bit corresponding to the L value is either the MSB or the LSB of the bit sequence for the reported 1st PMI or one of components; or (b) RI, where 1-bit corresponding to the L value is either the MSB or the LSB of the bit sequence for the reported RI.

In some embodiments, a UE is configured with an eMIMO-Type of 'Class E' or explicit CSI reporting via RRC signaling in which the UE is configured to report the CSI which includes a PMI for channel quantization. In particular, the PMI indicates Class B LC coefficients to quantize or represent a form of the DL channel measured through P beam-formed ports. The examples of the form of DL channel include DL channel itself or dominant eigenvectors of the DL channel or a covariance matrix of DL channel. The codebook to quantize a form of the channel is the Class B LC codebook proposed in some embodiments of this present disclosure.

In one example, PMI indicating LC coefficients is reported together with corresponding RI and CQI. In another alternative, PMI indicating LC coefficients is reported together with CQI only, where CQI and PMI corresponds to an RI that is the last reported RI or pre-configured RI, for example RI=1. In yet another method, only PMI indicating LC coefficients is reported.

For 8 antenna ports {15,16,17,18,19,20,21,22}, 12 antenna ports {15,16,17,18,19,20,21,22,23,24,25,26}, 16 antenna ports {15,16,17,18,19, 20, 21, 22, 23, 24, 25, 26, 27, 28, 29, 30}, and a UE configured with higher layer parameter eMIMO-Type, and eMIMO-Type is set to 'CLASS A', each PMI value corresponds to three codebook indices given in TABLE 18, where the quantities $\varphi_n$, $u_m$ and $v_{l,m}$ are given by:

$$\varphi_n = e^{j\pi n/2} \quad \text{Equation (2)}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

The values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively. The supported configurations of $(O_1,O_2)$ and $(N_1,N_2)$ for a given number of CSI-RS ports are given in TABLE 17. The number of CSI-RS ports, P, is $2N_1N_2$.

A UE is not expected to be configured with value of Codebook-Config set to 2 or 3, if the value of codebook-Config-N2 is set to 1. A UE may only use $i_{1,2}=0$ and shall not report $i_{1,2}$ if the value of codebook-Config-N2 is set to 1. A first PMI value $i_1$ corresponds to the codebook indices pair $\{i_{1,1},i_{1,2}\}$, and a second PMI value $i_2$ corresponds to the codebook index $i_2$ given in TABLE 18.

In some embodiments, cases codebook subsampling is supported. The sub-sampled codebook for PUCCH mode 2-1 for value of parameter Codebook-Config set to 2, 3, or 4 is defined in TABLE 7.2.2-1F in [REF3] for PUCCH Reporting Type 1a.

TABLE 17

Supported configurations of $(O_1, O_2)$ and $(N_1, N_2)$

| Number of CSI-RS antenna ports, P | $(N_1, N_2)$ | $(O_1, O_2)$ |
|---|---|---|
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |

TABLE 18

Codebook for 1-layer CSI reporting using antenna ports 15 to 14 + P

| Value of Codebook-Config | $i_{1,1}$ | $i_{1,2}$ | $i_2$ | | | |
|---|---|---|---|---|---|---|
| | | | 0 | 1 | 2 | 3 |
| 1 | $0, 1, \ldots, O_1 N_1 - 1$ | $0, 1, \ldots, O_2 N_2 - 1$ | $W_{i_{1,1},i_{1,2},0}^{(1)}$ | $W_{i_{1,1},i_{1,2},1}^{(1)}$ | $W_{i_{1,1},i_{1,2},2}^{(1)}$ | $W_{i_{1,1},i_{1,2},3}^{(1)}$ | where $W_{l,m,n}^{(1)} = \frac{1}{\sqrt{P}} \begin{bmatrix} v_{l,m} \\ \varphi_n v_{l,m} \end{bmatrix}$ TABLE 18-continued Codebook for 1-layer CSI reporting using antenna ports 15 to 14 + P

| Value of Codebook-Config | $i_{1,1}$ | $i_{1,2}$ | $i_2$ | | | |
|---|---|---|---|---|---|---|
| | | | 0 | 1 | 2 | 3 |
| 2 | $0, 1, \ldots, \frac{N_1O_1}{2} - 1$ | $0, 1, \ldots, \frac{N_2O_2}{2} - 1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |

| Value of Codebook-Config | $i_{1,1}$ | $i_{1,2}$ | $i_2$ | | | |
|---|---|---|---|---|---|---|
| | | | 4 | 5 | 6 | 7 |
| 2 | $0, 1, \ldots, \frac{N_1O_1}{2} - 1$ | $0, 1, \ldots, \frac{N_2O_2}{2} - 1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |

| Value of Codebook-Config | $i_{1,1}$ | $i_{1,2}$ | $i_2$ | | | |
|---|---|---|---|---|---|---|
| | | | 8 | 9 | 10 | 11 |
| 2 | $0, 1, \ldots, \frac{N_1O_1}{2} - 1$ | $0, 1, \ldots, \frac{N_2O_2}{2} - 1$ | $W_{2i_{1,1},2i_{1,2}+1,0}^{(1)}$ | $W_{2i_{1,1},2i_{1,2}+1,1}^{(1)}$ | $W_{2i_{1,1},2i_{1,2}+1,2}^{(1)}$ | $W_{2i_{1,1},2i_{1,2}+1,3}^{(1)}$ |

| Value of Codebook-Config | $i_{1,1}$ | $i_{1,2}$ | $i_2$ | | | |
|---|---|---|---|---|---|---|
| | | | 12 | 13 | 14 | 15 |
| 2 | $0, 1, \ldots, \frac{N_1O_1}{2} - 1$ | $0, 1, \ldots, \frac{N_2O_2}{2} - 1$ | $W_{2i_{1,1}+1,2i_{1,2}+1,0}^{(1)}$ | $W_{2i_{1,1}+1,2i_{1,2}+1,1}^{(1)}$ | $W_{2i_{1,1}+1,2i_{1,2}+1,2}^{(1)}$ | $W_{2i_{1,1}+1,2i_{1,2}+1,3}^{(1)}$ | where $W_{l,m,n}^{(1)} = \frac{1}{\sqrt{P}} \begin{bmatrix} v_{l,m} \\ \varphi_n v_{l,m} \end{bmatrix}$

| Value of Codebook-Config | $i_{1,1}$ | $i_{1,2}$ | $i_2$ | | | |
|---|---|---|---|---|---|---|
| | | | 0 | 1 | 2 | 3 |
| 3 | $0, 1, \ldots, \frac{N_1O_1}{2} - 1$ | $0, 1, \ldots, \frac{N_2O_2}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| Value of Codebook-Config | $i_{1,1}$ | $i_{1,2}$ | $i_2$ | | | |
|---|---|---|---|---|---|---|
| | | | 4 | 5 | 6 | 7 |
| 3 | $0, 1, \ldots, \frac{N_1O_1}{2} - 1$ | $0, 1, \ldots, \frac{N_2O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| Value of Codebook-Config | $i_{1,1}$ | $i_{1,2}$ | $i_2$ | | | |
|---|---|---|---|---|---|---|
| | | | 8 | 9 | 10 | 11 |
| 3 | $0, 1, \ldots, \frac{N_1O_1}{2} - 1$ | $0, 1, \ldots, \frac{N_2O_2}{2} - 1$ | $W_{2x+1,2y+1,0}^{(1)}$ | $W_{2x+1,2y+1,1}^{(1)}$ | $W_{2x+1,2y+1,2}^{(1)}$ | $W_{2x+1,2y+1,3}^{(1)}$ |

TABLE 18-continued

Codebook for 1-layer CSI reporting using antenna ports 15 to 14 + P

| Value of Codebook-Config | $i_{1,1}$ | $i_{1,2}$ | $i_2$ | | | |
|---|---|---|---|---|---|---|
| | | | 12 | 13 | 14 | 15 |
| 3 | $0, 1, \ldots, \frac{N_1 O_1}{2} - 1$ | $0, 1, \ldots, \frac{N_2 O_2}{2} - 1$ | $W_{2x+3,2y+1,0}^{(1)}$ | $W_{2x+3,2y+1,1}^{(1)}$ | $W_{2x+3,2y+1,2}^{(1)}$ | $W_{2x+3,2y+1,3}^{(1)}$ |

$$\text{where } x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}, \text{ if } N_1 \geq N_2$$

$$x = i_{1,2}, y = i_{1,1}, W_{l,m,n}^{(1)} = \frac{1}{\sqrt{P}} \begin{bmatrix} v_{m,l} \\ \varphi_n v_{m,l} \end{bmatrix}, \text{ if } N_1 < N_2$$

| Value of Codebook-Config | $i_{1,1}$ | $i_{1,2}$ | $i_2$ | | | |
|---|---|---|---|---|---|---|
| | | | 0 | 1 | 2 | 3 |
| 4 | $0, 1, \ldots, \frac{N_1 O_1}{2} - 1$ | $0, 1, \ldots, \frac{N_1 O_1}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| Value of Codebook-Config | $i_{1,1}$ | $i_{1,2}$ | $i_2$ | | | |
|---|---|---|---|---|---|---|
| | | | 4 | 5 | 6 | 7 |
| 4 | $0, 1, \ldots, \frac{N_1 O_1}{2} - 1$ | $0, 1, \ldots, \frac{N_2 O_2}{2} - 1$ | $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| Value of Codebook-Config | $i_{1,1}$ | $i_{1,2}$ | $i_2$ | | | |
|---|---|---|---|---|---|---|
| | | | 8 | 9 | 10 | 11 |
| 4 | $0, 1, \ldots, \frac{N_1 O_1}{2} - 1$ | $0, 1, \ldots, \frac{N_2 O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| Value of Codebook-Config | $i_{1,1}$ | $i_{1,2}$ | $i_2$ | | | |
|---|---|---|---|---|---|---|
| | | | 12 | 13 | 14 | 15 |
| 4 | $0, 1, \ldots, \frac{N_1 O_1}{2} - 1$ | $0, 1, \ldots, \frac{N_2 O_2}{2} - 1$ | $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ |

$$\text{where } x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}, \text{ if } N_1 \geq N_2$$

$$x = i_{1,2}, y = i_{1,1}, W_{l,m,n}^{(1)} = \frac{1}{\sqrt{P}} \begin{bmatrix} v_{m,l} \\ \varphi_n v_{m,l} \end{bmatrix}, \text{ if } N_1 < N_2$$

Figures 23, 24:
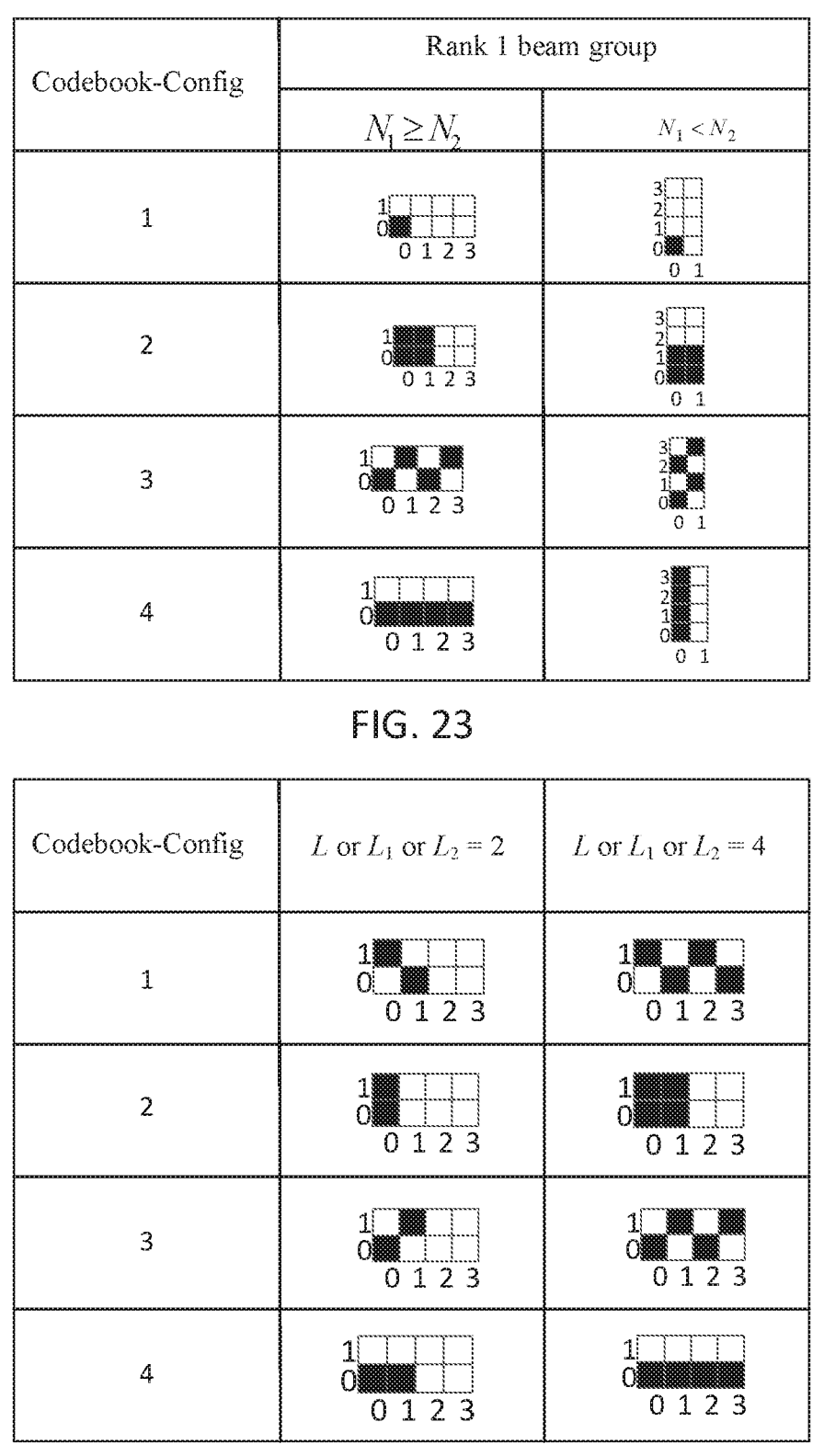

The mapping between Codebook-Config parameter to rank 1 beam grouping indicated by ($i_{1,1}$, $i_{1,2}$) is illustrated in FIG. 23. As shown, Codebook-Config =1 corresponds to one beam (black square located at (0, 0)), and Codebook-Config =2, 3, 4 correspond to 4 beams (shown as black squares) which are located inside the (4, 2) beam grid depending on the Codebook-Config value.

Note that Rel. 10 8-Tx and Rel. 12 4-Tx codebooks can be mapped to Codebook-Config=4 because Rel. 10 8-Tx and Rel. 12 4-Tx codebooks correspond to 1D antenna port layouts.

eFD-MIMO may support {20, 24, 28, 32} antenna ports in Rel. 14. Assuming rectangular (1D or 2D) port layouts, there are several possible ($N_1$, $N_2$) values for {20, 24, 28, 32} ports (as shown in FIG. 13). An illustration of 1D and 2D antenna port layouts for these ($N_1$, $N_2$) values are shown in FIG. 13.

Figure 18:
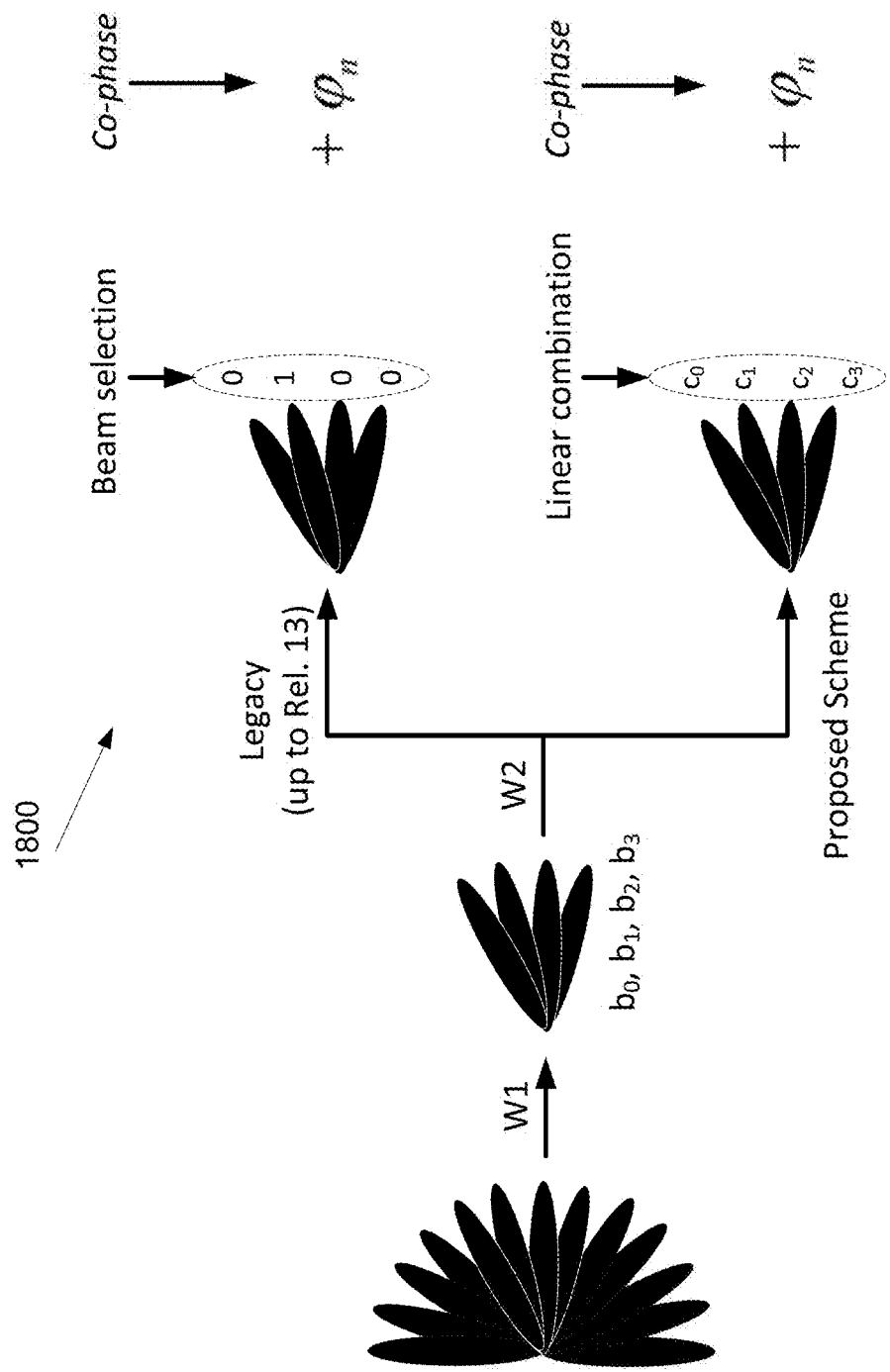
FIG. 18 illustrates an example linear combination PMI pre-coder according to embodiments of the present disclosure.

FIG. 18 illustrates an example linear combination PMI pre-coder 1800 according to embodiments of the present disclosure. An embodiment of the linear combination PMI pre-coder 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

Similar to Rel. 10 8-Tx and Rel. 12 4-Tx, the Rel. 13 'Class A' eMIMO-Type codebook is a double codebook: $W = W_1 W_2$, where $W_1$ is for WB and long-term first PMI $i_1$ or PMI pair ($i_{1,1}$, $i_{1,2}$) feedback, and $W_e$ is for SB and short-term second PMI $i_2$ feedback.

If Codebook-Config=2, 3, 4, then the first PMI ($i_{1,1}$, $i_{1,2}$) indicates 4 DFT beams, namely $b_0$, $b_1$, $b_2$, and $b_3$, whose location is determined by the Codebook-Config value (TABLE 19).

The second PMI $i_2$ indicates a beam selection vector $e_k$ whose kth entry is 1 and rest are 0, belonging to {(1, 0, 0, 0), (0, 1, 0, 0), (0, 0, 1, 0), (0, 0, 0, 1)} and a co-phase $\varphi_n$ value belonging to {1,j,−1,−j}. The rank-1 PMI pre-coder can be expressed as $$W_{k,n}^{(1)} = \frac{1}{\sqrt{2N_1N_2}} \begin{bmatrix} b_0b_1b_2b_3 & 0000 \\ 0000 & b_0b_1b_2b_3 \end{bmatrix} \begin{bmatrix} e_k \\ \varphi_n e_k \end{bmatrix} = \frac{1}{\sqrt{2N_1N_2}} \begin{bmatrix} b_k \\ \varphi_n b_k \end{bmatrix},$$

where n, k=0, 1, 2, 3.

The rank-2 PMI pre-coder can be expressed as $$W_{k,k',n}^{(2)} = \frac{1}{2\sqrt{N_1N_2}} \begin{bmatrix} b_k & b_{k'} \\ \varphi_n b_k & -\varphi_n b_{k'} \end{bmatrix},$$

where k, k'=0, 1, 2, 3 and where n=0, 1.

In some embodiments, as shown in FIG. 18, a UE is configured with a 'Class A-LC' eMIMO-Type codebook, which is a double codebook: $W=W_1W_2$, where $W_1$ is for WB and long-term first PMI $i_1$ or PMI pair ($i_{1,1}$, $i_{1,2}$) feedback, and $W_2$ is for SB and short-term second PMI $i_2$ feedback.

This configuration is via RRC signaling. The first PMI ($i_{1,1}$, $i_{1,2}$) indicates L DFT beams, namely $b_0$, $b_1$, . . . , $b_{L-1}$. The second PMI $i_2$ indicates a beam combination vector $c_k=(c_{0,k}, c_{1,k}, \ldots c_{L-1,k})$ whose components belong to $C_{coeff}$ and the first coefficient $c_{0,k}=1$ without loss of generality, and a co-phase $\varphi_n$ value belonging to {1,j,−1,−j}.

In one embodiment, the coefficient codebook $C_{coeff}$={1, j,−1,−j}. In another embodiment, $C_{coeff}=C_{coeff,WB}C_{coeff,SB}$ where $$C_{coeff,WB} = \left\{ e^{j\frac{\pi}{4}}, e^{j\frac{3\pi}{4}}, e^{j\frac{5\pi}{4}}, e^{j\frac{7\pi}{4}} \right\} \text{ and } C_{coeff,SB} = \left\{ e^{j\frac{\pi}{4}}, e^{-j\frac{\pi}{4}} \right\}.$$

The rank-1 LC PMI pre-coder can then be expressed as $$W_{k,n}^{(1)} = \frac{1}{\sqrt{2}\|b\|} \begin{bmatrix} b_0b_1 \ldots b_{L-1} & 0\ 0\ \ldots 0 \\ 0\ 0\ \ldots 0 & b_0b_1 \ldots b_{L-1} \end{bmatrix} \begin{bmatrix} c_k \\ \varphi_n c_k \end{bmatrix} = \frac{1}{\sqrt{2}\|B_k\|} \begin{bmatrix} B_k \\ \varphi_n B_k \end{bmatrix},$$

where $c_k \in C_{coeff}$;
n=0, 1, 2, 3 and
where $B_k=\sum_{l=0}^{L-1} c_{l,k} b_l$. The rank-2 LC PMI pre-coder can be expressed as $$W_{k,n}^{(2)} = \frac{1}{\sqrt{2}\|B_k\|} \begin{bmatrix} B_k & B_k \\ \varphi_n B_k & -\varphi_n B_k \end{bmatrix}$$

where n=0, 1.

For rank>2, the LC codebook is the same as Rel. 13 or similar (such as Rel. 14) codebook. The main advantage of LC codebook is enhanced MU-MIMO performance through better channel quantization, which can be realized with max per-UE rank=2. Rank>2 codebook requires orthogonal beams, which makes rank>2 LC codebook design complicated.

Figure 19:
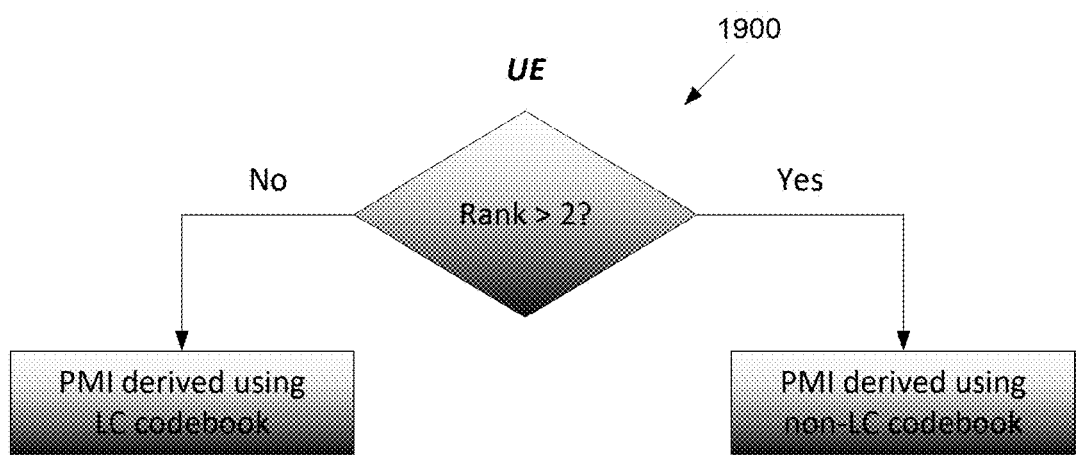
FIG. 19 illustrates an example LC or non-LC PMI derivation based on rank according to embodiments of the present disclosure.

FIG. 19 illustrates an example LC or non-LC PMI derivation based on rank 1900 according to embodiments of the present disclosure. An embodiment of the LC or non-LC PMI derivation based on rank 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

An illustration of PMI derivation at the UE based on rank is shown in FIG. 19. If rank≤2, the UE derives PMI using the LC codebooks. Otherwise, the UE derives the PMI using the non-LC codebook such as Rel. 13 or Rel. 14 codebooks.

In some embodiments, a UE is configured with a 'Class B-LC' eMIMO-Type codebook, which is the $W_2$ codebook of 'Class A-LC' eMIMO-Type codebook. This configuration is via RRC signaling. If the UE is further configured with K=1 BF CSI-RS resource for P ports, then the UE derives a PMI value using the $W_2$ codebook of the P port 'Class A-LC' eMIMO-Type codebook. If the UE is configured with K>1 BF CSI-RS resource for P ports, then the UE derives a PMI value using the $W_2$ codebook of the P port 'Class A-LC' eMIMO-Type codebook. In addition, the UE also derives a corresponding CRI.

Figure 20:
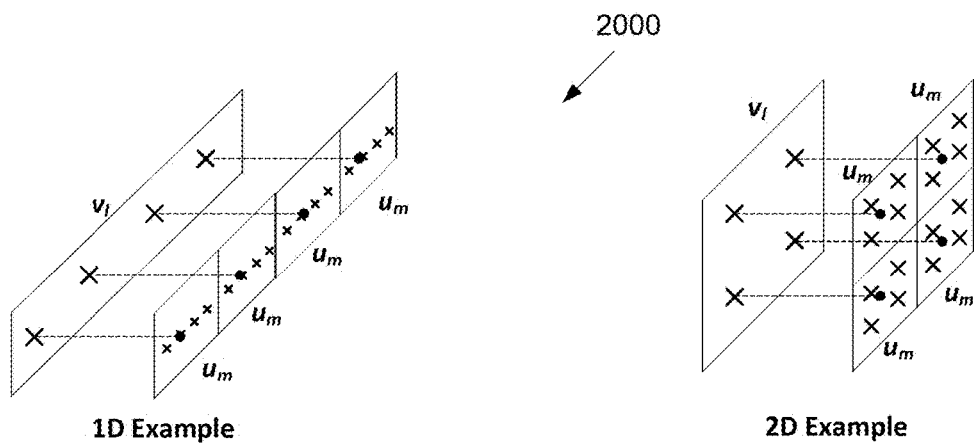
FIG. 20 illustrates an example rank-1 pre-coder according to embodiments of the present disclosure.

FIG. 20 illustrates an example rank-1 pre-coder 2000 according to embodiments of the present disclosure. An embodiment of the rank-1 pre-coder 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with a hybrid LC codebook (e.g. via RRC signaling) which is based on the antenna subarray or antenna group based partition of the entire 1D or 2D antenna array, an illustration of which is show in FIG. 20. As shown the entire antenna array is partition into 4 subarrays or groups. The construction of subarrays is according to the following: (1) the number of ports in the 1st dimension of each subarray or group is $M_1$, where $M_1$ may or may not divide $N_1$, (2) the number of ports in the 2nd dimension of each subarray or group is $M_2$, where $M_2$ may or may not divide $N_2$, and (3) a subarray is 1D for 1D antenna port layouts and is 1D or 2D for 2D antenna port layouts.

The number of subarrays or groups in the dimension d=1, 2 is $$Q_d = \left\lceil \frac{N_d}{M_d} \right\rceil.$$

If $M_d$ divides $N_d$, then $$Q_d = \frac{N_d}{M_d}.$$

The total number of subarrays is $Q=Q_1Q_2$ and the total number of antenna ports in each subarray is $M=M_1M_2$.

The rank-1 hybrid LC pre-coder is then given by:

$$W^{(1)}_{k_1,l_2,m_2,n} = \frac{1}{\sqrt{2Q}\|B_{k_1}\|} \begin{bmatrix} w_{k_1,l_2,m_2} \\ \varphi_n w_{k_1,l_2,m_2} \end{bmatrix} \text{ where} \qquad \text{Equation (3)}$$

$$w_{k_1,l_2,m_2} = \begin{bmatrix} B_{k_1} & 0 & \cdots & 0 \\ 0 & B_{k_1} & \cdots & 0 \\ \vdots & \vdots & \ddots & \vdots \\ 0 & 0 & \cdots & B_{k_1} \end{bmatrix} v_{l_2,m_2} = v_{l_2,m_2} \otimes B_{k_1}$$

where $$B_{k_1} = \sum_{l=0}^{L_1-1} c_{l,k_1} (v_{l_1,m_1})_l$$

is the length M 1st pre-coder, which is an LC pre-coder vector and is applied to antenna ports in each of Q subarrays and both polarizations; here $(v_{l_1,m_1})_l$ is the l-th DFT beam in the beam group of $L_1$ beams in the 1st stage codebook, $v_{l_2,m_2}$ is the length Q 2nd pre-coder vector, applied to Q subarrays and both polarizations, and $\varphi_n$ is co-phase for the two polarizations, whose definitions are as in equation (2) except that $(N_1,N_2)$ is replaced with $(M_1,M_2)$ and $(Q_1,Q_2)$ for in the definition of $v_{l_1,m_1}$ and $v_{l_2,m_2}$, respectively.

Alternatively, the rank-1 LC pre-coder is given by:

$$W^{(1)}_{l_1,m_1,k_2,n} = \frac{1}{\sqrt{2M}\|B_{k_2}\|} \begin{bmatrix} w_{l_1,m_1,k_2} \\ \varphi_n w_{l_1,m_1,k_2} \end{bmatrix} \text{ where}$$

$$w_{l_1,m_1,k_2} = \begin{bmatrix} v_{l_1,m_1} & 0 & \cdots & 0 \\ 0 & v_{l_1,m_1} & \cdots & 0 \\ \vdots & \vdots & \ddots & \vdots \\ 0 & 0 & \cdots & v_{l_1,m_1} \end{bmatrix} B_{k_2} = B_{k_2} \otimes v_{l_1,m_1}$$

where $v_{l_1,m_1}$ is the length M 1st pre-coder vector, applied to antenna ports in each of Q subarrays and both polarizations, $$B_{k_2} = \sum_{l=0}^{L_2-1} c_{l,k_2} (v_{l_2,m_2})_l$$

is the length Q 2nd pre-coder, which is an LC pre-coder vector and is Q subarrays and both polarizations; here $(v_{l_2,m_2})_l$ is the l-th DFT beam in the beam group of $L_2$ beams in the 2nd stage codebook, and $\varphi_n$ is co-phase for the two polarizations.

Alternatively, the rank-1 LC pre-coder is given by:

$$W^{(1)}_{k_1,k_2,n} = \frac{1}{\sqrt{2}\|B_{k_1}\|\|B_{k_2}\|} \begin{bmatrix} w_{k_1,k_2} \\ \varphi_n w_{k_1,k_2} \end{bmatrix} \text{ where}$$

$$w_{k_1,k_2} = \begin{bmatrix} B_{k_1} & 0 & \cdots & 0 \\ 0 & B_{k_1} & \cdots & 0 \\ \vdots & \vdots & \ddots & \vdots \\ 0 & 0 & \cdots & B_{k_1} \end{bmatrix} B_{k_2} = B_{k_2} \otimes B_{k_1},$$

where $B_{k_1}$ and $B_{k_2}$ are as defined above.

The pre-coder for rank=2 can be derived similarly.

In some embodiments, a UE is configured with at least one L value for Class A or B LC codebook, and one $(L_1, L_2)$ pair for hybrid LC codebook via higher-layer RRC signaling, where the set of configurable L or ($L_1$ or/and $L_2$) values includes 2 and 4.

In one example, the L or ($L_1$ or/and $L_2$) beams associated with the configured L or ($L_1$ or/and $L_2$) value are predetermined and fixed. In another example, the UE is configured with Codebook-Config (similar to Rel. 13 Class A codebook parameter), where the set of configurable Codebook-Config values include 1, 2, 3, and 4. An illustration of mapping Codebook-Config to L or ($L_1$ or/and $L_2$) beams is shown in FIG. 24.

In some embodiments, a UE is configured with multiple L values via RRC signaling which may be a subset of {1, 2, 4}, where L=1 implies beam selection similar to $i_2$ in Rel. 13 codebook. The UE reports a preferred L value from the configured set, where this report may either be: (1) WB in which the number of beams in LC pre-coder remains the same in all SBs or (2) SB in which the number of beams in LC pre-coder may change in different SBs.

In some embodiments, a UE is configured with either: (1) a non-LC codebook: such as up to Rel.13 codebooks, and Rel. 14 codebooks; or (2) the proposed LC codebook using a 1-bit RRC signaling.

In some embodiments, a UE is configured with one or both of the two types of CSI-RS resources: (1) Non-precoded CSI-RS resource: corresponds to either (a) Full port: CSI-RS is transmitted from all $2N_1N_2$ ports, or (b) Partial port: CSI-RS is transmitted from a subset of $2N_1N_2$ ports; and (2) Beam-formed CSI-RS resource with K resources where K=1 or K>1.

In some embodiments, a UE is configured to report at least one class of CSI reporting or eMIMO-Type from at least the following classes of CSI reporting or eMIMO-Types. In one example of Class A eMIMO-Type, the CSI content includes a single or a pair of 1st PMI, a single 2nd PMI, CQI, and RI, where the two PMIs are derived using the Class A codebook, wherein it can be associated with both NP and BF types of CSI-RS resources.

In another example of Class B eMIMO-Type, the CSI content includes a single PMI, CQI, and RI, where the single PMI is derived using the Class B codebook, wherein it is associated with the BF CSI-RS resource with K resources and there are two sub-types: (1)K=1: No CRI-RS resource indicator (CRI) feedback; and (2) K>1: Two alternatives: Alt 1: CRI is fed back; Alt 2: CRI is not fed back.

In yet another example of Class C eMIMO-Type, the CSI content includes a single or a pair of 1st PMI, which does not include co-phase, where the PMI is derived using the Class C codebook, for example DFT codebook of appropriate dimension, wherein it is associated with the NP CSI-RS resource.

In yet another example of Class C' eMIMO-Type, the CSI content includes a single or a pair of 1st PMI, which includes co-phase, where the PMI is derived using the Class C' codebook, for example DFT codebook of appropriate dimension with QPSK codebook for co-phase, wherein it is associated with the NP CSI-RS resource.

In yet another example of Class A-LC eMIMO-Type, the CSI content includes a single or a pair of 1st PMI, a single 2nd PMI, CQI, and RI, where the 2nd PMI indicates LC coefficients and a co-phase value using the Class A LC codebook, and it is associated with both NP and BF types of CSI-RS resources.

In yet another example of Class B-LC eMIMO-Type, the CSI content includes a single PMI, CQI, and RI, where the single PMI indicates LC coefficients and a co-phase value using the Class B LC codebook, wherein it is associated with the first or the second type (BF) of CSI-RS resource with K resources and there are two sub-types: (1) K=1: No CRI-RS resource indicator (CRI) feedback; and (2) K>1: Two alternatives: Alt 1: CRI is fed back; Alt 2: CRI is not fed back.

In yet another example of Class C-LC eMIMO-Type, the CSI content includes a single or a pair of PMIs, where the PMI indicates LC coefficients using the Class C LC codebook and it is associated with both NP and BF types of CSI-RS resources.

In yet another example of Class C'-LC eMIMO-Type, the CSI content includes a single or a pair of PMIs, where the PMI indicates LC coefficients and a co-phase, which are derived using the Class C' LC codebook, and it is associated with both NP and BF types of CSI-RS resources.

In some embodiments, a UE is configured by higher-layer RRC signaling with eMIMO-Type or CSI reporting type configuration for LC codebook as shown in TABLE 21. In one example of LC Configuration 0, the UE is configured with non-precoded CSI-RS and eMIMO-Type of Class A-LC. The UE is also configured with the Class A codebook related parameters via RRC signaling. The UE derives Class A-LC CSI and reports the Class A-LC CSI to the eNB according to the configuration. In such example, a full port (e.g., Alt 0-0) and a partial port (e.g., Alt 0-1) are provided.

In another example of LC Configuration 1, the UE is configured with non-precoded CSI-RS and eMIMO-Type of Class A-LC. The UE is also configured with the Class C codebook related parameters via RRC signaling. The UE derives Class C-LC CSI and reports the Class C-LC CSI to the eNB according to the configuration. In such example, a full port (e.g., Alt 1-0) and a partial port (e.g., Alt 1-1) are provided.

In yet another example of LC Configuration 2-3, the UE is configured with beam-formed CSI-RS with K=1 resource and Class B or Class C eMIMO-Type.

In yet another example of LC Configuration 4-7, the UE is configured with beam-formed CSI-RS with K>1 resources and Class B or Class C eMIMO-Type, with or without CRI.

TABLE 21

LC eMIMO-Type or CSI reporting type configuration table

| LC Configuration | CSI-RS resource | CSI reporting class or eMIMO-Type | CSI Content |
|---|---|---|---|
| 0-0 | Non-Precoded (full port) | Class A-LC | PMI, CQI, RI |
| 0-1 | Non-Precoded (partial ports) | | |
| 1-0 | Non-Precoded (full port) | Class C-LC | PMI |
| 1-1 | Non-Precoded (partial port) | | |
| 2 | Beam-formed with K = 1 resource | Class B-LC | PMI, CQI, RI |
| 3 | | Class C-LC | PMI |
| 4 | Beam-formed with K > 1 resources | Class B-LC (K >1) with CRI | PMI, CQI, RI, CRI |
| 5 | | Class B-LC (K >1) without CRI | PMI, CQI, RI |
| 6 | | Class C-LC (K >1) with CRI | PMI, CRI |
| 7 | | Class C-LC (K >1) without CRI | PMI |

In some embodiments, a UE is configured by higher-layer RRC signaling with hybrid eMIMO-Type or CSI reporting type configuration for LC codebook as shown in TABLE 22, where two stages are considered for hybrid CSI reporting.

TABLE 22

Hybrid LC eMIMO-Type or CSI reporting type configuration table

| Hybrid LC Configuration | 1st stage | | | 2nd stage | |
|---|---|---|---|---|---|
| | Full/partial | 1st CSI-RS resource | CSI reporting type or eMIMO-Type | 2nd CSI-RS resource | CSI reporting type or eMIMO-Type |
| 0 | Full port ($2N_1N_2$ ports) | Non-Precoded | Class A | Beam-formed with | Class A-LC |
| 1 | | | | K = 1 resource | Class B-LC (K = 1) |
| 2 | | | Class C | Beam-formed with | Class A-LC |
| 3 | | | | K = 1 resource | Class B-LC (K = 1) |
| 4 | Partial port ($<2N_1N_2$ ports) | Non-Precoded | Class A | Beam-formed with | Class A-LC |
| 5 | | | | K = 1 resource | Class B-LC (K = 1) |

TABLE 22-continued

Hybrid LC eMIMO-Type or CSI reporting type configuration table

| Hybrid LC Configuration | 1st stage Full/partial | 1st CSI-RS resource | CSI reporting type or eMIMO-Type | 2nd stage 2nd CSI-RS resource | CSI reporting type or eMIMO-Type |
|---|---|---|---|---|---|
| 6 | | | Class C | Beam-formed with K = 1 resource | Class A-LC |
| 7 | | | | | Class B-LC (K = 1) |
| 8 | | Beam-formed with K >1 resources | Class B (K >1) without CRI | Beam-formed with K = 1 resource | Class A-LC |
| 9 | | | | | Class B-LC (K = 1) |
| 10-19 | Same as 0-9 except LC reporting is in the 1st stage CSI | | | | |
| 20-29 | Same as 0-9 except LC reporting is in both 1st CSI and 2nd CSI | | | | |

In some embodiments, a UE is configured to report co-phase and coefficients such that either: (1) co-phase and coefficients are reported together in the same PMI reporting instances; or (2) co-phase and coefficients are reported separately in two different PMI reporting instances, where both are reported WB or per SB or one of them WB and the other per SB. In such embodiments, coefficient=WB and co-phase=SB or vice-versa. Also, both co-phase and coefficients may also have WB and SB reporting components.

In some embodiments, a UE is configured with a CSI reporting class or eMIMO-Type to report CSI comprising of PMI only or PMI together with CQI/RI, where the PMI indicates the coefficients for LC with/without a co-phase value.

In some embodiments, a UE is configured with 'Class A-LC' eMIMO-Type, which corresponds to one of the following alternatives. In one example of Alt 0, it is based on Rel-13 'Class A' eMIMO-Type, which has the following CSI components: 1st PMI: ($i_{1,1}$, $i_{1,2}$), which implies L=4 beams according to Codebook-Config=2, 3, 4 (TABLE 20); 2nd PMI: $i_2$, which implies 1 beam selection and co-phase; and $i_2$-CQI and RI. The first beam for LC codebooks is selected using Rel.13 $i_2$. The UE is configured to report a 3rd PMI $i_3$ for selecting L−1 beams for LC codebook and corresponding CQI, $i_3$-CQI. Sub-alternatives to report ($i_3$, $i_3$-CQI) are as follows: (1) Alt 0-0: $i_3$ and $i_3$-CQI are reported WB. WB ($i_{1,1}$, $i_{1,2}$, $i_3$, $i_3$-CQI) and SB ($i_2$, $i_2$-CQI) and minimal feedback overhead increase; (2) Alt 0-1: $i_3$-CQI is SB; and $i_3$ is partially or fully WB, wherein WB ($i_{1,1}$, $i_{1,2}$, $i_3$(co-ph, coeff)) and SB ($i_2$, $i_2$-CQI, $i_3$-CQI) (e.g., Ex 0), WB ($i_{1,1}$, $i_{1,2}$, $i_3$(co-ph)) and SB ($i_2$, $i_3$(coeff), $i_2$-CQI, $i_3$-CQI) (e.g., Ex 1), and WB ($i_{1,1}$, $i_{1,2}$, $i_3$(coeff)) and SB ($i_2$, $i_3$(co-ph), $i_2$-CQI, $i_3$-CQI) (e.g., Ex 2); (3) Alt 0-2: $i_3$ and $i_3$-CQI are reported per SB, wherein WB ($i_{1,1}$, $i_{1,2}$) and SB ($i_2$, $i_2$-CQI, $i_3$, $i_3$-CQI), and potentially large feedback overhead; and (4) Alt 0-3: ($i_3$, $i_3$-CQI) reporting indication is included as an extra information in the CQI trigger bit in the UL grant.

For L=2, the second beam selection (i) can be separate or joint with $i_2$. An example is shown in TABLE 23

TABLE 23

| | Alt 0 for L = 2 | |
|---|---|---|
| | $i_2$ beam selection 2 bits | (L = 2) $i_3$ beam selection 2 bits |
| Separate | 0 | From {1, 2, 3} |
| | 1 | From {0, 2, 3} |
| | 2 | From {0, 1, 3} |
| | 3 | From {0, 1, 2} |

| | | 0 bit | |
|---|---|---|---|
| | 2 bits | Rel. 10 Rank 2 different beam pairs | Consecutive |
| Joint | 0 | 1 | 1 |
| | 1 | 3 | 2 |
| | 2 | 1 | 3 |
| | 3 | 0 | 0 |

In some embodiments of Alt 1, ($i_{1,1}$, $i_{1,2}$) is based on Rel. 13 Class A codebook for Codebook-Config=2, 3, 4 and $i_2$ is for LC coefficient and co-phase reporting. And $i_2$-CQI is reporting corresponding to this newly defined LC $i_2$. Sub-alternatives to report ($i_{1,1}$, $i_{1,2}$, $i_2$, $i_2$-CQI) are as follows: (1) Alt 1-0: WB ($i_{1,1}$, $i_{1,2}$, $i_2$(co-ph, coeff)) and SB ($i_2$-CQI), (2) Alt 1-1: WB ($i_{1,1}$, $i_{1,2}$, $i_2$(coeff)) and SB ($i_2$ (co-ph), $i_2$-CQI), (3) Alt 1-2: WB ($i_{1,1}$, $i_{1,2}$, $i_2$(co-ph)) and SB ($i_2$ (coeff), $i_2$-CQI), and (4) Alt 1-3: WB ($i_{1,1}$, $i_{1,2}$) and SB ($i_2$ (co-ph, coeff), $i_2$-CQI).

In some embodiments of Alt 2, ($i_{1,1}$, $i_{1,2}$) is based on Rel. 14 Class A codebook for Codebook-Config=1, 2, 3, 4 and $i_2$ is for LC coefficient and co-phase reporting, where Codebook-Config may or may not be the same as Rel. 13 Class A codebook.

TABLE 24

SB feedback overhead for Alt 0-1 and Alt 1-3

| | | Rel. 13 $i_2$ | | | LC | | | | |
|---|---|---|---|---|---|---|---|---|---|
| Alt | Beams for LC | Beam selection | Co-phase | $i_2$-CQI (bits) | Beam selection | Coeff $\{1, j, -1, -j\}$ | Co-phase | $i_3$-CQI (bits) | Total (bits) |
| 0-2 | L = 2 | 2 | 2 | 4 | 2 | 2 | 2 | 4 | 18 |
|     | L = 4 | 2 | 2 | 4 | 0 | 6 | 2 | 4 | 20 |
| 1-3 | L = 2 | — | — | — | 3 | 2 | 2 | 4 | 11 |
|     | L = 4 | — | — | — | 0 | 6 | 2 | 4 | 12 |

Per SB feedback overhead for Alt 0-2 and Alt 1-3 are compared in TABLE 24. Alt 0-2 has 7-8 bit more per SB overhead.

In some embodiments of Alt 0-3, a UE is configured to report $i_2$-CQI and $i_3$-CQI differentially because $i_3$-CQI≥$i_2$-CQI. For rank-1, the differential $i_3$-CQI offset level is defined as Differential $i_3$-CQI offset level=$i_3$-CQI index−$i_2$-CQI index. Example tables for 1-bit and 2-bit differential CQIs are shown in TABLE 25 and TABLE 26, respectively.

TABLE 25

1-bit differential CQI table for $i_3$-CQI

| Differential CQI value | Offset level |
|---|---|
| 0 | 1 |
| 1 | ≥3 |

TABLE 26

2-bit differential CQI table for $i_3$-CQI

| Differential CQI value | Offset level |
|---|---|
| 0 | 0 |
| 1 | 1 |
| 2 | 2 |
| 3 | ≥3 |

For rank 2, there are at least two alternatives. In one example of per layer differential $i_3$-CQI, 1 or 2-bit differential $i_3$-CQI per layer (TABLES 25 and 26). In another example of cross layer differential $i_3$-CQI, 1 or 2-bit for the average of two layer $i_3$-CQIs (e.g. 1 or 2-bit TABLES 25 and 26) and 1-bit for the difference of two layer $i_3$-CQIs (e.g. 1-bit TABLE 25 and 26).

In some embodiments, a UE is configured with 'Class B-LC' eMIMO-Type, which corresponds to one of the above-mentioned alternatives except that 1st PMI pair ($i_{1,1}$, $i_{1,2}$) is not reported.

In some embodiments, the number of subarrays in dimension d=1, 2, is $Q_d \in \{1,2,4\}$. In some embodiments, the set of possible values of $(Q_1,Q_2)$ includes the set $\{(1,1), (2,1), (1,2), (2,2), (4,1), (1,4)\}$. In such embodiments, $v_{l_2,m_2}$ is derived using Kronecker product of 2 DFT vectors of lengths $Q_1$ and $Q_2$ as in (2). In such embodiments, it is derived using legacy (up to Rel. 13) codebooks.

In some embodiments, the set of possible values of $(M_1,M_2)$ includes the set $\{(a, b): a, b\in\{1,2,3,4,5,6,7,8,10, 12,14,16\}$ such that $a*b\in\{1,2,4,8,12,16,20,24,28,32\}\}$. In one example, $v_{l_1,m_1}$ is derived using Kronecker product of 2 DFT vectors of lengths $M_1$ and $M_2$ as in (2). In another example, it is derived using legacy (up to Rel. 13) codebooks, as mentioned in above embodiment.

In some embodiments, the block diagonal matrix in equation (3) may or may not have the same diagonal blocks. In one example of Alt 1, the diagonal blocks are the same. In another example of Alt 2, the diagonal blocks can be different.

In some embodiments, the UE is configured with an antenna subarray or group type via RRC signaling parameter namely Subarray-Config or Group-Config or Antenna-Group-Config, from a plurality of subarray types. In one example, the set of possible subarray types corresponds to the supported antenna port configurations (up to Rel. 13) in terms of ($N_1$, $N_2$) values (FIG. 12). In another example, at least one of them does not correspond to the supported antenna port configurations (up to Rel. 13) in terms of ($N_1$, $N_2$) values.

In some embodiments, the UE is configured with a subarray type configuration in terms of ($N_1$, $N_2$) for the full antenna port layout and ($M_1$, $M_2$) for the number of antenna ports in each subarray.

In some embodiments, the UE is configured with a subarray type configuration in terms of ($N_1$, $N_2$) for the full antenna port layout and ($Q_1$, $Q_2$) for the number of antenna ports in each subarray.

In some embodiments, the UE is configured with a subarray type configuration in terms of ($M_1$, $M_2$) for the number of antenna ports in each subarray and ($Q_1$, $Q_2$) for the number of antenna ports in each subarray.

In some embodiments, the subarray type configuration is cell-specific, and hence remains the same for all UEs.

In some embodiments, the subarray type configuration is UE-specific, and hence a UE is configured with a subarray type from a plurality of subarray types.

In some embodiments, the UE suggests a preferred subarray type to the eNB.

In some embodiments, the subarray type is pre-determined, hence does not need configuration.

In some embodiments, the subarray type configuration is semi-static via RRC or is more dynamic via CSI configuration.

In some embodiments, the codebook parameter configuration includes some of the following parameters. In one example of subarray type configuration to configure the subarray type according to some embodiments of the present disclosure, the codebook parameter configuration includes: subarray-Config or Group-Config or AntennaGroup-Config; ($N_1$,$N_2$) and ($M_1$,$M_2$); ($N_1$,$N_2$) and ($Q_1$,$Q_2$): or ($M_1$,$M_2$) and ($Q_1$,$Q_2$).

In another example of ($s_1$, $s_2$), the spacing between two nearest antenna ports in the subarray, the set of values for $s_1$ and $s_2$ includes 1. In yet another example of oversampling factor, there may be two alternatives, for example, Alt 1: ($O_1$, $O_2$) for both $v_{l_1,m_1}$ and $v_{l_2,m_2}$ and Alt 2: ($O_{11}$, $O_{21}$): the oversampling factors for 1st stage pre-coder $v_{l_1,m_1}$, and ($O_{12}$, $O_{22}$): the oversampling factors for 2nd stage pre-coder $v_{l_2,m_2}$.

In yet another example of Codebook-Config, the set of values include 1, 2, 3, 4 which may or may not correspond to Rel. 13 FD-MIMO codebook. Assuming Codebook-Config 1 is for $v_{l_1,m_1}$ and Codebook-Config2 is for $v_{l_2,m_2}$, there may be following alternatives: Codebook-Config1=Codebook-Config2; Codebook-Config1≠Codebook-Config2; Codebook-Config 1=1 for $v_{l_1,m_1}$ and Codebook-Config2=1, 2, 3, 4 for $v_{l_2,m_2}$; and Codebook-Config1=1, 2, 3, 4 for $v_{l_1,m_1}$ and Codebook-Config2=1 for $v_{l_2,m_2}$.

In some embodiments, the codebook parameters are configured such that at least one of both of $v_{l_2,m_2}$ and $v_{l_2,m_2}$ are derived from legacy (up to Rel.13) codebooks.

In some embodiments, a UE is configured with an eMIMO-Type of 'Class E' for explicit CSI reporting which includes a PMI for channel quantization. In particular, the PMI indicates a linear combination coefficients vector to combine L 'basis vectors', for example DFT beams, similar to the beams in FIG. 18. In one example, the basis vectors are configured to the UE via RRC signaling. Alternatively, in another example, the UE also selects the set of basis vectors and reports them as another CSI component. In yet another example, only PMI indicating LC coefficients is reported as a CSI report. In yet another example, PMI indicating LC coefficients and basis vectors are reported as CSI feedback. The indication of coefficients is SB, and that of basis vectors is WB. In yet another example, PMI indicating LC coefficients is reported together with corresponding RI and CQI. In yet another example, PMI indicating LC coefficients is reported together with CQI only, where CQI and PMI corresponds to an RI that is the last reported RI or pre-configured RI, for example RI=1.

In some embodiments, the rank 1 and rank 2 LC precoders are given by $$W^{(1)}_{l,m,k,n} = \frac{1}{\sqrt{2}\|w_{l,m,k}\|}\begin{bmatrix} w_{l,m,k} \\ \varphi_n w_{l,m,k} \end{bmatrix},$$

$$W^{(2)}_{l,m,k,n} = \frac{1}{2\|w_{l,m,k}\|}\begin{bmatrix} w_{l,m,k} & w_{l,m,k} \\ \varphi_n w_{l,m,k} & -\varphi_n w_{l,m,k} \end{bmatrix}$$

where for Codebook-Config=2: $w_{l,m,k}=c_{k,0}v_{l,m}+c_{k,1}v_{l+1,m}+c_{k,2}v_{l,m+1}+c_{k,3}v_{l+1,m+1}$, for Codebook-Config=3: $w_{l,m,k}=c_{k,0}v_{l,m}+c_{k,1}v_{l+2,m}+c_{k,2}v_{l+1,m+1}+c_{k,3}v_{l+3,m+1}$, if $N_1 \geq N_2$ $w_{l,m,k}=c_{k,0}v_{l,m}+c_{k,1}v_{l,m+2}+c_{k,2}v_{l+1,m+1}+c_{k,3}v_{l+1,m+1}$ if $N_1<N_2$, for Codebook-Config=4: $w_{l,m,k}=c_{k,0}v_{l,m}+c_{k,1}v_{l,m+1}+c_{k,2}v_{l,m+2}+c_{k,3}v_{l,m+1}$, if $N_1<N_2$, $c_{k,r}=\varphi_{\lfloor k/4^{3-r} \rfloor \bmod 4}$, which corresponds to QPSK LC coefficients.

In an alternate expression for $w_{l,m,k}$, for Codebook-Config=2:

$$w_{l,m,k} = \begin{bmatrix} v_{l,m} & v_{l+1,m} & v_{l,m+1} & v_{l+1,m+1} \end{bmatrix}\begin{bmatrix} c_{k,0} \\ c_{k,1} \\ c_{k,2} \\ c_{k,2} \end{bmatrix};$$

for Codebook-Config=3:

$$w_{l,m,k} = \begin{bmatrix} v_{l,m} & v_{l+2,m} & v_{l+1,m+1} & v_{l+3,m+1} \end{bmatrix}\begin{bmatrix} c_{k,0} \\ c_{k,1} \\ c_{k,2} \\ c_{k,2} \end{bmatrix},$$

if $N_1 \geq N_2$ $$w_{l,m,k} = \begin{bmatrix} v_{l,m} & v_{l,m+2} & v_{l+1,m+1} & v_{l+1,m+3} \end{bmatrix}\begin{bmatrix} c_{k,0} \\ c_{k,1} \\ c_{k,2} \\ c_{k,2} \end{bmatrix},$$

if $N_1<N_2$, for Codebook-Config=4:

$$w_{l,m,k} = \begin{bmatrix} v_{l,m} & v_{l+1,m} & v_{l+2,m} & v_{l+3,m} \end{bmatrix}\begin{bmatrix} c_{k,0} \\ c_{k,1} \\ c_{k,2} \\ c_{k,2} \end{bmatrix},$$

if $N_1 \geq N_2$ $$w_{l,m,k} = \begin{bmatrix} v_{l,m} & v_{l,m+1} & v_{l,m+2} & v_{l,m+3} \end{bmatrix}\begin{bmatrix} c_{k,0} \\ c_{k,1} \\ c_{k,2} \\ c_{k,2} \end{bmatrix}, \text{ if } N_1 < N_2.$$

In another alternate expression for $w_{l,m,k}$ is as follows: $w_{l,m,k}=x_{l,m}c_k$, where for Codebook-Config=2: $[v_{l,m}v_{l+1,m}v_{l,m+1}v_{l+1,m+1}]$, for Codebook-Config=3: $x_{l,m}=[v_{l,m}\ v_{l+2,m}\ v_{l+1,m+1}\ v_{l+3,m+1}]$, if $N_1 \geq N_2$ $x_{l,m}=[v_{l,m}\ v_{l,m+2}\ v_{l+1,m+1}\ v_{l+1,m+3}]$, if $x_{l,m}=[v_{l,m}\ v_{l,m+1}\ v_{l,m+2}\ v_{l,m+3}]$, if $N_1<N_2$, and $c_k=[c_{k,0}\ c_{k,1}\ c_{k,2}\ c_{k,3}]^T$.

In some embodiments, a UE is configured with separate rank 1 and rank 2 LC codebook tables for Codebook-Config=2, 3, and 4 as shown in TABLE 27 and 28.

In some embodiments, a UE is configured with single rank 1 and rank 2 LC codebook tables for Codebook-Config=2, 3, and 4 as shown in TABLE 29 and 30.

TABLE 27

| Codebook for 1-layer CSI reporting using antenna ports 15 to 14 + P | | | | | | |
|---|---|---|---|---|---|---|
| Value of Codebook-Config | $i_{1,1}$ | $i_{1,2}$ | $i_2$ | | | |
| | | | 0 | 1 | 2 | 3 |
| 2 | $0, 1, \ldots, \frac{N_1 O_1}{2}-1$ | $0, 1, \ldots, \frac{N_2 O_2}{2}-1$ | $W^{(1)}_{2i_{1,1},2i_{1,2},0,0}$ | $W^{(1)}_{2i_{1,1},2i_{1,2},0,1}$ | $W^{(1)}_{2i_{1,1},2i_{1,2},0,2}$ | $W^{(1)}_{2i_{1,1},2i_{1,2},0,3}$ |

TABLE 27-continued

Codebook for 1-layer CSI reporting using antenna ports 15 to 14 + P

| Value of Codebook-Config | $i_{1,1}$ | $i_{1,2}$ | $i_2$ 4 | 5 | 6 | 7 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 1, 0}^{(1)}$ | $W_{2i_{1,1}, 2i_{1,2}, 1, 1}^{(1)}$ | $W_{2i_{1,1}, 2i_{1,2}, 1, 2}^{(1)}$ | $W_{2i_{1,1}, 2i_{1,2}, 1, 3}^{(1)}$ |

| Value of Codebook-Config | $i_{1,1}$ | $i_{1,2}$ | $i_2$ 8-251 |
|---|---|---|---|
| 2 | $0, 1, \ldots, \frac{N_1 O_1}{2} - 1$ | $0, 1, \ldots, \frac{N_2 O_2}{2} - 1$ | Indices i2 = 8 to 251 are obtained by replacing the third and fourth subscripts in $W_{2i_{1,1}, 2i_{1,2}, 0, 0}^{(1)}$ with 2, 3, . . . 62 and 0, 1, 2, 3, respectively |

| Value of Codebook-Config | $i_{1,1}$ | $i_{1,2}$ | $i_2$ 252 | 253 | 254 | 255 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 63, 0}^{(1)}$ | $W_{2i_{1,1}, 2i_{1,2}, 63, 1}^{(1)}$ | $W_{2i_{1,1}, 2i_{1,2}, 63, 2}^{(1)}$ | $W_{2i_{1,1}, 2i_{1,2}, 63, 3}^{(1)}$ | where $W_{l,m,k,n}^{(1)} = \frac{1}{\sqrt{2} \|w_{l,m,k}\|} \begin{bmatrix} w_{l,m,k} \\ \varphi_n w_{l,m,k} \end{bmatrix}$, $w_{l,m,k} = c_{k,0} v_{l,m} + c_{k,1} v_{l+1,m} + c_{k,2} v_{l,m+1} + c_{k,3} v_{l+1,m+1}$ $c_{k,r} = \varphi_{\lfloor k/4^{3-r} \rfloor \bmod 4}$

| Value of Codebook-Config | $i_{1,1}$ | $i_{1,2}$ | $i_2$ 0 | 1 | 2 | 3 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(1)}$ | $W_{2i_{1,1}, 2i_{1,2}, 0, 1}^{(1)}$ | $W_{2i_{1,1}, 2i_{1,2}, 0, 2}^{(1)}$ | $W_{2i_{1,1}, 2i_{1,2}, 0, 3}^{(1)}$ |

| Value of Codebook-Config | $i_{1,1}$ | $i_{1,2}$ | $i_2$ 4 | 5 | 6 | 7 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 1, 0}^{(1)}$ | $W_{2i_{1,1}, 2i_{1,2}, 1, 1}^{(1)}$ | $W_{2i_{1,1}, 2i_{1,2}, 1, 2}^{(1)}$ | $W_{2i_{1,1}, 2i_{1,2}, 1, 3}^{(1)}$ |

| Value of Codebook-Config | $i_{1,1}$ | $i_{1,2}$ | $i_2$ 8-251 |
|---|---|---|---|
| 3 | $0, 1, \ldots, \frac{N_1 O_1}{2} - 1$ | $0, 1, \ldots, \frac{N_2 O_2}{2} - 1$ | Indices i2 = 8 to 251 are obtained by replacing the third and fourth subscripts in $W_{2i_{1,1}, 2i_{1,2}, 0, 0}^{(1)}$ with 2, 3, . . . 62 and 0, 1, 2, 3, respectively |

| Value of Codebook-Config | $i_{1,1}$ | $i_{1,2}$ | $i_2$ 252 | 253 | 254 | 255 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 63, 0}^{(1)}$ | $W_{2i_{1,1}, 2i_{1,2}, 63, 1}^{(1)}$ | $W_{2i_{1,1}, 2i_{1,2}, 63, 2}^{(1)}$ | $W_{2i_{1,1}, 2i_{1,2}, 63, 3}^{(1)}$ | where $W_{l,m,k,n}^{(1)} = \frac{1}{\sqrt{2} \|w_{l,m,k}\|} \begin{bmatrix} w_{l,m,k} \\ \varphi_n w_{l,m,k} \end{bmatrix}$, $w_{l,m,k} = c_{k,0} v_{l,m} + c_{k,1} v_{l+2,m} + c_{k,2} v_{l+1,m+1} + c_{k,3} v_{l+3,m+1}$, if $N_1 \geq N_2$ $w_{l,m,k} = c_{k,0} v_{l,m} + c_{k,1} v_{l,m+2} + c_{k,2} v_{l+1,m+1} + c_{k,3} v_{l+1,m+3}$, if $N_1 < N_2$ $c_{k,r} = \varphi_{\lfloor k/4^{3-r} \rfloor \bmod 4}$

TABLE 27-continued

Codebook for 1-layer CSI reporting using antenna ports 15 to 14 + P

| Value of Codebook-Config | $i_{1,1}$ | $i_{1,2}$ | $i_2$ = 0 | 1 | 2 | 3 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W^{(1)}_{2i_{1,1}, 2i_{1,2}, 0, 0}$ | $W^{(1)}_{2i_{1,1}, 2i_{1,2}, 0, 1}$ | $W^{(1)}_{2i_{1,1}, 2i_{1,2}, 0, 2}$ | $W^{(1)}_{2i_{1,1}, 2i_{1,2}, 0, 3}$ |

| Value of Codebook-Config | $i_{1,1}$ | $i_{1,2}$ | $i_2$ = 4 | 5 | 6 | 7 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W^{(1)}_{2i_{1,1}, 2i_{1,2}, 1, 0}$ | $W^{(1)}_{2i_{1,1}, 2i_{1,2}, 1, 1}$ | $W^{(1)}_{2i_{1,1}, 2i_{1,2}, 1, 2}$ | $W^{(1)}_{2i_{1,1}, 2i_{1,2}, 1, 3}$ |

| Value of Codebook-Config | $i_{1,1}$ | $i_{1,2}$ | $i_2$ = 8-251 |
|---|---|---|---|
| 4 | $0, 1, \ldots, \frac{N_1 O_1}{2} - 1$ | $0, 1, \ldots, \frac{N_2 O_2}{2} - 1$ | Indices i2 = 8 to 251 are obtained by replacing the third and fourth subscripts in $W^{(1)}_{2i_{1,1}, 2i_{1,2}, 0, 0}$ with 2, 3, ... 62 and 0, 1, 2, 3, respectively |

| Value of Codebook-Config | $i_{1,1}$ | $i_{1,2}$ | $i_2$ = 252 | 253 | 254 | 255 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W^{(1)}_{2i_{1,1}, 2i_{1,2}, 63, 0}$ | $W^{(1)}_{2i_{1,1}, 2i_{1,2}, 63, 1}$ | $W^{(1)}_{2i_{1,1}, 2i_{1,2}, 63, 2}$ | $W^{(1)}_{2i_{1,1}, 2i_{1,2}, 63, 3}$ | where $W^{(1)}_{l,m,k,n} = \frac{1}{\sqrt{2}\, \|w_{l,m,k}\|} \begin{bmatrix} w_{l,m,k} \\ \varphi_n w_{l,m,k} \end{bmatrix}$, $w_{l,m,k} = c_{k,0} v_{l,m} + c_{k,1} v_{l+1,m} + c_{k,2} v_{l+2,m} + c_{k,3} v_{l+3,m}$, if $N_1 \geq N_2$ $w_{l,m,k} = c_{k,0} v_{l,m} + c_{k,1} v_{l,m+1} + c_{k,2} v_{l,m+2} + c_{k,3} v_{l,m+3}$, if $N_1 < N_2$ $c_{k,r} = \varphi_{\lfloor k/4^{3-r} \rfloor \bmod 4}$

TABLE 28

Codebook for 2-layer CSI reporting using antenna ports 15 to 14 + P

| Value of Codebook-Config | $i_{1,1}$ | $i_{1,2}$ | $i_2$ = 0 | 1 |
|---|---|---|---|---|
| 2 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 0, 0}$ | $W^{(2)}_{2i_{1,1}, 2i_{1,2}, 0, 1}$ |

| Value of Codebook-Config | $i_{1,1}$ | $i_{1,2}$ | $i_2$ = 2 | 3 |
|---|---|---|---|---|
| 2 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 1, 0}$ | $W^{(2)}_{2i_{1,1}, 2i_{1,2}, 1, 1}$ |

| Value of Codebook-Config | $i_{1,1}$ | $i_{1,2}$ | $i_2$ = 4-125 |
|---|---|---|---|
| 2 | $0, 1, \ldots, \frac{N_1 O_1}{2} - 1$ | $0, 1, \ldots, \frac{N_2 O_2}{2} - 1$ | Indices i2 = 4 to 125 are obtained by replacing the third and fourth subscripts in $W^{(2)}_{2i_{1,1}, 2i_{1,2}, 0, 0}$ with 2, 3, ... 62 and 0, 1, respectively |

TABLE 28-continued

Codebook for 2-layer CSI reporting using antenna ports 15 to 14 + P

| Value of Codebook-Config | $i_{1,1}$ | $i_{1,2}$ | $i_2$ 126 | 127 |
|---|---|---|---|---|
| 2 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 63, 0}$ | $W^{(2)}_{2i_{1,1}, 2i_{1,2}, 63, 1}$ |

$$\text{where } W^{(2)}_{l,m,k,n} = \frac{1}{2\|w_{l,m,k}\|} \begin{bmatrix} w_{l,m,k} & w_{l,m,k} \\ \varphi_n w_{l,m,k} & -\varphi_n w_{l,m,k} \end{bmatrix},$$
$$w_{l,m,k} = c_{k,0} v_{l,m} + c_{k,1} v_{l+1,m} + c_{k,2} v_{l,m+1} + c_{k,3} v_{l+1,m+1}$$
$$c_{k,r} = \varphi_{\lfloor k/4^{3-r} \rfloor \bmod 4}$$

| Value of Codebook-Config | $i_{1,1}$ | $i_{1,2}$ | $i_2$ 0 | 1 |
|---|---|---|---|---|
| 3 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 0, 0}$ | $W^{(2)}_{2i_{1,1}, 2i_{1,2}, 0, 1}$ |

| Value of Codebook-Config | $i_{1,1}$ | $i_{1,2}$ | $i_2$ 2 | 3 |
|---|---|---|---|---|
| 3 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 1, 0}$ | $W^{(2)}_{2i_{1,1}, 2i_{1,2}, 1, 1}$ |

| Value of Codebook-Config | $i_{1,1}$ | $i_{1,2}$ | $i_2$ 4-125 |
|---|---|---|---|
| 3 | $0, 1, \ldots, \frac{N_1 O_1}{2} - 1$ | $0, 1, \ldots, \frac{N_2 O_2}{2} - 1$ | Indices i2 = 4 to 125 are obtained by replacing the third and fourth subscripts in $W^{(2)}_{2i_{1,1}, 2i_{1,2}, 0, 0}$ with 2, 3, . . . 62 and 0, 1, respectively |

| Value of Codebook-Config | $i_{1,1}$ | $i_{1,2}$ | $i_2$ 126 | 127 |
|---|---|---|---|---|
| 3 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 63, 0}$ | $W^{(2)}_{2i_{1,1}, 2i_{1,2}, 63, 1}$ |

$$\text{where } W^{(2)}_{l,m,k,n} = \frac{1}{2\|w_{l,m,k}\|} \begin{bmatrix} w_{l,m,k} & w_{l,m,k} \\ \varphi_n w_{l,m,k} & -\varphi_n w_{l,m,k} \end{bmatrix},$$
$$w_{l,m,k} = c_{k,0} v_{l,m} + c_{k,1} v_{l+2,m} + c_{k,2} v_{l+1,m+1} + c_{k,3} v_{l+3,m+1}, \text{ if } N_1 \geq N_2$$
$$w_{l,m,k} = c_{k,0} v_{l,m} + c_{k,1} v_{l,m+2} + c_{k,2} v_{l+1,m+1} + c_{k,3} v_{l+1,m+3}, \text{ if } N_1 < N_2$$
$$c_{k,r} = \varphi_{\lfloor k/4^{3-r} \rfloor \bmod 4}$$

| Value of Codebook-Config | $i_{1,1}$ | $i_{1,2}$ | $i_2$ 0 | 1 |
|---|---|---|---|---|
| 4 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 0, 0}$ | $W^{(2)}_{2i_{1,1}, 2i_{1,2}, 0, 1}$ |

| Value of Codebook-Config | $i_{1,1}$ | $i_{1,2}$ | $i_2$ 2 | 3 |
|---|---|---|---|---|
| 4 | $0, 1, \ldots, \frac{N_1 O_1}{2} - 1$ | $0, 1, \ldots, \frac{N_2 O_2}{2} - 1$ | $W^{(2)}_{2i_{1,1}, 2i_{1,2}, 1, 0}$ | $W^{(2)}_{2i_{1,1}, 2i_{1,2}, 1, 1}$ |

TABLE 28-continued

Codebook for 2-layer CSI reporting using antenna ports 15 to 14 + P

| Value of Codebook-Config | $i_{1,1}$ | $i_{1,2}$ | $i_2$ 4-125 | |
|---|---|---|---|---|
| 4 | $0, 1, \ldots, \frac{N_1 O_1}{2} - 1$ | $0, 1, \ldots, \frac{N_2 O_2}{2} - 1$ | Indices i2 = 4 to 125 are obtained by replacing the third and fourth subscripts in $W_{2i_{1,1}, 2i_{1,2}, 0, 0}^{(2)}$ with 2, 3, . . . 62 and 0, 1, respectively | |

| Value of Codebook-Config | $i_{1,1}$ | $i_{1,2}$ | $i_2$ 126 | 127 |
|---|---|---|---|---|
| 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 63, 0}^{(2)}$ | $W_{2i_{1,1}, 2i_{1,2}, 63, 1}^{(2)}$ | where $W_{l,m,k,n}^{(2)} = \frac{1}{2\|w_{l,m,k}\|} \begin{bmatrix} w_{l,m,k} & w_{l,m,k} \\ \varphi_n w_{l,m,k} & -\varphi_n w_{l,m,k} \end{bmatrix}$, $w_{l,m,k} = c_{k,0} v_{l,m} + c_{k,1} v_{l+1,m} + c_{k,2} v_{l+2,m} + c_{k,3} v_{l+3,m}$, if $N_1 \geq N_2$ $w_{l,m,k} = c_{k,0} v_{l,m} + c_{k,1} v_{l,m+1} + c_{k,2} v_{l,m+2} + c_{k,3} v_{l,m+3}$, if $N_1 < N_2$ $c_{k,r} = \varphi_{\lfloor k/4^{3-r} \rfloor \mod 4}$

TABLE 29

Codebook for 1-layer CSI reporting using antenna ports 15 to 14 + P

| Value of Codebook-Config | $i_{1,1}$ | $i_{1,2}$ | $i_2$ 0 | 1 | 2 | 3 |
|---|---|---|---|---|---|---|
| 2, 3, 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(1)}$ | $W_{2i_{1,1}, 2i_{1,2}, 0, 1}^{(1)}$ | $W_{2i_{1,1}, 2i_{1,2}, 0, 2}^{(1)}$ | $W_{2i_{1,1}, 2i_{1,2}, 0, 3}^{(1)}$ |

| Value of Codebook-Config | $i_{1,1}$ | $i_{1,2}$ | $i_2$ 4 | 5 | 6 | 7 |
|---|---|---|---|---|---|---|
| 2, 3, 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 1, 0}^{(1)}$ | $W_{2i_{1,1}, 2i_{1,2}, 1, 1}^{(1)}$ | $W_{2i_{1,1}, 2i_{1,2}, 1, 2}^{(1)}$ | $W_{2i_{1,1}, 2i_{1,2}, 1, 3}^{(1)}$ |

| Value of Codebook-Config | $i_{1,1}$ | $i_{1,2}$ | $i_2$ 8-251 | | | |
|---|---|---|---|---|---|---|
| 2, 3, 4 | $0, 1, \ldots, \frac{N_1 O_1}{2} - 1$ | $0, 1, \ldots, \frac{N_2 O_2}{2} - 1$ | Indices i2 = 8 to 251 are obtained by replacing the third and fourth subscripts in $W_{2i_{1,1}, 2i_{1,2}, 0, 0}^{(1)}$ with 2, 3, . . . 62 and 0, 1, 2, 3, respectively | | | |

| Value of Codebook-Config | $i_{1,1}$ | $i_{1,2}$ | $i_2$ 252 | 253 | 254 | 255 |
|---|---|---|---|---|---|---|
| 2, 3, 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 63, 0}^{(1)}$ | $W_{2i_{1,1}, 2i_{1,2}, 63, 1}^{(1)}$ | $W_{2i_{1,1}, 2i_{1,2}, 63, 2}^{(1)}$ | $W_{2i_{1,1}, 2i_{1,2}, 63, 3}^{(1)}$ | where $W_{l,m,k,n}^{(1)} = \frac{1}{\sqrt{2} \|w_{l,m,k}\|} \begin{bmatrix} w_{l,m,k} \\ \varphi_n w_{l,m,k} \end{bmatrix}$, for Codebook-Config = 2:
$w_{l,m,k} = c_{k,0} v_{l,m} + c_{k,1} v_{l+1,m} + c_{k,2} v_{l,m+1} + c_{k,3} v_{l+1,m+1}$ for Codebook-Config = 3:
$w_{l,m,k} = c_{k,0} v_{l,m} + c_{k,1} v_{l+2,m} + c_{k,2} v_{l+1,m+1} + c_{k,3} v_{l+3,m+1}$, if $N_1 \geq N_2$
$w_{l,m,k} = c_{k,0} v_{l,m} + c_{k,1} v_{l,m+2} + c_{k,2} v_{l+1,m+1} + c_{k,3} v_{l+1,m+3}$, if $N_1 < N_2$ for Codebook-Config = 4:
$w_{l,m,k} = c_{k,0} v_{l,m} + c_{k,1} v_{l+1,m} + c_{k,2} v_{l+2,m} + c_{k,3} v_{l+3,m}$, if $N_1 \geq N_2$
$w_{l,m,k} = c_{k,0} v_{l,m} + c_{k,1} v_{l,m+1} + c_{k,2} v_{l,m+2} + c_{k,3} v_{l,m+3}$, if $N_1 < N_2$ and $c_{k,r} = \varphi_{\lfloor k/4^{3-r} \rfloor \mod 4}$

TABLE 30

| Codebook for 2-layer CSI reporting using antenna ports 15 to 14 + P | | | | |
|---|---|---|---|---|
| Value of Codebook-Config | $i_{1,1}$ | $i_{1,2}$ | $i_2$ = 0 | $i_2$ = 1 |
| 2, 3, 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(2)}$ | $W_{2i_{1,1}, 2i_{1,2}, 0, 1}^{(2)}$ |
| Value of Codebook-Config | $i_{1,1}$ | $i_{1,2}$ | $i_2$ = 2 | $i_2$ = 3 |
| 2, 3, 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 1, 0}^{(2)}$ | $W_{2i_{1,1}, 2i_{1,2}, 1, 1}^{(2)}$ |
| Value of Codebook-Config | $i_{1,1}$ | $i_{1,2}$ | $i_2$ 4-125 | |
| 2, 3, 4 | $0, 1, \ldots, \frac{N_1 O_1}{2} - 1$ | $0, 1, \ldots, \frac{N_2 O_2}{2} - 1$ | Indices i2 = 4 to 125 are obtained by replacing the third and fourth subscripts in $W_{2i_{1,1}, 2i_{1,2}, 0, 0}^{(2)}$ with 2, 3, ... 62 and 0, 1, respectively | |
| Value of Codebook-Config | $i_{1,1}$ | $i_{1,2}$ | $i_2$ = 126 | $i_2$ = 127 |
| 2, 3, 4 | $0, 1, \ldots, \frac{N_1 O_1}{2} - 1$ | $0, 1, \ldots, \frac{N_2 O_2}{2} - 1$ | $W_{2i_{1,1}, 2i_{1,2}, 63, 0}^{(2)}$ | $W_{2i_{1,1}, 2i_{1,2}, 63, 1}^{(2)}$ | where $W_{l,m,k,n}^{(2)} = \frac{1}{2\|w_{l,m,k}\|} \begin{bmatrix} w_{l,m,k} & w_{l,m,k} \\ \varphi_n w_{l,m,k} & -\varphi_n w_{l,m,k} \end{bmatrix}$, for Codebook-Config = 2:
$w_{l,m,k} = c_{k,0} v_{l,m} + c_{k,1} v_{l+1,m} + c_{k,2} v_{l,m+1} + c_{k,3} v_{l+1,m+1}$ for Codebook-Config = 3:
$w_{l,m,k} = c_{k,0} v_{l,m} + c_{k,1} v_{l+2,m} + c_{k,2} v_{l+1,m+1} + c_{k,3} v_{l+3,m+1}$, if $N_1 \geq N_2$
$w_{l,m,k} = c_{k,0} v_{l,m} + c_{k,1} v_{l,m+2} + c_{k,2} v_{l+1,m+1} + c_{k,3} v_{l+1,m+3}$, if $N_1 < N_2$ for Codebook-Config = 4:
$w_{l,m,k} = c_{k,0} v_{l,m} + c_{k,1} v_{l+1,m} + c_{k,2} v_{l+2,m} + c_{k,3} v_{l+3,m}$, if $N_1 \geq N_2$
$w_{l,m,k} = c_{k,0} v_{l,m} + c_{k,1} v_{l,m+1} + c_{k,2} v_{l,m+2} + c_{k,3} v_{l,m+3}$, if $N_1 < N_2$
and $c_{k,r} = \varphi_{\lfloor k/4^{3-r} \rfloor \bmod 4}$ In some embodiments, a UE is configured with single rank 1 and rank 2 LC codebook tables for Codebook-Config=2, 3, and 4 as shown in TABLEs 31, 32, and 33, in which W1 and W2 components of the codebooks are separated into two codebook tables.

TABLE 31

| W1 Codebook for 1-layer and 2-layer CSI reporting using antenna ports 15 to 14 + P | | | |
|---|---|---|---|
| Value of Codebook-Config | $i_{1,1}$ | $i_{1,2}$ | $x_{l,m}$ |
| 2 | $0, 1, \ldots, \frac{N_1 O_1}{2} - 1$ | $0, 1, \ldots, \frac{N_2 O_2}{2} - 1$ | $x_{l,m} = [\, v_{l,m} \quad v_{l+1,m} \quad v_{l,m+1} \quad v_{l+1,m+1} \,]$ |
| 3 | $0, 1, \ldots, \frac{N_1 O_1}{2} - 1$ | $0, 1, \ldots, \frac{N_2 O_2}{2} - 1$ | $x_{l,m} = [\, v_{l,m} \quad v_{l+2,m} \quad v_{l+1,m+1} \quad v_{l+3,m+1} \,]$, if $N_1 \geq N_2$ |
| | | | $x_{l,m} = [\, v_{l,m} \quad v_{l,m+2} \quad v_{l+1,m+1} \quad v_{l+1,m+3} \,]$, if $N_1 < N_2$ |
| 4 | $0, 1, \ldots, \frac{N_1 O_1}{2} - 1$ | $0, 1, \ldots, \frac{N_2 O_2}{2} - 1$ | $x_{l,m} = [\, v_{l,m} \quad v_{l+1,m} \quad v_{l+2,m} \quad v_{l+3,m} \,]$, if $N_1 \geq N_2$ |
| | | | $x_{l,m} = [\, v_{l,m} \quad v_{l,m+1} \quad v_{l,m+2} \quad v_{l,m+3} \,]$, if $N_1 < N_2$ |

TABLE 32

Codebook for 1-layer CSI reporting using antenna ports 15 to 14 + P

| $i_2$ | | | |
|---|---|---|---|
| 0 | 1 | 2 | 3 |
| $W_{2i_{1,1},2i_{1,2},0,0}^{(1)}$ | $W_{2i_{1,1},2i_{1,2},0,1}^{(1)}$ | $W_{2i_{1,1},2i_{1,2},0,2}^{(1)}$ | $W_{2i_{1,1},2i_{1,2},0,3}^{(1)}$ |

| $i_2$ | | | |
|---|---|---|---|
| 4 | 5 | 6 | 7 |
| $W_{2i_{1,1},2i_{1,2},1,0}^{(1)}$ | $W_{2i_{1,1},2i_{1,2},1,1}^{(1)}$ | $W_{2i_{1,1},2i_{1,2},1,2}^{(1)}$ | $W_{2i_{1,1},2i_{1,2},1,3}^{(1)}$ |

| $i_2$ |
|---|
| 8-251 |

Indices i2 = 8 to 251 are obtained by replacing the third and fourth subscripts in $W_{2i_{1,1},2i_{1,2},0,0}^{(1)}$ with 2, 3, . . . 62 and 0, 1, 2, 3, respectively

| $i_2$ | | | |
|---|---|---|---|
| 252 | 253 | 254 | 255 |
| $W_{2i_{1,1},2i_{1,2},63,0}^{(1)}$ | $W_{2i_{1,1},2i_{1,2},63,1}^{(1)}$ | $W_{2i_{1,1},2i_{1,2},63,2}^{(1)}$ | $W_{2i_{1,1},2i_{1,2},63,3}^{(1)}$ | where $W_{l,m,k,n}^{(1)} = \dfrac{1}{\sqrt{2}\,\|w_{l,m,k}\|} \begin{bmatrix} w_{l,m,k} \\ \varphi_n w_{l,m,k} \end{bmatrix}$ $w_{l,m,k} = x_{l,m} c_k$ $c_k = [\,c_{k,0}\ \ c_{k,1}\ \ c_{k,2}\ \ c_{k,3}\,]^T$ $c_{k,r} = \varphi_{\lfloor k/4^{3-r} \rfloor \bmod 4}$

TABLE 33

W2 Codebook for 2-layer CSI reporting using antenna ports 15 to 14 + P

| $i_2$ | |
|---|---|
| 0 | 1 |
| $W_{2i_{1,1},2i_{1,2},0,0}^{(2)}$ | $W_{2i_{1,1},2i_{1,2},0,1}^{(2)}$ |

| $i_2$ | |
|---|---|
| 2 | 3 |
| $W_{2i_{1,1},2i_{1,2},1,0}^{(2)}$ | $W_{2i_{1,1},2i_{1,2},1,1}^{(2)}$ |

| $i_2$ |
|---|
| 4-125 |

Indices i2 = 4 to 251 are obtained by replacing the third and fourth subscripts in $W_{2i_{1,1},2i_{1,2},0,0}^{(2)}$ with 2, 3, . . . 62 and 0, 1, respectively

| $i_2$ | |
|---|---|
| 126 | 127 |
| $W_{2i_{1,1},2i_{1,2},63,0}^{(2)}$ | $W_{2i_{1,1},2i_{1,2},63,1}^{(2)}$ |

TABLE 33-continued

W2 Codebook for 2-layer CSI reporting using antenna ports 15 to 14 + P where $W_{l,m,k,n}^{(2)} = \dfrac{1}{2\|w_{l,m,k}\|} \begin{bmatrix} w_{l,m,k} & w_{l,m,k} \\ \varphi_n w_{l,m,k} & -\varphi_n w_{l,m,k} \end{bmatrix}$ $w_{l,m,k} = x_{l,m} c_k$ $c_k = [\,c_{k,0}\ \ c_{k,1}\ \ c_{k,2}\ \ c_{k,3}\,]^T$ $c_{k,r} = \varphi_{\lfloor k/4^{3-r} \rfloor \bmod 4}$ In some embodiments, a UE is configured with rank 1 and rank 2 W 2 LC codebook tables as shown in TABLE 34 and 35, in which the second PMI $i_2$ has two components ($i_{2,1}$, $i_{2,2}$). The 1st component $i_{2,1}$ indicates LC coefficient vector and 2nd component $i_{2,2}$ indicates co-phase for the two polarizations.

In one example, $i_{2,1}$ and $i_{2,2}$ are reported separately as two components of the 2nd PMI. In another method, $i_{2,1}$ and $i_{2,2}$ are reported jointly as a single second PMI. In this later case, the least significant bits (LSB) (e.g. 2 bits for rank 1 and 1 bit for rank 2 from right)) of $i_2$ correspond to $i_{2,2}$ (co-phase), and the most significant bits (MSB) (e.g. 6 bits of from left) of $i_2$ correspond to $i_{2,1}$ (coefficients). Alternatively, the LSB (e.g. 6 bits of from left) of $i_2$ correspond to $i_{2,1}$ (coefficients) and the MSB (e.g. 2 bits for rank 1 and 1 bit for rank 2 from right)) of $i_2$ correspond to $i_{2,2}$ (co-phase).

TABLE 34

W2 Codebook for 1-layer CSI reporting using antenna ports 15 to 14 + P

| $i_{2,1}$ | $i_{2,2}$ | | | |
|---|---|---|---|---|
| | 0 | 1 | 2 | 3 |
| 0, 1, ..., 63 | $W_{2i_{1,1},2i_{1,2},i_{2,1},0}^{(1)}$ | $W_{2i_{1,1},2i_{1,2},i_{2,1},1}^{(1)}$ | $W_{2i_{1,1},2i_{1,2},i_{2,1},2}^{(1)}$ | $W_{2i_{1,1},2i_{1,2},i_{2,1},3}^{(1)}$ | where $W_{l,m,k,n}^{(1)} = \dfrac{1}{\sqrt{2}\,\|w_{l,m,k}\|}\begin{bmatrix} w_{l,m,k} \\ \varphi_n w_{l,m,k} \end{bmatrix}$ $w_{l,m,k} = x_{l,m} c_k$ $c_k = [\, c_{k,0}\ \ c_{k,1}\ \ c_{k,2}\ \ c_{k,3}\,]^T$ $c_{k,r} = \varphi_{\lfloor k/4^{3-r}\rfloor \bmod 4}$

TABLE 35

W2 Codebook for 2-layer CSI reporting using antenna ports 15 to 14 + P

| $i_{2,1}$ | $i_{2,2}$ | |
|---|---|---|
| | 0 | 1 |
| 0, 1, ..., 63 | $W_{2i_{1,1},2i_{1,2},i_{2,1},0}^{(2)}$ | $W_{2i_{1,1},2i_{1,2},i_{2,1},1}^{(2)}$ | where $W_{l,m,k,n}^{(2)} = \dfrac{1}{2\|w_{l,m,k}\|}\begin{bmatrix} w_{l,m,k} & w_{l,m,k} \\ \varphi_n w_{l,m,k} & -\varphi_n w_{l,m,k} \end{bmatrix}$ $w_{l,m,k} = x_{l,m} c_k$ $c_k = [\, c_{k,0}\ \ c_{k,1}\ \ c_{k,2}\ \ c_{k,3}\,]^T$ $c_{k,r} = \varphi_{\lfloor k/4^{3-r}\rfloor \bmod 4}$ In some embodiments, the 1st component $i_{2,1}$ indicates co-phase for the two polarizations and 2nd component $i_{2,2}$ indicates LC coefficient vector.

In some embodiments, the rank 1 and rank 2 LC precoders are given by $W_{l,m,k_1,k_2,n}^{(1)} = \dfrac{1}{\sqrt{2}\,\|w_{l,m,k_1,k_2}\|}\begin{bmatrix} w_{l,m,k_1,k_2} \\ \varphi_n w_{l,m,k_1,k_2} \end{bmatrix}$, $W_{l,m,k_1,k_2,n}^{(2)} = \dfrac{1}{\sqrt{2}\,\|w_{l,m,k_1,k_2}\|}\begin{bmatrix} w_{l,m,k_1,k_2} & w_{l,m,k_1,k_2} \\ \varphi_n w_{l,m,k_1,k_2} & -\varphi_n w_{l,m,k_1,k_2} \end{bmatrix}$ where for Codebook-Config=2: $w_{l,m,k_1,k_2}=c_{k_1,0}c_{k_2,0}v_{l,m}+c_{k_1,1}c_{k_2,1}v_{l+1,m}+c_{k_1,2}c_{k_2,2}v_{l,m+1}+c_{k_1,3}c_{k_2,3}v_{l+1,m+1}$ for Codebook-Config=3: $w_{l,m,k_1,k_2}=c_{k_1,0}c_{k_2,0}v_{l,m}+c_{k_1,1}c_{k_2,1}v_{l+2,m}+c_{k_1,2}c_{k_2,2}v_{l+1,m+1}+c_{k_1,3}c_{k_2,3}v_{l+3,3,m+1}$, if $N_1 \geq N_2$ $w_{l,m,k_1,k_2}=c_{k_1,0}c_{k_2,0}v_{l,m}+c_{k_1,1}c_{k_2,1}v_{l,m+2}+c_{k_1,2}c_{k_2,2}v_{l+1,m+1}+c_{k_1,3}c_{k_2,3}v_{l+1,m+3}$, if $N_1 < N_2$, and for Codebook-Config=4: $w_{l,m,k_1,k_2}=c_{k_1,0}c_{k_2,0}v_{l,m}+c_{k_1,1}c_{k_2,1}v_{l+1,m}+c_{k_1,2}c_{k_2,2}v_{l+2,m}+c_{k_1,3}c_{k_2,3}v_{l+3,m}$, if $N_1 \geq N_2$ $w_{l,m,k_1,k_2}=c_{k_1,0}c_{k_2,0}v_{l,m}+c_{k_1,1}c_{k_2,1}v_{l,m+1}+c_{k_1,2}c_{k_2,2}v_{l,m+2}+c_{k_1,3}c_{k_2,3}v_{l,m+3}$, if $N_1 < N_2$.

The coefficients can be according to one of the following alternatives (e.g., TABLE 36)

TABLE 36

Coefficient codebook alternatives

| Alt | 1st coefficient component ($c_{k_1,r}$) | | 2nd coefficient component ($c_{k_2,r}$) | |
|---|---|---|---|---|
| | type | example | type | example |
| 0 | WB phase | $c_{k_1,r} = \alpha_{k_1}$ | SB phase | $c_{k_2,r} = \psi_{\lfloor k2/2^{3-r}\rfloor \bmod 2}$ |
| 1 | WB magnitude | $c_{k_1,r} = m_{k_1}$ | SB phase | $c_{k_2,r} = \varphi_{\lfloor k2/4^{3-r}\rfloor \bmod 4}$ |

TABLE 36-continued

Coefficient codebook alternatives

| Alt | 1st coefficient component ($c_{k_1,r}$) | | 2nd coefficient component ($c_{k_2,r}$) | |
|---|---|---|---|---|
| | type | example | type | example |
| 2 | WB magnitude, WB phase | $c_{k_1,r} = m_{k_1} \alpha_{k_1}$ | SB phase | $c_{k_2,r} = \psi_{\lfloor k2/2^{3-r}\rfloor \bmod 2}$ |
| 3 | SB magnitude | $c_{k_1,r} = m_{k_1}$ | SB phase | $c_{k_2,r} = \varphi_{\lfloor k2/4^{3-r}\rfloor \bmod 4}$ | where $\psi_k = e^{j\pi(k/2-1/4)}$ is 1-bit SB co-phase $\{e^{j\frac{\pi}{4}}, e^{-j\frac{\pi}{4}}\}$, $\alpha_k = e^{j\pi(k/2+1/4)}$ is 2-bit WB co-phase $\{e^{j\frac{\pi}{4}}, e^{j\frac{2\pi}{4}}, e^{j\frac{5\pi}{4}}, e^{j\frac{7\pi}{4}}\}$, and $m_k$ is WB magnitude. An example of which in uniform codebook in (0, 1).

The WB reporting of the 1st coefficient component $c_{k_1,r}$ can be joint with the first PMI $i_1$ or the first component of the first PMI $i_{1,1}$ or the second component of the first PMI $i_{1,2}$. Alternatively, it can be as another WB PMI, for example $i_0$. The SB reporting of both 1st and 2nd coefficient components, $c_{k_1,r}$ and $c_{k_2,r}$, can be joint with the second PMI $i_2$ (for the co-phase). Alternatively, it can be as another SB PMI, for example $i_3$. Similarly, the SB reporting of the 2nd coefficient component $c_{k_2,r}$ only can be joint with the second PMI $i_2$. Alternatively, it can be as another SB PMI, for example $i_3$.

The rank 1 and rank 2 codebook tables for alternatives in TABLE 36 can be constructed similar to TABLE27-TABLE 33.

In some embodiments, the rank 1 and rank 2 LC precoders are given by:

$W_{l,m,k,,n}^{(1)} = \dfrac{1}{\sqrt{2}}\begin{bmatrix} w_{l,m,k}^{(0)} \\ \varphi_n w_{l,m,k}^{(1)} \end{bmatrix}$, -continued $$W_{l,m,k}^{(2)} = \frac{1}{2}\begin{bmatrix} w_{l,m,k}^{(0)} & w_{l,m,k}^{(0)} \\ \varphi_n w_{l,m,k}^{(1)} & -\varphi_n w_{l,m,k}^{(1)} \end{bmatrix},$$

respectively,
where $$w_{l,m,k}^{(0)} = \frac{x_{l,m}c_k^{(0)}}{\|x_{l,m}c_k^{(0)}\|};$$

$$w_{l,m,k}^{(1)} = \frac{x_{l,m}c_k^{(1)}}{\|x_{l,m}c_k^{(1)}\|},$$

for Codebook-Config=2: $x_{l,m} = [v_{l,m}\ v_{l+1,m}\ v_{l,m+1}\ v_{l+1,m+1}]$, for Codebook-Config=3: $x_{l,m} = [v_{l,m}\ v_{l+2,m}\ v_{l+1,m+1}\ v_{l+3,m+1}]$, if $N_1 \geq N_2$ $x_{l,m} = [v_{l,m}\ v_{l,m+2}\ v_{l+1,m+1}\ v_{l+1,m+3}]$, if $N_1 < N_2$, for Codebook-Config=4: $x_{l,m} = [v_{l,m}\ v_{l+1,m}\ v_{l+2,m}\ v_{l+1,m}]$, if $N_1 \geq N_2$ $x_{l,m} = [v_{l,m}\ v_{l,m+1}\ v_{l,m+2}\ v_{l,m+3}]$, if $N_1$; and $c_k^{(0)} = [c_{k,0}^{(0)}\ c_{k,1}^{(0)}\ c_{k,2}^{(0)}\ c_{k,3}^{(0)}]^T$ and $c_k^{(1)} = [c_{k,0}^{(1)}\ c_{k,1}^{(1)}\ c_{k,2}^{(1)}\ c_{k,3}^{(1)}]^T$ are length-4 coefficient vectors for the two polarizations. Coefficients of each vector belong to a K-PSK codebook. In one example, K=4, i.e. QPSK codebook In one method, $c_k^{(0)} = c_k^{(1)}$. In another method, $c_k^{(0)} \neq c_k^{(1)}$.

In some embodiments, the rank 1 and rank 2 LC precoders are given by:

$$W_{l,m,k}^{(1)} = \frac{w_{l,m,k}}{\|w_{l,m,k}\|},$$

$$W_{l,m,k}^{(2)} = \frac{1}{2}\begin{bmatrix} w_{l,m,k}^{(0)} & w_{l,m,k}^{(0)} \\ w_{l,m,k}^{(1)} & -w_{l,m,k}^{(1)} \end{bmatrix},$$

respectively,
where $$w_{l,m,k} = \begin{bmatrix} x_{l,m} & 0 \\ 0 & x_{l,m} \end{bmatrix} c_k = \begin{bmatrix} x_{l,m} & 0 \\ 0 & x_{l,m} \end{bmatrix}\begin{bmatrix} c_k^{(0)} \\ c_k^{(1)} \end{bmatrix} = \begin{bmatrix} x_{l,m}c_k^{(0)} \\ x_{l,m}c_k^{(1)} \end{bmatrix},$$

$$w_{l,m,k}^{(0)} = \frac{x_{l,m}c_k^{(0)}}{\|x_{l,m}c_k^{(0)}\|},$$

for Codebook-Config=2: $x_{l,m} = [v_{l,m}\ v_{l+1,m}\ v_{l,m+1}\ v_{l+1,m+1}]$, for Codebook-Config=3: $x_{l,m} = [v_{l,m}\ v_{l+2,m}\ v_{l+1,m+1}\ v_{l+3,m+1}]$, if $N_1 \leq N_2$, $x_{l,m} = [v_{l,m}\ v_{l,m+2}\ v_{l+1,m+1}\ v_{l+1,m+3}]$, if $N_1 < N_2$, for Codebook-Config=4: $x_{l,m} = [v_{l,m}\ v_{l+1,m}\ v_{l+2,m}\ v_{l+3,m}]$, if $N_1 \leq N_2$ $x_{l,m} = [v_{l,m}\ v_{l,m+1}\ v_{l,m+2}\ v_{l,m+3}]$, if $N_1 < N_2$, $c_k = [c_{k,0}\ c_{k,1}\ c_{k,2}\ c_{k,3}\ c_{k,4}\ c_{k,5}\ c_{k,6}\ c_{k,7}]^T$ is length-8 coefficient vector. Each coefficient of belong to a K-PSK codebook. In one example, K=4, i.e. QPSK codebook, and $c_k^{(0)} = [c_{k,0}\ c_{k,1}\ c_{k,2}\ c_{k,3}]^T$ and $c_k^{(1)} = [c_{k,4}\ c_{k,5}\ c_{k,6}\ c_{k,7}]^T$.

In some embodiments, the rank 3 and rank 4 LC precoders are given by:

$$W_{l,l',m,m',k}^{(3)} = \frac{1}{\sqrt{6}}\begin{bmatrix} w_{\frac{O_1}{4}l,\frac{O_2}{4}m,k} & w_{\frac{O_1}{4}l,\frac{O_2}{4}m,k} & w_{\frac{O_1}{4}l',\frac{O_2}{4}m',k} \\ w_{\frac{O_1}{4}l,\frac{O_2}{4}m,k} & -w_{\frac{O_1}{4}l,\frac{O_2}{4}m,k} & -w_{\frac{O_1}{4}l',\frac{O_2}{4}m',k} \end{bmatrix},$$

$$W_{l,l',m,m',k}^{(3)} = \frac{1}{\sqrt{6}}\begin{bmatrix} w_{\frac{O_1}{4}l,\frac{O_2}{4}m,k} & w_{\frac{O_1}{4}l',\frac{O_2}{4}m',k} & w_{\frac{O_1}{4}l',\frac{O_2}{4}m',k} \\ w_{\frac{O_1}{4}l,\frac{O_2}{4}m,k} & w_{\frac{O_1}{4}l',\frac{O_2}{4}m',k} & -w_{\frac{O_1}{4}l',\frac{O_2}{4}m',k} \end{bmatrix}$$ and $$\tilde{W}_{l,l',m,m',k,n}^{(3)} = \frac{1}{\sqrt{8}}$$

$$\begin{bmatrix} w_{\frac{O_1}{4}l,\frac{O_2}{4}m,k} & w_{\frac{O_1}{4}l',\frac{O_2}{4}m',k} & w_{\frac{O_1}{4}l,\frac{O_2}{4}m,k} & w_{\frac{O_1}{4}l',\frac{O_2}{4}m',k} \\ \varphi_n w_{\frac{O_1}{4}l,\frac{O_2}{4}m,k} & \varphi_n w_{\frac{O_1}{4}l',\frac{O_2}{4}m',k} & -\varphi_n w_{\frac{O_1}{4}l,\frac{O_2}{4}m,k} & -\varphi_n w_{\frac{O_1}{4}l',\frac{O_2}{4}m',k} \end{bmatrix}$$

where $$w_{\frac{O_1}{4}l,\frac{O_2}{4}m,k} = \frac{x_{\frac{O_1}{4}l,\frac{O_2}{4}m}c_k}{\left\|x_{\frac{O_1}{4}l,\frac{O_2}{4}m}c_k\right\|};$$

$$w_{\frac{O_1}{4}l',\frac{O_2}{4}m',k} = \frac{x_{\frac{O_1}{4}l',\frac{O_2}{4}m'}c_k}{\left\|x_{\frac{O_1}{4}l',\frac{O_2}{4}m'}c_k\right\|},$$

for Codebook-Config=2:

$$x_{\frac{O_1}{4}l,\frac{O_2}{4}m} = \left[v_{\frac{O_1}{4}l,\frac{O_2}{4}m}\ v_{\frac{O_1}{4}(l+1),\frac{O_2}{4}m}\ v_{\frac{O_1}{4}l,\frac{O_2}{4}(m+1)}\ v_{\frac{O_1}{4}(l+1),\frac{O_2}{4}(m+1)}\right],$$

for Codebook-Config=3:

$$x_{\frac{O_1}{4}l,\frac{O_2}{4}m} = \left[v_{\frac{O_1}{4}(l+2),\frac{O_2}{4}m}\ v_{\frac{O_1}{4}(l+3),\frac{O_2}{4}m}\ v_{\frac{O_1}{4}(l+1),\frac{O_2}{4}(m+1)}\ v_{\frac{O_1}{4}(l+1),\frac{O_2}{4}(m+1)}\right],$$

if $N_1 \geq N_2$ $$x_{\frac{O_1}{4}l,\frac{O_2}{4}m} = \left[v_{\frac{O_1}{4}l,\frac{O_2}{4}(m+2)}\ v_{\frac{O_1}{4}l,\frac{O_2}{4}(m+3)}\ v_{\frac{O_1}{4}(l+1),\frac{O_2}{4}m}\ v_{\frac{O_1}{4}(l+1),\frac{O_2}{4}(m+1)}\right],$$

if $N_1 < N_2$, for Codebook-Config=4:

$$x_{\frac{O_1}{4}l,\frac{O_2}{4}m} = \left[v_{\frac{O_1}{4}l,\frac{O_2}{4}m}\ v_{\frac{O_1}{4}(l+1),\frac{O_2}{4}m}\ v_{\frac{O_1}{4}(l+2),\frac{O_2}{4}m}\ v_{\frac{O_1}{4}(l+3),\frac{O_2}{4}m}\right],$$

if $N_1 \geq N_2$ $$x_{\frac{O_1}{4}l,\frac{O_2}{4}m} = \left[v_{\frac{O_1}{4}l,\frac{O_2}{4}m}\ v_{\frac{O_1}{4}l,\frac{O_2}{4}(m+1)}\ v_{\frac{O_1}{4}l,\frac{O_2}{4}(m+2)}\ v_{\frac{O_1}{4}l,\frac{O_2}{4}(m+3)}\right],$$

if $N_1 < N_2$, $c_k = [c_{k,0}\ c_{k,1}\ c_{k,2}\ c_{k,3}]^T$, for example, $c_{k,r} = \varphi_{\lfloor k/4^{3-r} \rfloor \bmod 4}$, which corresponds to QPSK LC coefficients.

An example of rank 3 LC codebook table is shown in TABLE 47. The rank 4 LC codebook table can be constructed similarly.

TABLE 37

Codebook for 3-layer CSI reporting using antenna ports 15 to 14 + P

3 Layers, Codebook-Config = 2
$i_{1,2} = 0, 1, \ldots, 2N_2 - 1$

| $i_{1,1}$ | $i_2$ | | | |
|---|---|---|---|---|
| | 0 | 1 | 2 | 3 |
| $0, \ldots, 2N_1 - 1$ | $W^{(3)}_{2i_{1,1},2i_{1,1}+4,2i_{1,2},2i_{1,2},0}$ | $W^{(3)}_{2i_{1,1}+4,2i_{1,1},2i_{1,2},2i_{1,2},0}$ | $\tilde{W}^{(3)}_{2i_{1,1},2i_{1,1}+4,2i_{1,2},2i_{1,2},0}$ | $\tilde{W}^{(3)}_{2i_{1,1}+4,2i_{1,1},2i_{1,2},2i_{1,2},0}$ |
| $2N_1, \ldots, 4N_1 - 1$ | $W^{(3)}_{2i_{1,1},2i_{1,1},2i_{1,2},2i_{1,2}+4,0}$ | $W^{(3)}_{2i_{1,1},2i_{1,1},2i_{1,2},+4,2i_{1,2},0}$ | $\tilde{W}^{(3)}_{2i_{1,1},2i_{1,1},2i_{1,2},2i_{1,2}+4,0}$ | $\tilde{W}^{(3)}_{2i_{1,1},2i_{1,1},2i_{1,2},2i_{1,2}+4,0}$ |

| $i_{1,1}$ | $i_2$ |
|---|---|
| | 4-251 |
| $0, \ldots, 2N_1 - 1$ | Indices $i_2 = 4\text{-}251$ are obtained by replacing the fifth subscript in 1st row and $i_2 = 0\text{-}3$ with 1, 2, . . . 62 |
| $2N_1, \ldots, 4N_1 - 1$ | Indices $i_2 = 4\text{-}251$ are obtained by replacing the fifth subscript in 2nd row and $i_2 = 0\text{-}3$ with 1, 2, . . . 62 |

| $i_{1,1}$ | $i_2$ | | | |
|---|---|---|---|---|
| | 252 | 253 | 254 | 255 |
| $0, \ldots, 2N_1 - 1$ | $W^{(3)}_{2i_{1,1},2i_{1,1}+4,2i_{1,2},2i_{1,2},63}$ | $W^{(3)}_{2i_{1,1}+4,2i_{1,1},2i_{1,2},2i_{1,2},63}$ | $\tilde{W}^{(3)}_{2i_{1,1},2i_{1,1}+4,2i_{1,2},2i_{1,2},63}$ | $\tilde{W}^{(3)}_{2i_{1,1}+4,2i_{1,1},2i_{1,2},2i_{1,2},63}$ |
| $2N_1, \ldots, 4N_1 - 1$ | $W^{(3)}_{2i_{1,1},2i_{1,1},2i_{1,2},2i_{1,2}+4,63}$ | $W^{(3)}_{2i_{1,1},2i_{1,1},2i_{1,2},+4,2i_{1,2},63}$ | $\tilde{W}^{(3)}_{2i_{1,1},2i_{1,1},2i_{1,2},2i_{1,2}+4,63}$ | $\tilde{W}^{(3)}_{2i_{1,1},2i_{1,2},2i_{1,2},+4,2i_{1,2},63}$ | where 
$$W^{(3)}_{l,l',m,m',k} = \frac{1}{\sqrt{6}} \begin{bmatrix} w_{\frac{O_1}{4}l,\frac{O_2}{4}m,k} & w_{\frac{O_1}{4}l,\frac{O_2}{4}m,k} & w_{\frac{O_1}{4}l',\frac{O_2}{4}m',k} \\ w_{\frac{O_1}{4}l,\frac{O_2}{4}m,k} & -w_{\frac{O_1}{4}l,\frac{O_2}{4}m,k} & -w_{\frac{O_1}{4}l',\frac{O_2}{4}m',k} \end{bmatrix}$$

$$\tilde{W}^{(3)}_{l,l',m,m',k} = \frac{1}{\sqrt{6}} \begin{bmatrix} w_{\frac{O_1}{4}l,\frac{O_2}{4}m,k} & w_{\frac{O_1}{4}l',\frac{O_2}{4}m',k} & w_{\frac{O_1}{4}l',\frac{O_2}{4}m',k} \\ w_{\frac{O_1}{4}l,\frac{O_2}{4}m,k} & w_{\frac{O_1}{4}l',\frac{O_2}{4}m',k} & -w_{\frac{O_1}{4}l',\frac{O_2}{4}m',k} \end{bmatrix}$$

3 Layers, Codebook-Config = 3
$i_{1,2} = 0, 1, \ldots, 2N_2 - 1$

| $i_{1,1}$ | $i_2$ | | | |
|---|---|---|---|---|
| | 0 | 1 | 2 | 3 |
| $0, \ldots, N_1 - 1$ | $W^{(3)}_{2i_{1,1},2i_{1,1}+4,2i_{1,2},2i_{1,2},0}$ | $W^{(3)}_{2i_{1,1}+4,2i_{1,1},2i_{1,2},2i_{1,2},0}$ | $\tilde{W}^{(3)}_{2i_{1,1},2i_{1,1}+4,2i_{1,2},2i_{1,2},0}$ | $\tilde{W}^{(3)}_{2i_{1,1}+4,2i_{1,1},2i_{1,2},2i_{1,2},0}$ |
| $N_1, \ldots, 2N_1 - 1$ | $W^{(3)}_{2i_{1,1},2i_{1,1},2i_{1,2},2i_{1,2}+4,0}$ | $W^{(3)}_{2i_{1,1},2i_{1,1},2i_{1,2},+4,2i_{1,2},0}$ | $\tilde{W}^{(3)}_{2i_{1,1},2i_{1,1},2i_{1,2},2i_{1,2}+4,0}$ | $\tilde{W}^{(3)}_{2i_{1,1},2i_{1,1},2i_{1,2},+4,2i_{1,2},0}$ |

| $i_{1,1}$ | $i_2$ |
|---|---|
| | 4-251 |
| $0, \ldots, N_1 - 1$ | Indices $i_2 = 4\text{-}251$ are obtained by replacing the fifth subscript in 1st row and $i_2 = 0\text{-}3$ with 1, 2, . . . 62 |
| $N_1, \ldots, 2N_1 - 1$ | Indices $i_2 = 4\text{-}251$ are obtained by replacing the fifth subscript in 2nd row and $i_2 = 0\text{-}3$ with 1, 2, . . . 62 |

| $i_{1,1}$ | $i_2$ | | | |
|---|---|---|---|---|
| | 252 | 253 | 254 | 255 |
| $0, \ldots, N_1 - 1$ | $W^{(3)}_{2i_{1,1},2i_{1,1}+4,2i_{1,2},2i_{1,2},63}$ | $W^{(3)}_{2i_{1,1}+4,2i_{1,1},2i_{1,2},2i_{1,2},63}$ | $\tilde{W}^{(3)}_{2i_{1,1},2i_{1,1}+4,2i_{1,2},2i_{1,2},63}$ | $\tilde{W}^{(3)}_{2i_{1,1}+4,2i_{1,1},2i_{1,2},2i_{1,2},63}$ |
| $N_1, \ldots, 2N_1 - 1$ | $W^{(3)}_{2i_{1,1},2i_{1,1},2i_{1,2},2i_{1,2}+4,63}$ | $W^{(3)}_{2i_{1,1},2i_{1,1},2i_{1,2},+4,2i_{1,2},63}$ | $\tilde{W}^{(3)}_{2i_{1,1},2i_{1,1},2i_{1,2},2i_{1,2}+4,63}$ | $\tilde{W}^{(3)}_{2i_{1,1},2i_{1,1},2i_{1,2},+4,2i_{1,2},63}$ | where 
$$W^{(3)}_{l,l',m,m',k} = \frac{1}{\sqrt{6}} \begin{bmatrix} w_{\frac{O_1}{4}l,\frac{O_2}{4}m,k} & w_{\frac{O_1}{4}l,\frac{O_2}{4}m,k} & w_{\frac{O_1}{4}l',\frac{O_2}{4}m',k} \\ w_{\frac{O_1}{4}l,\frac{O_2}{4}m,k} & -w_{\frac{O_1}{4}l,\frac{O_2}{4}m,k} & -w_{\frac{O_1}{4}l',\frac{O_2}{4}m',k} \end{bmatrix}$$

$$\tilde{W}^{(3)}_{l,l',m,m',k} = \frac{1}{\sqrt{6}} \begin{bmatrix} w_{\frac{O_1}{4}l,\frac{O_2}{4}m,k} & w_{\frac{O_1}{4}l',\frac{O_2}{4}m',k} & w_{\frac{O_1}{4}l',\frac{O_2}{4}m',k} \\ w_{\frac{O_1}{4}l,\frac{O_2}{4}m,k} & w_{\frac{O_1}{4}l',\frac{O_2}{4}m',k} & -w_{\frac{O_1}{4}l',\frac{O_2}{4}m',k} \end{bmatrix}$$

TABLE 37-continued

Codebook for 3-layer CSI reporting using antenna ports 15 to 14 + P

3 Layers, Codebook-Config = 4, $N_1 > 1$, $N_2 > 1$
$i_{1,2} = 0, 1, \ldots, 4N_2 - 1$

| $i_{1,1}$ | $i_2$ = 0 | 1 | 2 | 3 |
|---|---|---|---|---|
| $0, \ldots, N_1 - 1$ | $W^{(3)}_{2i_{1,1},2i_{1,1}+4,2i_{1,2},2i_{1,2},0}$ | $W^{(3)}_{2i_{1,1}+4,2i_{1,1},2i_{1,2},2i_{1,2},0}$ | $\tilde{W}^{(3)}_{2i_{1,1},2i_{1,1}+4,2i_{1,2},2i_{1,2},0}$ | $\tilde{W}^{(3)}_{2i_{1,1}+4,2i_{1,1},2i_{1,2},2i_{1,2},0}$ |
| $N_1, \ldots, 2N_1 - 1$ | $W^{(3)}_{2i_{1,1},2i_{1,1},2i_{1,2},2i_{1,2}+4,0}$ | $W^{(3)}_{2i_{1,1},2i_{1,1},2i_{1,2},+4,2i_{1,2},0}$ | $\tilde{W}^{(3)}_{2i_{1,1},2i_{1,1},2i_{1,2},2i_{1,2}+4,0}$ | $\tilde{W}^{(3)}_{2i_{1,1},2i_{1,1},2i_{1,2},+4,2i_{1,2},0}$ |

| $i_{1,1}$ | $i_2$ 4-251 |
|---|---|
| $0, \ldots, N_1 - 1$ | Indices $i_2$ = 4-251 are obtained by replacing the fifth subscript in 1st row and $i_2$ = 0-3 with 1, 2, . . . 62 |
| $N_1, \ldots, 2N_1 - 1$ | Indices $i_2$ = 4-251 are obtained by replacing the fifth subscript in 2nd row and $i_2$ = 0-3 with 1, 2, . . . 62 |

| $i_{1,1}$ | $i_2$ = 252 | 253 | 254 | 255 |
|---|---|---|---|---|
| $0, \ldots, N_1 - 1$ | $W^{(3)}_{2i_{1,1},2i_{1,1}+4,2i_{1,2},2i_{1,2},63}$ | $W^{(3)}_{2i_{1,1}+4,2i_{1,1},2i_{1,2},2i_{1,2},63}$ | $\tilde{W}^{(3)}_{2i_{1,1},2i_{1,1}+4,2i_{1,2},2i_{1,2},63}$ | $\tilde{W}^{(3)}_{2i_{1,1}+4,2i_{1,1},2i_{1,2},2i_{1,2},63}$ |
| $N_1, \ldots, 2N_1 - 1$ | $W^{(3)}_{2i_{1,1},2i_{1,1},2i_{1,2},2i_{1,2}+4,63}$ | $W^{(3)}_{2i_{1,1},2i_{1,1},2i_{1,2},+4,2i_{1,2},63}$ | $\tilde{W}^{(3)}_{2i_{1,1},2i_{1,1},2i_{1,2},2i_{1,2}+4,63}$ | $\tilde{W}^{(3)}_{2i_{1,1},2i_{1,1},2i_{1,2},+4,2i_{1,2},63}$ | where $W^{(3)}_{l,l',m,m',k} = \frac{1}{\sqrt{6}} \begin{bmatrix} w_{\frac{o_1}{4}l,\frac{o_2}{4}m,k} & w_{\frac{o_1}{4}l,\frac{o_2}{4}m,k} & w_{\frac{o_1}{4}l',\frac{o_2}{4}m',k} \\ w_{\frac{o_1}{4}l,\frac{o_2}{4}m,k} & -w_{\frac{o_1}{4}l,\frac{o_2}{4}m,k} & -w_{\frac{o_1}{4}l',\frac{o_2}{4}m',k} \end{bmatrix}$, $\tilde{W}^{(3)}_{l,l',m,m',k} = \frac{1}{\sqrt{6}} \begin{bmatrix} w_{\frac{o_1}{4}l,\frac{o_2}{4}m,k} & w_{\frac{o_1}{4}l',\frac{o_2}{4}m',k} & w_{\frac{o_1}{4}l',\frac{o_2}{4}m',k} \\ w_{\frac{o_1}{4}l,\frac{o_2}{4}m,k} & w_{\frac{o_1}{4}l',\frac{o_2}{4}m',k} & -w_{\frac{o_1}{4}l',\frac{o_2}{4}m',k} \end{bmatrix}$ 3 Layers, Codebook-Config = 4, $N_2 = 1$
$i_{1,2} = 0, 1, \ldots, 4N_2 - 1$

| $i_{1,1}$ | $i_2$ = 0 | 1 | 2 | 3 |
|---|---|---|---|---|
| $0, \ldots, N_1 - 1$ | $W^{(3)}_{4i_{1,1},4i_{1,1}+4,0,0,0}$ | $W^{(3)}_{4i_{1,1}+4,4i_{1,1},0,0,0}$ | $\tilde{W}^{(3)}_{4i_{1,1},4i_{1,1}+4,0,0,0}$ | $\tilde{W}^{(3)}_{4i_{1,1}+4,4i_{1,1},0,0,0}$ |
| $N_1, \ldots, 2N_1 - 1$ | $W^{(3)}_{4i_{1,1},4i_{1,1}+8,0,0,0}$ | $W^{(3)}_{4i_{1,1}+8,4i_{1,1},0,0,0}$ | $\tilde{W}^{(3)}_{4i_{1,1},4i_{1,1}+8,0,0,0}$ | $\tilde{W}^{(3)}_{4i_{1,1}+8,4i_{1,1},0,0,0}$ |
| $2N_1, \ldots, 3N_1 - 1$ | $W^{(3)}_{4i_{1,1},4i_{1,1}+12,0,0,0}$ | $W^{(3)}_{4i_{1,1}+12,4i_{1,1},0,0,0}$ | $\tilde{W}^{(3)}_{4i_{1,1},4i_{1,1}+12,0,0,0}$ | $\tilde{W}^{(3)}_{4i_{1,1}+12,4i_{1,1},0,0,0}$ |

| $i_{1,1}$ | $i_2$ 4-251 |
|---|---|
| $0, \ldots, N_1 - 1$ | Indices $i_2$ = 4-251 are obtained by replacing the fifth subscript in 1st row and $i_2$ = 0-3 with 1, 2, . . . 62 |
| $N_1, \ldots, 2N_1 - 1$ | Indices $i_2$ = 4-251 are obtained by replacing the fifth subscript in 2nd row and $i_2$ = 0-3 with 1, 2, . . . 62 |
| $2N_1, \ldots, 3N_1 - 1$ | Indices $i_2$ = 4-251 are obtained by replacing the fifth subscript in 3rd row and $i_2$ = 0-3 with 1, 2, . . . 62 |

Figure 21:
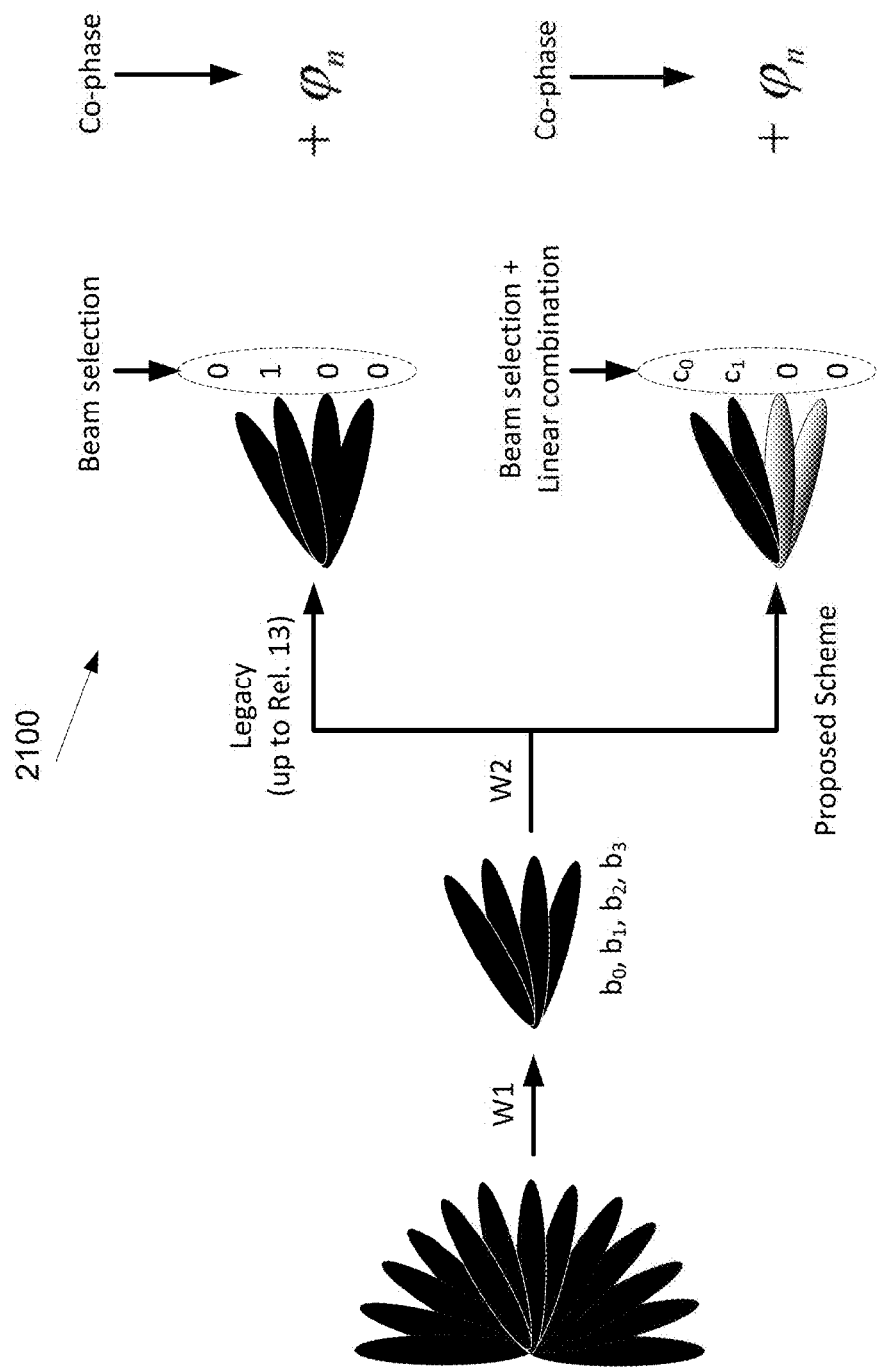
FIG. 21 illustrates an example beam selection followed linear combination pre-coder according to embodiments of the present disclosure.

| $i_{1,1}$ | $i_2$ = 252 | 253 | 254 | 255 |
|---|---|---|---|---|
| $0, \ldots, N_1 - 1$ | $W^{(3)}_{4i_{1,1},4i_{1,1}+4,0,0,63}$ | $W^{(3)}_{4i_{1,1}+4,4i_{1,1},0,0,63}$ | $\tilde{W}^{(3)}_{4i_{1,1},4i_{1,1}+4,0,0,63}$ | $\tilde{W}^{(3)}_{4i_{1,1}+4,4i_{1,1},0,0,63}$ |
| $N_1, \ldots, 2N_1 - 1$ | $W^{(3)}_{4i_{1,1},4i_{1,1}+8,0,0,63}$ | $W^{(3)}_{4i_{1,1}+8,4i_{1,1},0,0,63}$ | $\tilde{W}^{(3)}_{4i_{1,1},4i_{1,1}+8,0,0,63}$ | $\tilde{W}^{(3)}_{4i_{1,1}+8,4i_{1,1},0,0,63}$ |
| $2N_1, \ldots, 3N_1 - 1$ | $W^{(3)}_{4i_{1,1},4i_{1,1}+12,0,0,63}$ | $W^{(3)}_{4i_{1,1}+12,4i_{1,1},0,0,63}$ | $\tilde{W}^{(3)}_{4i_{1,1},4i_{1,1}+12,0,0,63}$ | $\tilde{W}^{(3)}_{4i_{1,1}+12,4i_{1,1},0,0,63}$ | where $W^{(3)}_{l,l',m,m',k} = \frac{1}{\sqrt{6}} \begin{bmatrix} w_{\frac{o_1}{4}l,\frac{o_2}{4}m,k} & w_{\frac{o_1}{4}l,\frac{o_2}{4}m,k} & w_{\frac{o_1}{4}l',\frac{o_2}{4}m',k} \\ w_{\frac{o_1}{4}l,\frac{o_2}{4}m,k} & -w_{\frac{o_1}{4}l,\frac{o_2}{4}m,k} & -w_{\frac{o_1}{4}l',\frac{o_2}{4}m',k} \end{bmatrix}$, $W^{(3)}_{l,l',m,m',k} = \frac{1}{\sqrt{6}} \begin{bmatrix} w_{\frac{o_1}{4}l,\frac{o_2}{4}m,k} & w_{\frac{o_1}{4}l',\frac{o_2}{4}m',k} & w_{\frac{o_1}{4}l',\frac{o_2}{4}m',k} \\ w_{\frac{o_1}{4}l,\frac{o_2}{4}m,k} & w_{\frac{o_1}{4}l',\frac{o_2}{4}m',k} & -w_{\frac{o_1}{4}l',\frac{o_2}{4}m',k} \end{bmatrix}$ FIG. 21 illustrates an example beam selection followed linear combination pre-coder 2100 according to embodiments of the present disclosure. An embodiment of the beam selection followed linear combination pre-coder 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with the extended LC codebook in which $1 \leq l \leq L$ beam selection is performed first, followed by linear combination of l selected beams, where l=1 implies one beam selection, in which case the codebook reduces to Rel. 13 Class A codebook; and l=L implies all L beam selection, in which case the codebook reduces to the LC codebook proposed earlier in the present disclosure.

An illustration of beam selection followed by linear combination is shown in FIG. 21. As shown, out of L=4 beams, $b_0$, $b_1$, $b_2$, and $b_3$, l=2 beams, $b_0$ and $b_1$, are selected and linear combined using non-zero coefficients $c_0$ and $c_1$, respectively. In one embodiment, a beam selection is WB; hence l (out of L) selected beams do not change across SBs. In this case, the reporting of selected beams can be joint with the first PMI $i_1$ or the first component of the first PMI $i_{1,1}$ or the second component of the first PMI $i_{1,2}$. Alternatively, the selected beams are reported separately as another WB PMI, for example $i_0$.

In another embodiment, a beam selection is SB; hence l (out of L) selected beams change across SBs. In this case, the reporting of selected beams can be joint with the second PMI $i_2$. Alternatively, the selected beams are reported separately as another SB PMI, for example $i_3$.

The rank 1-4 LC pre-coder expressions and codebook tables can be constructed similar to some embodiments of this present disclosure by introducing l out L beam selection.

In some embodiment of A, the UE is configured with an LC codebook with L=2 beams as follows. For 4 antenna ports {15,16,17,18}, 8 antenna ports {15,16,17,18,19,20,21,22}, 12 antenna ports {15,16,17,18,19,20,21,22,23,24,25,26}, 16 antenna ports {15,16,17,18,19,20,21,22,23,24,25,26,27,28,29,30}, 20 antenna ports {15,16,17,18,19,20,21,22,23,24,25,26,27,28,29,30,31,32,33,34}, 24 antenna ports, {15,16,17,18,19,20,21,22,23,24,25,26,27,28,29,30,31,32, 33,34,35,36,37,38} 28 antenna ports {15,16,17,18,19,20,21,22,23,24,25,26,27,28,29,30,31,32,33,34,35,36,37,38,39,40,41,42}, antenna ports {15,16,17,18,19,20,21,22,23,24,25,26,27,28,29,30,31,32,33,34,35,36,37,38,39,40,41,42,43,44,45,46}, and UE configured with higher layer parameters advancedCodebookEnabled and eMIMO-Type, and advancedCodebookEnabled is set to 'TRUE' and eMIMO-Type is set to 'CLASS A', each PMI value corresponds to at least three codebook indices given in TABLE 39 and TABLE 40 for 1-layer and 2-layer CSI reporting, respectively, and Rel. 12 4-Tx rank 3-4 codebook for 3-4 layer CSI reporting for 4 CSI-RS ports, Rel. 10 8-Tx rank 3-8 codebook for 3-8 layer CSI reporting for 1D, 8 CSI-RS ports, and for 3-8 layer CSI reporting for remaining CSI-RS ports, where the quantities $\varphi_n$, $u_m$ and $v_{l,m}$ are given by:

$$\phi_n = e^{j\pi n/2}$$

$$u_m = \begin{bmatrix} 1 & e^{j\frac{2\pi m}{4N_2}} & \cdots & e^{j\frac{2\pi m(N_2-1)}{4N_2}} \end{bmatrix}$$

$$v_{l,m} = \begin{bmatrix} u_m & e^{j\frac{2\pi l}{4N_1}} u_m & \cdots & e^{j\frac{2\pi l(N_1-1)}{4N_1}} u_m \end{bmatrix}^T$$

wherein the CSI feedback configuration information includes a number of dual-polarized CSI-RS ports $P=2N_1N_2$, wherein $N_1$ and $N_2$ comprise a number of CSI-RS ports, respectively, in a first dimension and a second dimension, a first half of the CSI-RS ports corresponds to a first polarization and a second half of the CSI-RS ports corresponds to a second polarization, wherein each half of the CSI-RS ports comprises of $P/2=N_1N_2$ CSI-RS ports, and wherein the LC pre-coder corresponding to a weighted linear combination of a first beam $v_{l,m}$ and a second beam $v_{l+l',m+m'}$ is determined as:

$$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix},$$

wherein p denotes the power of the weight assigned to the second beam, where p takes a value from $\{0, \sqrt[4]{1/4}, \sqrt[4]{1/2}, 1\}$, $\varphi_{n_1}$ denotes a phase of the weight assigned to the second beam for the first half of the CSI-RS ports with the first polarization, and $\varphi_{n_2}$ and $\varphi_{n_3}$ denote a phase of the weights assigned to the first and second beams, respectively, for the second half of the CSI-RS ports with the second polarization.

The values of $N_1$, $N_2$ are configured with the higher-layer parameter codebookConfigig-N1, codebookConfig-N2, respectively. The supported configurations of $(N_1, N_2)$ for a given number of CSI-RS ports are given in TABLE 38. The number of CSI-RS ports, P, is $2N_1N_2$. The oversampling factor $(O_1, O_2)=(4,4)$ if $N_1 > 1$, $N_2 > 1$ and (4,1) if $N_2=1$ for 1 layer and 2 layer CSI reporting, and it is according to legacy up to 14 codebooks for higher than 2 layer CSI reporting A UE may only use $i_{1,2}=0$ and shall not report $i_{1,2}$ if the value of codebookConfigN2 is set to 1.

A first PMI value $i_1$ corresponds to the codebook indices pair $\{i_{1,1}, i_{1,2}\}$, and a second PMI value $i_2$ corresponds to the codebook index $i_2$ given in TABLE 39 and TABLE 40 for RI=1 and 2, respectively, and legacy up to Rel. 14 codebooks for RI>2.

TABLE 38

| Supported configurations ($N_1$, $N_2$) | |
|---|---|
| Number of CSI-RS antenna ports, P | ($N_1$, $N_2$) |
| 4 | (2, 1) |
| 8 | (2, 2) |
|   | (4, 1) |
| 12 | (2, 3) |
|   | (3, 2) |
|   | (6, 1) |
| 16 | (2, 4) |
|   | (4, 2) |
|   | (8, 1) |
| 20 | (2, 5) |
|   | (5, 2) |
|   | (10, 1) |
| 24 | (2, 6) |
|   | (3, 4) |
|   | (4, 3) |
|   | (6, 2) |
|   | (12, 1) |
| 28 | (2, 7) |
|   | (7, 2) |
|   | (14, 1) |
| 32 | (2, 8) |
|   | (4, 4) |
|   | (8, 2) |
|   | (12, 1) |

TABLE 39

Codebook for 1-layer CSI reporting using antenna ports 15 to 14 + P

P = 4
$i_{1,2} = 0$
$i_2 = 0, 1, \ldots, 63$

| $i_{1,1}$ | $N_1 = 2, N_2 = 1$ |
|---|---|
| $0, \ldots, 4N_1 - 1$ | $W^{(1)}_{i_{1,1}, i_{1,1}+O_1, 0, 0, 1, i_2}$ |
| $4N_1, \ldots, 8N_1 - 1$ | $W^{(1)}_{i_{1,1}, i_{1,1}+O_1, 0, 0, 0.5, i_2}$ |
| $8N_1, \ldots, 12N_1 - 1$ | $W^{(1)}_{i_{1,1}, i_{1,1}+O_1, 0, 0, 0.25, i_2}$ |
| $12N_1, \ldots, 16N_1 - 1$ | $W^{(1)}_{i_{1,1}, i_{1,1}+O_1, 0, 0, 0, i_2}$ | where $W^{(1)}_{l,l',m,m',p,n} = \dfrac{x_{l,l',m,m',p} c_n}{\|x_{l,l',m,m',p} c_n\|}$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_n = [\, 1 \ \ c_{n,1} \ \ c_{n,2} \ \ c_{n,3}\,]^T$, $c_{n,r} = \varphi_{\lfloor n/4^{3-r} \rfloor \bmod 4}$

P = 8

$i_{1,2} = 0$ if $N_2 = 1$; $i_{1,2} = 0, 1, \ldots, 4N_2 - 1$ otherwise
$i_2 = 0, 1, \ldots, 63$

| $i_{1,1}$ | $N_1 = N_2 = 2$ | $N_1 = 4, N_2 = 1$ |
|---|---|---|
| $0, \ldots, 4N_1 - 1$ | $W^{(1)}_{i_{1,1}, i_{1,1}+O_1, i_{1,2}, i_{1,2}, 1, i_2}$ | $W^{(1)}_{i_{1,1}, i_{1,1}+O_1, 0, 0, 1, i_2}$ |
| $4N_1, \ldots, 8N_1 - 1$ | $W^{(1)}_{i_{1,1}, i_{1,1}+O_1, i_{1,2}, i_{1,2}, 0.5, i_2}$ | $W^{(1)}_{i_{1,1}, i_{1,1}+O_1, 0, 0, 0.5, i_2}$ |
| $8N_1, \ldots, 12N_1 - 1$ | $W^{(1)}_{i_{1,1}, i_{1,1}+O_1, i_{1,2}, i_{1,2}, 0.25, i_2}$ | $W^{(1)}_{i_{1,1}, i_{1,1}+O_1, 0, 0, 0.25, i_2}$ |
| $12N_1, \ldots, 16N_1 - 1$ | $W^{(1)}_{i_{1,1}, i_{1,1}+O_1, i_{1,2}, i_{1,2}, 0, i_2}$ | $W^{(1)}_{i_{1,1}, i_{1,1}+O_1, 0, 0, 0, i_2}$ |
| $16N_1, \ldots, 20N_1 - 1$ | $W^{(1)}_{i_{1,1}, i_{1,1}+O_1, i_{1,2}, i_{1,2}+O_2, 1, i_2}$ | $W^{(1)}_{i_{1,1}, i_{1,1}+2O_1, 0, 0, 1, i_2}$ |
| $20N_1, \ldots, 24N_1 - 1$ | $W^{(1)}_{i_{1,1}, i_{1,1}+O_1, i_{1,2}, i_{1,2}+O_2, 0.5, i_2}$ | $W^{(1)}_{i_{1,1}, i_{1,1}+2O_1, 0, 0, 0.5, i_2}$ |
| $24N_1, \ldots, 28N_1 - 1$ | $W^{(1)}_{i_{1,1}, i_{1,1}+O_1, i_{1,2}, i_{1,2}+O_2, 0.25, i_2}$ | $W^{(1)}_{i_{1,1}, i_{1,1}+2O_1, 0, 0, 0.25, i_2}$ |
| $28N_1, \ldots, 32N_1 - 1$ | $W^{(1)}_{i_{1,1}, i_{1,1}+O_1, i_{1,2}, i_{1,2}+O_2, 0, i_2}$ | $W^{(1)}_{i_{1,1}, i_{1,1}+2O_1, 0, 0, 0, i_2}$ |
| $32N_1, \ldots, 36N_1 - 1$ | $W^{(1)}_{i_{1,1}, i_{1,1}+O_1, i_{1,2}, i_{1,2}+O_2+1, i_2}$ | $W^{(1)}_{i_{1,1}, i_{1,1}+3O_1, 0, 0, 1, i_2}$ |
| $36N_1, \ldots, 40N_1 - 1$ | $W^{(1)}_{i_{1,1}, i_{1,1}+O_1, i_{1,2}, i_{1,2}+O_2+0.5, i_2}$ | $W^{(1)}_{i_{1,1}, i_{1,1}+3O_1, 0, 0, 0.5, i_2}$ |
| $40N_1, \ldots, 44N_1 - 1$ | $W^{(1)}_{i_{1,1}, i_{1,1}+O_1, i_{1,2}, i_{1,2}+O_2+0.25, i_2}$ | $W^{(1)}_{i_{1,1}, i_{1,1}+3O_1, 0, 0, 0.25, i_2}$ |
| $44N_1, \ldots, 48N_1 - 1$ | $W^{(1)}_{i_{1,1}, i_{1,1}+O_1, i_{1,2}, i_{1,2}+O_2+0, i_2}$ | $W^{(1)}_{i_{1,1}, i_{1,1}+3O_1, 0, 0, 0, i_2}$ | where $W^{(1)}_{l,l',m,m',p,n} = \dfrac{x_{l,l',m,m',p} c_n}{\|x_{l,l',m,m',p} c_n\|}$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_n = [\, 1 \ \ c_{n,1} \ \ c_{n,2} \ \ c_{n,3}\,]^T$, $c_{n,r} = \varphi_{\lfloor n/4^{3-r} \rfloor \bmod 4}$

P = 12

$i_{1,2} = 0$ if $N_2 = 1$; $i_{1,2} = 0, 1, \ldots, 4N_2 - 1$ otherwise
$i_2 = 0, 1, \ldots, 63$

| $i_{1,1}$ | $N_1 \geq N_2 > 1$ | $N_2 > N_1 > 1$ | $N_2 = 1$ |
|---|---|---|---|
| $0, \ldots, 4N_1 - 1$ | $W^{(1)}_{i_{1,1}, i_{1,1}+O_1, i_{1,2}, i_{1,2}, 1, i_2}$ | $W^{(1)}_{i_{1,1}, i_{1,1}, i_{1,2}, i_{1,2}+O_2, 1, i_2}$ | $W^{(1)}_{i_{1,1}, i_{1,1}+O_1, 0, 0, 1, i_2}$ |
| $4N_1, \ldots, 8N_1 - 1$ | $W^{(1)}_{i_{1,1}, i_{1,1}+O_1, i_{1,2}, i_{1,2}, 0.5, i_2}$ | $W^{(1)}_{i_{1,1}, i_{1,1}, i_{1,2}, i_{1,2}+O_2, 0.5, i_2}$ | $W^{(1)}_{i_{1,1}, i_{1,1}+O_1, 0, 0, 0.5, i_2}$ |
| $8N_1, \ldots, 12N_1 - 1$ | $W^{(1)}_{i_{1,1}, i_{1,1}+O_1, i_{1,2}, i_{1,2}, 0.25, i_2}$ | $W^{(1)}_{i_{1,1}, i_{1,1}, i_{1,2}, i_{1,2}+O_2, 0.25, i_2}$ | $W^{(1)}_{i_{1,1}, i_{1,1}+O_1, 0, 0, 0.25, i_2}$ |
| $12N_1, \ldots, 16N_1 - 1$ | $W^{(1)}_{i_{1,1}, i_{1,1}+O_1, i_{1,2}, i_{1,2}, 0, i_2}$ | $W^{(1)}_{i_{1,1}, i_{1,1}, i_{1,2}, i_{1,2}+O_2, 0, i_2}$ | $W^{(1)}_{i_{1,1}, i_{1,1}+O_1, 0, 0, 0, i_2}$ |
| $16N_1, \ldots, 20N_1 - 1$ | $W^{(1)}_{i_{1,1}, i_{1,1}+2O_1, i_{1,2}, i_{1,2}, 1, i_2}$ | $W^{(1)}_{i_{1,1}, i_{1,1}, i_{1,2}, i_{1,2}+2O_2, 1, i_2}$ | $W^{(1)}_{i_{1,1}, i_{1,1}+2O_1, 0, 0, 1, i_2}$ |
| $20N_1, \ldots, 24N_1 - 1$ | $W^{(1)}_{i_{1,1}, i_{1,1}+2O_1, i_{1,2}, i_{1,2}, 0.5, i_2}$ | $W^{(1)}_{i_{1,1}, i_{1,1}, i_{1,2}, i_{1,2}+2O_2, 0.5, i_2}$ | $W^{(1)}_{i_{1,1}, i_{1,1}+2O_1, 0, 0, 0.5, i_2}$ |
| $24N_1, \ldots, 28N_1 - 1$ | $W^{(1)}_{i_{1,1}, i_{1,1}+2O_1, i_{1,2}, i_{1,2}, 0.25, i_2}$ | $W^{(1)}_{i_{1,1}, i_{1,1}, i_{1,2}, i_{1,2}+2O_2, 0.25, i_2}$ | $W^{(1)}_{i_{1,1}, i_{1,1}+2O_1, 0, 0, 0.25, i_2}$ |
| $28N_1, \ldots, 32N_1 - 1$ | $W^{(1)}_{i_{1,1}, i_{1,1}+2O_1, i_{1,2}, i_{1,2}, 0, i_2}$ | $W^{(1)}_{i_{1,1}, i_{1,1}, i_{1,2}, i_{1,2}+2O_2, 0, i_2}$ | $W^{(1)}_{i_{1,1}, i_{1,1}+2O_1, 0, 0, 0, i_2}$ |
| $32N_1, \ldots, 36N_1 - 1$ | $W^{(1)}_{i_{1,1}, i_{1,1}, i_{1,2}, i_{1,2}+O_2+1, i_2}$ | $W^{(1)}_{i_{1,1}, i_{1,1}+O_1, i_{1,2}, i_{1,2}, 1, i_2}$ | $W^{(1)}_{i_{1,1}, i_{1,1}+3O_1, 0, 0, 1, i_2}$ |
| $36N_1, \ldots, 40N_1 - 1$ | $W^{(1)}_{i_{1,1}, i_{1,1}, i_{1,2}, i_{1,2}+O_2+0.5, i_2}$ | $W^{(1)}_{i_{1,1}, i_{1,1}+O_1, i_{1,2}, i_{1,2}, 0.5, i_2}$ | $W^{(1)}_{i_{1,1}, i_{1,1}+3O_1, 0, 0, 0.5, i_2}$ |
| $40N_1, \ldots, 44N_1 - 1$ | $W^{(1)}_{i_{1,1}, i_{1,1}, i_{1,2}, i_{1,2}+O_2+0.25, i_2}$ | $W^{(1)}_{i_{1,1}, i_{1,1}+O_1, i_{1,2}, i_{1,2}, 0.25, i_2}$ | $W^{(1)}_{i_{1,1}, i_{1,1}+3O_1, 0, 0, 0.25, i_2}$ |
| $44N_1, \ldots, 48N_1 - 1$ | $W^{(1)}_{i_{1,1}, i_{1,1}, i_{1,2}, i_{1,2}+O_2+0, i_2}$ | $W^{(1)}_{i_{1,1}, i_{1,1}+O_1, i_{1,2}, i_{1,2}, 0, i_2}$ | $W^{(1)}_{i_{1,1}, i_{1,1}+3O_1, 0, 0, 0, i_2}$ |
| $48N_1, \ldots, 52N_1 - 1$ | $W^{(1)}_{i_{1,1}, i_{1,1}, i_{1,2}, i_{1,2}+O_2, 1, i_2}$ | $W^{(1)}_{i_{1,1}, i_{1,1}+O_1, i_{1,2}, i_{1,2}+O_2, 1, i_2}$ | $W^{(1)}_{i_{1,1}, i_{1,1}+4O_1, 0, 0, 1, i_2}$ |
| $52N_1, \ldots, 56N_1 - 1$ | $W^{(1)}_{i_{1,1}, i_{1,1}+O_1, i_{1,2}, i_{1,2}+O_2, 0.5, i_2}$ | $W^{(1)}_{i_{1,1}, i_{1,1}+O_1, i_{1,2}, i_{1,2}+O_2, 0.5, i_2}$ | $W^{(1)}_{i_{1,1}, i_{1,1}+4O_1, 0, 0, 0.5, i_2}$ |
| $56N_1, \ldots, 60N_1 - 1$ | $W^{(1)}_{i_{1,1}, i_{1,1}+O_1, i_{1,2}, i_{1,2}+O_2, 0.25, i_2}$ | $W^{(1)}_{i_{1,1}, i_{1,1}+O_1, i_{1,2}, i_{1,2}+O_2, 0.25, i_2}$ | $W^{(1)}_{i_{1,1}, i_{1,1}+4O_1, 0, 0, 0.25, i_2}$ |
| $60N_1, \ldots, 64N_1 - 1$ | $W^{(1)}_{i_{1,1}, i_{1,1}+O_1, i_{1,2}, i_{1,2}+O_2, 0, i_2}$ | $W^{(1)}_{i_{1,1}, i_{1,1}+O_1, i_{1,2}, i_{1,2}+O_2, 0, i_2}$ | $W^{(1)}_{i_{1,1}, i_{1,1}+4O_1, 0, 0, 0, i_2}$ |
| $64N_1, \ldots, 68N_1 - 1$ | $W^{(1)}_{i_{1,1}, i_{1,1}+2O_1, i_{1,2}, i_{1,2}+O_2, 1, i_2}$ | $W^{(1)}_{i_{1,1}, i_{1,1}+O_1, i_{1,2}, i_{1,2}+2O_2, 1, i_2}$ | $W^{(1)}_{i_{1,1}, i_{1,1}+5O_1, 0, 0, 1, i_2}$ |

TABLE 39-continued

Codebook for 1-layer CSI reporting using antenna ports 15 to 14 + P

| | | |
|---|---|---|
| $68N_1, \ldots, 72N_1 - 1$ | $W^{(1)}_{i_{1,1},i_{1,1}+2O_1,i_{1,2},i_{1,2}+O_2,0.5,i_2}$ | $W^{(1)}_{i_{1,1},i_{1,1}+O_1,i_{1,2},i_{1,2}+2O_2,0.5,i_2}$ | $W^{(1)}_{i_{1,1},i_{1,1}+5O_1,0,0,0.5,i_2}$ |
| $72N_1, \ldots, 76N_1 - 1$ | $W^{(1)}_{i_{1,1},i_{1,1}+2O_1,i_{1,2},i_{1,2}+O_2,0.25,i_2}$ | $W^{(1)}_{i_{1,1},i_{1,1}+O_1,i_{1,2},i_{1,2}+2O_2,0.25,i_2}$ | $W^{(1)}_{i_{1,1},i_{1,1}+5O_1,0,0,0.25,i_2}$ |
| $76N_1, \ldots, 80N_1 - 1$ | $W^{(1)}_{i_{1,1},i_{1,1}+2O_1,i_{1,2},i_{1,2}+O_2,0,i_2}$ | $W^{(1)}_{i_{1,1},i_{1,1}+O_1,i_{1,2},i_{1,2}+2O_2,0,i_2}$ | $W^{(1)}_{i_{1,1},i_{1,1}+5O_1,0,0,0,i_2}$ | where $W^{(1)}_{l,l',m,m',p,n} = \dfrac{x_{l,l',m,m',p}c_n}{\|x_{l,l',m,m',p}c_n\|}$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$c_n = [\, 1 \; c_{n,1} \; c_{n,2} \; c_{n,3} \,]^T$, $c_{n,r} = \varphi_{\lfloor n/4^{3-r} \rfloor \bmod 4}$

---

$P = 16, 20, 24, 28, 32$
$i_{1,2} = 0$ if $N_2 = 1$; $i_{1,2} = 0, 1, \ldots, 4N_2 - 1$ otherwise
$i_2 = 0, 1, \ldots, 63$

| $i_{1,1}$ | $N_1 \geq N_2 > 1$ | $N_2 > N_1 > 1$ | $N_1 \geq 8, N_2 = 1$ |
|---|---|---|---|
| $0, \ldots, 4N_1 - 1$ | $W^{(1)}_{i_{1,1},i_{1,1}+O_1,i_{1,2},i_{1,2}+O_2,1,i_2}$ | $W^{(1)}_{i_{1,1},i_{1,1},i_{1,2},i_{1,2}+O_2,1,i_2}$ | $W^{(1)}_{i_{1,1},i_{1,1}+O_1,0,0,1,i_2}$ |
| $4N_1, \ldots, 8N_1 - 1$ | $W^{(1)}_{i_{1,1},i_{1,1}+O_1,i_{1,2},i_{1,2},0.5,i_2}$ | $W^{(1)}_{i_{1,1},i_{1,1},i_{1,2},i_{1,2}+O_2,0.5,i_2}$ | $W^{(1)}_{i_{1,1},i_{1,1}+O_1,0,0,0.5,i_2}$ |
| $8N_1, \ldots, 12N_1 - 1$ | $W^{(1)}_{i_{1,1},i_{1,1}+O_1,i_{1,2},i_{1,2},0.25,i_2}$ | $W^{(1)}_{i_{1,1},i_{1,1},i_{1,2},i_{1,2}+O_2,0.25,i_2}$ | $W^{(1)}_{i_{1,1},i_{1,1}+O_1,0,0,0.25,i_2}$ |
| $12N_1, \ldots, 16N_1 - 1$ | $W^{(1)}_{i_{1,1},i_{1,1}+O_1,i_{1,2},i_{1,2},0,i_2}$ | $W^{(1)}_{i_{1,1},i_{1,1},i_{1,2},i_{1,2}+O_2,0,i_2}$ | $W^{(1)}_{i_{1,1},i_{1,1}+O_1,0,0,0,i_2}$ |
| $16N_1, \ldots, 20N_1 - 1$ | $W^{(1)}_{i_{1,1},i_{1,1}+2O_1,i_{1,2},i_{1,2},1,i_2}$ | $W^{(1)}_{i_{1,1},i_{1,1},i_{1,2},i_{1,2}+2O_2,1,i_2}$ | $W^{(1)}_{i_{1,1},i_{1,1}+2O_1,0,0,1,i_2}$ |
| $20N_1, \ldots, 24N_1 - 1$ | $W^{(1)}_{i_{1,1},i_{1,1}+2O_1,i_{1,2},i_{1,2},0.5,i_2}$ | $W^{(1)}_{i_{1,1},i_{1,1},i_{1,2},i_{1,2}+2O_2,0.5,i_2}$ | $W^{(1)}_{i_{1,1},i_{1,1}+2O_1,0,0,0.5,i_2}$ |
| $24N_1, \ldots, 28N_1 - 1$ | $W^{(1)}_{i_{1,1},i_{1,1}+2O_1,i_{1,2},i_{1,2},0.25,i_2}$ | $W^{(1)}_{i_{1,1},i_{1,1},i_{1,2},i_{1,2}+2O_2,0.25,i_2}$ | $W^{(1)}_{i_{1,1},i_{1,1}+2O_1,0,0,0.25,i_2}$ |
| $28N_1, \ldots, 32N_1 - 1$ | $W^{(1)}_{i_{1,1},i_{1,1}+2O_1,i_{1,2},i_{1,2},0,i_2}$ | $W^{(1)}_{i_{1,1},i_{1,1},i_{1,2},i_{1,2}+2O_2,0,i_2}$ | $W^{(1)}_{i_{1,1},i_{1,1}+2O_1,0,0,0,i_2}$ |
| $32N_1, \ldots, 36N_1 - 1$ | $W^{(1)}_{i_{1,1},i_{1,1}+3O_1,i_{1,2},i_{1,2},1,i_2}$ | $W^{(1)}_{i_{1,1},i_{1,1},i_{1,2},i_{1,2}+3O_2,1,i_2}$ | $W^{(1)}_{i_{1,1},i_{1,1}+3O_1,0,0,1,i_2}$ |
| $36N_1, \ldots, 40N_1 - 1$ | $W^{(1)}_{i_{1,1},i_{1,1}+3O_1,i_{1,2},i_{1,2},0.5,i_2}$ | $W^{(1)}_{i_{1,1},i_{1,1},i_{1,2},i_{1,2}+3O_2,0.5,i_2}$ | $W^{(1)}_{i_{1,1},i_{1,1}+3O_1,0,0,0.5,i_2}$ |
| $40N_1, \ldots, 44N_1 - 1$ | $W^{(1)}_{i_{1,1},i_{1,1}+3O_1,i_{1,2},i_{1,2},0.25,i_2}$ | $W^{(1)}_{i_{1,1},i_{1,1},i_{1,2},i_{1,2}+3O_2,0.25,i_2}$ | $W^{(1)}_{i_{1,1},i_{1,1}+3O_1,0,0,0.25,i_2}$ |
| $44N_1, \ldots, 48N_1 - 1$ | $W^{(1)}_{i_{1,1},i_{1,1}+3O_1,i_{1,2},i_{1,2},0,i_2}$ | $W^{(1)}_{i_{1,1},i_{1,1},i_{1,2},i_{1,2}+3O_2,0,i_2}$ | $W^{(1)}_{i_{1,1},i_{1,1}+3O_1,0,0,0,i_2}$ |
| $48N_1, \ldots, 52N_1 - 1$ | $W^{(1)}_{i_{1,1},i_{1,1},i_{1,2},i_{1,2}+O_2,1,i_2}$ | $W^{(1)}_{i_{1,1},i_{1,1}+O_1,i_{1,2},i_{1,2},1,i_2}$ | $W^{(1)}_{i_{1,1},i_{1,1}+4O_1,0,0,1,i_2}$ |
| $52N_1, \ldots, 56N_1 - 1$ | $W^{(1)}_{i_{1,1},i_{1,1},i_{1,2},i_{1,2}+O_2,0.5,i_2}$ | $W^{(1)}_{i_{1,1},i_{1,1}+O_1,i_{1,2},i_{1,2},0.5,i_2}$ | $W^{(1)}_{i_{1,1},i_{1,1}+4O_1,0,0,0.5,i_2}$ |
| $56N_1, \ldots, 60N_1 - 1$ | $W^{(1)}_{i_{1,1},i_{1,1},i_{1,2},i_{1,2}+O_2,0.25,i_2}$ | $W^{(1)}_{i_{1,1},i_{1,1}+O_1,i_{1,2},i_{1,2},0.25,i_2}$ | $W^{(1)}_{i_{1,1},i_{1,1}+4O_1,0,0,0.25,i_2}$ |
| $60N_1, \ldots, 64N_1 - 1$ | $W^{(1)}_{i_{1,1},i_{1,1},i_{1,2},i_{1,2}+O_2,0,i_2}$ | $W^{(1)}_{i_{1,1},i_{1,1}+O_1,i_{1,2},i_{1,2},0,i_2}$ | $W^{(1)}_{i_{1,1},i_{1,1}+4O_1,0,0,0,i_2}$ |
| $64N_1, \ldots, 68N_1 - 1$ | $W^{(1)}_{i_{1,1},i_{1,1}+O_1,i_{1,2},i_{1,2}+O_2,1,i_2}$ | $W^{(1)}_{i_{1,1},i_{1,1}+O_1,i_{1,2},i_{1,2}+O_2,1,i_2}$ | $W^{(1)}_{i_{1,1},i_{1,1}+5O_1,0,0,1,i_2}$ |
| $68N_1, \ldots, 72N_1 - 1$ | $W^{(1)}_{i_{1,1},i_{1,1}+O_1,i_{1,2},i_{1,2}+O_2,0.5,i_2}$ | $W^{(1)}_{i_{1,1},i_{1,1}+O_1,i_{1,2},i_{1,2}+O_2,0.5,i_2}$ | $W^{(1)}_{i_{1,1},i_{1,1}+5O_1,0,0,0.5,i_2}$ |
| $72N_1, \ldots, 76N_1 - 1$ | $W^{(1)}_{i_{1,1},i_{1,1}+O_1,i_{1,2},i_{1,2}+O_2,0.25,i_2}$ | $W^{(1)}_{i_{1,1},i_{1,1}+O_1,i_{1,2},i_{1,2}+O_2,0.25,i_2}$ | $W^{(1)}_{i_{1,1},i_{1,1}+5O_1,0,0,0.25,i_2}$ |
| $76N_1, \ldots, 80N_1 - 1$ | $W^{(1)}_{i_{1,1},i_{1,1}+O_1,i_{1,2},i_{1,2}+O_2,0,i_2}$ | $W^{(1)}_{i_{1,1},i_{1,1}+O_1,i_{1,2},i_{1,2}+O_2,0,i_2}$ | $W^{(1)}_{i_{1,1},i_{1,1}+5O_1,0,0,0,i_2}$ |
| $80N_1, \ldots, 84N_1 - 1$ | $W^{(1)}_{i_{1,1},i_{1,1}+2O_1,i_{1,2},i_{1,2}+O_2,1,i_2}$ | $W^{(1)}_{i_{1,1},i_{1,1}+O_1,i_{1,2},i_{1,2}+2O_2,1,i_2}$ | $W^{(1)}_{i_{1,1},i_{1,1}+6O_1,0,0,1,i_2}$ |
| $84N_1, \ldots, 88N_1 - 1$ | $W^{(1)}_{i_{1,1},i_{1,1}+2O_1,i_{1,2},i_{1,2}+O_2,0.5,i_2}$ | $W^{(1)}_{i_{1,1},i_{1,1}+O_1,i_{1,2},i_{1,2}+2O_2,0.5,i_2}$ | $W^{(1)}_{i_{1,1},i_{1,1}+6O_1,0,0,0.5,i_2}$ |
| $88N_1, \ldots, 92N_1 - 1$ | $W^{(1)}_{i_{1,1},i_{1,1}+2O_1,i_{1,2},i_{1,2}+O_2,0.25,i_2}$ | $W^{(1)}_{i_{1,1},i_{1,1}+O_1,i_{1,2},i_{1,2}+2O_2,0.25,i_2}$ | $W^{(1)}_{i_{1,1},i_{1,1}+6O_1,0,0,0.25,i_2}$ |
| $92N_1, \ldots, 96N_1 - 1$ | $W^{(1)}_{i_{1,1},i_{1,1}+2O_1,i_{1,2},i_{1,2}+O_2,0,i_2}$ | $W^{(1)}_{i_{1,1},i_{1,1}+O_1,i_{1,2},i_{1,2}+2O_2,0,i_2}$ | $W^{(1)}_{i_{1,1},i_{1,1}+6O_1,0,0,0,i_2}$ |
| $96N_1, \ldots, 100N_1 - 1$ | $W^{(1)}_{i_{1,1},i_{1,1}+3O_1,i_{1,2},i_{1,2}+O_2,1,i_2}$ | $W^{(1)}_{i_{1,1},i_{1,1}+O_1,i_{1,2},i_{1,2}+3O_2,1,i_2}$ | $W^{(1)}_{i_{1,1},i_{1,1}+7O_1,0,0,1,i_2}$ |
| $100N_1, \ldots, 104N_1 - 1$ | $W^{(1)}_{i_{1,1},i_{1,1}+3O_1,i_{1,2},i_{1,2}+O_2,0.5,i_2}$ | $W^{(1)}_{i_{1,1},i_{1,1}+O_1,i_{1,2},i_{1,2}+3O_2,0.5,i_2}$ | $W^{(1)}_{i_{1,1},i_{1,1}+7O_1,0,0,0.5,i_2}$ |
| $104N_1, \ldots, 108N_1 - 1$ | $W^{(1)}_{i_{1,1},i_{1,1}+3O_1,i_{1,2},i_{1,2}+O_2,0.25,i_2}$ | $W^{(1)}_{i_{1,1},i_{1,1}+O_1,i_{1,2},i_{1,2}+3O_2,0.25,i_2}$ | $W^{(1)}_{i_{1,1},i_{1,1}+7O_1,0,0,0.25,i_2}$ |
| $108N_1, \ldots, 112N_1 - 1$ | $W^{(1)}_{i_{1,1},i_{1,1}+3O_1,i_{1,2},i_{1,2}+O_2,0,i_2}$ | $W^{(1)}_{i_{1,1},i_{1,1}+O_1,i_{1,2},i_{1,2}+3O_2,0,i_2}$ | $W^{(1)}_{i_{1,1},i_{1,1}+7O_1,0,0,0,i_2}$ | where $W^{(1)}_{l,l',m,m',p,n} = \dfrac{x_{l,l',m,m',p}c_n}{\|x_{l,l',m,m',p}c_n\|}$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$c_n = [\, 1 \; c_{n,1} \; c_{n,2} \; c_{n,3} \,]^T$, $c_{n,r} = \varphi_{\lfloor n/4^{3-r} \rfloor \bmod 4}$

TABLE 40

Codebook for 2-layer CSI reporting using antenna ports 15 to 14 + P $P = 4$
$i_{1,2} = 0$
$i_2 = 0, 1, \ldots, 4095$

| $i_{1,1}$ | $N_1 = 2, N_2 = 1$ |
|---|---|
| $0, \ldots, 4N_1 - 1$ | $W^{(2)}_{i_{1,1},i_{1,1}+O_1,0,0,1,i_2}$ |
| $4N_1, \ldots, 8N_1 - 1$ | $W^{(2)}_{i_{1,1},i_{1,1}+O_1,0,0,0.5,i_2}$ |

TABLE 40-continued

Codebook for 2-layer CSI reporting using antenna ports 15 to 14 + P

| | |
|---|---|
| $8N_1, \ldots, 12N_1 - 1$ | $W^{(2)}_{i_{1,1},i_{1,1}+O_1,0,0,0.25,i_2}$ |
| $12N_1, \ldots, 16N_1 - 1$ | $W^{(2)}_{i_{1,1},i_{1,1}+O_1,0,0,0,i_2}$ | where $W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right]$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = [\,1 \;\; c_{n,0,1} \;\; c_{n,0,2} \;\; c_{n,0,3}\,]^T$, $c_{n,0,r} = \varphi_{\lfloor n/4^{3-r}\rfloor \bmod 4}$ $c_{n,1} = [\,1 \;\; c_{n,1,1} \;\; c_{n,1,2} \;\; c_{n,1,3}\,]^T$, $c_{n,1,r} = \varphi_{\lfloor n/4^{6-r}\rfloor \bmod 4}$ P = 8
$i_{1,2} = 0$ if $N_2 = 1$; $i_{1,2} = 0, 1, \ldots, 4N_2 - 1$ otherwise
$i_2 = 0, 1, \ldots, 4095$

| $i_{1,1}$ | $N_1 = N_2 = 2$ | $N_1 = 4, N_2 = 1$ |
|---|---|---|
| $0, \ldots, 4N_1 - 1$ | $W^{(2)}_{i_{1,1},i_{1,1}+O_1,i_{1,2},i_{1,2},1,i_2}$ | $W^{(2)}_{i_{1,1},i_{1,1}+O_1,0,0,1,i_2}$ |
| $4N_1, \ldots, 8N_1 - 1$ | $W^{(2)}_{i_{1,1},i_{1,1}+O_1,i_{1,2},i_{1,2},0.5,i_2}$ | $W^{(2)}_{i_{1,1},i_{1,1}+O_1,0,0,0.5,i_2}$ |
| $8N_1, \ldots, 12N_1 - 1$ | $W^{(2)}_{i_{1,1},i_{1,1}+O_1,i_{1,2},i_{1,2},0.25,i_2}$ | $W^{(2)}_{i_{1,1},i_{1,1}+O_1,0,0,0.25,i_2}$ |
| $12N_1, \ldots, 16N_1 - 1$ | $W^{(2)}_{i_{1,1},i_{1,1}+O_1,i_{1,2},i_{1,2},0,i_2}$ | $W^{(1)}_{i_{1,1},i_{1,1}+O_1,0,0,0,i_2}$ |
| $16N_1, \ldots, 20N_1 - 1$ | $W^{(2)}_{i_{1,1},i_{1,1},i_{1,2},i_{1,2}+O_2,1,i_2}$ | $W^{(2)}_{i_{1,1},i_{1,1}+2O_1,0,0,1,i_2}$ |
| $20N_1, \ldots, 24N_1 - 1$ | $W^{(2)}_{i_{1,1},i_{1,1},i_{1,2},i_{1,2}+O_2,0.5,i_2}$ | $W^{(2)}_{i_{1,1},i_{1,1}+2O_1,0,0,0.5,i_2}$ |
| $24N_1, \ldots, 28N_1 - 1$ | $W^{(2)}_{i_{1,1},i_{1,1},i_{1,2},i_{1,2}+O_2,0.25,i_2}$ | $W^{(2)}_{i_{1,1},i_{1,1}+2O_1,0,0,0.25,i_2}$ |
| $28N_1, \ldots, 32N_1 - 1$ | $W^{(2)}_{i_{1,1},i_{1,1},i_{1,2},i_{1,2}+O_2,0,i_2}$ | $W^{(2)}_{i_{1,1},i_{1,1}+2O_1,0,0,0,i_2}$ |
| $32N_1, \ldots, 36N_1 - 1$ | $W^{(2)}_{i_{1,1},i_{1,1}+O_1,i_{1,2},i_{1,2}+O_2,1,i_2}$ | $W^{(2)}_{i_{1,1},i_{1,1}+3O_1,0,0,1,i_2}$ |
| $36N_1, \ldots, 40N_1 - 1$ | $W^{(2)}_{i_{1,1},i_{1,1}+O_1,i_{1,2},i_{1,2}+O_2,0.5,i_2}$ | $W^{(2)}_{i_{1,1},i_{1,1}+3O_1,0,0,0.5,i_2}$ |
| $40N_1, \ldots, 44N_1 - 1$ | $W^{(2)}_{i_{1,1},i_{1,1}+O_1,i_{1,2},i_{1,2}+O_2,0.25,i_2}$ | $W^{(2)}_{i_{1,1},i_{1,1}+3O_1,0,0,0.25,i_2}$ |
| $44N_1, \ldots, 48N_1 - 1$ | $W^{(2)}_{i_{1,1},i_{1,1}+O_1,i_{1,2},i_{1,2}+O_2,0,i_2}$ | $W^{(2)}_{i_{1,1},i_{1,1}+3O_1,0,0,0,i_2}$ | where $W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right]$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = [\,1 \;\; c_{n,0,1} \;\; c_{n,0,2} \;\; c_{n,0,3}\,]^T$, $c_{n,0,r} = \varphi_{\lfloor n/4^{3-r}\rfloor \bmod 4}$ $c_{n,1} = [\,1 \;\; c_{n,1,1} \;\; c_{n,1,2} \;\; c_{n,1,3}\,]^T$, $c_{n,1,r} = \varphi_{\lfloor n/4^{6-r}\rfloor \bmod 4}$ P = 12
$i_{1,2} = 0$ if $N_2 = 1$; $i_{1,2} = 0, 1, \ldots, 4N_2 - 1$ otherwise
$i_2 = 0, 1, \ldots, 4095$

| $i_{1,1}$ | $N_1 \geq N_2 > 1$ | $N_2 > N_1 > 1$ | $N_2 = 1$ |
|---|---|---|---|
| $0, \ldots, 4N_1 - 1$ | $W^{(2)}_{i_{1,1},i_{1,1}+O_1,i_{1,2},i_{1,2},1,i_2}$ | $W^{(2)}_{i_{1,1},i_{1,1},i_{1,2},i_{1,2}+O_2,1,i_2}$ | $W^{(2)}_{i_{1,1},i_{1,1}+O_1,0,0,1,i_2}$ |
| $4N_1, \ldots, 8N_1 - 1$ | $W^{(2)}_{i_{1,1},i_{1,1}+O_1,i_{1,2},i_{1,2},0.5,i_2}$ | $W^{(2)}_{i_{1,1},i_{1,1},i_{1,2},i_{1,2}+O_2,0.5,i_2}$ | $W^{(2)}_{i_{1,1},i_{1,1}+O_1,0,0,0.5,i_2}$ |
| $8N_1, \ldots, 12N_1 - 1$ | $W^{(2)}_{i_{1,1},i_{1,1}+O_1,i_{1,2},i_{1,2},0.25,i_2}$ | $W^{(2)}_{i_{1,1},i_{1,1},i_{1,2},i_{1,2}+O_2,0.25,i_2}$ | $W^{(2)}_{i_{1,1},i_{1,1}+O_1,0,0,0.25,i_2}$ |
| $12N_1, \ldots, 16N_1 - 1$ | $W^{(2)}_{i_{1,1},i_{1,1}+O_1,i_{1,2},i_{1,2},0,i_2}$ | $W^{(2)}_{i_{1,1},i_{1,1},i_{1,2},i_{1,2}+O_2,0,i_2}$ | $W^{(2)}_{i_{1,1},i_{1,1}+O_1,0,0,0,i_2}$ |
| $16N_1, \ldots, 20N_1 - 1$ | $W^{(2)}_{i_{1,1},i_{1,1}+2O_1,i_{1,2},i_{1,2},1,i_2}$ | $W^{(2)}_{i_{1,1},i_{1,1},i_{1,2},i_{1,2}+2O_2,1,i_2}$ | $W^{(2)}_{i_{1,1},i_{1,1}+2O_1,0,0,1,i_2}$ |
| $20N_1, \ldots, 24N_1 - 1$ | $W^{(2)}_{i_{1,1},i_{1,1}+2O_1,i_{1,2},i_{1,2},0.5,i_2}$ | $W^{(2)}_{i_{1,1},i_{1,1},i_{1,2},i_{1,2}+2O_2,0.5,i_2}$ | $W^{(2)}_{i_{1,1},i_{1,1}+2O_1,0,0,0.5,i_2}$ |
| $24N_1, \ldots, 28N_1 - 1$ | $W^{(2)}_{i_{1,1},i_{1,1}+2O_1,i_{1,2},i_{1,2},0.25,i_2}$ | $W^{(2)}_{i_{1,1},i_{1,1},i_{1,2},i_{1,2}+2O_2,0.25,i_2}$ | $W^{(2)}_{i_{1,1},i_{1,1}+2O_1,0,0,0.25,i_2}$ |
| $28N_1, \ldots, 32N_1 - 1$ | $W^{(2)}_{i_{1,1},i_{1,1}+2O_1,i_{1,2},i_{1,2},0,i_2}$ | $W^{(2)}_{i_{1,1},i_{1,1},i_{1,2},i_{1,2}+2O_2,0,i_2}$ | $W^{(2)}_{i_{1,1},i_{1,1}+2O_1,0,0,0,i_2}$ |
| $32N_1, \ldots, 36N_1 - 1$ | $W^{(2)}_{i_{1,1},i_{1,1},i_{1,2},i_{1,2}+O_2,1,i_2}$ | $W^{(2)}_{i_{1,1},i_{1,1}+O_1,i_{1,2},i_{1,2},1,i_2}$ | $W^{(2)}_{i_{1,1},i_{1,1}+3O_1,0,0,1,i_2}$ |
| $36N_1, \ldots, 40N_1 - 1$ | $W^{(2)}_{i_{1,1},i_{1,1},i_{1,2},i_{1,2}+O_2,0.5,i_2}$ | $W^{(2)}_{i_{1,1},i_{1,1}+O_1,i_{1,2},i_{1,2},0.5,i_2}$ | $W^{(2)}_{i_{1,1},i_{1,1}+3O_1,0,0,0.5,i_2}$ |
| $40N_1, \ldots, 44N_1 - 1$ | $W^{(2)}_{i_{1,1},i_{1,1},i_{1,2},i_{1,2}+O_2,0.25,i_2}$ | $W^{(2)}_{i_{1,1},i_{1,1}+O_1,i_{1,2},i_{1,2},0.25,i_2}$ | $W^{(2)}_{i_{1,1},i_{1,1}+3O_1,0,0,0.25,i_2}$ |
| $44N_1, \ldots, 48N_1 - 1$ | $W^{(2)}_{i_{1,1},i_{1,1},i_{1,2},i_{1,2}+O_2,0,i_2}$ | $W^{(2)}_{i_{1,1},i_{1,1}+O_1,i_{1,2},i_{1,2},0,i_2}$ | $W^{(2)}_{i_{1,1},i_{1,1}+3O_1,0,0,0,i_2}$ |
| $48N_1, \ldots, 52N_1 - 1$ | $W^{(2)}_{i_{1,1},i_{1,1},i_{1,2},i_{1,2}+2O_2,1,i_2}$ | $W^{(2)}_{i_{1,1},i_{1,1}+O_1,i_{1,2},i_{1,2}+2O_2,1,i_2}$ | $W^{(2)}_{i_{1,1},i_{1,1}+4O_1,0,0,1,i_2}$ |
| $52N_1, \ldots, 56N_1 - 1$ | $W^{(2)}_{i_{1,1},i_{1,1}+O_1,i_{1,2},i_{1,2}+2O_2,0.5,i_2}$ | $W^{(2)}_{i_{1,1},i_{1,1}+O_1,i_{1,2},i_{1,2}+2O_2,0.5,i_2}$ | $W^{(2)}_{i_{1,1},i_{1,1}+4O_1,0,0,0.5,i_2}$ |
| $56N_1, \ldots, 60N_1 - 1$ | $W^{(2)}_{i_{1,1},i_{1,1}+O_1,i_{1,2},i_{1,2}+2O_2,0.25,i_2}$ | $W^{(2)}_{i_{1,1},i_{1,1}+O_1,i_{1,2},i_{1,2}+2O_2,0.25,i_2}$ | $W^{(2)}_{i_{1,1},i_{1,1}+4O_1,0,0,0.25,i_2}$ |

TABLE 40-continued

Codebook for 2-layer CSI reporting using antenna ports 15 to 14 + P

| | | | |
|---|---|---|---|
| $60N_1, \ldots, 64N_1 - 1$ | $W^{(2)}_{i_{1,1},i_{1,1}+O_1,i_{1,2},i_{1,2}+O_2,0,i_2}$ | $W^{(2)}_{i_{1,1},i_{1,1}+O_1,i_{1,2},i_{1,2}+O_2,0,i_2}$ | $W^{(2)}_{i_{1,1},i_{1,1}+4O_1,0,0,0,i_2}$ |
| $64N_1, \ldots, 68N_1 - 1$ | $W^{(2)}_{i_{1,1},i_{1,1}+2O_1,i_{1,2},i_{1,2}+O_2,1,i_2}$ | $W^{(2)}_{i_{1,1},i_{1,1}+O_1,i_{1,2},i_{1,2}+O_2,1,i_2}$ | $W^{(2)}_{i_{1,1},i_{1,1}+5O_1,0,0,1,i_2}$ |
| $68N_1, \ldots, 72N_1 - 1$ | $W^{(2)}_{i_{1,1},i_{1,1}+2O_1,i_{1,2},i_{1,2}+O_2,0.5,i_2}$ | $W^{(2)}_{i_{1,1},i_{1,1}+O_1,i_{1,2},i_{1,2}+2O_2,0.5,i_2}$ | $W^{(2)}_{i_{1,1},i_{1,1}+5O_1,0,0,0.5,i_2}$ |
| $72N_1, \ldots, 76N_1 - 1$ | $W^{(2)}_{i_{1,1},i_{1,1}+2O_1,i_{1,2},i_{1,2}+O_2,0.25,i_2}$ | $W^{(2)}_{i_{1,1},i_{1,1}+O_1,i_{1,2},i_{1,2}+2O_2,0.25,i_2}$ | $W^{(2)}_{i_{1,1},i_{1,1}+5O_1,0,0,0.25,i_2}$ |
| $76N_1, \ldots, 80N_1 - 1$ | $W^{(2)}_{i_{1,1},i_{1,1}+2O_1,i_{1,2},i_{1,2}+O_2,0,i_2}$ | $W^{(2)}_{i_{1,1},i_{1,1}+O_1,i_{1,2},i_{1,2}+2O_2,0,i_2}$ | $W^{(2)}_{i_{1,1},i_{1,1}+5O_1,0,0,0,i_2}$ | where $W^{(2)}_{l,l',m,m',p,n} = \frac{1}{\sqrt{2}} \left[ \frac{x_{l,l',m,m',p} c_{n,0}}{\|x_{l,l',m,m',p} c_{n,0}\|}, \frac{x_{l,l',m,m',p} c_{n,1}}{\|x_{l,l',m,m',p} c_{n,1}\|} \right]$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = [\, 1 \quad c_{n,0,1} \quad c_{n,0,2} \quad c_{n,0,3} \,]^T$, $c_{n,0,r} = \varphi_{\lfloor n/4^{3-r} \rfloor \bmod 4}$ $c_{n,1} = [\, 1 \quad c_{n,1,1} \quad c_{n,1,2} \quad c_{n,1,3} \,]^T$, $c_{n,1,r} = \varphi_{\lfloor n/4^{6-r} \rfloor \bmod 4}$ P = 16, 20, 24, 28, 32
$i_{1,2} = 0$ if $N_2 = 1$; $i_{1,2} = 0, 1, \ldots, 4N_2 - 1$ otherwise
$i_2 = 0, 1, \ldots, 4095$

| $i_{1,1}$ | $N_1 \geq N_2 > 1$ | $N_2 > N_1 > 1$ | $N_1 \geq 8, N_2 = 1$ |
|---|---|---|---|
| $0, \ldots, 4N_1 - 1$ | $W^{(2)}_{i_{1,1},i_{1,1}+O_1,i_{1,2},i_{1,2},1,i_2}$ | $W^{(2)}_{i_{1,1},i_{1,1},i_{1,2},i_{1,2}+O_2,1,i_2}$ | $W^{(2)}_{i_{1,1},i_{1,1}+O_1,0,0,1,i_2}$ |
| $4N_1, \ldots, 8N_1 - 1$ | $W^{(2)}_{i_{1,1},i_{1,1}+O_1,i_{1,2},i_{1,2},0.5,i_2}$ | $W^{(2)}_{i_{1,1},i_{1,1},i_{1,2},i_{1,2}+O_2,0.5,i_2}$ | $W^{(2)}_{i_{1,1},i_{1,1}+O_1,0,0,0.5,i_2}$ |
| $8N_1, \ldots, 12N_1 - 1$ | $W^{(2)}_{i_{1,1},i_{1,1}+O_1,i_{1,2},i_{1,2},0.25,i_2}$ | $W^{(2)}_{i_{1,1},i_{1,1},i_{1,2},i_{1,2}+O_2,0.25,i_2}$ | $W^{(2)}_{i_{1,1},i_{1,1}+O_1,0,0,0.25,i_2}$ |
| $12N_1, \ldots, 16N_1 - 1$ | $W^{(2)}_{i_{1,1},i_{1,1}+O_1,i_{1,2},i_{1,2},0,i_2}$ | $W^{(2)}_{i_{1,1},i_{1,1},i_{1,2},i_{1,2}+O_2,0,i_2}$ | $W^{(2)}_{i_{1,1},i_{1,1}+O_1,0,0,0,i_2}$ |
| $16N_1, \ldots, 20N_1 - 1$ | $W^{(2)}_{i_{1,1},i_{1,1}+2O_1,i_{1,2},i_{1,2},1,i_2}$ | $W^{(2)}_{i_{1,1},i_{1,1},i_{1,2},i_{1,2}+2O_2,1,i_2}$ | $W^{(2)}_{i_{1,1},i_{1,1}+2O_1,0,0,1,i_2}$ |
| $20N_1, \ldots, 24N_1 - 1$ | $W^{(2)}_{i_{1,1},i_{1,1}+2O_1,i_{1,2},i_{1,2},0.5,i_2}$ | $W^{(2)}_{i_{1,1},i_{1,1},i_{1,2},i_{1,2}+2O_2,0.5,i_2}$ | $W^{(2)}_{i_{1,1},i_{1,1}+2O_1,0,0,0.5,i_2}$ |
| $24N_1, \ldots, 28N_1 - 1$ | $W^{(2)}_{i_{1,1},i_{1,1}+2O_1,i_{1,2},i_{1,2},0.25,i_2}$ | $W^{(2)}_{i_{1,1},i_{1,1},i_{1,2},i_{1,2}+2O_2,0.25,i_2}$ | $W^{(2)}_{i_{1,1},i_{1,1}+2O_1,0,0,0.25,i_2}$ |
| $28N_1, \ldots, 32N_1 - 1$ | $W^{(2)}_{i_{1,1},i_{1,1}+2O_1,i_{1,2},i_{1,2},0,i_2}$ | $W^{(2)}_{i_{1,1},i_{1,1},i_{1,2},i_{1,2}+2O_2,0,i_2}$ | $W^{(2)}_{i_{1,1},i_{1,1}+2O_1,0,0,0,i_2}$ |
| $32N_1, \ldots, 36N_1 - 1$ | $W^{(2)}_{i_{1,1},i_{1,1}+3O_1,i_{1,2},i_{1,2},1,i_2}$ | $W^{(2)}_{i_{1,1},i_{1,1},i_{1,2},i_{1,2}+3O_2,1,i_2}$ | $W^{(2)}_{i_{1,1},i_{1,1}+3O_1,0,0,1,i_2}$ |
| $36N_1, \ldots, 40N_1 - 1$ | $W^{(2)}_{i_{1,1},i_{1,1}+3O_1,i_{1,2},i_{1,2},0.5,i_2}$ | $W^{(2)}_{i_{1,1},i_{1,1},i_{1,2},i_{1,2}+3O_2,0.5,i_2}$ | $W^{(2)}_{i_{1,1},i_{1,1}+3O_1,0,0,0.5,i_2}$ |
| $40N_1, \ldots, 44N_1 - 1$ | $W^{(2)}_{i_{1,1},i_{1,1}+3O_1,i_{1,2},i_{1,2},0.25,i_2}$ | $W^{(2)}_{i_{1,1},i_{1,1},i_{1,2},i_{1,2}+3O_2,0.25,i_2}$ | $W^{(2)}_{i_{1,1},i_{1,1}+3O_1,0,0,0.25,i_2}$ |
| $44N_1, \ldots, 48N_1 - 1$ | $W^{(2)}_{i_{1,1},i_{1,1}+3O_1,i_{1,2},i_{1,2},0,i_2}$ | $W^{(2)}_{i_{1,1},i_{1,1},i_{1,2},i_{1,2}+3O_2,0,i_2}$ | $W^{(2)}_{i_{1,1},i_{1,1}+3O_1,0,0,0,i_2}$ |
| $48N_1, \ldots, 52N_1 - 1$ | $W^{(2)}_{i_{1,1},i_{1,1},i_{1,2},i_{1,2}+O_2,1,i_2}$ | $W^{(2)}_{i_{1,1},i_{1,1}+O_1,i_{1,2},i_{1,2},1,i_2}$ | $W^{(2)}_{i_{1,1},i_{1,1}+4O_1,0,0,1,i_2}$ |
| $52N_1, \ldots, 56N_1 - 1$ | $W^{(2)}_{i_{1,1},i_{1,1},i_{1,2},i_{1,2}+O_2,0.5,i_2}$ | $W^{(2)}_{i_{1,1},i_{1,1}+O_1,i_{1,2},i_{1,2},0.5,i_2}$ | $W^{(2)}_{i_{1,1},i_{1,1}+4O_1,0,0,0.5,i_2}$ |
| $56N_1, \ldots, 60N_1 - 1$ | $W^{(2)}_{i_{1,1},i_{1,1},i_{1,2},i_{1,2}+O_2,0.25,i_2}$ | $W^{(2)}_{i_{1,1},i_{1,1}+O_1,i_{1,2},i_{1,2},0.25,i_2}$ | $W^{(2)}_{i_{1,1},i_{1,1}+4O_1,0,0,0.25,i_2}$ |
| $60N_1, \ldots, 64N_1 - 1$ | $W^{(2)}_{i_{1,1},i_{1,1},i_{1,2},i_{1,2}+O_2,0,i_2}$ | $W^{(2)}_{i_{1,1},i_{1,1}+O_1,i_{1,2},i_{1,2},0,i_2}$ | $W^{(2)}_{i_{1,1},i_{1,1}+4O_1,0,0,0,i_2}$ |
| $64N_1, \ldots, 68N_1 - 1$ | $W^{(2)}_{i_{1,1},i_{1,1}+O_1,i_{1,2},i_{1,2}+O_2,1,i_2}$ | $W^{(2)}_{i_{1,1},i_{1,1}+O_1,i_{1,2},i_{1,2}+O_2,1,i_2}$ | $W^{(2)}_{i_{1,1},i_{1,1}+5O_1,0,0,1,i_2}$ |
| $68N_1, \ldots, 72N_1 - 1$ | $W^{(2)}_{i_{1,1},i_{1,1}+O_1,i_{1,2},i_{1,2}+O_2,0.5,i_2}$ | $W^{(2)}_{i_{1,1},i_{1,1}+O_1,i_{1,2},i_{1,2}+O_2,0.5,i_2}$ | $W^{(2)}_{i_{1,1},i_{1,1}+5O_1,0,0,0.5,i_2}$ |
| $72N_1, \ldots, 76N_1 - 1$ | $W^{(2)}_{i_{1,1},i_{1,1}+O_1,i_{1,2},i_{1,2}+O_2,0.25,i_2}$ | $W^{(2)}_{i_{1,1},i_{1,1}+O_1,i_{1,2},i_{1,2}+O_2,0.25,i_2}$ | $W^{(2)}_{i_{1,1},i_{1,1}+5O_1,0,0,0.25,i_2}$ |
| $76N_1, \ldots, 80N_1 - 1$ | $W^{(2)}_{i_{1,1},i_{1,1}+O_1,i_{1,2},i_{1,2}+O_2,0,i_2}$ | $W^{(2)}_{i_{1,1},i_{1,1}+O_1,i_{1,2},i_{1,2}+O_2,0,i_2}$ | $W^{(2)}_{i_{1,1},i_{1,1}+5O_1,0,0,0,i_2}$ |
| $80N_1, \ldots, 84N_1 - 1$ | $W^{(2)}_{i_{1,1},i_{1,1}+2O_1,i_{1,2},i_{1,2}+O_2,1,i_2}$ | $W^{(2)}_{i_{1,1},i_{1,1}+O_1,i_{1,2},i_{1,2}+2O_2,1,i_2}$ | $W^{(2)}_{i_{1,1},i_{1,1}+6O_1,0,0,1,i_2}$ |
| $84N_1, \ldots, 88N_1 - 1$ | $W^{(2)}_{i_{1,1},i_{1,1}+2O_1,i_{1,2},i_{1,2}+O_2,0.5,i_2}$ | $W^{(2)}_{i_{1,1},i_{1,1}+O_1,i_{1,2},i_{1,2}+2O_2,0.5,i_2}$ | $W^{(2)}_{i_{1,1},i_{1,1}+6O_1,0,0,0.5,i_2}$ |
| $88N_1, \ldots, 92N_1 - 1$ | $W^{(2)}_{i_{1,1},i_{1,1}+2O_1,i_{1,2},i_{1,2}+O_2,0.25,i_2}$ | $W^{(2)}_{i_{1,1},i_{1,1}+O_1,i_{1,2},i_{1,2}+2O_2,0.25,i_2}$ | $W^{(2)}_{i_{1,1},i_{1,1}+6O_1,0,0,0.25,i_2}$ |
| $92N_1, \ldots, 96N_1 - 1$ | $W^{(2)}_{i_{1,1},i_{1,1}+2O_1,i_{1,2},i_{1,2}+O_2,0,i_2}$ | $W^{(2)}_{i_{1,1},i_{1,1}+O_1,i_{1,2},i_{1,2}+2O_2,0,i_2}$ | $W^{(2)}_{i_{1,1},i_{1,1}+6O_1,0,0,0,i_2}$ |
| $96N_1, \ldots, 100N_1 - 1$ | $W^{(2)}_{i_{1,1},i_{1,1}+3O_1,i_{1,2},i_{1,2}+O_2,1,i_2}$ | $W^{(2)}_{i_{1,1},i_{1,1}+O_1,i_{1,2},i_{1,2}+3O_2,1,i_2}$ | $W^{(2)}_{i_{1,1},i_{1,1}+7O_1,0,0,1,i_2}$ |
| $100N_1, \ldots, 104N_1 - 1$ | $W^{(2)}_{i_{1,1},i_{1,1}+3O_1,i_{1,2},i_{1,2}+O_2,0.5,i_2}$ | $W^{(2)}_{i_{1,1},i_{1,1}+O_1,i_{1,2},i_{1,2}+3O_2,0.5,i_2}$ | $W^{(2)}_{i_{1,1},i_{1,1}+7O_1,0,0,0.5,i_2}$ |
| $104N_1, \ldots, 108N_1 - 1$ | $W^{(2)}_{i_{1,1},i_{1,1}+3O_1,i_{1,2},i_{1,2}+O_2,0.25,i_2}$ | $W^{(2)}_{i_{1,1},i_{1,1}+O_1,i_{1,2},i_{1,2}+3O_2,0.25,i_2}$ | $W^{(2)}_{i_{1,1},i_{1,1}+7O_1,0,0,0.25,i_2}$ |
| $108N_1, \ldots, 112N_1 - 1$ | $W^{(2)}_{i_{1,1},i_{1,1}+3O_1,i_{1,2},i_{1,2}+O_2,0,i_2}$ | $W^{(2)}_{i_{1,1},i_{1,1}+O_1,i_{1,2},i_{1,2}+3O_2,0,i_2}$ | $W^{(2)}_{i_{1,1},i_{1,1}+7O_1,0,0,0,i_2}$ | where $W^{(2)}_{l,l',m,m',p,n} = \frac{1}{\sqrt{2}} \left[ \frac{x_{l,l',m,m',p} c_{n,0}}{\|x_{l,l',m,m',p} c_{n,0}\|}, \frac{x_{l,l',m,m',p} c_{n,1}}{\|x_{l,l',m,m',p} c_{n,1}\|} \right]$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = [\, 1 \quad c_{n,0,1} \quad c_{n,0,2} \quad c_{n,0,3} \,]^T$, $c_{n,0,r} = \varphi_{\lfloor n/4^{3-r} \rfloor \bmod 4}$ $c_{n,1} = [\, 1 \quad c_{n,1,1} \quad c_{n,1,2} \quad c_{n,1,3} \,]^T$, $c_{n,1,r} = \varphi_{\lfloor n/4^{6-r} \rfloor \bmod 4}$ In one embodiment of A-0, the UE is configured with an LC codebook in which the rank 1 and rank 2 codebook tables for three cases $N_1 \geq N_2 > 1$, $N_2 \geq N_1 > 1$, and $N_2 = 1$ are three separate codebook tables. Such separate codebook tables can be constructed by selecting respective columns from TABLE 39 and TABLE 40.

In one embodiment of B, the UE is configured with an alternative LC codebook TABLE 41 and TABLE 42 for rank 1 and 2, respectively. The rest of the details are the same as in Embodiment A.

TABLE 41

| Codebook for 1-layer CSI reporting using antenna ports 15 to 14 + P | | |
|---|---|---|
| $i_{1,2} = 0$ if $N_2 = 1$; $i_{1,2} = 0, 1, \ldots, 4N_2 - 1$ otherwise | | |
| $i_2 = 0, 1, \ldots, 63$ | | |
| $i_{1,1}, 0, \ldots, 4N_1 - 1$ | | |
| $N_1 \geq N_2 > 1$ | $N_2 > N_1 > 1$ | $N_2 = 1$ |
| $W_{i_{1,1},i_{1,1}+O_1,i_{1,2},i_{1,2},1,i_2}^{(1)}$ | $W_{i_{1,1},i_{1,1},i_{1,2},i_{1,2}+O_2,1,i_2}^{(1)}$ | $W_{i_{1,1},i_{1,1}+O_1,0,0,1,i_2}^{(1)}$ |
| $i_{1,1}, 4N_1, \ldots, 8N_1 - 1$ | | |
| $N_1 \geq N_2 > 1$ | $N_2 > N_1 > 1$ | $N_2 = 1$ |
| $W_{i_{1,1},i_{1,1}+O_1,i_{1,2},i_{1,2},0.5,i_2}^{(1)}$ | $W_{i_{1,1},i_{1,1},i_{1,2},i_{1,2}+O_2,0.5,i_2}^{(1)}$ | $W_{i_{1,1},i_{1,1}+O_1,0,0,0.5,i_2}^{(1)}$ |
| $i_{1,1}, 8N_1, \ldots, 12N_1 - 1$ | | |
| $N_1 \geq N_2 > 1$ | $N_2 > N_1 > 1$ | $N_2 = 1$ |
| $W_{i_{1,1},i_{1,1}+O_1,i_{1,2},i_{1,2},0.25,i_2}^{(1)}$ | $W_{i_{1,1},i_{1,1},i_{1,2},i_{1,2}+O_2,0.25,i_2}^{(1)}$ | $W_{i_{1,1},i_{1,1}+O_1,0,0,0.25,i_2}^{(1)}$ |
| $i_{1,1}, 12N_1, \ldots, 16N_1 - 1$ | | |
| $N_1 \geq N_2 > 1$ | $N_2 > N_1 > 1$ | $N_2 = 1$ |
| $W_{i_{1,1},i_{1,1}+O_1,i_{1,2},i_{1,2},0,i_2}^{(1)}$ | $W_{i_{1,1},i_{1,1},i_{1,2},i_{1,2}+O_2,0,i_2}^{(1)}$ | $W_{i_{1,1},i_{1,1}+O_1,0,0,0,i_2}^{(1)}$ |
| $i_{1,1}, 16N_1, \ldots, 20N_1 - 1$ | | |
| $N_1 \geq N_2 > 1$ | $N_2 > N_1 > 1$ | $N_2 = 1$ |
| $W_{i_{1,1},i_{1,1}+2O_1,i_{1,2},i_{1,2},1,i_2}^{(1)}$ | $W_{i_{1,1},i_{1,1},i_{1,2},i_{1,2}+2O_2,1,i_2}^{(1)}$ | $W_{i_{1,1},i_{1,1}+2O_1,0,0,1,i_2}^{(1)}$ |
| $i_{1,1}, 20N_1, \ldots, 24N_1 - 1$ | | |
| $N_1 \geq N_2 > 1$ | $N_2 > N_1 > 1$ | $N_2 = 1$ |
| $W_{i_{1,1},i_{1,1}+2O_1,i_{1,2},i_{1,2},0.5,i_2}^{(1)}$ | $W_{i_{1,1},i_{1,1},i_{1,2},i_{1,2}+2O_2,0.5,i_2}^{(1)}$ | $W_{i_{1,1},i_{1,1}+2O_1,0,0,0.5,i_2}^{(1)}$ |
| $i_{1,1}, 24N_1, \ldots, 28N_1 - 1$ | | |
| $N_1 \geq N_2 > 1$ | $N_2 > N_1 > 1$ | $N_2 = 1$ |
| $W_{i_{1,1},i_{1,1}+2O_1,i_{1,2},i_{1,2},0.25,i_2}^{(1)}$ | $W_{i_{1,1},i_{1,1},i_{1,2},i_{1,2}+2O_2,0.25,i_2}^{(1)}$ | $W_{i_{1,1},i_{1,1}+2O_1,0,0,0.25,i_2}^{(1)}$ |
| $i_{1,1}, 28N_1, \ldots, 32N_1 - 1$ | | |
| $N_1 \geq N_2 > 1$ | $N_2 > N_1 > 1$ | $N_2 = 1$ |
| $W_{i_{1,1},i_{1,1}+2O_1,i_{1,2},i_{1,2},0,i_2}^{(1)}$ | $W_{i_{1,1},i_{1,1},i_{1,2},i_{1,2}+2O_2,0,i_2}^{(1)}$ | $W_{i_{1,1},i_{1,1}+2O_1,0,0,0,i_2}^{(1)}$ |
| ... | ... | ... |
| $i_{1,1}, 16(x-1)N_1, \ldots, (16x-12)N_1 - 1$ | | |
| $N_1 \geq N_2 > 1$ | $N_2 > N_1 > 1$ | $N_2 = 1$ |
| $W_{i_{1,1},i_{1,1}+(d_1-1)O_1,i_{1,2},i_{1,2},1,i_2}^{(1)}$ | $W_{i_{1,1},i_{1,1},i_{1,2},i_{1,2}+(d_2-1)O_2,1,i_2}^{(1)}$ | $W_{i_{1,1},i_{1,1}+(d_1/2-1)O_1,0,0,1,i_2}^{(1)}$ |
| $i_{1,1}, 16(x-12)N_1, \ldots, (16x-8)N_1 - 1$ | | |
| $N_1 \geq N_2 > 1$ | $N_2 > N_1 > 1$ | $N_2 = 1$ |
| $W_{i_{1,1},i_{1,1}+(d_1-1)O_1,i_{1,2},i_{1,2},0.5,i_2}^{(1)}$ | $W_{i_{1,1},i_{1,1},i_{1,2},i_{1,2}+(d_2-1)O_2,0.5,i_2}^{(1)}$ | $W_{i_{1,1},i_{1,1}+(d_1/2-1)O_1,0,0,0.5,i_2}^{(1)}$ |

TABLE 41-continued

Codebook for 1-layer CSI reporting using antenna ports 15 to 14 + P

| $i_{1,1}$, $16(x-8)N_1, \ldots, (16x-4)N_1-1$ | | |
|---|---|---|
| $N_1 \geq N_2 > 1$ | $N_2 > N_1 > 1$ | $N_2 = 1$ |
| $W_{i_{1,1},i_{1,1}+(d_1-1)O_1,i_{1,2},i_{1,2},0.25,i_2}^{(1)}$ | $W_{i_{1,1},i_{1,1},i_{1,2},i_{1,2}+(d_2-1)O_2,0.25,i_2}^{(1)}$ | $W_{i_{1,1},i_{1,1}+(d_1/2-1)O_1,0,0,0.25,i_2}^{(1)}$ |

| $i_{1,1}$, $16(x-4)N_1, \ldots, 16xN_1-1$ | | |
|---|---|---|
| $N_1 \geq N_2 > 1$ | $N_2 > N_1 > 1$ | $N_2 = 1$ |
| $W_{i_{1,1},i_{1,1}+(d_1-1)O_1,i_{1,2},i_{1,2},0,i_2}^{(1)}$ | $W_{i_{1,1},i_{1,1},i_{1,2},i_{1,2}+(d_2-1)O_2,0,i_2}^{(1)}$ | $W_{i_{1,1},i_{1,1}+(d_1/2-1)O_1,0,0,0,i_2}^{(1)}$ |

| $i_{1,1}$, $16xN_1, \ldots, 16(x+4)N_1-1$ | | |
|---|---|---|
| $N_1 \geq N_2 > 1$ | $N_2 > N_1 > 1$ | $N_2 = 1$ |
| $W_{i_{1,1},i_{1,1},i_{1,2},i_{1,2}+O_2,1,i_2}^{(1)}$ | $W_{i_{1,1},i_{1,1}+O_1,i_{1,2},i_{1,2},1,i_2}^{(1)}$ | $W_{i_{1,1},i_{1,1}+(d_1/2)O_1,0,0,1,i_2}^{(1)}$ |

| $i_{1,1}$, $16(x+4)N_1, \ldots, 16(x+8)N_1-1$ | | |
|---|---|---|
| $N_1 \geq N_2 > 1$ | $N_2 > N_1 > 1$ | $N_2 = 1$ |
| $W_{i_{1,1},i_{1,1},i_{1,2},i_{1,2}+O_2,0.5,i_2}^{(1)}$ | $W_{i_{1,1},i_{1,1}+O_1,i_{1,2},i_{1,2},0.5,i_2}^{(1)}$ | $W_{i_{1,1},i_{1,1}+(d_1/2)O_1,0,0,0.5,i_2}^{(1)}$ |

| $i_{1,1}$, $16(x+8)N_1, \ldots, 16(x+12)N_1-1$ | | |
|---|---|---|
| $N_1 \geq N_2 > 1$ | $N_2 > N_1 > 1$ | $N_2 = 1$ |
| $W_{i_{1,1},i_{1,1},i_{1,2},i_{1,2}+O_2,0.25,i_2}^{(1)}$ | $W_{i_{1,1},i_{1,1}+O_1,i_{1,2},i_{1,2},0.25,i_2}^{(1)}$ | $W_{i_{1,1},i_{1,1}+(d_1/2)O_1,0,0,0.25,i_2}^{(1)}$ |

| $i_{1,1}$, $16(x+12)N_1, \ldots, 16(x+16)N_1-1$ | | |
|---|---|---|
| $N_1 \geq N_2 > 1$ | $N_2 > N_1 > 1$ | $N_2 = 1$ |
| $W_{i_{1,1},i_{1,1},i_{1,2},i_{1,2}+O_2,0,i_2}^{(1)}$ | $W_{i_{1,1},i_{1,1}+O_1,i_{1,2},i_{1,2},0,i_2}^{(1)}$ | $W_{i_{1,1},i_{1,1}+(d_1/2)O_1,0,0,0,i_2}^{(1)}$ |

| $i_{1,1}$, $16(x+16)N_1, \ldots, 16(x+20)N_1-1$ | | |
|---|---|---|
| $N_1 \geq N_2 > 1$ | $N_2 > N_1 > 1$ | $N_2 = 1$ |
| $W_{i_{1,1},i_{1,1}+O_1,i_{1,2},i_{1,2}+O_2,1,i_2}^{(1)}$ | $W_{i_{1,1},i_{1,1}+O_1,i_{1,2},i_{1,2}+O_2,1,i_2}^{(1)}$ | $W_{i_{1,1},i_{1,1}+(d_1/2+1)O_1,0,0,1,i_2}^{(1)}$ |

| $i_{1,1}$, $16(x+20)N_1, \ldots, 16(x+24)N_1-1$ | | |
|---|---|---|
| $N_1 \geq N_2 > 1$ | $N_2 > N_1 > 1$ | $N_2 = 1$ |
| $W_{i_{1,1},i_{1,1}+O_1,i_{1,2},i_{1,2}+O_2,0.5,i_2}^{(1)}$ | $W_{i_{1,1},i_{1,1}+O_1,i_{1,2},i_{1,2}+O_2,0.5,i_2}^{(1)}$ | $W_{i_{1,1},i_{1,1}+(d_1/2+1)O_1,0,0,0.5,i_2}^{(1)}$ |

| $i_{1,1}$, $16(x+24)N_1, \ldots, 16(x+28)N_1-1$ | | |
|---|---|---|
| $N_1 \geq N_2 > 1$ | $N_2 > N_1 > 1$ | $N_2 = 1$ |
| $W_{i_{1,1},i_{1,1}+O_1,i_{1,2},i_{1,2}+O_2,0.25,i_2}^{(1)}$ | $W_{i_{1,1},i_{1,1}+O_1,i_{1,2},i_{1,2}+O_2,0.25,i_2}^{(1)}$ | $W_{i_{1,1},i_{1,1}+(d_1/2+1)O_1,0,0,0.25,i_2}^{(1)}$ |

| $i_{1,1}$, $16(x+28)N_1, \ldots, 16(x+32)N_1-1$ | | |
|---|---|---|
| $N_1 \geq N_2 > 1$ | $N_2 > N_1 > 1$ | $N_2 = 1$ |
| $W_{i_{1,1},i_{1,1}+O_1,i_{1,2},i_{1,2}+O_2,0,i_2}^{(1)}$ | $W_{i_{1,1},i_{1,1}+O_1,i_{1,2},i_{1,2},0,i_2}^{(1)}$ | $W_{i_{1,1},i_{1,1}+(d_1/2+1)O_1,0,0,0,i_2}^{(1)}$ |

| $i_{1,1}$, $16(x+y-1)N_1, \ldots, (16(x+y)-12)N_1-1$ | | |
|---|---|---|
| $N_1 \geq N_2 > 1$ | $N_2 > N_1 > 1$ | $N_2 = 1$ |
| ... | ... | ... |
| $W_{i_{1,1},i_{1,1}+(d_1-1)O_1,i_{1,2},i_{1,2}+O_2,1,i_2}^{(1)}$ | $W_{i_{1,1},i_{1,1}+O_1,i_{1,2},i_{1,2}+(d_2-1)O_2,1,i_2}^{(1)}$ | $W_{i_{1,1},i_{1,1}+(d_1-1)O_1,0,0,1,i_2}^{(1)}$ |

| $i_{1,1}$, $(16(x+y)-12)N_1, \ldots, (16(x+y)-8)N_1-1$ | | |
|---|---|---|
| $N_1 \geq N_2 > 1$ | $N_2 > N_1 > 1$ | $N_2 = 1$ |
| $W_{i_{1,1},i_{1,1}+(d_1-1)O_1,i_{1,2},i_{1,2}+O_2,0.5,i_2}^{(1)}$ | $W_{i_{1,1},i_{1,1}+O_1,i_{1,2},i_{1,2}+(d_2-1)O_2,0.5,i_2}^{(1)}$ | $W_{i_{1,1},i_{1,1}+(d_1-1)O_1,0,0,0.5,i_2}^{(1)}$ |

TABLE 41-continued

Codebook for 1-layer CSI reporting using antenna ports 15 to 14 + P $i_{1,1}, (16(x+y) - 8)N_1, \ldots, (16(x+y) - 4)N_1 - 1$

| $N_1 \geq N_2 > 1$ | $N_2 > N_1 > 1$ | $N_2 = 1$ |
|---|---|---|
| $W^{(1)}_{i_{1,1},i_{1,1}+(d_1-1)O_1,i_{1,2},i_{1,2}+O_2,0.25,i_2}$ | $W^{(1)}_{i_{1,1},i_{1,1}+O_1,i_{1,2},i_{1,2}+(d_2-1)O_2,0.25,i_2}$ | $W^{(1)}_{i_{1,1},i_{1,1}+(d_1-1)O_1,0,0,0.25,i_2}$ |

$i_{1,1}, (16(x+y) - 4)N_1, \ldots, 16(x+y)N_1 - 1$

| $N_1 \geq N_2 > 1$ | $N_2 > N_1 > 1$ | $N_2 = 1$ |
|---|---|---|
| $W^{(1)}_{i_{1,1},i_{1,1}+(d_1-1)O_1,i_{1,2},i_{1,2}+O_2,0,i_2}$ | $W^{(1)}_{i_{1,1},i_{1,1}+O_1,i_{1,2},i_{1,2}+(d_2-1)O_2,0,i_2}$ | $W^{(1)}_{i_{1,1},i_{1,1}+(d_1-1)O_1,0,0,0,i_2}$ |

Where $d_1 = \min(N_1, 4)$, $(x, y) = (d_1, 2)$ if $N_1 \geq N_2 > 1$
$d_2 = \min(N_2, 4)$, $(x, y) = (2, d_2)$ if $N_2 > N_1 > 1$
$d_1 = \min(N_1, 8)$, $(x, y) = (d_1, 1)$ if $N_2 = 1$ $$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$c_n = [\, 1 \ \ c_{n,1} \ \ c_{n,2} \ \ c_{n,3}\,]^T$, $c_{n,r} = \varphi_{\lfloor n/4^{3-r} \rfloor \bmod 4}$

TABLE 42

Codebook for 2-layer CSI reporting using antenna ports 15 to 14 + P $i_{1,2} = 0$ if $N_2 = 1$; $i_{1,2} = 0, 1, \ldots, 4N_2 - 1$ otherwise
$i_2 = 0, 1, \ldots, 4095$
$i_{1,1}, 0, \ldots, 4N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+O_1,i_{1,2},i_{1,2},1,i_2}$ | $W^{(2)}_{i_{1,1},i_{1,1},i_{1,2},i_{1,2}+O_2,1,i_2}$ | $W^{(2)}_{i_{1,1},i_{1,1}+O_1,0,0,1,i_2}$ |

$i_{1,1}, 4N_1, \ldots, 8N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+O_1,i_{1,2},i_{1,2},0.5,i_2}$ | $W^{(2)}_{i_{1,1},i_{1,1},i_{1,2},i_{1,2}+O_2,0.5,i_2}$ | $W^{(2)}_{i_{1,1},i_{1,1}+O_1,0,0,0.5,i_2}$ |

$i_{1,1}, 8N_1, \ldots, 12N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+O_1,i_{1,2},i_{1,2},0.25,i_2}$ | $W^{(2)}_{i_{1,1},i_{1,1},i_{1,2},i_{1,2}+O_2,0.25,i_2}$ | $W^{(2)}_{i_{1,1},i_{1,1}+O_1,0,0,0.25,i_2}$ |

$i_{1,1}, 12N_1, \ldots, 16N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+O_1,i_{1,2},i_{1,2},0,i_2}$ | $W^{(2)}_{i_{1,1},i_{1,1},i_{1,2},i_{1,2}+O_2,0,i_2}$ | $W^{(2)}_{i_{1,1},i_{1,1}+O_1,0,0,0,i_2}$ |

$i_{1,1}, 16N_1, \ldots, 20N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+2O_1,i_{1,2},i_{1,2},1,i_2}$ | $W^{(2)}_{i_{1,1},i_{1,1},i_{1,2},i_{1,2}+2O_2,1,i_2}$ | $W^{(2)}_{i_{1,1},i_{1,1}+2O_1,0,0,1,i_2}$ |

$i_{1,1}, 20N_1, \ldots, 24N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+2O_1,i_{1,2},i_{1,2},0.5,i_2}$ | $W^{(2)}_{i_{1,1},i_{1,1},i_{1,2},i_{1,2}+2O_2,0.5,i_2}$ | $W^{(2)}_{i_{1,1},i_{1,1}+2O_1,0,0,0.5,i_2}$ |

$i_{1,1}, 24N_1, \ldots, 28N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+2O_1,i_{1,2},i_{1,2},0.25,i_2}$ | $W^{(2)}_{i_{1,1},i_{1,1},i_{1,2},i_{1,2}+2O_2,0.25,i_2}$ | $W^{(2)}_{i_{1,1},i_{1,1}+2O_1,0,0,0.25,i_2}$ |

TABLE 42-continued

Codebook for 2-layer CSI reporting using antenna ports 15 to 14 + P

| \multicolumn{3}{c}{$i_{1,1}, 28N_1, \ldots, 32N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+2O_1,i_{1,2},i_{1,2},0,i_2}$ | $W^{(2)}_{i_{1,1},i_{1,1},i_{1,2},i_{1,2}+2O_2,0,i_2}$ | $W^{(2)}_{i_{1,1},i_{1,1}+2O_1,0,0,0,i_2}$ |
| ... | ... | ... |

| \multicolumn{3}{c}{$i_{1,1}, 16(x - 1)N_1, \ldots, (16x - 12)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+(d_1-1)O_1,i_{1,2},i_{1,2},1,i_2}$ | $W^{(2)}_{i_{1,1},i_{1,1},i_{1,2},i_{1,2}+(d_2-1)O_2,1,i_2}$ | $W^{(2)}_{i_{1,1},i_{1,1}+(d_1/2-1)O_1,0,0,0,i_2}$ |

| \multicolumn{3}{c}{$i_{1,1}, 16(x - 12)N_1, \ldots, (16x - 8)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+(d_1-1)O_1,i_{1,2},i_{1,2},0.5,i_2}$ | $W^{(2)}_{i_{1,1},i_{1,1},i_{1,2},i_{1,2}+(d_2-1)O_2,0.5,i_2}$ | $W^{(2)}_{i_{1,1},i_{1,1}+(d_1/2-1)O_1,0,0,0.5,i_2}$ |

| \multicolumn{3}{c}{$i_{1,1}, 16(x - 8)N_1, \ldots, (16x - 4)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+(d_1-1)O_1,i_{1,2},i_{1,2},0.25,i_2}$ | $W^{(2)}_{i_{1,1},i_{1,1},i_{1,2},i_{1,2}+(d_2-1)O_2,0.25,i_2}$ | $W^{(2)}_{i_{1,1},i_{1,1}+(d_1/2-1)O_1,0,0,0.25,i_2}$ |

| \multicolumn{3}{c}{$i_{1,1}, 16(x - 4)N_1, \ldots, 16xN_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+(d_1-1)O_1,i_{1,2},i_{1,2},0,i_2}$ | $W^{(2)}_{i_{1,1},i_{1,1},i_{1,2},i_{1,2}+(d_2-1)O_2,0,i_2}$ | $W^{(2)}_{i_{1,1},i_{1,1}+(d_1/2-1)O_1,0,0,0,i_2}$ |

| \multicolumn{3}{c}{$i_{1,1}, 16xN_1, \ldots, 16(x + 4)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1},i_{1,2},i_{1,2}+O_2,1,i_2}$ | $W^{(2)}_{i_{1,1},i_{1,1}+O_1,i_{1,2},i_{1,2},1,i_2}$ | $W^{(2)}_{i_{1,1},i_{1,1}+(d_1/2)O_1,0,0,1,i_2}$ |

| \multicolumn{3}{c}{$i_{1,1}, 16(x + 4)N_1, \ldots, 16(x + 8)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1},i_{1,2},i_{1,2}+O_2,0.5,i_2}$ | $W^{(2)}_{i_{1,1},i_{1,1}+O_1,i_{1,2},i_{1,2},0.5,i_2}$ | $W^{(2)}_{i_{1,1},i_{1,1}+(d_1/2)O_1,0,0,0.5,i_2}$ |

| \multicolumn{3}{c}{$i_{1,1}, 16(x + 8)N_1, \ldots, 16(x + 12)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1},i_{1,2},i_{1,2}+O_2,0.25,i_2}$ | $W^{(2)}_{i_{1,1},i_{1,1}+O_1,i_{1,2},i_{1,2},0.25,i_2}$ | $W^{(2)}_{i_{1,1},i_{1,1}+(d_1/2)O_1,0,0,0.25,i_2}$ |

| \multicolumn{3}{c}{$i_{1,1}, 16(x + 12)N_1, \ldots, 16(x + 16)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1},i_{1,2},i_{1,2}+O_2,0,i_2}$ | $W^{(2)}_{i_{1,1},i_{1,1}+O_1,i_{1,2},i_{1,2},0,i_2}$ | $W^{(2)}_{i_{1,1},i_{1,1}+(d_1/2)O_1,0,0,0,i_2}$ |

| \multicolumn{3}{c}{$i_{1,1}, 16(x + 16)N_1, \ldots, 16(x + 20)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+O_1,i_{1,2},i_{1,2}+O_2,1,i_2}$ | $W^{(2)}_{i_{1,1},i_{1,1}+O_1,i_{1,2},i_{1,2}+O_2,1,i_2}$ | $W^{(2)}_{i_{1,1},i_{1,1}+(d_1/2+1)O_1,0,0,1,i_2}$ |

| \multicolumn{3}{c}{$i_{1,1}, 16(x + 20)N_1, \ldots, 16(x + 24)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+O_1,i_{1,2},i_{1,2}+O_2,0.5,i_2}$ | $W^{(2)}_{i_{1,1},i_{1,1}+O_1,i_{1,2},i_{1,2}+O_2,0.5,i_2}$ | $W^{(2)}_{i_{1,1},i_{1,1}+(d_1/2+1)O_1,0,0,0.5,i_2}$ |

| \multicolumn{3}{c}{$i_{1,1}, 16(x + 24)N_1, \ldots, 16(x + 28)N_1 - 1$} |
|---|---|---|
| $N_1 \geq N_2 > 1$ | $N_2 > N_1 > 1$ | $N_2 = 1$ |
| $W^{(2)}_{i_{1,1},i_{1,1}+O_1,i_{1,2},i_{1,2}+O_2,0.25,i_2}$ | $W^{(2)}_{i_{1,1},i_{1,1}+O_1,i_{1,2},i_{1,2}+O_2,0.25,i_2}$ | $W^{(2)}_{i_{1,1},i_{1,1}+(d_1/2+1)O_1,0,0,0.25,i_2}$ |

TABLE 42-continued

Codebook for 2-layer CSI reporting using antenna ports 15 to 14 + P $i_{1,1}, 16(x + 28)N_1, \ldots, 16(x + 32)N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+O_1,i_{1,2},i_{1,2}+O_2,0,i_2}$ | $W^{(2)}_{i_{1,1},i_{1,1}+O_1,i_{1,2},i_{1,2}+O_2,0,i_2}$ | $W^{(2)}_{i_{1,1},i_{1,1}+(d_1/2+1)O_1,0,0,0,i_2}$ |
| ... | ... | ... |

$i_{1,1}, 16(x + y - 1)N_1, \ldots, (16(x + y) - 12)N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+(d_1-1)O_1,i_{1,2},i_{1,2}+O_2,1,i_2}$ | $W^{(2)}_{i_{1,1},i_{1,1}+O_1,i_{1,2},i_{1,2}+(d_2-1)O_2,1,i_2}$ | $W^{(2)}_{i_{1,1},i_{1,1}+(d_1-1)O_1,0,0,1,i_2}$ |

$i_{1,1}, (16(x + y) - 12)N_1, \ldots, (16(x + y) - 8)N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+(d_1-1)O_1,i_{1,2},i_{1,2}+O_2,0.5,i_2}$ | $W^{(2)}_{i_{1,1},i_{1,1}+O_1,i_{1,2},i_{1,2}+(d_2-1)O_2,0.5,i_2}$ | $W^{(2)}_{i_{1,1},i_{1,1}+(d_1-1)O_1,0,0,0.5,i_2}$ |

$i_{1,1}, (16(x + y) - 8)N_1, \ldots, (16(x + y) - 4)N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+(d_1-1)O_1,i_{1,2},i_{1,2}+O_2,0.25,i_2}$ | $W^{(2)}_{i_{1,1},i_{1,1}+O_1,i_{1,2},i_{1,2}+(d_2-1)O_2,0.25,i_2}$ | $W^{(2)}_{i_{1,1},i_{1,1}+(d_1-1)O_1,0,0,0.25,i_2}$ |

$i_{1,1}, (16(x + y) - 4)N_1, \ldots, 16(x + y)N_1 - 1$

| $N_1 \geq N_2 > 1$ | $N_2 > N_1 > 1$ | $N_2 = 1$ |
|---|---|---|
| $W^{(2)}_{i_{1,1},i_{1,1}+(d_1-1)O_1,i_{1,2},i_{1,2}+O_2,0,i_2}$ | $W^{(2)}_{i_{1,1},i_{1,1}+O_1,i_{1,2},i_{1,2}+(d_2-1)O_2,0,i_2}$ | $W^{(2)}_{i_{1,1},i_{1,1}+(d_1-1)O_1,0,0,0,i_2}$ |

Where $d_1 = \min(N_1, 4)$, $(x, y) = (d_1, 2)$ if $N_1 \geq N_2 > 1$
$d_2 = \min(N_2, 4)$, $(x, y) = (2, d_2)$ if $N_2 > N_1 > 1$
$d_1 = \min(N_1, 8)$, $(x, y) = (d_1, 1)$ if $N_2 = 1$ $$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = [\, 1 \; c_{n,0,1} \; c_{n,0,2} \; c_{n,0,3} \,]^T$, $c_{n,0,r} = \varphi_{\lfloor n/4^{3-r} \rfloor \bmod 4}$ $c_{n,1} = [\, 1 \; c_{n,1,1} \; c_{n,1,2} \; c_{n,1,3} \,]^T$, $c_{n,1,r} = \varphi_{\lfloor n/4^{6-r} \rfloor \bmod 4}$ In one embodiment of B-0, the UE is configured with an LC codebook in which the rank 1 and rank 2 codebook tables for three cases $N_1 \geq N_2 > 1$, $N_2 \geq N_1 > 1$, and $N_2 = 1$ are three separate codebook tables. Such separate codebook tables can be constructed by selecting respective columns from TABLE 41 and TABLE 42.

Figure 22:
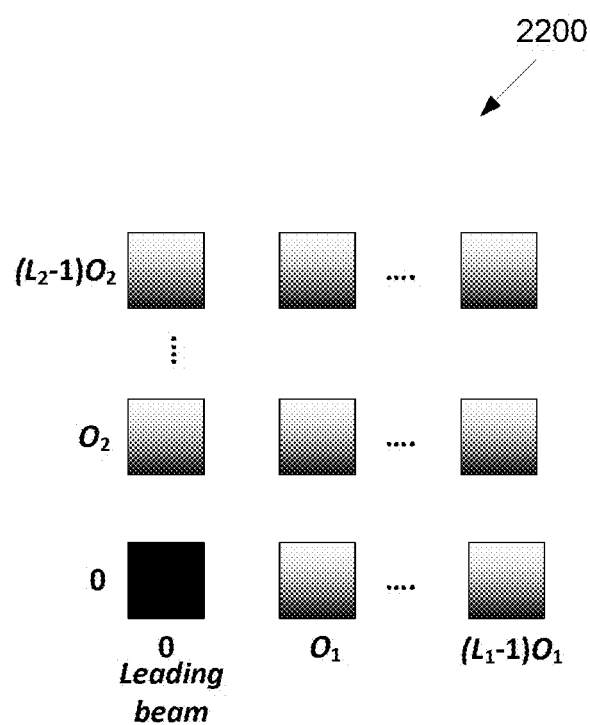
FIG. 22 illustrates an example orthogonal beam selection according to embodiments of the present disclosure.

In one embodiment of B-1, the parameter (x, y) in the rank 1 and rank 2 codebook tables TABLE 41 and TABLE 42, respectively, determines the orthogonal beam group of size $(L_1, L_2)$ where $L_1$ and $L_2$ respectively are the number of orthogonal beams in first and second dimensions, whose leading beam (0,0) corresponds to the stronger ($1^{st}$ beam) $v_{l,m}$ and the second (orthogonal) beam $v_{l',m'}$ is selected freely from the remaining $L_1 L_2 - 1$ beams in the beam group. An illustration of the orthogonal beam group for 2 beam selection is shown in FIG. 22. As sown in FIG. 22, the leading beam (0, 0) corresponds to the $1^{st}$ beam $v_{l,m}$ which is shown as black square. The second (weaker) beam is selected from the remaining beams which are shown as a white square.

FIG. 22 illustrates an example orthogonal beam selection 2200 according to embodiments of the present disclosure. An embodiment of the orthogonal beam selection 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In the rest of the present disclosure, $(O_1, O_2) = (4,4)$ if $N_1 > 1$, $N_2 > 1$ and $(4, 1)$ if $N_2 = 1$ has been assumed in embodiments related to the rank 1 and 2 advanced CSI codebook tables.

In one embodiment of C, the UE is configured with an alternative LC codebook TABLE 43 and TABLE 44 for rank 1 and 2, respectively, where each PMI value corresponds to six codebook indices, $i_{1,1}, i_{1,2}, d_1, d_2, p,$ and $i_2$. The rest of the details are the same as in the embodiment of A.

TABLE 43

| Codebook for 1-layer CSI reporting using antenna ports 15 to 14 + P |
|---|

| P = 4 | |
|---|---|
| | $i_2 = 0, 1, \ldots, 63$ |
| $i_{1,1} = 0, \ldots, 7$<br>$i_{1,2} = 0$<br>$(d_1, d_2) = (1, 0)$<br>$p \in \{1, 0.5, 0.25, 0\}$ | $W_{i_{1,1}, i_{1,1}+4d_1, i_{1,2}, i_{1,2}+4d_2, p, i_2}^{(1)}$ |

$$W_{l,l',m,m',p,n}^{(1)} = \frac{x_{l,l',m,m',p} c_n}{\|x_{l,l',m,m',p} c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$$c_n = \begin{bmatrix} 1 & c_{n,1} & c_{n,2} & c_{n,3} \end{bmatrix}^T, \quad c_{n,r} = \varphi_{\lfloor n/4^{3-r} \rfloor \bmod 4}$$

| P = 8 | | |
|---|---|---|
| $N_1 = 4, N_2 = 1$ | $N_1 = N_2 = 2$ | $i_2 = 0, 1, \ldots, 63$ |
| $i_{1,1} = 0, \ldots, 4N_1 - 1$<br>$i_{1,2} = 0$<br>$(d_1, d_2) \in \{(1, 0), (2, 0), (3, 0)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1)\}$<br>$p \in \{1, 0.5, 0.25, 0\}$ | $W_{i_{1,1}, i_{1,1}+4d_1, i_{1,2}, i_{1,2}+4d_2, p, i_2}^{(1)}$ |

$$W_{l,l',m,m',p,n}^{(1)} = \frac{x_{l,l',m,m',p} c_n}{\|x_{l,l',m,m',p} c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$$c_n = \begin{bmatrix} 1 & c_{n,1} & c_{n,2} & c_{n,3} \end{bmatrix}^T, \quad c_{n,r} = \varphi_{\lfloor n/4^{3-r} \rfloor \bmod 4}$$

| P = 12 | | |
|---|---|---|
| $N_1 = 2, N_2 = 3$ | $N_1 = 3, N_2 = 2$ | $i_2 = 0, 1, \ldots, 63$ |
| $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1), (0, 2), (1, 2)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1), (2, 0), (2, 1)\}$<br>$p \in \{1, 0.5, 0.25, 0\}$ | $W_{i_{1,1}, i_{1,1}+4d_1, i_{1,2}, i_{1,2}+4d_2, p, i_2}^{(1)}$ | where, $W_{l,l',m,m',p,n}^{(1)} = \dfrac{x_{l,l',m,m',p} c_n}{\|x_{l,l',m,m',p} c_n\|}$, $$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$$c_n = \begin{bmatrix} 1 & c_{n,1} & c_{n,2} & c_{n,3} \end{bmatrix}^T, \quad c_{n,r} = \varphi_{\lfloor n/4^{3-r} \rfloor \bmod 4}$$

| P = 16, 20, 24, 28, 32 | | | |
|---|---|---|---|
| $N_1 \geq 8, N_2 = 1$ | $N_2 > N_1 > 1$ | $N_1 \geq N_2 > 1$ | $i_2 = 0, 1, \ldots, 63$ |
| $i_{1,1} = 0, \ldots, 4N_1 - 1$<br>$i_{1,2} = 0$<br>$(d_1, d_2) \in \{(1, 0), (2, 0), (3, 0),$<br>$(4, 0), (5, 0), (6, 0), (7, 0)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1),$<br>$(0, 2), (1, 2), (0, 3), (1, 3)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1),$<br>$(2, 0), (2, 1), (3, 0), (3, 1)\}$<br>$p \in \{1, 0.5, 0.25, 0\}$ | $W_{i_{1,1}, i_{1,1}+4d_1, i_{1,2}, i_{1,2}+4d_2, p, i_2}^{(1)}$ |

TABLE 43-continued

Codebook for 1-layer CSI reporting using antenna ports 15 to 14 + P $$\text{where, } W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\,1\ \ c_{n,1}\ \ c_{n,2}\ \ c_{n,3}\,]^T,\ c_{n,r} = \varphi_{\lfloor n/4^{3-r} \rfloor \bmod 4}$$

TABLE 44

Codebook for 2-layer CSI reporting using antenna ports 15 to 14 + P

| P = 4 | | |
|---|---|---|
| | | $i_2 = 0, 1, \ldots, 4095$ |
| $i_{1,1} = 0, \ldots, 7$<br>$i_{1,2} = 0$<br>$(d_1, d_2) = (1, 0)$<br>$p \in \{1, 0.5, 0.25, 0\}$ | | $W^{(2)}_{i_{1,1},i_{1,1}+4d_1,i_{1,2},i_{1,2}+4d_2,p,i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|},\ \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = [\,1\ \ c_{n,0,1}\ \ c_{n,0,2}\ \ c_{n,0,3}\,]^T,\ c_{n,0,r} = \varphi_{\lfloor n/4^{3-r} \rfloor \bmod 4}$$

$$c_{n,1} = [\,1\ \ c_{n,1,1}\ \ c_{n,1,2}\ \ c_{n,1,3}\,]^T,\ c_{n,1,r} = \varphi_{\lfloor n/4^{6-r} \rfloor \bmod 4}$$

| P = 8 | | |
|---|---|---|
| $N_1 = 4, N_2 = 1$ | $N_1 = N_2 = 2$ | $i_2 = 0, 1, \ldots, 4095$ |
| $i_{1,1} = 0, \ldots, 4N_1 - 1$<br>$i_{1,2} = 0$<br>$(d_1, d_2) \in \{(1, 0), (2, 0), (3, 0)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1)\}$<br>$p \in \{1, 0.5, 0.25, 0\}$ | $W^{(2)}_{i_{1,1},i_{1,1}+4d_1,i_{1,2},i_{1,2}+4d_2,p,i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|},\ \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = [\,1\ \ c_{n,0,1}\ \ c_{n,0,2}\ \ c_{n,0,3}\,]^T,\ c_{n,0,r} = \varphi_{\lfloor n/4^{3-r} \rfloor \bmod 4}$$

$$c_{n,1} = [\,1\ \ c_{n,1,1}\ \ c_{n,1,2}\ \ c_{n,1,3}\,]^T,\ c_{n,1,r} = \varphi_{\lfloor n/4^{6-r} \rfloor \bmod 4}$$

| P = 12 | | |
|---|---|---|
| $N_1 = 2, N_2 = 3$ | $N_1 = 3, N_2 = 2$ | $i_2 = 0, 1, \ldots, 4095$ |
| $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1), (0, 2), (1, 2)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1), (2, 0), (2, 1)\}$<br>$p \in \{1, 0.5, 0.25, 0\}$ | $W^{(2)}_{i_{1,1},i_{1,1}+4d_1,i_{1,2},i_{1,2}+4d_2,p,i_2}$ |

TABLE 44-continued

Codebook for 2-layer CSI reporting using antenna ports 15 to 14 + P $$W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = [\,1\;\; c_{n,0,1}\;\; c_{n,0,2}\;\; c_{n,0,3}\,]^T,\; c_{n,0,r} = \varphi_{\lfloor n/4^{3-r}\rfloor \bmod 4}$$

$$c_{n,1} = [\,1\;\; c_{n,1,1}\;\; c_{n,1,2}\;\; c_{n,1,3}\,]^T,\; c_{n,1,r} = \varphi_{\lfloor n/4^{6-r}\rfloor \bmod 4}$$

| P = 16, 20, 24, 28, 32 | | | |
|---|---|---|---|
| $N_1 \geq 8, N_2 = 1$ | $N_2 > N_1 > 1$ | $N_1 \geq N_2 > 1$ | $i_2 = 0, 1, \ldots, 4095$ |
| $i_{1,1} = 0, \ldots, 4N_1 - 1$<br>$i_{1,2} = 0$<br>$(d_1, d_2) \in \{(1, 0), (2, 0), (3, 0),$<br>$(4, 0), (5, 0), (6, 0), (7, 0)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1),$<br>$(0, 2), (1, 2), (0, 3), (1, 3)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1), (1, 1),$<br>$(2, 0), (2, 1), (3, 0), (3, 1)\}$<br>$p \in \{1, 0.5, 0.25, 0\}$ | $W^{(2)}_{i_{1,1},i_{1,1}+4d_1,i_{1,2},i_{1,2}+4d_2,p,i_2}$ |

$$W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = [\,1\;\; c_{n,0,1}\;\; c_{n,0,2}\;\; c_{n,0,3}\,]^T,\; c_{n,0,r} = \varphi_{\lfloor n/4^{3-r}\rfloor \bmod 4}$$

$$c_{n,1} = [\,1\;\; c_{n,1,1}\;\; c_{n,1,2}\;\; c_{n,1,3}\,]^T,\; c_{n,1,r} = \varphi_{\lfloor n/4^{6-r}\rfloor \bmod 4}$$

In one embodiment of C-0, the UE is configured with an LC codebook in which the rank 1 and rank 2 codebook tables for three cases $N_1 \geq N_2 > 1$, $N_2 \geq N_1 > 1$, and $N_2 = 1$ are three separate codebook tables. Such separate codebook tables can be constructed by selecting respective columns from TABLE 43 and TABLE 44.

In one embodiment of D, the UE is configured with an alternative LC codebook TABLE 45 and TABLE 46 for rank 1 and 2, respectively, where each PMI value corresponds to six codebook indices, $i_{1,1}$, $i_{1,2}$, $d_1$, $d_2$, p, and $i_2$. The rest of the details are the same as in Embodiment A. Note that the definition $c_{n,1} = \varphi_{\lfloor n/16 \rfloor}$, $c_{n,3} = \varphi_{\lfloor n/4 \rfloor \bmod 4}$, $c_{n,2} = \varphi_{n \bmod 4}$ is just an example. In general, for 1 layer CSI reporting, $(c_{n,1}, c_{n,2}, c_{n,3})$ can be mapped to any combination of $(\varphi_{\lfloor n/16 \rfloor}, \varphi_{\lfloor n/4 \rfloor \bmod 4}, \varphi_{n \bmod 4})$. Similarly, for 2 layer CSI reporting, $(c_{n,0,1}, c_{n,0,2}, c_{n,0,3}, c_{n,1,1}, c_{n,1,2}, c_{n,1,3})$ can be mapped to any combination of $(\varphi_{\lfloor n/1024 \rfloor}, \varphi_{\lfloor n/256 \rfloor \bmod 4}, \varphi_{\lfloor n/64 \rfloor \bmod 4}, \varphi_{\lfloor n/16 \rfloor \bmod 4}, \varphi_{\lfloor n/4 \rfloor \bmod 4}, \varphi_{n \bmod 4})$.

TABLE 45

Codebook for 1-layer CSI reporting using antenna ports 15 to 14 + P

| P = 4, 8, 12, 16, 20, 24, 28, 32 | | | |
|---|---|---|---|
| $N_1 > 1, N_2 = 1$ | $N_2 > N_1 > 1$ | $N_1 \geq N_2 > 1$ | $i_2 = 0, 1, \ldots, 63$ |
| $i_{1,1} = 0, \ldots, 4N_1 - 1$<br>$i_{1,2} = 0$<br>$(d_1, d_2) \in \{(1, 0),$<br>$(2, 0), \ldots, (L_1 - 1, 0)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(1, 0), (0, 1),$<br>$(1, 1), \ldots, (0, L_1 - 1, (1, L_2 - 1)\}$<br>$p \in \{1, 0.5, 0.25, 0\}$ | $i_{1,1} = 0, \ldots, 4N_1 - 1$<br>$i_{1,2} = 0, 1, \ldots, 4N_2 - 1$<br>$(d_1, d_2) \in \{(0, 1), (1, 0),$<br>$(1, 1), \ldots, (L_1 - 1, 0), (L_2 - 1, 1)\}$<br>$p \in \{1, 0.5, 0.25, 0\}$ | $W^{(1)}_{i_{1,1},i_{1,1}+4d_1,i_{1,2},i_{1,2}+4d_2,p,i_2}$ |

Where $d_1 = \min(N_1, 4)$, $(L_1, L_2) = (d_1, 2)$ if $N_1 \geq N_2 > 1$ $d_2 = \min(N_2, 4)$, $(L_1, L_2) = (2, d_2)$ if $N_2 > N_1 > 1$ $d_1 = \min(N_1, 8)$, $(L_1, L_2) = (d_1, 1)$ if $N_2 = 1$ TABLE 45-continued Codebook for 1-layer CSI reporting using antenna ports 15 to 14 + P $$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\,1\ \ c_{n,1}\ \ c_{n,2}\ \ c_{n,3}\,]^T,\ c_{n,1} = \varphi_{\lfloor n/16 \rfloor},\ c_{n,2} = \varphi_{\lfloor n/4 \rfloor \bmod 4},\ c_{n,3} = \varphi_{n \bmod 4},$$

TABLE 46

Codebook for 2-layer CSI reporting using antenna ports 15 to 14 + P

P = 4, 8, 12, 16, 20, 24, 28, 32

| $N_1 > 1, N_2 = 1$ | $N_2 > N_1 > 1$ | $N_1 \geq N_2 > 1$ | $i_2 = 0, 1, \ldots, 4095$ |
|---|---|---|---|
| $i_{1,1} = 0, \ldots, 4N_1 - 1$ | $i_{1,1} = 0, \ldots, 4N_1 - 1$ | $i_{1,1} = 0, \ldots, 4N_1 - 1$ | $W^{(2)}_{i_{1,1},i_{1,1}+4d_1,i_{1,2},i_{1,2}+4d_2,p,i_2}$ |
| $i_{1,2} = 0$ | $i_{1,2} = 0, 1, \ldots, 4N_2 - 1$ | $i_{1,2} = 0, 1, \ldots, 4N_2 - 1$ | |
| $(d_1, d_2) \in \{(1, 0),$ | $(d_1, d_2) \in \{(1, 0), (0, 1),$ | $(d_1, d_2) \in \{(0, 1), (1, 0),$ | |
| $(2, 0), \ldots, (L_1 - 1, 0)\}$ | $(1, 1), \ldots, (0, L_1 - 1, (1, L_2 - 1)\}(1, 1), \ldots, (L_1 - 1, 0), (L_2 - 1, 1)\}$ | | |
| $p \in \{1, 0.5, 0.25, 0\}$ | $p \in \{1, 0.5, 0.25, 0\}$ | $p \in \{1, 0.5, 0.25, 0\}$ | |

Where $d_1 = \min(N_1, 4)$, $(L_1, L_2) = (d_1, 2)$ if $N_1 \geq N_2 > 1$
$d_2 = \min(N_2, 4)$, $(L_1, L_2) = (2, d_2)$ if $N_2 > N_1 > 1$
$d_1 = \min(N_1, 8)$, $(L_1, L_2) = (d_1, 1)$ if $N_2 = 1$ $$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$c_{n,0} = [\,1\ \ c_{n,0,1}\ \ c_{n,0,2}\ \ c_{n,0,3}\,]^T,\ c_{n,0,1} = \varphi_{\lfloor n/16 \rfloor \bmod 4},\ c_{n,0,2} = \varphi_{\lfloor n/4 \rfloor \bmod 4},\ c_{n,0,3} = \varphi_{n \bmod 4}$ $c_{n,1} = [\,1\ \ c_{n,1,1}\ \ c_{n,1,2}\ \ c_{n,1,3}\,]^T,\ c_{n,1,1} = \varphi_{\lfloor n/1024 \rfloor},\ c_{n,1,2} = \varphi_{\lfloor n/256 \rfloor \bmod 4},\ c_{n,1,3} = \varphi_{\lfloor n/64 \rfloor \bmod 4}$ In one embodiment of D-0, the UE is configured with an LC codebook in which the rank 1 and rank 2 codebook tables for three cases $N_1 \geq N_2 > 1$, $N_2 \geq N_1 > 1$, and $N_2 = 1$ are three separate codebook tables. Such separate codebook tables can be constructed by selecting respective columns from TABLE 45 and TABLE 46.

In one embodiment of E, the second PMI index $i_2$ in at least one of codebook of tables TBALE 39-46 is mapped to three sub-indices $i_{2,i}, i_{2,2}, i_{2,3}$ for 1 layer CSI reporting, to six sub-indices $i_{2,i}, i_{2,2}, i_{2,3}, i_{2,4}, i_{2,5}, i_{2,6}$ for 2 layer CSI reporting, each of these sub-indices take any value n belonging to $\{0, 1, 2, 3\}$ which indicates a QPSK value $\varphi_n$. For 1 layer CSI reporting, the three sub-indices $i_{2,1}, i_{2,2}, i_{2,3}$ correspond to $c_{n,1}, c_{n,2}, c_{n,3}$, respectively (or their other combinations) in the rank 1 coefficient vector $c_n = [1\ c_{n,1}\ c_{n,2}\ c_{n,3}]^T$ in TABLE 39-TABLE 42. Similarly, for 2 layer CSI reporting, the six sub-indices $i_{2,1}, i_{2,2}, i_{2,3}, i_{2,4}, i_{2,5}, i_{2,6}$ correspond to $c_{n,0,1}, c_{n,0,2}, c_{n,0,3}, c_{n,1,1}, c_{n,1,2}, c_{n,1,3}$, respectively (or their other combinations) in the rank 2 coefficient vectors $c_{n,0} = [1\ c_{n,0,1}\ c_{n,0,2}\ c_{n,0,3}]^T$ for layer 0 and $c_{n,1} = [1\ c_{n,1,1}\ c_{n,1,2}\ c_{n,1,3}]^T$ for layer 1 in TABLE 39-TABLE 42.

In some embodiments of 1 layer CSI reporting, since $i_2$ takes an integer value between 0 and 63, binary expansion results in a length 6 binary string $b_0b_1b_2b_3b_4b_5$. The mapping to obtain three sub-indices is according to at least one of the following schemes: (1) scheme 0: the 2 most significant bits (MSB) $b_0b_1$ are mapped to the sub-index $i_{2,1}$, the 2 middle bits $b_2b_3$ are mapped to the sub-index $i_{2,2}$, and the 2 least significant bits $b_4b_5$ are mapped to the sub-index $i_{2,3}$; and (2) scheme 1: The 2 MSBs $b_0b_1$ are mapped to the sub-index $i_{2,3}$, the middle 2 bits $b_2b_3$ are mapped to the sub-index $i_{2,2}$, and the 2 LSBs $b_4b_5$ are mapped to the sub-index $i_{2,1}$.

In some embodiments of 2 layer CSI reporting, since $i_2$ takes an integer value between 0 and 127, binary expansion results in a length 12 binary string $b_0b_1b_2b_3b_4b_5b_6b_7b_8b_9b_{10}b_{11}$. There are at least three alternatives to map 6 of these 12 bits to 2 layers, namely layer 0 and layer 1, at least one of these alternatives is supported: (1) Alt 0 (layer-wise mapping): $b_0b_1b_2b_3b_4b_5$ are mapped to layer 0 and $b_6b_7b_8b_9b_{10}b_{11}$ are mapped to layer 1; (2) Alt 1 (layer-wise mapping): $b_0b_1b_2b_3b_4b_5$ are mapped to layer 1 and $b_6b_7b_8b_9b_{10}b_{11}$ are mapped to layer 0; and Alt 2 (coefficient-wise mapping): $b_0b_1b_2b_3$ are mapped to the first coefficient for layer 0 and layer 1, $b_4b_5b_6b_7$ are mapped to the second coefficient for layer 0 and layer 1, and $b_8 b_9 b_{10} b_{11}$ are mapped to the third coefficient for layer 0 and layer 1, wherein for each of these three coefficient-wise mappings either 2 MSBs correspond to layer 0 and 2 LSBs correspond to layer 1 or 2 MSBs correspond to layer 1 and 2 LSBs correspond to layer 0.

In such embodiment, for Alt 0, the mapping to obtain six sub-indices is according to at least one of the following schemes: (1) method 0 of layer 0: the 2 MSBs $b_0 b_1$ are mapped to the sub-index $i_{2,1}$, the 2 middle bits $b_2 b_3$ are mapped to the sub-index $i_{2,2}$, and the 2 LSBs $b_4 b_5$ are mapped to the sub-index $i_{2,3}$; (2) method 0 of layer 1: the 2 MSBs $b_6 b_7$ are mapped to the sub-index $i_{2,4}$, the 2 middle bits $b_8 b_9$ are mapped to the sub-index $i_{2,5}$, and the 2 LSBs $b_{10} b_{11}$ are mapped to the sub-index $i_{2,6}$; (3) method 1 of layer 0: The 2 MSBs $b_0 b_1$ are mapped to the sub-index $i_{2,3}$, the middle 2 bits $b_2 b_3$ are mapped to the sub-index $i_{2,2}$, and the 2 LSBs $b_4 b_5$ are mapped to the sub-index $i_{2,1}$; and (4) method 1 of layer 1: The 2 MSBs $b_6 b_7$ are mapped to the sub-index $i_{2,6}$, the middle 2 bits $b_8 b_9$ are mapped to the sub-index $i_{2,5}$, and the 2 LSBs $b_{10} b_{11}$ are mapped to the sub-index $i_{2,4}$.

In such embodiments, for Alt 1, the mapping is similar by swapping the two bit strings $b_0 b_1 b_2 b_3 b_4 b_5$ and $b_6 b_7 b_8 b_9 b_{10} b_{11}$ for layer 1 and layer 0, respectively.

In some embodiments of F, the second PMI index $i_2$ in at least one of rank 2 codebook tables TABLE 40 and TABLE 41, TABLE 42, and TABLE 45 has two component $i_{2,0}$ and $i_{2,1}$ for layer 0 and layer 1 respectively. In this case, $i_{2,0}$ and $i_{2,1}$ respectively indicate confident vectors $c_{n,0}$ and $c_{n,1}$ in the precoding matrix $$W^{(2)}_{l,l'm,m',p,n} = \frac{1}{\sqrt{2}} \left[ \frac{x_{l,l',m,m',p} c_{n,0}}{\|x_{l,l',m,m',p} c_{n,0}\|}, \frac{x_{l,l',m,m',p} c_{n,1}}{\|x_{l,l',m,m',p} c_{n,1}\|} \right].$$

Note also that the range of values for $i_{2,0}$ and $i_{2,1}$ are then $i_{2,0} = 0, 1, \ldots, 63$ and $i_{2,1} = 0, 1, \ldots, 63$ respectively.

In some embodiments of G, the five WB first PMI indices $i_{1,1}, i_{1,2}, d_1, d_2$, and p in Embodiment C and D are equivalently denoted as five separate WB first PMI indices $i_{1,1-1}, i_{1,2-1}, i_{1,1-2}, i_{1,2-2}$, and $i_{1,p-2}$, respectively.

In some embodiments of H, a few of the five WB first PMI indices $i_{1,1}, i_{1,2}, d_1, d_2$, and p in Embodiment C and D are reported separately and the remaining jointly. In one example, $(i_{1,1}, d_1, d_2), i_{1,2},$ and p are reported as three WB first PMI indices $i_{1,1}, i_{1,2},$ and $i_{1,p}$, respectively. The corresponding 1 layer and 2 layer codebook tables are given in TABLE 47 and TABLE 48, respectively. In another example, $(i_{1,1}, d_1)$ $(i_{1,2}, d_2)$ and p are reported as three WB first PMI indices $i_{1,1}, i_{1,2},$ and $i_{1,p}$, respectively. For 1D port layouts (i.e. $N_2 > 1$, $N_2 = 1$ layer and 2 layer codebook tables are the same as in TABLE 47 and TABLE 48, respectively, and for 2D port layouts, 1 layer and 2 layer codebook are as shown in TABLE 49 and TABLE 50, respectively. In yet another example, $i_{1,1}, i_{1,2}, (d_1, d_2)$ and p are reported as four WB first PMI indices $i_{1,1}, i_{1,2}, i_{1,b}$ and $i_{1,p}$, respectively. The corresponding 1 layer and 2 layer codebook tables are given in TABLE 43 and TABLE 44 or TABLE 45 and TABLE 46, respectively.

In some embodiments of I, the $2^{nd}$ and $3^{rd}$ subscripts in rank 1 and rank 2 pre-coder equations in TABLE 39-TABLE 46 are swapped, i.e., the rank 1 and rank 2 pre-coder equations are given by $W^{(1)}_{i_{1,1}, i_{1,2}, i_{1,1}+d_1 O_1, i_{1,2}+d_2 O_2, p, i_2}$ and $W^{(2)}_{i_{1,1}, i_{1,2}, i_{1,1}+d_1 O_1, i_{1,2}+d_2 O_2, p, i_2}$, respectively.

In some embodiment of J, the relative power $p \in \{1, 0.5, 0.25, 0\}$ is indexed by $q = 0, 1, 2, 3$ in some codebook tables in the present disclosure which maps to the relative power according to either: (Alt 0)

$$p = \frac{1}{2^q}$$

or $2^{-q}$ for $q = 0, 1, 2$, and $p = 0$ for $q = 3$; (Alt 1) $p = 0$ for $q = 0$ and $$p = \frac{1}{2^{(3-q)}}$$

or $2^{-(3-q)}$ for $q = 1, 2, 3$; (Alt 2) $p = 0$ for $q = 0$ and $$p = \frac{1}{2^{(q-1)}}$$

or $2^{-(q-1)}$ for $q = 1, 2, 3$; (Alt 3) $p = 0, \frac{1}{4}, \frac{1}{2},$ and 1 for $q = 0, 1, 2,$ and 3, respectively; or (Alt 4) other mathematically form, for example, with squared root of power values, i.e., $$p = 0, \frac{1}{2}, \frac{1}{\sqrt{2}},$$

and 1 for $q = 0, 1, 2,$ and 3, respectively.

In some embodiment of H, since $v_{l,m}$ and $v_{l',m'}$ corresponds to two orthogonal DFT beams, $$\|x_{l,l',m,m',p}\| = \left\| \begin{bmatrix} v_{l,m} & \sqrt{p} \, v_{l',m'} & 0 & 0 \\ 0 & 0 & v_{l,m} & \sqrt{p} \, v_{l',m'} \end{bmatrix} \right\| = \sqrt{P(1+p)},$$

where $P = 2 N_1 N_2$ is the number of CSI-RS ports and p is the relative power of the $2^{nd}$ (weaker) beam $v_{l',m'}$ with respect to the $1^{st}$ (stronger) beam whose power is 1.

TABLE 47

| Codebook for 1-layer CSI reporting using antenna ports 15 to 14 + P |
|---|
| P = 4 |
| $i_2 = 0, 1, \ldots, 63$ |

| $i_{1,1} = 0, \ldots, 7$ $i_{1,2} = 0$ $p \in \{1, 0.5, 0.25, 0\}$ | $W^{(1)}_{i_{1,1}, i_{1,1}+O_1, i_{1,2}, i_{1,2}, p, i_2}$ |
|---|---|

TABLE 47-continued

Codebook for 1-layer CSI reporting using antenna ports 15 to 14 + P $$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\,1 \quad c_{n,1} \quad c_{n,2} \quad c_{n,3}\,]^T,\; c_{n,r} = \varphi_{\lfloor n/4^{3-r} \rfloor \bmod 4}$$

P = 8
$i_2 = 0, 1, \ldots, 63$
$i_{1,2} = 0$ if $N_2 = 1$, $i_{1,2} = 0, 1, \ldots, 4N_2 - 1$ otherwise
$p \in \{1, 0.5, 0.25, 0\}$

|  | $N_1 = 4, N_2 = 1$ | $N_1 = N_2 = 2$ |
|---|---|---|
| $i_{1,1} = 0, \ldots, 4N_1 - 1$ | $W^{(1)}_{i_{1,1},i_{1,1}+O_1,i_{1,2},i_{1,2},p,i_2}$ | $W^{(1)}_{i_{1,1},i_{1,1}+O_1,i_{1,2},i_{1,2},p,i_2}$ |
| $i_{1,1} = 4N_1, \ldots, 8N_1 - 1$ | $W^{(1)}_{i_{1,1},i_{1,1}+2O_1,i_{1,2},i_{1,2},p,i_2}$ | $W^{(1)}_{i_{1,1},i_{1,1},i_{1,2},i_{1,2}+O_2,p,i_2}$ |
| $i_{1,1} = 8N_1, \ldots, 12N_1 - 1$ | $W^{(1)}_{i_{1,1},i_{1,1}+3O_1,i_{1,2},i_{1,2},p,i_2}$ | $W^{(1)}_{i_{1,1},i_{1,1}+O_1,i_{1,2},i_{1,2}+O_2,p,i_2}$ |

$$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\,1 \quad c_{n,1} \quad c_{n,2} \quad c_{n,3}\,]^T,\; c_{n,r} = \varphi_{\lfloor n/4^{3-r} \rfloor \bmod 4}$$

P = 12
$i_2 = 0, 1, \ldots, 63$
$i_{1,2} = 0, 1, \ldots, 4N_2 - 1$
$p \in \{1, 0.5, 0.25, 0\}$

|  | $N_1 = 2, N_2 = 3$ | $N_1 = 3, N_2 = 2$ |
|---|---|---|
| $i_{1,1} = 0, \ldots, 4N_1 - 1$ | $W^{(1)}_{i_{1,1},i_{1,1}+O_1,i_{1,2},i_{1,2},p,i_2}$ | $W^{(1)}_{i_{1,1},i_{1,1}+O_1,i_{1,2},i_{1,2},p,i_2}$ |
| $i_{1,1} = 4N_1, \ldots, 8N_1 - 1$ | $W^{(1)}_{i_{1,1},i_{1,1},i_{1,2},i_{1,2}+O_2,p,i_2}$ | $W^{(1)}_{i_{1,1},i_{1,1},i_{1,2},i_{1,2}+O_2,p,i_2}$ |
| $i_{1,1} = 8N_1, \ldots, 12N_1 - 1$ | $W^{(1)}_{i_{1,1},i_{1,1}+O_1,i_{1,2},i_{1,2}+O_2,p,i_2}$ | $W^{(1)}_{i_{1,1},i_{1,1}+O_1,i_{1,2},i_{1,2}+O_2,p,i_2}$ |
| $i_{1,1} = 12N_1, \ldots, 16N_1 - 1$ | $W^{(1)}_{i_{1,1},i_{1,1}+O_1,i_{1,2},i_{1,2}+2O_2,p,i_2}$ | $W^{(1)}_{i_{1,1},i_{1,1}+2O_1,i_{1,2},i_{1,2},p,i_2}$ |
| $i_{1,1} = 16N_1, \ldots, 20N_1 - 1$ | $W^{(1)}_{i_{1,1},i_{1,1}+O_1,i_{1,2},i_{1,2}+2O_2,p,i_2}$ | $W^{(1)}_{i_{1,1},i_{1,1}+2O_1,i_{1,2},i_{1,2}+O_2,p,i_2}$ |

$$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\,1 \quad c_{n,1} \quad c_{n,2} \quad c_{n,3}\,]^T,\; c_{n,r} = \varphi_{\lfloor n/4^{3-r} \rfloor \bmod 4}$$

P = 16, 20, 24, 28, 32
$i_2 = 0, 1, \ldots, 63$
$i_{1,2} = 0$ if $N_2 = 1$, $i_{1,2} = 0, 1, \ldots, 4N_2 - 1$ otherwise
$p \in \{1, 0.5, 0.25, 0\}$

|  | $N_1 \geq 8, N_2 = 1$ | $N_2 > N_1 > 1$ | $N_1 \geq N_2 > 1$ |
|---|---|---|---|
| $i_{1,1} = 0, \ldots, 4N_1 - 1$ | $W^{(1)}_{i_{1,1},i_{1,1}+O_1,i_{1,2},i_{1,2},p,i_2}$ | $W^{(1)}_{i_{1,1},i_{1,1}+O_1,i_{1,2},i_{1,2},p,i_2}$ | $W^{(1)}_{i_{1,1},i_{1,1}+O_1,i_{1,2},i_{1,2},p,i_2}$ |
| $i_{1,1} = 4N_1, \ldots, 8N_1 - 1$ | $W^{(1)}_{i_{1,1},i_{1,1}+2O_1,i_{1,2},i_{1,2},p,i_2}$ | $W^{(1)}_{i_{1,1},i_{1,1},i_{1,2},i_{1,2}+O_2,p,i_2}$ | $W^{(1)}_{i_{1,1},i_{1,1},i_{1,2},i_{1,2}+O_2,p,i_2}$ |
| $i_{1,1} = 8N_1, \ldots, 12N_1 - 1$ | $W^{(1)}_{i_{1,1},i_{1,1}+3O_1,i_{1,2},i_{1,2},p,i_2}$ | $W^{(1)}_{i_{1,1},i_{1,1}+O_1,i_{1,2},i_{1,2}+O_2,p,i_2}$ | $W^{(1)}_{i_{1,1},i_{1,1}+O_1,i_{1,2},i_{1,2}+O_2,p,i_2}$ |
| $i_{1,1} = 12N_1, \ldots, 16N_1 - 1$ | $W^{(1)}_{i_{1,1},i_{1,1}+4O_1,i_{1,2},i_{1,2},p,i_2}$ | $W^{(1)}_{i_{1,1},i_{1,1},i_{1,2},i_{1,2}+2O_2,p,i_2}$ | $W^{(1)}_{i_{1,1},i_{1,1}+2O_1,i_{1,2},i_{1,2},p,i_2}$ |
| $i_{1,1} = 16N_1, \ldots, 20N_1 - 1$ | $W^{(1)}_{i_{1,1},i_{1,1}+5O_1,i_{1,2},i_{1,2},p,i_2}$ | $W^{(1)}_{i_{1,1},i_{1,1}+O_1,i_{1,2},i_{1,2}+2O_2,p,i_2}$ | $W^{(1)}_{i_{1,1},i_{1,1}+2O_1,i_{1,2},i_{1,2}+O_2,p,i_2}$ |
| $i_{1,1} = 20N_1, \ldots, 24N_1 - 1$ | $W^{(1)}_{i_{1,1},i_{1,1}+6O_1,i_{1,2},i_{1,2},p,i_2}$ | $W^{(1)}_{i_{1,1},i_{1,1},i_{1,2},i_{1,2}+3O_2,p,i_2}$ | $W^{(1)}_{i_{1,1},i_{1,1}+3O_1,i_{1,2},i_{1,2},p,i_2}$ |
| $i_{1,1} = 24N_1, \ldots, 28N_1 - 1$ | $W^{(1)}_{i_{1,1},i_{1,1}+7O_1,i_{1,2},i_{1,2},p,i_2}$ | $W^{(1)}_{i_{1,1},i_{1,1}+O_1,i_{1,2},i_{1,2}+3O_2,p,i_2}$ | $W^{(1)}_{i_{1,1},i_{1,1}+3O_1,i_{1,2},i_{1,2}+O_2,p,i_2}$ |

TABLE 47-continued

Codebook for 1-layer CSI reporting using antenna ports 15 to 14 + P $$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = \begin{bmatrix} 1 & c_{n,1} & c_{n,2} & c_{n,3} \end{bmatrix}^T, \; c_{n,r} = \varphi_{\lfloor n/4^{3-r}\rfloor \bmod 4}$$

TABLE 48

Codebook for 2-layer CSI reporting using antenna ports 15 to 14 + P
P = 4

| $i_{1,1} = 0, \ldots, 7$ | $i_2 = 0, 1, \ldots, 4095$ |
| $i_{1,2} = 0$ | $W^{(2)}_{i_{1,1},i_{1,1}+O_1,i_{1,2},i_{1,2},p,i_2}$ |
| $p \in \{1, 0.5, 0.25, 0\}$ | |

$$W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = \begin{bmatrix} 1 & c_{n,0,1} & c_{n,0,2} & c_{n,0,3} \end{bmatrix}^T, \; c_{n,0,r} = \varphi_{\lfloor n/4^{3-r}\rfloor \bmod 4}$$

$$c_{n,1} = \begin{bmatrix} 1 & c_{n,1,1} & c_{n,1,2} & c_{n,1,3} \end{bmatrix}^T, \; c_{n,1,r} = \varphi_{\lfloor n/4^{6-r}\rfloor \bmod 4}$$

P = 8
$i_2 = 0, 1, \ldots, 4095$
$i_{1,2} = 0$ if $N_2 = 1$, $i_{1,2} = 0, 1, \ldots, 4N_2 - 1$ otherwise
$p \in \{1, 0.5, 0.25, 0\}$

| | $N_1 = 4, N_2 = 1$ | $N_1 = N_2 = 2$ |
|---|---|---|
| $i_{1,1} = 0, \ldots, 4N_1 - 1$ | $W^{(2)}_{i_{1,1},i_{1,1}+O_1,i_{1,2},i_{1,2},p,i_2}$ | $W^{(2)}_{i_{1,1},i_{1,1}+O_1,i_{1,2},i_{1,2},p,i_2}$ |
| $i_{1,1} = 4N_1, \ldots, 8N_1 - 1$ | $W^{(2)}_{i_{1,1},i_{1,1}+2O_1,i_{1,2},i_{1,2},p,i_2}$ | $W^{(2)}_{i_{1,1},i_{1,1},i_{1,2},i_{1,2}+O_2,p,i_2}$ |
| $i_{1,1} = 8N_1, \ldots, 12N_1 - 1$ | $W^{(2)}_{i_{1,1},i_{1,1}+3O_1,i_{1,2},i_{1,2},p,i_2}$ | $W^{(2)}_{i_{1,1},i_{1,1}+O_1,i_{1,2},i_{1,2}+O_2,p,i_2}$ |

$$W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = \begin{bmatrix} 1 & c_{n,0,1} & c_{n,0,2} & c_{n,0,3} \end{bmatrix}^T, \; c_{n,0,r} = \varphi_{\lfloor n/4^{3-r}\rfloor \bmod 4}$$

$$c_{n,1} = \begin{bmatrix} 1 & c_{n,1,1} & c_{n,1,2} & c_{n,1,3} \end{bmatrix}^T, \; c_{n,1,r} = \varphi_{\lfloor n/4^{6-r}\rfloor \bmod 4}$$

P = 12
$i_2 = 0, 1, \ldots, 4095$
$i_{1,2} = 0, 1, \ldots, 4N_2 - 1$
$p \in \{1, 0.5, 0.25, 0\}$

| | $N_1 = 2, N_2 = 3$ | $N_1 = 3, N_2 = 2$ |
|---|---|---|
| $i_{1,1} = 0, \ldots, 4N_1 - 1$ | $W^{(2)}_{i_{1,1},i_{1,1}+O_1,i_{1,2},i_{1,2},p,i_2}$ | $W^{(2)}_{i_{1,1},i_{1,1}+O_1,i_{1,2},i_{1,2},p,i_2}$ |
| $i_{1,1} = 4N_1, \ldots, 8N_1 - 1$ | $W^{(2)}_{i_{1,1},i_{1,1},i_{1,2},i_{1,2}+O_2,p,i_2}$ | $W^{(2)}_{i_{1,1},i_{1,1},i_{1,2},i_{1,2}+O_2,p,i_2}$ |
| $i_{1,1} = 8N_1, \ldots, 12N_1 - 1$ | $W^{(2)}_{i_{1,1},i_{1,1}+O_1,i_{1,2},i_{1,2}+O_2,p,i_2}$ | $W^{(2)}_{i_{1,1},i_{1,1}+O_1,i_{1,2},i_{1,2}+O_2,p,i_2}$ |
| $i_{1,1} = 12N_1, \ldots, 16N_1 - 1$ | $W^{(2)}_{i_{1,1},i_{1,1},i_{1,2},i_{1,2}+2O_2,p,i_2}$ | $W^{(2)}_{i_{1,1},i_{1,1}+2O_1,i_{1,2},i_{1,2},p,i_2}$ |
| $i_{1,1} = 16N_1, \ldots, 20N_1 - 1$ | $W^{(2)}_{i_{1,1},i_{1,1}+O_1,i_{1,2},i_{1,2}+2O_2,p,i_2}$ | $W^{(2)}_{i_{1,1},i_{1,1}+2O_1,i_{1,2},i_{1,2},+O_2,p,i_2}$ |

TABLE 48-continued $$W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = [\,1\ \ c_{n,0,1}\ \ c_{n,0,2}\ \ c_{n,0,3}\,]^T,\ c_{n,0,r} = \varphi_{\lfloor n/4^{3-r}\rfloor\bmod 4}$$

$$c_{n,1} = [\,1\ \ c_{n,1,1}\ \ c_{n,1,2}\ \ c_{n,1,3}\,]^T,\ c_{n,1,r} = \varphi_{\lfloor n/4^{6-r}\rfloor\bmod 4}$$

P = 16, 20, 24, 28, 21
$i_2 = 0, 1, \ldots, 4095$
$i_{1,2} = 0$ if $N_2 = 1$, $i_{1,2} = 0, 1, \ldots, 4N_2 - 1$ otherwise
$p \in \{1, 0.5, 0.25, 0\}$

| | $N_1 \geq 8, N_2 = 1$ | $N_2 > N_1 > 1$ | $N_1 \geq N_2 > 1$ |
|---|---|---|---|
| $i_{1,1} = 0, \ldots, 4N_1 - 1$ | $W^{(2)}_{i_{1,1},i_{1,1}+O_1,i_{1,2},i_{1,2},p,i_2}$ | $W^{(2)}_{i_{1,1},i_{1,1}+O_1,i_{1,2},i_{1,2},p,i_2}$ | $W^{(2)}_{i_{1,1},i_{1,1}+O_1,i_{1,2},i_{1,2},p,i_2}$ |
| $i_{1,1} = 4N_1, \ldots, 8N_1 - 1$ | $W^{(2)}_{i_{1,1},i_{1,1}+2O_1,i_{1,2},i_{1,2},p,i_2}$ | $W^{(2)}_{i_{1,1},i_{1,1},i_{1,2},i_{1,2}+O_2,p,i_2}$ | $W^{(2)}_{i_{1,1},i_{1,1},i_{1,2},i_{1,2}+O_2,p,i_2}$ |
| $i_{1,1} = 8N_1, \ldots, 12N_1 - 1$ | $W^{(2)}_{i_{1,1},i_{1,1}+3O_1,i_{1,2},i_{1,2},p,i_2}$ | $W^{(2)}_{i_{1,1},i_{1,1}+O_1,i_{1,2},i_{1,2}+O_2,p,i_2}$ | $W^{(2)}_{i_{1,1},i_{1,1}+O_1,i_{1,2},i_{1,2}+O_2,p,i_2}$ |
| $i_{1,1} = 12N_1, \ldots, 16N_1 - 1$ | $W^{(2)}_{i_{1,1},i_{1,1}+4O_1,i_{1,2},i_{1,2},p,i_2}$ | $W^{(2)}_{i_{1,1},i_{1,1},i_{1,2},i_{1,2}+2O_2,p,i_2}$ | $W^{(2)}_{i_{1,1},i_{1,1}+2O_1,i_{1,2},i_{1,2},p,i_2}$ |
| $i_{1,1} = 16N_1, \ldots, 20N_1 - 1$ | $W^{(2)}_{i_{1,1},i_{1,1}+5O_1,i_{1,2},i_{1,2},p,i_2}$ | $W^{(2)}_{i_{1,1},i_{1,1}+O_1,i_{1,2},i_{1,2}+2O_2,p,i_2}$ | $W^{(2)}_{i_{1,1},i_{1,1}+2O_1,i_{1,2},i_{1,2}+O_2,p,i_2}$ |
| $i_{1,1} = 20N_1, \ldots, 24N_1 - 1$ | $W^{(2)}_{i_{1,1},i_{1,1}+6O_1,i_{1,2},i_{1,2},p,i_2}$ | $W^{(2)}_{i_{1,1},i_{1,1},i_{1,2},i_{1,2}+3O_2,p,i_2}$ | $W^{(2)}_{i_{1,1},i_{1,1}+3O_1,i_{1,2},i_{1,2},p,i_2}$ |
| $i_{1,1} = 24N_1, \ldots, 28N_1 - 1$ | $W^{(2)}_{i_{1,1},i_{1,1}+7O_1,i_{1,2},i_{1,2},p,i_2}$ | $W^{(2)}_{i_{1,1},i_{1,1}+O_1,i_{1,2},i_{1,2}+3O_2,p,i_2}$ | $W^{(2)}_{i_{1,1},i_{1,1}+3O_1,i_{1,2},i_{1,2}+O_2,p,i_2}$ |

$$W^{(2)}_{l,l',m,m',p,n} = \frac{1}{\sqrt{2}}\left[\frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|}\right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_{n,0} = [\,1\ \ c_{n,0,1}\ \ c_{n,0,2}\ \ c_{n,0,3}\,]^T,\ c_{n,0,r} = \varphi_{\lfloor n/4^{3-r}\rfloor\bmod 4}$$

$$c_{n,1} = [\,1\ \ c_{n,1,1}\ \ c_{n,1,2}\ \ c_{n,1,3}\,]^T,\ c_{n,1,r} = \varphi_{\lfloor n/4^{6-r}\rfloor\bmod 4}$$

TABLE 49

Codebook for 1-layer CSI reporting using antenna ports 15 to 14 + P
P = 8
$i_2 = 0, 1, \ldots, 63$
$p \in \{1, 0.5, 0.25, 0\}$

| | | $N_1 = N_2 = 2$ |
|---|---|---|
| $i_{1,1} = 0, \ldots, 4N_1 - 1$ | $i_{1,2} = 0, 1, \ldots, 4N_2 - 1$ | $W^{(1)}_{i_{1,1},i_{1,1}+O_1,i_{1,2},i_{1,2},p,i_2}$ |
| $i_{1,1} = 4N_1, \ldots, 8N_1 - 1$ | $i_{1,2} = 4N_2, \ldots, 8N_2 - 1$ | $W^{(1)}_{i_{1,1},i_{1,1},i_{1,2},i_{1,2}+O_2,p,i_2}$ |
| $i_{1,1} = 0, \ldots, 4N_1 - 1$ | $i_{1,2} = 4N_2, \ldots, 8N_2 - 1$ | $W^{(1)}_{i_{1,1},i_{1,1}+O_1,i_{1,2},i_{1,2}+O_2,p,i_2}$ |

$$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\,1\ \ c_{n,1}\ \ c_{n,2}\ \ c_{n,3}\,]^T,\ c_{n,r} = \varphi_{\lfloor n/4^{3-r}\rfloor\bmod 4}$$

P = 12
$i_2 = 0, 1, \ldots, 63$
$p \in \{1, 0.5, 0.25, 0\}$

| | | $N_1 = 2, N_2 = 3$ |
|---|---|---|
| $i_{1,1} = 0, \ldots, 4N_1 - 1$ | $i_{1,2} = 0, 1, \ldots, 4N_2 - 1$ | $W^{(1)}_{i_{1,1},i_{1,1}+O_1,i_{1,2},i_{1,2},p,i_2}$ |
| $i_{1,1} = 4N_1, \ldots, 8N_1 - 1$ | $i_{1,2} = 4N_2, \ldots, 8N_2 - 1$ | $W^{(1)}_{i_{1,1},i_{1,1},i_{1,2},i_{1,2}+O_2,p,i_2}$ |

TABLE 49-continued

| | | |
|---|---|---|
| $i_{1,1} = 0, \ldots, 4N_1 - 1$ | $i_{1,2} = 4N_2, \ldots, 8N_2 - 1$ | $W_{i_{1,1},i_{1,1}+O_1,i_{1,2},i_{1,2}+O_2,p,i_2}^{(1)}$ |
| $i_{1,1} = 4N_1, \ldots, 8N_1 - 1$ | $i_{1,2} = 8N_2, \ldots, 12N_2 - 1$ | $W_{i_{1,1},i_{1,1},i_{1,2},i_{1,2}+2O_2,p,i_2}^{(1)}$ |
| $i_{1,1} = 0, \ldots, 4N_1 - 1$ | $i_{1,2} = 8N_2, \ldots, 12N_2 - 1$ | $W_{i_{1,1},i_{1,1}+O_1,i_{1,2},i_{1,2}+2O_2,p,i_2}^{(1)}$ |

$$W_{l,l',m,m',p,n}^{(1)} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = \begin{bmatrix} 1 & c_{n,1} & c_{n,2} & c_{n,3} \end{bmatrix}^T, \quad c_{n,r} = \varphi_{\lfloor n/4^{3-r} \rfloor \bmod 4}$$

$$P = 12$$
$$i_2 = 0, 1, \ldots, 63$$
$$p \in \{1, 0.5, 0.25, 0\}$$

$$N_1 = 3, N_2 = 2$$

| | | |
|---|---|---|
| $i_{1,1} = 0, \ldots, 4N_1 - 1$ | $i_{1,2} = 0, 1, \ldots, 4N_2 - 1$ | $W_{i_{1,1},i_{1,1}+O_1,i_{1,2},i_{1,2},p,i_2}^{(1)}$ |
| $i_{1,1} = 4N_1, \ldots, 8N_1 - 1$ | $i_{1,2} = 4N_2, \ldots, 8N_2 - 1$ | $W_{i_{1,1},i_{1,1},i_{1,2},i_{1,2}+O_2,p,i_2}^{(1)}$ |
| $i_{1,1} = 0, \ldots, 4N_1 - 1$ | $i_{1,2} = 4N_2, \ldots, 8N_2 - 1$ | $W_{i_{1,1},i_{1,1}+O_1,i_{1,2},i_{1,2}+O_2,p,i_2}^{(1)}$ |
| $i_{1,1} = 8N_1, \ldots, 12N_1 - 1$ | $i_{1,2} = 0, 1, \ldots, 4N_2 - 1$ | $W_{i_{1,1},i_{1,1}+2O_1,i_{1,2},i_{1,2},p,i_2}^{(1)}$ |
| $i_{1,1} = 8N_1, \ldots, 12N_1 - 1$ | $i_{1,2} = 4N_2, \ldots, 8N_2 - 1$ | $W_{i_{1,1},i_{1,1}+2O_1,i_{1,2},i_{1,2}+O_2,p,i_2}^{(1)}$ |

$$W_{l,l',m,m',p,n}^{(1)} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = \begin{bmatrix} 1 & c_{n,1} & c_{n,2} & c_{n,3} \end{bmatrix}^T, \quad c_{n,r} = \varphi_{\lfloor n/4^{3-r} \rfloor \bmod 4}$$

$$P = 16/20/24/28/32$$
$$i_2 = 0, 1, \ldots, 63$$
$$p \in \{1, 0.5, 0.25, 0\}$$

$$N_2 > N_1 > 1$$

| | | |
|---|---|---|
| $i_{1,1} = 0, \ldots, 4N_1 - 1$ | $i_{1,2} = 0, 1, \ldots, 4N_2 - 1$ | $W_{i_{1,1},i_{1,1}+O_1,i_{1,2},i_{1,2},p,i_2}^{(1)}$ |
| $i_{1,1} = 4N_1, \ldots, 8N_1 - 1$ | $i_{1,2} = 4N_2, \ldots, 8N_2 - 1$ | $W_{i_{1,1},i_{1,1},i_{1,2},i_{1,2}+O_2,p,i_2}^{(1)}$ |
| $i_{1,1} = 0, \ldots, 4N_1 - 1$ | $i_{1,2} = 4N_2, \ldots, 8N_2 - 1$ | $W_{i_{1,1},i_{1,1}+O_1,i_{1,2},i_{1,2}+O_2,p,i_2}^{(2)}$ |
| $i_{1,1} = 4N_1, \ldots, 8N_1 - 1$ | $i_{1,2} = 8N_2, \ldots, 12N_2 - 1$ | $W_{i_{1,1},i_{1,1},i_{1,2},i_{1,2}+2O_2,p,i_2}^{(1)}$ |
| $i_{1,1} = 0, \ldots, 4N_1 - 1$ | $i_{1,2} = 8N_2, \ldots, 12N_2 - 1$ | $W_{i_{1,1},i_{1,1}+O_1,i_{1,2},i_{1,2}+2O_2,p,i_2}^{(1)}$ |
| $i_{1,1} = 4N_1, \ldots, 8N_1 - 1$ | $i_{1,2} = 12N_2, \ldots, 16N_2 - 1$ | $W_{i_{1,1},i_{1,1},i_{1,2},i_{1,2}+3O_2,p,i_2}^{(1)}$ |
| $i_{1,1} = 0, \ldots, 4N_1 - 1$ | $i_{1,2} = 12N_2, \ldots, 16N_2 - 1$ | $W_{i_{1,1},i_{1,1}+O_1,i_{1,2},i_{1,2}+3O_2,p,i_2}^{(1)}$ |

$$W_{l,l',m,m',p,n}^{(1)} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = \begin{bmatrix} 1 & c_{n,1} & c_{n,2} & c_{n,3} \end{bmatrix}^T, \quad c_{n,r} = \varphi_{\lfloor n/4^{3-r} \rfloor \bmod 4}$$

$$P = 16/20/24/28/32$$
$$i_2 = 0, 1, \ldots, 63$$
$$p \in \{1, 0.5, 0.25, 0\}$$

$$N_1 \geq N_2 > 1$$

| | | |
|---|---|---|
| $i_{1,1} = 0, \ldots, 4N_1 - 1$ | $i_{1,2} = 0, 1, \ldots, 4N_2 - 1$ | $W_{i_{1,1},i_{1,1}+O_1,i_{1,2},i_{1,2},p,i_2}^{(1)}$ |
| $i_{1,1} = 4N_1, \ldots, 8N_1 - 1$ | $i_{1,2} = 4N_2, \ldots, 8N_2 - 1$ | $W_{i_{1,1},i_{1,1},i_{1,2},i_{1,2}+O_2,p,i_2}^{(1)}$ |
| $i_{1,1} = 0, \ldots, 4N_1 - 1$ | $i_{1,2} = 4N_2, \ldots, 8N_2 - 1$ | $W_{i_{1,1},i_{1,1}+O_1,i_{1,2},i_{1,2}+O_2,p,i_2}^{(1)}$ |
| $i_{1,1} = 8N_1, \ldots, 12N_1 - 1$ | $i_{1,2} = 0, 1, \ldots, 4N_2 - 1$ | $W_{i_{1,1},i_{1,1}+2O_1,i_{1,2},i_{1,2},p,i_2}^{(1)}$ |
| $i_{1,1} = 8N_1, \ldots, 12N_1 - 1$ | $i_{1,2} = 4N_2, \ldots, 8N_2 - 1$ | $W_{i_{1,1},i_{1,1}+2O_1,i_{1,2},i_{1,2}+O_2,p,i_2}^{(1)}$ |
| $i_{1,1} = 12N_1, \ldots, 16N_1 - 1$ | $i_{1,2} = 0, 1, \ldots, 4N_2 - 1$ | $W_{i_{1,1},i_{1,1}+3O_1,i_{1,2},i_{1,2},p,i_2}^{(1)}$ |
| $i_{1,1} = 12N_1, \ldots, 16N_1 - 1$ | $i_{1,2} = 4N_2, \ldots, 8N_2 - 1$ | $W_{i_{1,1},i_{1,1}+3O_1,i_{1,2},i_{1,2}+O_2,p,i_2}^{(1)}$ |

TABLE 49-continued $$W^{(1)}_{l,l',m,m',p,n} = \frac{x_{l,l',m,m',p}c_n}{\|x_{l,l',m,m',p}c_n\|},$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$$c_n = [\, 1 \;\; c_{n,1} \;\; c_{n,2} \;\; c_{n,3} \,]^T, \; c_{n,r} = \varphi_{\lfloor n/4^{3-r}\rfloor \bmod 4}$$

TABLE 50

Codebook for 2-layer CSI reporting using antenna ports 15 to 14 + P

P = 8
$i_2 = 0, 1, \ldots, 4095$
$p \in \{1, 0.5, 0.25, 0\}$ $N_1 = N_2 = 2$

| | | |
|---|---|---|
| $i_{1,1} = 0, \ldots, 4N_1 - 1$ | $i_{1,2} = 0, 1, \ldots, 4N_2 - 1$ | $W^{(2)}_{i_{1,1},\, i_{1,1}+O_1,\, i_{1,2},\, i_{1,2},\, p,\, i_2}$ |
| $i_{1,1} = 4N_1, \ldots, 8N_1 - 1$ | $i_{1,2} = 4N_2, \ldots, 8N_2 - 1$ | $W^{(2)}_{i_{1,1},\, i_{1,1},\, i_{1,2},\, i_{1,2}+O_2,\, i_2}$ |
| $i_{1,1} = 0, \ldots, 4N_1 - 1$ | $i_{1,2} = 4N_2, \ldots, 8N_2 - 1$ | $W^{(2)}_{i_{1,1},\, i_{1,1}+O_1,\, i_{1,2},\, i_{1,2}+O_2,\, p,\, i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|},\; \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$c_{n,0} = [\, 1 \;\; c_{n,0,1} \;\; c_{n,0,2} \;\; c_{n,0,3} \,]^T, \; c_{n,0,r} = \varphi_{\lfloor n/4^{3-r}\rfloor \bmod 4}$ $c_{n,1} = [\, 1 \;\; c_{n,1,1} \;\; c_{n,1,2} \;\; c_{n,1,3} \,]^T, \; c_{n,1,r} = \varphi_{\lfloor n/4^{6-r}\rfloor \bmod 4}$ P = 12
$i_2 = 0, 1, \ldots, 4095$
$p \in \{1, 0.5, 0.25, 0\}$ $N_1 = 2, N_2 = 3$

| | | |
|---|---|---|
| $i_{1,1} = 0, \ldots, 4N_1 - 1$ | $i_{1,2} = 0, 1, \ldots, 4N_2 - 1$ | $W^{(2)}_{i_{1,1},\, i_{1,1}+O_1,\, i_{1,2},\, i_{1,2},\, p,\, i_2}$ |
| $i_{1,1} = 4N_1, \ldots, 8N_1 - 1$ | $i_{1,2} = 4N_2, \ldots, 8N_2 - 1$ | $W^{(2)}_{i_{1,1},\, i_{1,1},\, i_{1,2},\, i_{1,2}+O_2,\, i_2}$ |
| $i_{1,1} = 0, \ldots, 4N_1 - 1$ | $i_{1,2} = 4N_2, \ldots, 8N_2 - 1$ | $W^{(2)}_{i_{1,1},\, i_{1,1}+O_1,\, i_{1,2},\, i_{1,2}+O_2,\, p,\, i_2}$ |
| $i_{1,1} = 4N_1, \ldots, 8N_1 - 1$ | $i_{1,2} = 8N_2, \ldots, 12N_2 - 1$ | $W^{(2)}_{i_{1,1},\, i_{1,1},\, i_{1,2},\, i_{1,2}+2O_2,\, p,\, i_2}$ |
| $i_{1,1} = 0, \ldots, 4N_1 - 1$ | $i_{1,2} = 8N_2, \ldots, 12N_2 - 1$ | $W^{(2)}_{i_{1,1},\, i_{1,1}+O_1,\, i_{1,2},\, i_{1,2}+2O_2,\, p,\, i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|},\; \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\,v_{l',m'} & 0 & 0 \\ 0 & 0 & v_{l,m} & \sqrt{p}\,v_{l',m'} \end{bmatrix}$$

$c_{n,0} = [\, 1 \;\; c_{n,0,1} \;\; c_{n,0,2} \;\; c_{n,0,3} \,]^T, \; c_{n,0,r} = \varphi_{\lfloor n/4^{3-r}\rfloor \bmod 4}$ $c_{n,1} = [\, 1 \;\; c_{n,1,1} \;\; c_{n,1,2} \;\; c_{n,1,3} \,]^T, \; c_{n,1,r} = \varphi_{\lfloor n/4^{6-r}\rfloor \bmod 4}$ P = 12
$i_2 = 0, 1, \ldots, 4095$
$p \in \{1, 0.5, 0.25, 0\}$ $N_1 = 3, N_2 = 2$

| | | |
|---|---|---|
| $i_{1,1} = 0, \ldots, 4N_1 - 1$ | $i_{1,2} = 0, 1, \ldots, 4N_2 - 1$ | $W^{(2)}_{i_{1,1},\, i_{1,1}+O_1,\, i_{1,2},\, i_{1,2},\, p,\, i_2}$ |
| $i_{1,1} = 4N_1, \ldots, 8N_1 - 1$ | $i_{1,2} = 4N_2, \ldots, 8N_2 - 1$ | $W^{(2)}_{i_{1,1},\, i_{1,1},\, i_{1,2},\, i_{1,2}+O_2,\, p,\, i_2}$ |
| $i_{1,1} = 0, \ldots 4N_1 - 1$ | $i_{1,2} = 4N_2, \ldots, 8N_2 - 1$ | $W^{(2)}_{i_{1,1},\, i_{1,1}+O_1,\, i_{1,2},\, i_{1,2}+O_2,\, p,\, i_2}$ |

TABLE 50-continued

Codebook for 2-layer CSI reporting using antenna ports 15 to 14 + P

| | | |
|---|---|---|
| $i_{1,1} = 8N_1, \ldots, 12N_1 - 1$ | $i_{1,2} = 0, 1, \ldots, 4N_2 - 1$ | $W^{(2)}_{i_{1,1}, i_{1,1}+2O_1, i_{1,2}, i_{1,2}, p, i_2}$ |
| $i_{1,1} = 8N_1, \ldots, 12N_1 - 1$ | $i_{1,2} = 4N_2, \ldots, 8N_2 - 1$ | $W^{(2)}_{i_{1,1}, i_{1,1}+2O_1, i_{1,2}, i_{1,2}+O_2, p, i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = \begin{bmatrix} 1 & c_{n,0,1} & c_{n,0,2} & c_{n,0,3} \end{bmatrix}^T,\ c_{n,0,r} = \varphi_{\lfloor n/4^{3-r} \rfloor \bmod 4}$ $c_{n,1} = \begin{bmatrix} 1 & c_{n,1,1} & c_{n,1,2} & c_{n,1,3} \end{bmatrix}^T,\ c_{n,1,r} = \varphi_{\lfloor n/4^{6-r} \rfloor \bmod 4}$ $P = 16/20/24/28/32$
$i_2 = 0, 1, \ldots, 4095$
$p \in \{1, 0.5, 0.25, 0\}$ $N_2 > N_1 > 1$

| | | |
|---|---|---|
| $i_{1,1} = 0, \ldots, 4N_1 - 1$ | $i_{1,2} = 0, 1, \ldots, 4N_2 - 1$ | $W^{(2)}_{i_{1,1}, i_{1,1}+O_1, i_{1,2}, i_{1,2}, p, i_2}$ |
| $i_{1,1} = 4N_1, \ldots, 8N_1 - 1$ | $i_{1,2} = 4N_2, \ldots, 8N_2 - 1$ | $W^{(2)}_{i_{1,1}, i_{1,1}, i_{1,2}, i_{1,2}+O_2, p, i_2}$ |
| $i_{1,1} = 0, \ldots, 4N_1 - 1$ | $i_{1,2} = 4N_2, \ldots, 8N_2 - 1$ | $W^{(2)}_{i_{1,1}, i_{1,1}+O_1, i_{1,2}, i_{1,2}+O_2, p, i_2}$ |
| $i_{1,1} = 4N_1, \ldots, 8N_1 - 1$ | $i_{1,2} = 8N_2, \ldots, 12N_2 - 1$ | $W^{(2)}_{i_{1,1}, i_{1,1}, i_{1,2}, i_{1,2}+2O_2, p, i_2}$ |
| $i_{1,1} = 0, \ldots, 4N_1 - 1$ | $i_{1,2} = 8N_2, \ldots, 12N_2 - 1$ | $W^{(2)}_{i_{1,1}, i_{1,1}+O_1, i_{1,2}, i_{1,2}+2O_2, p, i_2}$ |
| $i_{1,1} = 4N_1, \ldots, 8N_1 - 1$ | $i_{1,2} = 12N_2, \ldots, 16N_2 - 1$ | $W^{(2)}_{i_{1,1}, i_{1,1}, i_{1,2}, i_{1,2}+3O_2, p, i_2}$ |
| $i_{1,1} = 0, \ldots, 4N_1 - 1$ | $i_{1,2} = 12N_2, \ldots, 16N_2 - 1$ | $W^{(2)}_{i_{1,1}, i_{1,1}+O_1, i_{1,2}, i_{1,2}+3O_2, p, i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = \begin{bmatrix} 1 & c_{n,0,1} & c_{n,0,2} & c_{n,0,3} \end{bmatrix}^T,\ c_{n,0,r} = \varphi_{\lfloor n/4^{3-r} \rfloor \bmod 4}$ $c_{n,1} = \begin{bmatrix} 1 & c_{n,1,1} & c_{n,1,2} & c_{n,1,3} \end{bmatrix}^T,\ c_{n,1,r} = \varphi_{\lfloor n/4^{6-r} \rfloor \bmod 4}$ $P = 16/20/24/28/32$
$i_2 = 0, 1, \ldots, 4095$
$p \in \{1, 0.5, 0.25, 0\}$ $N_1 \geq N_2 > 1$

| | | |
|---|---|---|
| $i_{1,1} = 0, \ldots, 4N_1 - 1$ | $i_{1,2} = 0, 1, \ldots, 4N_2 - 1$ | $W^{(2)}_{i_{1,1}, i_{1,1}+O_1, i_{1,2}, i_{1,2}, p, i_2}$ |
| $i_{1,1} = 4N_1, \ldots, 8N_1 - 1$ | $i_{1,2} = 4N_2, \ldots, 8N_2 - 1$ | $W^{(2)}_{i_{1,1}, i_{1,1}, i_{1,2}, i_{1,2}+O_2, p, i_2}$ |
| $i_{1,1} = 0, \ldots, 4N_1 - 1$ | $i_{1,2} = 4N_2, \ldots, 8N_2 - 1$ | $W^{(2)}_{i_{1,1}, i_{1,1}+O_1, i_{1,2}, i_{1,2}+O_2, p, i_2}$ |
| $i_{1,1} = 8N_1, \ldots, 12N_1 - 1$ | $i_{1,2} = 0, 1, \ldots, 4N_2 - 1$ | $W^{(2)}_{i_{1,1}, i_{1,1}+2O_1, i_{1,2}, i_{1,2}, p, i_2}$ |
| $i_{1,1} = 8N_1, \ldots, 12N_1 - 1$ | $i_{1,2} = 4N_2, \ldots, 8N_2 - 1$ | $W^{(2)}_{i_{1,1}, i_{1,1}+2O_1, i_{1,2}, i_{1,2}+O_2, p, i_2}$ |
| $i_{1,1} = 12N_1, \ldots, 16N_1 - 1$ | $i_{1,2} = 0, 1, \ldots, 4N_2 - 1$ | $W^{(2)}_{i_{1,1}, i_{1,1}+3O_1, i_{1,2}, i_{1,2}, p, i_2}$ |
| $i_{1,1} = 12N_1, \ldots, 16N_1 - 1$ | $i_{1,2} = 4N_2, \ldots, 8N_2 - 1$ | $W^{(2)}_{i_{1,1}, i_{1,1}+3O_1, i_{1,2}, i_{1,2}+O_2, p, i_2}$ |

$$W^{(2)}_{l,l',m,m',p,n} = \frac{1}{\sqrt{2}} \left[ \frac{x_{l,l',m,m',p}c_{n,0}}{\|x_{l,l',m,m',p}c_{n,0}\|}, \frac{x_{l,l',m,m',p}c_{n,1}}{\|x_{l,l',m,m',p}c_{n,1}\|} \right],$$

$$x_{l,l',m,m',p} = \begin{bmatrix} v_{l,m} & v_{l',m'} & 0 & 0 \\ 0 & 0 & v_{l,m} & v_{l',m'} \end{bmatrix} \begin{bmatrix} 1 & 0 & 0 & 0 \\ 0 & \sqrt{p} & 0 & 0 \\ 0 & 0 & 1 & 0 \\ 0 & 0 & 0 & \sqrt{p} \end{bmatrix} = \begin{bmatrix} v_{l,m} & \sqrt{p}\, v_{l',m'} & 0 & 0 \\ 0 & 0 & v_{l,m} & \sqrt{p}\, v_{l',m'} \end{bmatrix}$$

$c_{n,0} = \begin{bmatrix} 1 & c_{n,0,1} & c_{n,0,2} & c_{n,0,3} \end{bmatrix}^T,\ c_{n,0,r} = \varphi_{\lfloor n/4^{3-r} \rfloor \bmod 4}$ $c_{n,1} = \begin{bmatrix} 1 & c_{n,1,1} & c_{n,1,2} & c_{n,1,3} \end{bmatrix}^T,\ c_{n,1,r} = \varphi_{\lfloor n/4^{6-r} \rfloor \bmod 4}$ In some embodiments of I, the UE is configured with an LC codebook in which there one codebook for both 1 layer and 2 layer CSI reporting. An example is shown in TABLE 51 in which the codebook table is parameterized by layer value l=0, 1. The value of the second beam index (d$_1$, d$_2$) and the beam power p are the same as in TABLE 43, hence the second beam index (d$_1$, d$_2$) and the beam power p are not shown. Note that a subscript l is introduced in the second PMI index (i.e., i$_{2,l}$) in order to make the table applicable to each of layer l=0 and 1. For 1 layer, the second PMI can be obtained as i$_2$=i$_{2,0}$ and for 2 layers, it can be obtained as i$_2$=64*i$_{2,0}$+i$_{2,1}$ or i$_2$=64*i$_{2,1}$+i$_{2,0}$. Note that the second PMI i$_{2,l}$ is used to determine in three sub-indices i$_{2,l,1}$, i$_{2,l,2}$, and i$_{2,l,3}$ for the three LC coefficients, each of which belongs to {0, 1, 2, 3}.

TABLE 51

Codebook for 1-layer and 2-layer CSI reporting using antenna ports 15 to 14 + P
P = 4, 8, 12, 16, 20, 24, 28, 32

| N$_2$ = 1 | N$_1$ > 1, N$_2$ > 1 | i$_{2,l}$ = 0, 1, . . . , 63 |
|---|---|---|
| i$_{1,1}$ = 0, . . . , 4N$_1$ − 1<br>i$_{1,2}$ = 0 | i$_{1,1}$ = 0, . . . , 4N$_1$ − 1<br>i$_{1,2}$ = 0, . . . , 4N$_2$ − 1 | i$_{2,l,1}$ = i$_{2,l}$ mod 4<br>i$_{2,l,2}$ = ⌊i$_{2,l}$/4⌋ mod 4<br>i$_{2,l,3}$ = ⌊i$_{2,l}$/16⌋<br>W$^{(l)}_{i_{1,1},i_{1,2},4d_1,4d_2,p,i_{2,l,1},i_{2,l,2},i_{2,l,3}}$ |

$$W^{(l)}_{l,m,l',m',p,n_1,n_2,n_3} = \frac{1}{\sqrt{P(1+p)}} \begin{bmatrix} v_{l,m} + \sqrt{p}\,\varphi_{n_1} v_{l+l',m+m'} \\ \varphi_{n_2} v_{l,m} + \sqrt{p}\,\varphi_{n_3} v_{l+l',m+m'} \end{bmatrix}, l = 0, 1$$

1 layer: $W^{(1)}_{l,l',m,m',p,n_1,n_2,n_3} = W^{(l=0)}_{l,l',m,m',p,n_1,n_2,n_3}$ 2 layers: $W^{(2)}_{l,l',m,m',p,n_{1,0},n_{2,0},n_{3,0},n_{1,1},n_{2,1},n_{3,1}} = \frac{1}{\sqrt{2}} \left[ W^{(l=0)}_{l,l',m,m',p,n_{1,0},n_{2,0},n_{3,0}} \quad W^{(l=1)}_{l,l',m,m',p,n_{1,1},n_{2,1},n_{3,1}} \right]$ In some embodiments of I-0, the three sub-indices i$_{2,l,1}$, i$_{2,l,2}$, and i$_{2,l,3}$ can be mapped to any one of the following combinations: i$_{2,l,1}$=i$_{2,l}$ mod 4, i$_{2,l,2}$=⌊i$_{2,l}$/4⌋ mod 4, and i$_{2,l,3}$=⌊i$_{2,l}$/16⌋; i$_{2,l,2}$=i$_{2,l}$ mod 4, i$_{2,l,1}$=⌊i$_{2,l}$/4⌋ mod 4, and i$_{2,l,3}$=⌊i$_{2,l}$/16⌋; i$_{2,l,1}$=i$_{2,l}$ mod 4, i$_{2,l,2}$=⌊i$_{2,l}$/4⌋ mod 4, and i$_{2,l,3}$=⌊i$_{2,l}$/16⌋; or i$_{2,l,1}$=i$_{2,l}$ mod 4, i$_{2,l,3}$=⌊i$_{2,l}$/4⌋ mod 4, and i$_{2,l,2}$=⌊i$_{2,l}$/16⌋.

In some embodiments of I-1, the LC codebook in TABLE 51 can equivalently constructed either as shown in TABLE 52 or TABLE 53 such that the codebook table is expressed in terms of 16 pair of values for two coefficients and a dummy variable x for the third coefficient.

TABLE 52

Codebook for 1-layer and 2-layer CSI reporting using antenna ports 15 to 14 + P
P = 4, 8, 12, 16, 20, 24, 28, 32
0 ≤ i$_{2,l}$ ≤ 63
0 ≤ i$_{1,1}$ ≤ 4N$_1$ −1,
i$_{1,2}$ = 0 if N$_2$ = 1
0 ≤ i$_{1,2}$ ≤ 4N$_2$ − 1, N$_1$ > 1, N$_2$ > 1

| 0 + 16x | 1 + 16x | 2 + 16x | 3 + 16x |
|---|---|---|---|
| W$^{(l)}_{i_{1,1},i_{1,2},4d_1,4d_2,p,0,0,x}$ | W$^{(l)}_{i_{1,1},i_{1,2},4d_1,4d_2,p,0,1,x}$ | W$^{(l)}_{i_{1,1},i_{1,2},4d_1,4d_2,p,0,2,x}$ | W$^{(l)}_{i_{1,1},i_{1,2},4d_1,4d_2,p,0,3,x}$ |
| 4 + 16x | 5 + 16x | 6 + 16x | 7 + 16x |
| W$^{(l)}_{i_{1,1},i_{1,2},4d_1,4d_2,p,1,0,x}$ | W$^{(l)}_{i_{1,1},i_{1,2},4d_1,4d_2,p,1,1,x}$ | W$^{(l)}_{i_{1,1},i_{1,2},4d_1,4d_2,p,1,2,x}$ | W$^{(l)}_{i_{1,1},i_{1,2},4d_1,4d_2,p,1,3,x}$ |
| 8 + 16x | 9 + 16x | 10 + 16x | 11 + 16x |
| W$^{(l)}_{i_{1,1},i_{1,2},4d_1,4d_2,p,2,0,x}$ | W$^{(l)}_{i_{1,1},i_{1,2},4d_1,4d_2,p,2,1,x}$ | W$^{(l)}_{i_{1,1},i_{1,2},4d_1,4d_2,p,2,2,x}$ | W$^{(l)}_{i_{1,1},i_{1,2},4d_1,4d_2,p,2,3,x}$ |

TABLE 52-continued

| 12 + 16x | 13 + 16x | 14 + 16x | 15 + 16x |
|---|---|---|---|
| $W_{i_{1,1},i_{1,2},4d_1,4d_2,p,3,0,x}^{(l)}$ | $W_{i_{1,1},i_{1,2},4d_1,4d_2,p,3,1,x}^{(l)}$ | $W_{i_{1,1},i_{1,2},4d_1,4d_2,p,3,2,x}^{(l)}$ | $W_{i_{1,1},i_{1,2},4d_1,4d_2,p,3,3,x}^{(l)}$ | where $x = \lfloor i_{2,l}/16 \rfloor$, l denotes an index for a layer value, $(d_1, d_2)$ denotes a beam index of the second beam and takes a value from up to a $\{0, 1, 2, 3\}$-bit table, p is a beam power of the second beam and takes a value from a 2-bit table, $(N_1, N_2)$ denotes a dual-polarized CSI-RS port layout in two dimensions, P denotes a number of CSI-RS ports, $$W_{l,m,l',m',p,n_1,n_2,n_3}^{(l)} = \frac{1}{\sqrt{P(1+p)}} \begin{bmatrix} v_{l,m} + \sqrt{p}\, \varphi_{n_1} v_{l+l',m+m'} \\ \varphi_{n_2} v_{l,m} + \sqrt{p}\, \varphi_{n_3} v_{l+l',m+m'} \end{bmatrix}, l = 0, 1$$

1 layer: $W_{l,l',m,m',p,n_1,n_2,n_3}^{(1)} = W_{l,l',m,m',p,n_1,n_2,n_3}^{(l=0)}$ 2 layers: $W_{l,l',m,m',p,n_{1,0},n_{2,0},n_{3,0},n_{1,1},n_{2,1},n_{3,1}}^{(2)} = \frac{1}{\sqrt{2}} \begin{bmatrix} W_{l,l',m,m',p,n_{1,0},n_{2,0},n_{3,0}}^{(l=0)} & W_{l,l',m,m',p,n_{1,1},n_{2,1},n_{3,1}}^{(l=1)} \end{bmatrix}$

TABLE 53

Codebook for 1-layer and 2-layer CSI reporting using antenna ports 15 to 14 + P
P = 4, 8, 12, 16, 20, 24, 28, 32
$0 \leq i_{2,l} \leq 63$
$N_1 > 1, N_2 > 1$
$0 \leq i_{1,1} \leq 4N_1 - 1$,
$0 \leq i_{1,2} \leq 4N_2 - 1$,

| 0 + 16x | 1 + 16x | 2 + 16x | 3 + 16x |
|---|---|---|---|
| $W_{i_{1,1},i_{1,2},4d_1,4d_2,p,0,0,x}^{(l)}$ | $W_{i_{1,1},i_{1,2},4d_1,4d_2,p,0,1,x}^{(l)}$ | $W_{i_{1,1},i_{1,2},4d_1,4d_2,p,0,2,x}^{(l)}$ | $W_{i_{1,1},i_{1,2},4d_1,4d_2,p,0,3,x}^{(l)}$ |

| 4 + 16x | 5 + 16x | 6 + 16x | 7 + 16x |
|---|---|---|---|
| $W_{i_{1,1},i_{1,2},4d_1,4d_2,p,1,0,x}^{(l)}$ | $W_{i_{1,1},i_{1,2},4d_1,4d_2,p,1,1,x}^{(l)}$ | $W_{i_{1,1},i_{1,2},4d_1,4d_2,p,1,2,x}^{(l)}$ | $W_{i_{1,1},i_{1,2},4d_1,4d_2,p,1,3,x}^{(l)}$ |

| 8 + 16x | 9 + 16x | 10 + 16x | 11 + 16x |
|---|---|---|---|
| $W_{i_{1,1},i_{1,2},4d_1,4d_2,p,2,0,x}^{(l)}$ | $W_{i_{1,1},i_{1,2},4d_1,4d_2,p,2,1,x}^{(l)}$ | $W_{i_{1,1},i_{1,2},4d_1,4d_2,p,2,2,x}^{(l)}$ | $W_{i_{1,1},i_{1,2},4d_1,4d_2,p,2,3,x}^{(l)}$ |

| 12 + 16x | 13 + 16x | 14 + 16x | 15 + 16x |
|---|---|---|---|
| $W_{i_{1,1},i_{1,2},4d_1,4d_2,p,3,0,x}^{(l)}$ | $W_{i_{1,1},i_{1,2},4d_1,4d_2,p,3,1,x}^{(l)}$ | $W_{i_{1,1},i_{1,2},4d_1,4d_2,p,3,2,x}^{(l)}$ | $W_{i_{1,1},i_{1,2},4d_1,4d_2,p,3,3,x}^{(l)}$ |

$N_2 = 1$
$0 \leq i_{1,1} \leq 4N_1 - 1$,
$i_{1,2} = 0$

| 0 + 16x | 1 + 16x | 2 + 16x | 3 + 16x |
|---|---|---|---|
| $W_{i_{1,1},i_{1,2},4d_1,d_2,p,0,0,x}^{(l)}$ | $W_{i_{1,1},i_{1,2},4d_1,d_2,p,0,1,x}^{(l)}$ | $W_{i_{1,1},i_{1,2},4d_1,d_2,p,0,2,x}^{(l)}$ | $W_{i_{1,1},i_{1,2},4d_1,d_2,p,0,3,x}^{(l)}$ |

| 4 + 16x | 5 + 16x | 6 + 16x | 7 + 16x |
|---|---|---|---|
| $W_{i_{1,1},i_{1,2},4d_1,d_2,p,1,0,x}^{(l)}$ | $W_{i_{1,1},i_{1,2},4d_1,d_2,p,1,1,x}^{(l)}$ | $W_{i_{1,1},i_{1,2},4d_1,d_2,p,1,2,x}^{(l)}$ | $W_{i_{1,1},i_{1,2},4d_1,d_2,p,1,3,x}^{(l)}$ |

| 8 + 16x | 9 + 16x | 10 + 16x | 11 + 16x |
|---|---|---|---|
| $W_{i_{1,1},i_{1,2},4d_1,d_2,p,2,0,x}^{(l)}$ | $W_{i_{1,1},i_{1,2},4d_1,d_2,p,2,1,x}^{(l)}$ | $W_{i_{1,1},i_{1,2},4d_1,d_2,p,2,2,x}^{(l)}$ | $W_{i_{1,1},i_{1,2},4d_1,d_2,p,2,3,x}^{(l)}$ |

| 12 + 16x | 13 + 16x | 14 + 16x | 15 + 16x |
|---|---|---|---|
| $W_{i_{1,1},i_{1,2},4d_1,d_2,p,3,0,x}^{(l)}$ | $W_{i_{1,1},i_{1,2},4d_1,d_2,p,3,1,x}^{(l)}$ | $W_{i_{1,1},i_{1,2},4d_1,d_2,p,3,2,x}^{(l)}$ | $W_{i_{1,1},i_{1,2},4d_1,d_2,p,3,3,x}^{(l)}$ | where $x = \lfloor i_{2,l}/16 \rfloor$, l denotes an index for a layer value, $(d_1, d_2)$ denotes a beam index of the second beam and takes a value from up to a $\{0, 1, 2, 3\}$-bit table, p is a beam power of the second beam and takes a value from a 2-bit table, $(N_1, N_2)$ denotes a dual-polarized CSI-RS port layout in two dimensions, P denotes a number of CSI-RS ports, $$W_{l,m,l',m',p,n_1,n_2,n_3}^{(l)} = \frac{1}{\sqrt{P(1+p)}} \begin{bmatrix} v_{l,m} + \sqrt{p}\, \varphi_{n_1} v_{l+l',m+m'} \\ \varphi_{n_2} v_{l,m} + \sqrt{p}\, \varphi_{n_3} v_{l+l',m+m'} \end{bmatrix}, l = 0, 1$$

1 layer: $W_{l,l',m,m',p,n_1,n_2,n_3}^{(1)} = W_{l,l',m,m',p,n_1,n_2,n_3}^{(l=0)}$ 2 layers: $W_{l,l',m,m',p,n_{1,0},n_{2,0},n_{3,0},n_{1,1},n_{2,1},n_{3,1}}^{(2)} = \frac{1}{\sqrt{2}} \begin{bmatrix} W_{l,l',m,m',p,n_{1,0},n_{2,0},n_{3,0}}^{(l=0)} & W_{l,l',m,m',p,n_{1,1},n_{2,1},n_{3,1}}^{(l=1)} \end{bmatrix}$ In some embodiments of I-2, the fifth subscript (p) for the beam power is not included in the pre-coder equation, i.e., the pre-coder equation is given by $W_{i_{1,1},i_{1,2},4d_1,4d_2,i_{1,1},i_{2,2},i_{2,3}}$, since for periodic reporting using PUCCH mode 1-1, beam power is reported jointly with RI, not with indices related with the PMI. In this case, the pre-coder equation is given by equation (4):

$$W^{(l)}_{l,m,l',m',n_1,n_2,n_3} = \frac{1}{\sqrt{P(1+p)}} \begin{bmatrix} v_{l,m} + \sqrt{p}\, \varphi_{n_1} v_{l+l',m+m'} \\ \varphi_{n_2} v_{l,m} + \sqrt{p}\, \varphi_{n_3} v_{l+l',m+m'} \end{bmatrix} \quad \text{Equation (4)}$$

In some embodiment of I-3, the beam power is defined with the squared-root, hence the squared-root is needed in the pre-coder equation, i.e. it is given by equation (5):

$$W^{(l)}_{l,m,l',m',n_1,n_2,n_3} \text{ or}$$

$$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2} v_{l,m} + p\varphi_{n_3} v_{l+l',m+m'} \end{bmatrix}. \quad \text{Equation (5)}$$

In some embodiment of I-4, the pre-coder equation is equivalently written as:

$$W^{(l)}_{l,m,l',m',n_1,n_2,n_3} \text{ or}$$

$$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix}.$$

This is due to the fact that from equation (4), we have $$\varphi_{n_2} v_{l,m} + \sqrt{p}\, \varphi_{n_3} v_{l+l',m+m'} = \varphi_{n_2}\left(v_{l,m} + \sqrt{p}\left(\frac{\varphi_{n_3}}{\varphi_{n_2}}\right) v_{l+l',m+m'}\right)$$

and since $$\frac{\varphi_{n_3}}{\varphi_{n_2}}$$

also belongs to $$\{\varphi_n : n = 0, 1, 2, 3\}, v_{l,m} + \sqrt{p}\left(\frac{\varphi_{n_3}}{\varphi_{n_2}}\right) v_{l+l',m+m'}$$

is equivalent to $v_{l,m}+\sqrt{p}\varphi_{n_3}v_{l+l',m+m'}$.

The 1 layer and 2 layer advanced CSI codebook tables may be according to at least one of the 1 layer and 2 layer codebook tables in this present disclosure with possible variation according to other embodiments in this present disclosure where variation includes variation in the number of the first PMIs and the number of second PMIs.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of theclaims are intended to invoke 35 U.S.C. § 112(f) unless the exact words "means for" are followed by a participle.

What is claimed is:

1. A user equipment (UE) for a channel state information (CSI) feedback in an advanced communication system, the UE comprising:
   a transceiver configured to receive, from a base station (BS), CSI feedback configuration information for a pre-coding matrix indicator (PMI) feedback based on a linear combination (LC) codebook, wherein the PMI comprises a first PMI $i_1$ and a second PMI $i_2$; and
   at least one processor configured to determine the first PMI $i_1$ and the second PMI $i_2$ indicating an LC pre-coder that corresponds to a weighted linear combination of a first beam and a second beam, wherein a power of a weight assigned to the first beam is 1 and a power of a weight assigned to the second beam is between 0 and 1,
   wherein the transceiver is further configure to transmit, to the BS, the CSI feedback over an uplink channel including the determined first PMI $i_1$ and second PMI $i_2$.

2. The UE of claim 1, wherein:
   the CSI feedback configuration information includes a number of dual-polarized CSI reference signal (CSI-RS) antenna ports P, wherein a first half of the CSI-RS antenna ports corresponds to a first antenna polarization and a second half of the CSI-RS antenna ports corresponds to a second antenna polarization,
   the LC pre-coder corresponding to a weighted linear combination of the first beam, $v_{l,m}$, and the second beam, $v_{l+l',m+m'}$, is determined as:

$$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix},$$

p denotes the power of the weight assigned to the second beam, $\varphi_{n_1}$ denotes a phase of the weight assigned to the second beam for the first half of the CSI-RS ports with the first polarization, and $\varphi_{n_2}$ and $\varphi_{n_3}$ denote a phase of the weights assigned to the first and second beams, respectively, for the second half of the CSI-RS ports with the second polarization.

3. The UE of claim 1, wherein the LC codebook is a single codebook and used to report the CSI feedback for a plurality of layers.

4. The UE of claim 2, wherein:
   the transceiver is further configured to receive, from the BS, dual polarized CSI-RS port layout values comprising (N1, N2) using a higher layer signaling that determines a number of CSI-RS ports P=2N1N2;
   the at least one processor is further configured to:
      determine an oversampling factor (O1, O2) based on a layer value for the CSI feedback, wherein:
         for a 1-layer and 2-layer CSI feedback, O1=4 and O2=1 if N1=1, and O1 =4 otherwise:

for more than the 2-layer CSI feedback, (O1, O2)=(16,1) if (N1, N2)=(2,1), (O1, O2)=(8,1) if (N1, N2)=(4,1), and (O1, O2) are configured using a higher layer signaling for other values of (N1, N2), and $$\varphi_n = e^{j\pi n/2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T.$$

5. The UE of claim 4, wherein a combination of the (N1, N2) is determined as:

| Number of CSI-RS antenna ports, P | (N$_1$, N$_2$) |
|---|---|
| 4 | (2, 1) |
| 8 | (2, 2) |
|  | (4, 1) |
| 12 | (2, 3) |
|  | (3, 2) |
| 16 | (2, 4) |
|  | (4, 2) |
|  | (8, 1) |
| 20 | (2, 5) |
|  | (5, 2) |
|  | (10, 1) |
| 24 | (2, 6) |
|  | (3, 4) |
|  | (4, 3) |
|  | (6, 2) |
|  | (12, 1) |
| 28 | (2, 7) |
|  | (7, 2) |
|  | (14, 1) |
| 32 | (2, 8) |
|  | (4, 4) |

| Number of CSI-RS antenna ports, P | (N$_1$, N$_2$) |
|---|---|
|  | (8, 2) |
|  | (16, 1). |

6. The UE of claim 2, wherein the processor is further configured to at least one of:
derive the first PMI i$_1$ and the second PMI i$_2$ based on the LC codebook when a rank indicator (RI) is less than or equal to two; or
derive the first PMI i$_1$ and the second PMI i$_2$ based on a non-LC codebook when the RI is greater than two, wherein the non-LC codebook is determined in accordance with a long-term-evolution (LTE) specification, and
wherein, for the LC codebook, the first PMI i$_1$ comprises indices (i$_{1,1}$, i$_{1,2}$), i$_{1,b}$, and i$_{1,p}$ indicating (l,m), (l', m'), and p, respectively, in a first five subscripts of a LC pre-coder equation, and the second PMI i$_2$=i$_{2,0}$ for a 1-layer CSI feedback and i$_2$=64·i$_{2,1}$+i$_{2,0}$, where i$_{2,0}$=i$_{2,l}$ mod 64 and i$_{2,1}$=$\lfloor i_{2,l}/64 \rfloor$, for a 2-layer CSI feedback, where i$_{2,l}$ for l=0,1 indicates a last three subscripts of the LC pre-coder equation as $\lfloor i_{2,l}/4 \rfloor$ mod 4, i$_{2,l}$ mod 4, and x=$\lfloor i_{2,l}/16 \rfloor$, respectively.

7. The UE of claim 1, wherein the LC codebook is used for the PMI comprising the first beam and the second beam that are common for a plurality of layers, a weight being assigned to the first beam and the second beam is independent for each layer.

8. The UE of claim 2, wherein the LC pre-coder for 1-layer and 2-layer are given by:
$$W_{l,m,l',m',p,n_1,n_2,n_3}^{(1)} = W_{l,m,l',m',p,n_1,n_2,n_3}^{(l=0)}, \text{ and}$$

$$W_{l,m,l',m',p,n_{1,0},n_{2,0},n_{3,0},n_{1,1},n_{2,1},n_{3,1}}^{(2)} = 1/\sqrt{2}[W_{l,m,l',m',p,n_{1,0},n_{2,0},n_{3,0}}^{(l=0)} \quad W_{l,m,l',m',p,n_{1,1},n_{2,1},n_{3,1}}^{(l=1)}],$$

respectively, where l=0 and l=1 denote a layer value 0 and a layer value 1, respectively.

9. The UE of claim 6, wherein the LC codebook for both 1-layer and 2-layer CSI feedback is given by:

If N$_1$ > 1, N$_2$ > 1, 0 ≤ i$_{1,1}$ ≤ 4N$_1$ − 1, 0 ≤ i$_{1,2}$ ≤ 4N$_2$ − 1
If N$_2$ = 1, 0 ≤ i$_{1,1}$ ≤ 4N$_1$ − 1, i$_{1,2}$ = 0
0 ≤ i$_{2,1}$ ≤ 63

| 0 + 16x | 1 + 16x | 2 + 16x | 3 + 16x |
|---|---|---|---|
| $W^{(l)}_{i_{1,1},i_{1,2},4d_1,4d_2,p,0,0,x}$ | $W^{(l)}_{i_{1,1},i_{1,2},4d_1,4d_2,p,0,1,x}$ | $W^{(l)}_{i_{1,1},i_{1,2},4d_1,4d_2,p,0,2,x}$ | $W^{(l)}_{i_{1,1},i_{1,2},4d_1,4d_2,p,0,3,x}$ |
| 4 + 16x | 5 + 16x | 6 + 16x | 7 + 16x |
| $W^{(l)}_{i_{1,1},i_{1,2},4d_1,4d_2,p,1,0,x}$ | $W^{(l)}_{i_{1,1},i_{1,2},4d_1,4d_2,p,1,1,x}$ | $W^{(l)}_{i_{1,1},i_{1,2},4d_1,4d_2,p,1,2,x}$ | $W^{(l)}_{i_{1,1},i_{1,2},4d_1,4d_2,p,1,3,x}$ |
| 8 + 16x | 9 + 16x | 10 + 16x | 11 + 16x |
| $W^{(l)}_{i_{1,1},i_{1,2},4d_1,4d_2,p,2,0,x}$ | $W^{(l)}_{i_{1,1},i_{1,2},4d_1,4d_2,p,2,1,x}$ | $W^{(l)}_{i_{1,1},i_{1,2},4d_1,4d_2,p,2,2,x}$ | $W^{(l)}_{i_{1,1},i_{1,2},4d_1,4d_2,p,2,3,x}$ |
| 12 + 16x | 13 + 16x | 14 + 16x | 15 + 16x |
| $W^{(l)}_{i_{1,1},i_{1,2},4d_1,4d_2,p,3,0,x}$ | $W^{(l)}_{i_{1,1},i_{1,2},4d_1,4d_2,p,3,1,x}$ | $W^{(l)}_{i_{1,1},i_{1,2},4d_1,4d_2,p,3,2,x}$ | $W^{(l)}_{i_{1,1},i_{1,2},4d_1,4d_2,p,3,3,x}$ | wherein
$$x = \lfloor i_{2,l}/16 \rfloor, \quad W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix},$$

and (i$_{1,1}$, i$_{1,2}$) indicates the first beam, v$_{l,m}$, (d$_1$, d$_2$), indicates the second beam, v$_{l+l',m+m'}$, p indicates the power assigned to the second beam, and the last three subscripts indicate $\varphi_{n_1}$, $\varphi_{n_2}$ and $\varphi_{n_3}$.

10. A base station (BS) for a channel state information (CSI) feedback in an advanced communication system, the BS comprising:
a transceiver configured to:
transmit, to a user equipment (UE), CSI feedback configuration information for a pre-coding matrix indicator (PMI) feedback based on a linear combination (LC) codebook, wherein the PMI comprises a first PMI $i_1$ and a second PMI $i_2$; and
receive, from the UE, the CSI feedback over an uplink channel including the first PMI $i_1$ and second PMI $i_2$ indicating an LC pre-coder that corresponds to a weighted linear combination of a first beam and a second beam, wherein a power of a weight assigned to the first beam is 1 and a power of a weight assigned to the second beam is between 0 and 1.

11. The BS of claim 10, wherein:
the CSI feedback configuration information includes a number of dual-polarized CSI reference signal (CSI-RS) antenna ports P, wherein a first half of the CSI-RS antenna ports corresponds to a first antenna polarization and a second half of the CSI-RS antenna ports corresponds to a second antenna polarization,
the LC pre-coder corresponding to the weighted linear combination of the first beam, $V_{l,m}$, and the second beam, $v_{l+l',m+m'}$, is determined as:

$$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix},$$

p denotes the power of the weight assigned to the second beam, $\varphi_{n_1}$ denotes a phase of the weight assigned to the second beam for the first half of the CSI-RS ports with the first polarization, and $\varphi_{n_2}$ and $\varphi_{n_3}$ denote a phase of the weights assigned to the first and second beams, respectively, for the second half of the CSI-RS ports with the second polarization.

12. The BS of claim 10, wherein the LC codebook is a single codebook and used to report the CSI feedback for a plurality of layers.

13. The BS of claim 11, wherein the transceiver is further configured to transmit, to the UE, dual polarized CSI-RS port layout values comprising (N1, N2) using a higher layer signaling that determines a number of CSI-RS ports P=2N1N2.

14. The BS of claim 13, wherein a combination of the (N1, N2) is determined as:

| Number of CSI-RS antenna ports, P | $(N_1, N_2)$ |
|---|---|
| 4 | (2, 1) |
| 8 | (2, 2) |
|  | (4, 1) |
| 12 | (2, 3) |
|  | (3, 2) |
| 16 | (2, 4) |
|  | (4, 2) |
|  | (8, 1) |
| 20 | (2, 5) |
|  | (5, 2) |
|  | (10, 1) |
| 24 | (2, 6) |
|  | (3, 4) |
|  | (4, 3) |
|  | (6, 2) |
|  | (12, 1) |
| 28 | (2, 7) |
|  | (7, 2) |
|  | (14, 1) |
| 32 | (2, 8) |
|  | (4, 4) |
|  | (8, 2) |
|  | (16, 1). |

15. The BS of claim 10, wherein the LC codebook is used for the PMI comprising the first beam and the second beam that are common for a plurality of layers, a weight being assigned to the first beam and the second beam is independent for each layer.

16. The BS of claim 11, wherein the LC pre-coder for 1-layer and 2-layer are given by:

$$W^{(1)}_{l,m,l',m',p,n_1,n_2,n_3} = W^{(l=0)}_{l,m,l',m',p,n_1,n_2,n_3}, \text{ and}$$

$$W^{(2)}_{l,m,l',m',p,n_1,0,n_2,0,n_3,0,n_1,1,n_2,1,n_3,1} = 1/\sqrt{2}[W^{(l=0)}_{l,m,l',m',p,n_1,0,n_2,0,n_3,0} \quad W^{(l=1)}_{l,m,l',m',p,n_1,1,n_2,1,n_3,1}],$$

respectively, where l=0 and l=1 denote a layer value 0 and a layer value 1, respectively.

17. A method for a channel state information (CSI) feedback in an advanced communication system, the method comprising:
receiving, from a base station (BS), CSI feedback configuration information for a pre-coding matrix indicator (PMI) feedback based on a linear combination (LC) codebook, wherein the PMI comprises a first PMI $i_1$ and a second PMI $i_2$;
determining, by a user equipment (UE), the first PMI $i_1$ and the second PMI $i_2$ indicating an LC pre-coder that corresponds to a weighted linear combination of a first beam and a second beam, where a power of a weight assigned to the first beam is 1 and a power of a weight assigned to the second beam is between 0 and 1; and
transmitting, to the BS, the CSI feedback over an uplink channel including the determined first PMI $i_1$ and second PMI $i_2$.

18. The method of claim 17, wherein the CSI feedback configuration information includes a number of dual-polarized CSI reference signal (CSI-RS) antenna ports P, wherein a first half of the CSI-RS antenna ports corresponds to a first antenna polarization and a second half of the CSI-RS antenna ports corresponds to a second antenna polarization, and wherein the LC pre-coder corresponding to the weighted linear combination of the first beam, $v_{l,m}$, and the second beam, $v_{l+l',m+m'}$, is determined as:

$$W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix},$$

wherein p denotes the power of the weight assigned to the second beam, $\varphi_{n_1}$ denotes a phase of the weight assigned to the second beam for the first half of the CSI-RS ports with the first polarization, and $\varphi_{n_2}$ and $\varphi_{n_3}$ denote a phase of the weights assigned to the first and second beams, respectively, for the second half of the CSI-RS ports with the second polarization.

19. The method of claim 17, wherein the LC codebook is a single codebook and used to report the CSI feedback for a plurality of layers.

20. The method of claim 18, further comprising:
receiving, from the BS, dual polarized CSI-RS port layout values comprising (N1, N2) using a higher layer signaling, which determines a number of CSI-RS ports P =2N1N2; and
determining an oversampling factor (O1, O2) based on a layer value for the CSI feedback, wherein:
for a 1-layer and 2-layer CSI feedback, O1=4 and O2=1 if N1=1, and O1=4 otherwise:
for more than the 2-layer CSI feedback, (O1, O2)=(16, 1) if (N1, N2)=(2,1), (O1, O2)=(8,1) if (N1, N2)= (4,1), and (O1, O2) are configured using a higher layer signaling for other values of (N1, N2), and $$\varphi_n = e^{j\pi n/2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T.$$

21. The method of claim 20, wherein a combination of the (N1, N2) is determined as:

| Number of CSI-RS antenna ports, P | (N$_1$, N$_2$) |
|---|---|
| 4 | (2, 1) |
| 8 | (2, 2) |
|  | (4, 1) |
| 12 | (2, 3) |
|  | (3, 2) |
| 16 | (2, 4) |
|  | (4, 2) |
|  | (8, 1) |
| 20 | (2, 5) |
|  | (5, 2) |
|  | (10, 1) |
| 24 | (2, 6) |
|  | (3, 4) |
|  | (4, 3) |
|  | (6, 2) |
|  | (12, 1) |
| 28 | (2, 7) |
|  | (7, 2) |
|  | (14, 1) |
| 32 | (2, 8) |
|  | (4, 4) |
|  | (8, 2) |
|  | (16, 1). |

22. The method of claim 17, further comprising at least one of:
deriving the first PMI $i_1$ and the second PMI $i_2$ based on the LC codebook when a rank indicator (RI) is less than or equal to two; or
deriving the first PMI $i_1$ and the second PMI $i_2$ based on a non-LC codebook when the RI is greater than two, wherein the non-LC codebook is determined in accordance with a long-term-evolution (LTE) specification, and
wherein, for the LC codebook, the first PMI $i_1$ comprises indices $(i_{1,1}, i_{1,2})$, $i_{1,b}$, and $i_{1,p}$ indicating (l,m), (l',m'), and p, respectively, in a first five subscripts of a LC pre-coder equation, and the second PMI $i_2=i_{2,0}$ for a 1-layer CSI feedback and $i_2=64 \cdot i_{2,1}+i_{2,0}$, where $i_{2,0}=i_{2,l}$ mod 64 and $i_{2,1}=\lfloor i_{2,l}/64 \rfloor$, for a 2-layer CSI feedback, where $i_{2,l}$ for l=0,1 indicates a last three subscripts of the LC pre-coder equation as $\lfloor i_{2,l}/4 \rfloor$ mod 4, $i_{2,l}$ mod 4, and $x=\lfloor i_{2,l}/16 \rfloor$, respectively.

23. The method of claim 17, wherein the LC codebook is used for the PMI comprising the first beam and the second beam that are common for a plurality of layers, a weight being assigned to the first beam and the second beam is independent for each layer.

24. The method of claim 18, wherein the LC pre-coder for 1-layer and 2-layer are given by:

$$W^{(1)}_{l,m,l',m',p,n_1,n_2,n_3} = W^{(l=0)}_{l,m,l',m',p,n_1,n_2,n_3}, \text{ and}$$

$$W^{(2)}_{l,m,l',m',p,n_{1,0},n_{2,0},n_{3,0},n_{1,1},n_{2,1},n_{3,1}} = 1/\sqrt{2} [W^{(l=0)}_{l,m,l',m',p, n_{1,0},n_{2,0},n_{3,0}}$$
$$W^{(l=1)}_{l,m,l',m',p,n_{1,1},n_{2,1},n_{3,1}}],$$

respectively, where l=0 and l=1 denote a layer value 0 and a layer value 1, respectively.

25. The method of claim 22, wherein the LC codebook for both 1-layer and 2-layer CSI feedback is given by:

If $N_1 > 1, N_2 > 1, 0 \le i_{1,1} \le 4N_1 - 1, 0 \le i_{1,2} \le 4N_2 - 1$

If $N_2 = 1, 0 \le i_{1,1} \le 4N_1 - 1, i_{1,2} = 0$ $0 \le i_{2,1} \le 63$

| 0 + 16x | 1 + 16x | 2 + 16x | 3 + 16x |
|---|---|---|---|
| $W^{(l)}_{i_{1,1},i_{1,2},4d_1,4d_2,p,0,0,x}$ | $W^{(l)}_{i_{1,1},i_{1,2},4d_1,4d_2,p,0,1,x}$ | $W^{(l)}_{i_{1,1},i_{1,2},4d_1,4d_2,p,0,2,x}$ | $W^{(l)}_{i_{1,1},i_{1,2},4d_1,4d_2,p,0,3,x}$ |

| 4 + 16x | 5 + 16x | 6 + 16x | 7 + 16x |
|---|---|---|---|
| $W^{(l)}_{i_{1,1},i_{1,2},4d_1,4d_2,p,1,0,x}$ | $W^{(l)}_{i_{1,1},i_{1,2},4d_1,4d_2,p,1,1,x}$ | $W^{(l)}_{i_{1,1},i_{1,2},4d_1,4d_2,p,1,2,x}$ | $W^{(l)}_{i_{1,1},i_{1,2},4d_1,4d_2,p,1,3,x}$ |

| 8 + 16x | 9 + 16x | 10 + 16x | 11 + 16x |
|---|---|---|---|
| $W^{(l)}_{i_{1,1},i_{1,2},4d_1,4d_2,p,2,0,x}$ | $W^{(l)}_{i_{1,1},i_{1,2},4d_1,4d_2,p,2,1,x}$ | $W^{(l)}_{i_{1,1},i_{1,2},4d_1,4d_2,p,2,2,x}$ | $W^{(l)}_{i_{1,1},i_{1,2},4d_1,4d_2,p,2,3,x}$ |

-continued

| If $N_1 > 1, N_2 > 1, 0 \leq i_{1,1} \leq 4N_1 - 1, 0 \leq i_{1,2} \leq 4N_2 - 1$ |
| If $N_2 = 1, 0 \leq i_{1,1} \leq 4N_1 - 1, i_{1,2} = 0$ |
| $0 \leq i_{2,1} \leq 63$ |

| 12 + 16x | 13 + 16x | 14 + 16x | 15 + 16x |
|---|---|---|---|
| $W^{(l)}_{i_{1,1},i_{1,2},4d_1,4d_2,p,3,0,x}$ | $W^{(l)}_{i_{1,1},i_{1,2},4d_1,4d_2,p,3,1,x}$ | $W^{(l)}_{i_{1,1},i_{1,2},4d_1,4d_2,p,3,2,x}$ | $W^{(l)}_{i_{1,1},i_{1,2},4d_1,4d_2,p,3,3,x}$ | wherein
$$x = \lfloor i_{2,l}/16 \rfloor, W^{(l)}_{l,m,l',m',p,n_1,n_2,n_3} = \frac{1}{\sqrt{P(1+p^2)}} \begin{bmatrix} v_{l,m} + p\varphi_{n_1} v_{l+l',m+m'} \\ \varphi_{n_2}(v_{l,m} + p\varphi_{n_3} v_{l+l',m+m'}) \end{bmatrix},$$

and $(i_{1,1}, i_{1,2})$ indicates the first beam, $v_{l,m}$, $(d_1, d_2)$, indicates the second beam, $v_{l+l',m+m'}$, p indicates the power assigned to the second beam, and the last three subscripts indicate $\varphi_{n_1}$, $\varphi_{n_2}$ and $\varphi_{n_3}$.

\* \* \* \* \*